United States Patent
Sato

(10) Patent No.: US 10,212,446 B2
(45) Date of Patent: *Feb. 19, 2019

(54) IMAGE PROCESSING DEVICE FOR SUPPRESSING DETERIORATION IN ENCODING EFFICIENCY

(71) Applicant: SONY CORPORATION, Tokyo (JP)

(72) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,182

(22) Filed: May 1, 2018

(65) Prior Publication Data

US 2018/0249170 A1   Aug. 30, 2018

Related U.S. Application Data

(63) Continuation of application No. 14/402,153, filed as application No. PCT/JP2013/075228 on Sep. 19, 2013, now Pat. No. 10,009,619.

(30) Foreign Application Priority Data

Sep. 28, 2012 (JP) ................................ 2012-218307
Dec. 26, 2012 (JP) ................................ 2012-283598
Jun. 20, 2013 (JP) ................................ 2013-129992

(51) Int. Cl.
*H04N 19/503* (2014.01)
*H04N 19/44* (2014.01)
(Continued)

(52) U.S. Cl.
CPC ......... *H04N 19/503* (2014.11); *H04N 19/103* (2014.11); *H04N 19/147* (2014.11);
(Continued)

(58) Field of Classification Search
None
See application file for complete search history.

(56) References Cited

U.S. PATENT DOCUMENTS

2005/0185714 A1   8/2005   Lin et al.
2007/0223595 A1*  9/2007   Hannuksela ........... H04N 19/70
                                                              375/240.26
(Continued)

FOREIGN PATENT DOCUMENTS

CN   101185332   5/2008
CN   101185343   5/2008
(Continued)

OTHER PUBLICATIONS

Kai Zhang, et al., "Selective Inter-layer Prediction", Joint Video Team (JVT) of ISO/IEC MPEG& TU-T VCEG (ISO/IEC JTC1/SC29/WG11 and ITU-T SG16 Q,6),18th Meeting, JVT-R064, Microsoft Research Asia, (Jan. 14-20, 2006), pp. 1-16.*

(Continued)

*Primary Examiner* — Kaitlin A Retallick
(74) *Attorney, Agent, or Firm* — Xsensus LLP

(57) ABSTRACT

The present disclosure relates to image processing device and method that can suppress the deterioration in encoding efficiency.

An image processing device includes: a reception unit that receives encoded data in which an image with a plurality of main layers is encoded, and inter-layer prediction control information controlling whether to perform inter-layer prediction, which is prediction between the plurality of main layers, with the use of a sublayer; and a decoding unit that decodes each main layer of the encoded data received by the reception unit by performing the inter-layer prediction on only the sublayer specified by the inter-layer prediction
(Continued)

control information received by the reception unit. The present disclosure can be applied to, for example, an image processing device.

10 Claims, 101 Drawing Sheets

(51) Int. Cl.
  *H04N 19/70* (2014.01)
  *H04N 19/187* (2014.01)
  *H04N 19/159* (2014.01)
  *H04N 19/147* (2014.01)
  *H04N 19/103* (2014.01)
  *H04N 19/31* (2014.01)

(52) U.S. Cl.
  CPC ......... *H04N 19/159* (2014.11); *H04N 19/187* (2014.11); *H04N 19/31* (2014.11); *H04N 19/44* (2014.11); *H04N 19/70* (2014.11)

(56) References Cited

U.S. PATENT DOCUMENTS

| | | | | |
|---|---|---|---|---|
| 2008/0089411 | A1* | 4/2008 | Wenger | H04N 19/105 375/240.12 |
| 2008/0123742 | A1 | 5/2008 | Xu et al. | |
| 2008/0267291 | A1* | 10/2008 | Vieron | H04N 19/139 375/240.16 |
| 2009/0097558 | A1* | 4/2009 | Ye | H04N 19/176 375/240.13 |
| 2010/0322529 | A1* | 12/2010 | Amonou | H04N 21/234327 382/233 |
| 2011/0305273 | A1* | 12/2011 | He | H04N 19/30 375/240.02 |
| 2012/0075436 | A1* | 3/2012 | Chen | H04N 13/161 348/51 |
| 2012/0183077 | A1* | 7/2012 | Hong | H04N 19/70 375/240.25 |
| 2013/0177066 | A1* | 7/2013 | Ye | H04N 19/36 375/240.02 |
| 2014/0064374 | A1* | 3/2014 | Xiu | H04N 19/52 375/240.16 |
| 2014/0169446 | A1* | 6/2014 | Yang | H04N 19/172 375/240.02 |
| 2014/0185671 | A1* | 7/2014 | Lee | H04N 19/50 375/240.12 |

FOREIGN PATENT DOCUMENTS

| | | |
|---|---|---|
| EP | 1897377 | 3/2008 |
| JP | 2009278495 | 11/2009 |

OTHER PUBLICATIONS

Schwarz, H.; Hinz, T.; Marpe, D.; Wiegand, T., "Constrained inter-layer prediction for single-loop decoding in spatial scalability," in Image Processing, 2005. ICIP 2005. IEEE International Conference on , vol. 2, No., pp. II-870-3, Sep. 11-14, 2005.*
Kai Zhang, et al,, "Selective Inter-layer Prediction", Joint Video Team (JVT) of ISO/I EC MPEG& TU-T VCEG (ISO/IEC JTC1/SC29/WG11 and ITU-T SGI 6 Q,6),18th Meeting, JVT-R064, Microsoft Research Asia, (Jan. 14-20, 2006), pp. 1-16.*
Schwarz, H.; Hinz, T.; Marpe, D.; Wiegand, T., "Constrained inter-layer prediction for single-loop decoding in spatial scalability," in Image Processing, 2005. ICIP 2005. IEEE International Conference on , vol. 2, No., pp. 11-870-3, Sep. 11-14, 2005.*
Wang et al., "HRD Parameters in VPS", Jul. 11-20, 2012, Joint Collaborative Team on Video Coding (JCT-VC) of ITU-T SG 16 WP3 and ISO/I EC JTC 1/SC 29/WG 11.*
Sato, K., "On inter-layer prediction enabling/disabling for HEVC scalable extensions" Sony Corp., pp. 1 to 6, (Oct. 10-19, 2012).
Xu, J., "AHG10: Selective inter-layer prediction signaling for HEVC scalable extension", Microsoft Corp., pp. 1 to 3, (Jul. 11-20, 2013).
Hannuksela, M., "AHG10 Hooks for Scalable Coding: Video Parameter Set Design", Nokia Corporation, pp. 1 to 5, (Jul. 11-20, 2012).
Luthra, A., "Scalable Video Coding Signalling in VPS", Motorola Mobility, pp. 1 to 2, (Jul. 11-20, 2012).
Written Opinion of the International Searching Authority dated Nov. 5, 2013 in PCT/JP13/075228 Filed Sep. 19, 2013.
International Search Report dated Nov. 5, 2013 in PCT/JP13/075228 Filed Sep. 19, 2013.
Office Action dated Feb. 5, 2015 in Japanese Patent Application No. 2014-538426.
Extended European Search Report dated Mar. 18, 2015 in Patent Application No. 13840882.8.
Chul Keun Kim, et al., "AHG 9/10: Generalized definition of the TLA for scalable extension" Joint Collaborative Team on Video Coding (JCT-VC) of ITU-T SG 16 WP 3 and ISO/IEC JTC 1/SC 29/WG 11, JCTVC-J0156, 10$^{th}$ Meeting, XP030112518, Jul. 2012, 4 Pages.
Office Action dated Jul. 14, 2015 in Japanese Patent Application No. 2014-538426.
Zhang K., et al., "Selective inter-layer prediction in scalable video coding," IEEE PCS 2007, Lisbon, Portugal, Nov. 9, 2007.
Schwarz H., et al., Constrained inter-layer prediction for single-loop decoding in spatial scalability, Image Processing, 2005. ICIP 2005. IEEE International Conference on, Sep. 14, 2005, vol. 2, pp. 870-873.
Xu J., AHG10: Selective inter-layer prediction signaling for HEVC scalable extension, Joint Collaborative Team on Video Coding (JCT-VC) of ITU-T SG 16 WP3 and ISO/IEC JTC 1/SC 29/WG 11, No. JCTVC-J0239, 10$^{th}$ Meeting: Stockholm, SE, Jul. 20, 2012.
Office Action issued in Singapore Application No. 11201408580P dated Mar. 11, 2016.
Office Action dated Dec. 21, 2014 in Korean Patent Application No. 10-2014-7033377 (with English language translation).
Benjamin Bross, et al. "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003-v21, 7$^{th}$ Meeting, (Nov. 21-30, 2011, 259 pages.
Benjamin Bross, et al. "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003-v22, 8$^{th}$ Meeting, (Feb. 1-10, 2012), 259 pages.
Extended European Search Report dated May 11, 2017 in Patent Application No. 17161556.0.
Singaporean Search Report and Written Opinion dated May 23, 2017 in Patent Application No. 10201507195Q.
Japanese Office Action dated May 16, 2017 in Patent Application No. 2015-077536 (without English Translation).
Chun-Su Park et al., "Selective Inter-Layer Residual Prediction for SVC-based Video Streaming", IEEE Transactions on Consumer Electronics, vol. 55, No. 1, Feb. 2009, pp. 235-239.
Chinese Office Action dated Sep. 7, 2018 in Chinese Application No. 201610552082.X.
Chinese Office Action dated Sep. 26, 2018 in Chinese Application No. 201610554619.6.
Korean Office Action dated Sep. 10, 2018 in Korean Application No. 10-2015-7007178.
Japanese Office Action dated Nov. 6, 2018 in Japanese Application No. 2018-006935.

* cited by examiner

*FIG. 5*

| video_parameter_set_rbsp( ) { | Descriptor |
|---|---|
|   video_parameter_set_id | u(4) |
|   vps_temporal_id_nesting_flag | u(1) |
|   vps_reserved_zero_2bits | u(2) |
|   vps_reserved_zero_6bits | u(6) |
|   vps_max_sub_layers_minus1 | u(3) |
|   profile_and_level( 1, vps_max_sub_layers_minus1 ) | |
|   vps_reserved_zero_12bits | u(12) |
|   for(i = 0; i <= vps_max_sub_layers_minus1; i++) { | |
|     vps_max_dec_pic_buffering[i] | ue(v) |
|     vps_max_num_reorder_pics[i] | ue(v) |
|     vps_max_latency_increase[i] | ue(v) |
|   } | |
|   vps_num_hrd_parameters | ue(v) |
|   for(i = 0; i < vps_num_hrd_parameters; i++) { | |
|     if(i > 0) | |
|       op_point(i) | |
|     hrd_parameters(i == 0, vps_max_sub_layers_minus1) | |
|   } | |
|   vps_extension_flag | u(1) |
|   if(vps_extension_flag) | |
|     while( more_rbsp_data( )) | |
|       vps_extension_data_flag | u(1) |
|   } | |
|   rbsp_trailing_bits( ) | |
| } | |

*FIG. 8*

| video_parameter_set_rbsp( ) { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits | u(6) |
| max_layer_minus1 | u(3) |
| vps_max_sub_layers_minus1 | u(3) |
| for(i = 1; i <= max_layers_minus1; i++) | |
| max_sub_layer_for_inter_layer_prediction[i] | u(3) |
| profile_and_level(1, vps_max_sub_layers_minus1) | |
| vps_reserved_zero_12bits | u(12) |
| for(i = 0; i <= vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| vps_num_hrd_parameters | ue(v) |
| for(i = 0; i < vps_num_hrd_parameters; i++) { | |
| if(i > 0) | |
| op_point(i) | |
| hrd_parameters(i == 0, vps_max_sub_layers_minus1) | |
| } | |
| vps_extension_flag | u(1) |
| if(vps_extension_flag) | |
| while( more_rbsp_data( )) | |
| vps_extension_data_flag | u(1) |
| } | |
| rbsp_trailing_bits( ) | |
| } | |

FIG. 29

| video_parameter_set_rbsp( ) { | Descriptor |
|---|---|
|   video_parameter_set_id | u(4) |
|   vps_temporal_id_nesting_flag | u(1) |
|   vps_reserved_zero_2bits | u(2) |
|   vps_reserved_zero_6bits | u(6) |
|   max_layer_minus1 | u(3) |
|   for( i = 0; i <= max_layers_minus1; i++) | |
|     vps_num_sub_layers_minus1[i] | u(3) |
|   for( i = 1; i <= max_layers_minus1; i++) | |
|     max_sub_layer_for_inter_layer_prediction[i] | u(3) |
|   profile_and_level(1, vps_max_sub_layers_minus1) | |
|   vps_reserved_zero_12bits | u(12) |
|   for( i = 0; i <= vps_max_sub_layers_minus1; i++ ) { | |
|     vps_max_dec_pic_buffering[i] | ue(v) |
|     vps_max_num_reorder_pics[i] | ue(v) |
|     vps_max_latency_increase[i] | ue(v) |
|   } | |
|   vps_num_hrd_parameters | ue(v) |
|   for( i = 0; i < vps_num_hrd_parameters; i++) { | |
|     if(i > 0) | |
|       op_point(i) | |
|     hrd_parameters(i = = 0, vps_max_sub_layers_minus1) | |
|   } | |
|   vps_extension_flag | u(1) |
|   if(vps_extension_flag) | |
|     while( more_rbsp_data( )) | |
|       vps_extension_data_flag | u(1) |
|   } | |
|   rbsp_trailing_bits( ) | |
| } | |

FIG. 36

| video_parameter_set_rbsp( ) { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits | u(6) |
| max_layer_minus1 | u(3) |
| vps_max_sub_layers_minus1 | u(3) |
| unified_max_sub_layer_for_inter_layer_prediction_flag | u(1) |
| if(unified_max_sub_layer_for_inter_prediction_flag) | |
| unified_max_sub_layer_for_inter_layer_prediction | u(3) |
| else | |
| for(i = 1;i <= max_layers_minus1;i++) | |
| max_sub_layer_for_inter_layer_prediction[i] | u(3) |
| profile_and_level(1, vps_max_sub_layers_minus1) | |
| vps_reserved_zero_12bits | u(12) |
| for(i = 0;i <= vps_max_sub_layers_minus1;i++) { | |
| vps_max_dec_pic_buffering[i] | ue(v) |
| vps_max_num_reorder_pics[i] | ue(v) |
| vps_max_latency_increase[i] | ue(v) |
| } | |
| vps_num_hrd_parameters | ue(v) |
| for(i = 0;i < vps_num_hrd_parameters;i++) { | |
| if(i > 0) | |
| op_point(i) | |
| hrd_parameters(i = = 0, vps_max_sub_layers_minus1) | |
| } | |
| vps_extension_flag | u(1) |
| if(vps_extension_flag) | |
| while(more_rbsp_data( )) | |
| vps_extension_data_flag | u(1) |
| } | |
| rbsp_trailing_bits( ) | |
| } | |

FIG. 57

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level(sps_max_sub_layers_minus1) | |
| sps_seq_parameter_set_id | ue(v) |
| chroma_format_idc | ue(v) |
| if(chroma_format_idc == 3) | |
|     separate_colour_plane_flag | u(1) |
| pic_width_in_luma_samples | ue(v) |
| pic_height_in_luma_samples | ue(v) |
| conformance_window_flag | u(1) |
| if(conformance_window_flag) { | |
|     conf_win_left_offset | ue(v) |
|     conf_win_right_offset | ue(v) |
|     conf_win_top_offset | ue(v) |
|     conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for(i=(sps_sub_layer_ordering_info_present_flag?0:sps_max_sub_layers_minus1);<br>    i<=sps_max_sub_layers_minus1; i++) { | |
|     sps_max_dec_pic_buffering_minus1[i] | ue(v) |
|     sps_max_num_reorder_pics[i] | ue(v) |
|     sps_max_latency_increase_plus1[i] | ue(v) |
| } | |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| scaling_list_enabled_flag | u(1) |
| if(scaling_list_enabled_flag) { | |
|     sps_scaling_list_data_present_flag | u(1) |
|     if(sps_scaling_list_data_present_flag) | |
|         scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag) { | |

FIG. 58

| | |
|---|---|
| pcm_sample_bit_depth_luma_minus1 | u(4) |
| pcm_sample_bit_depth_chroma_minus1 | u(4) |
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for(i=0;i<num_short_term_ref_pic_sets;i++) | |
| short_term_ref_pic_set(i) | |
| long_term_ref_pics_present_flag | u(1) |
| if(long_term_ref_pics_present_flag) { | |
| num_long_term_ref_pics_sps | ue(v) |
| for(i=0;i<num_long_term_ref_pics_sps;i++) { | |
| lt_ref_pic_poc_lsb_sps[i] | u(v) |
| used_by_curr_pic_lt_sps_flag[i] | u(1) |
| } | |
| } | |
| sps_temporal_mvp_enabled_flag | u(1) |
| strong_intra_smoothing_enabled_flag | u(1) |
| vui_parameters_present_flag | u(1) |
| if(vui_parameters_present_flag) | |
| vui_parameters( ) | |
| sps_extension_flag | u(1) |
| if(sps_extension_flag) { | |
| inter_view_mv_vert_constraint_flag | u(1) |
| sps_inter_layer_mfm_enable_flag | u(1) |
| while(more_rbsp_data( )) | |
| sps_extension_data_flag | u(1) |
| rbsp_trailing_bits( ) | |
| } | |
| } | |

FIG. 59

| slice_segment_header( ) { | Descriptor |
|---|---|
|   first_slice_segment_in_pic_flag | u(1) |
|   if(nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     for (i=0; i<num_extra_slice_header_bits; i++) | |
|       slice_reserved_flag[i] | u(1) |
|     slice_type | ue(v) |
|     if(output_flag_present_flag) | |
|       pic_output_flag | u(1) |
|     if(separate_colour_plane_flag == 1) | |
|       colour_plane_id | u(2) |
|     if(nal_unit_type != IDR_W_RADL && nal_unit_type != IDR_N_LP) { | |
|       slice_pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else if (num_short_term_ref_pic_sets>1) | |
|         short_term_ref_pic_set_idx | u(v) |
|       if(long_term_ref_pics_present_flag) { | |
|         if (num_long_term_ref_pics_sps>0) | |
|           num_long_term_sps | ue(v) |
|         num_long_term_pics | ue(v) |
|         for(i=0; i<num_long_term_sps + num_long_term_pics; i++) { | |
|           if(i<num_long_term_sps) { | |
|             if(num_long_term_ref_pics_sps>1) | |
|               lt_idx_sps[i] | u(v) |
|           }else{ | |
|             poc_lsb_lt[i] | u(v) |
|             used_by_curr_pic_lt_flag[i] | u(1) |
|           } | |
|           delta_poc_msb_present_flag[i] | u(1) |
|           if(delta_poc_msb_present_flag[i]) | |
|             delta_poc_msb_cycle_lt[i] | ue(v) |
|         } | |
|       } | |
|       if(sps_temporal_mvp_enabled_flag) | |

*FIG. 60*

| | |
|---|---|
| slice_temporal_mvp_enabled_flag | u(1) |
| } | |
| if(sample_adaptive_offset_enabled_flag) { | |
|   slice_sao_luma_flag | u(1) |
|   slice_sao_chroma_flag | u(1) |
| } | |
| if( slice_type == P \|\| slice_type == B) { | |
|   num_ref_idx_active_override_flag | u(1) |
|   if(num_ref_idx_active_override_flag) { | |
|     num_ref_idx_l0_active_minus1 | ue(v) |
|     if(slice_type == B) | |
|       num_ref_idx_l1_active_minus1 | ue(v) |
|   } | |
|   if(lists_modification_present_flag && NumPocTotalCurr>1) | |
|     ref_pic_lists_modification( ) | |
|   if(slice_type == B) | |
|     mvd_l1_zero_flag | u(1) |
|   if(cabac_init_present_flag) | |
|     cabac_init_flag | u(1) |
|   if(slice_temporal_mvp_enabled_flag) { | |
|     if(slice_type == B) | |
|       collocated_from_l0_flag | u(1) |
|     if((collocated_from_l0_flag && num_ref_idx_l0_active_minus1>0) \|\| | |
|       (!collocated_from_l0_flag && num_ref_idx_l1_active_minus1>0)) | |
|       collocated_ref_idx | ue(v) |
|   } | |
|   if((weighted_pred_flag && slice_type == P)\|\| | |
|     (weighted_bipred_flag && slice_type == B)) | |
|     pred_weight_table( ) | |
|   five_minus_max_num_merge_cand | ue(v) |
| } | |
| slice_qp_delta | se(v) |
| if(pps_slice_chroma_qp_offsets_present_flag) { | |
|   slice_cb_qp_offset | se(v) |
|   slice_cr_qp_offset | se(v) |
| } | |
| if(deblocking_filter_override_enabled_flag) | |
|   deblocking_filter_override_flag | u(1) |
| if(deblocking_filter_override_flag) { | |
|   slice_deblocking_filter_disabled_flag | u(1) |
|   if(!slice_deblocking_filter_disabled_flag) { | |
|     slice_beta_offset_div2 | se(v) |
|     slice_tc_offset_div2 | se(v) |
|   } | |

FIG. 61

| | |
|---|---|
| } | |
| if(pps_loop_filter_across_slices_enabled_flag && | |
| (slice_sao_luma_flag \|\| slice_sao_chroma_flag \|\| | |
| !slice_deblocking_filter_disabled_flag)) | |
| slice_loop_filter_across_slices_enabled_flag | u(1) |
| } | |
| if(tiles_enabled_flag \|\| entropy_coding_sync_enabled_flag) { | |
| num_entry_point_offsets | ue(v) |
| if(num_entry_point_offsets>0) { | |
| offset_len_minus1 | ue(v) |
| for(i=0; i<num_entry_point_offsets; i++) | |
| entry_point_offset_minus1[i] | u(v) |
| } | |
| } | |
| if(slice_segment_header_extension_present_flag) { | |
| slice_segment_header_extension_length | ue(v) |
| for(i=0; i<slice_segment_header_extension_length; i++) | |
| slice_segment_header_extension_data_byte[i] | u(8) |
| } | |
| byte_alignment( ) | |
| } | |

FIG. 96

```
<?xml version="1.0"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
type="static"
mediaPresentationDuration="PT3256S"
minBufferTime="PT1.2S"
profiles="urn:mpeg:dash:profile:isoff-on-demand:2011">

<BaseURL>http://cdn1.example.com/</BaseURL>
<BaseURL>http://cdn2.example.com/</BaseURL>

<Period>
  <!--English Audio-->
  <AdaptationSet mimeType="audio/mp4" codecs="mp4a.0x40" lang="en" subsegmentAlignment="true" subsegmentStartsWithSAP="1">
    <ContentProtection schemeIdUri="urn:uuid:706D6953-656C-5244-4048-656164657221"/>
    <Representation id="1" bandwidth="64000">
      <BaseURL>765741234a.mp4</BaseURL>
    </Representation>
    <Representation id="2" bandwidth="32000">
      <BaseURL>346364634b.mp4</BaseURL>
    </Representation>
  </AdaptationSet>
  <!--Video-->
  <AdaptationSet mimeType="video/mp4" codecs="avc1.4d0228" subsegmentAlignment="true" subsegmentStartsWithSAP="2">
    <ContentProtection schemeIdUri="urn:uuid:706D6953-656C-5244-4048-656164657221"/>
    <Representation id="6" bandwidth="256000" width="320" height="240">
      <BaseURL>8563456473.mp4</BaseURL>
    </Representation>
    <Representation id="7" bandwidth="512000" width="320" height="240">
      <BaseURL>5636363634.mp4</BaseURL>
    </Representation>
    <Representation id="8" bandwidth="1024000" width="640" height="480">
      <BaseURL>5624565736.mp4</BaseURL>
    </Representation>
    <Representation id="9" bandwidth="1384000" width="640" height="480">
      <BaseURL>4132545.mp4</BaseURL>
    </Representation>
    <Representation id="A" bandwidth="1536000" width="1280" height="720">
      <BaseURL>890045625.mp4</BaseURL>
    </Representation>
    <Representation id="B" bandwidth="2048000" width="1280" height="720">
      <BaseURL>2353674573a.mp4</BaseURL>
    </Representation>
  </AdaptationSet>
</Period>
</MPD>
```

IMAGE PROCESSING DEVICE FOR SUPPRESSING DETERIORATION IN ENCODING EFFICIENCY

CROSS-REFERENCE TO RELATED APPLICATIONS

The present application is a continuation of U.S. application Ser. No. 14/402,153, filed on Nov. 19, 2014 which is based on PCT application No. PCT/JP2013/075228, filed on Sep. 19, 2013, and claims priority to Japanese Patent Application 2013-129992, filed on Jun. 20, 2013, Japanese Patent Application 2012-283598, filed on Dec. 26, 2012, and Japanese Patent Application 2012-218307, filed on Sep. 28, 2012, the entire contents of each of which is incorporated herein by reference.

TECHNICAL FIELD

The present invention relates to an image processing device and a method, and particularly to an image processing device and a method that can suppress the deterioration in encoding efficiency.

BACKGROUND ART

In recent years, an device has become popular that handles image information digitally and for the purpose of highly efficiently transmitting and accumulating the information, compresses and encodes an image by employing an encoding method that compresses the image through the motion compensation and orthogonal transform such as discrete cosine transform by using the redundancy unique to the image information. This encoding method includes, for example, MPEG (Moving Picture Experts Group).

In particular, MPEG2 (ISO/IEC 13818-2) is defined as the versatile image encoding method, and is the standard covering both the interlaced scanning image and sequential scanning image and moreover the standard-resolution image and high-definition image. For example, currently MPEG2 is widely used in the applications for the professionals and consumers. By the use of the MPEG2 compression method, in the case of the interlaced scanning image with the standard resolution having 720×480 pixels, the code amount (bit rate) of 4 to 8 Mbps is allocated. By the use of the MPEG2 compression method, in the case of the interlaced scanning image with the high resolution having 1920×1088 pixels, the code amount (bit rate) of 18 to 22 Mbps is allocated. This enables the high compression rate and excellent image quality.

MPEG2 is mainly intended for the high-definition image encoding that is suitable for the broadcasting but does not deal with the lower code amount (bit rate) than MPEG1, i.e., with the encoding method with a higher compression rate. The encoding method as above is likely to be needed more as the portable terminals spread, and accordingly the MPEG4 encoding method has been standardized. In regard to the image encoding method, the specification was approved in Dec., 1998 as the international standard with the name of ISO/IEC 14496-2.

Moreover, in recent years, the standard called H.26L (ITU-T (International Telecommunication Union Telecommunication Standardization Sector) Q6/16 VCEG (Video Coding Expert Group)) has been set for the purpose of encoding the image for the teleconference. It has been known that H.26L achieves higher encoding efficiency though H.26 requires more calculations in encoding and decoding than the conventional encoding methods such as MPEG2 and MPEG4. Moreover, as one of activities of MPEG4, based on this H.26L, the standardization that achieves higher encoding efficiency is performed as Joint Model of Enhanced-Compression Video Coding in which the function that is not supported in H.26L has been introduced.

As for the schedule of the standardization, the international standard was set with the name of H.264 and MPEG-4 part 10 (Advanced Video Coding, hereinafter AVC) in Mar., 2003.

In addition, as the extension of H.264/AVC, the standardization of FRExt (Fidelity Range Extension) including the quantization matrix or 8×8 DCT defined in MPEG-2 and the encoding tool necessary for the work, such as RGB, 4:2:2, and 4:4:4 was completed in Feb., 2005. In this manner, the encoding method capable of expressing even the film noises included in a film based on H.264/AVC is achieved and used in the wide application including Blu-Ray Disc (trademark).

In recent years, however, there has been an increasing desire for the encoding with a higher compression rate: compressing the image with approximately 4000×2000 pixels corresponding four times that of the high-vision image; or distributing the high-vision image in the environment with the limited transmission capacity such as on the Internet. This induces the further examination on the improvement of the encoding efficiency in VCEG under ITU-T.

In view of this, for the purpose of improving the encoding efficiency over AVC, JCTVC (Joint Collaboration Team-Video Coding) as the ITU-T and ISO/IEC joint standardization group has advanced the standardization of the encoding method called HEVC (High Efficiency Video Coding). As for the HEVC specification, Committee draft corresponding to the first draft was issued in February, 2012 (for example, see Non-Patent Document 1).

Incidentally, the conventional image encoding method such as the MPEG-2 or AVC has the scalability (scalability) function of encoding the image by dividing the image into a plurality of layers.

In other words, the image compression information of just a base layer (base layer) is transmitted to a terminal with low process capacity, such as a cellular phone, so that a moving image with low spatial temporal resolution or low image quality is reproduced; on the other hand, in addition to the information of the base layer, the image compression information of an enhancement layer (enhancement layer) is transmitted to a terminal with high process capacity, such as a TV or a personal computer, so that a moving image with high spatial temporal resolution or high image quality is reproduced. Thus, the image compression information depending on the capacity of the terminal or the network can be transmitted from a server without the transcoding process.

By the way, in the scalable encoding, performing the prediction process between the layers for all the pictures leads to the increase in calculation amount.

In view of this, specifying on/off (on/off) of the prediction process between the layers for every picture (picture) in the NAL unit (NAL_Unit) has been suggested (for example, see Non-Patent Document 2).

CITATION LIST

Patent Document

Non-Patent Documents

Non-Patent Document 1: Benjamin Bross, Woo-Jin Han, Jens-Rainer Ohm, Gary J. Sullivan, Thomas Wiegand, "High efficiency video coding (HEVC) text specification draft 6", JCTVC-H1003 ver21, Joint Collaborative Team on Video Coding (JCT-VC) of ITU-T SG16 WP3 and ISO/IEC JTC1/SC29/WG117th Meeting: Geneva, CH, 21-30 Nov., 2011

Non-Patent Document 2: Jizheng Xu, "AHG10: Selective inter-layer prediction signalling for HEVC scalable extension", JCTVC-J0239, Joint Collaborative Team on Video Coding (JCT-VC) of ITU-T SG 16 WP 3 and ISO/IEC JTC 1/SC 29/WG 1110th Meeting: Stockholm, SE, 11-20 Jul. 2012

SUMMARY OF THE INVENTION

Problems to be Solved by the Invention

However, in the conventional method, the information for controlling the on/off (on/off) of the prediction process between the layers has been generated and transmitted for every picture. Therefore, there has been a risk that the code amount would increase due to the transmission of the information to thereby deteriorate the encoding efficiency.

The present invention has been made in view of the above and is to suppress the deterioration in encoding efficiency.

Solutions to Problems

An aspect of the present technique is an image processing device including: a reception unit that receives encoded data in which an image with a plurality of main layers is encoded, and inter-layer prediction control information controlling whether to perform inter-layer prediction, which is prediction between the plurality of main layers, with the use of a sublayer; and a decoding unit that decodes each main layer of the encoded data received by the reception unit by performing the inter-layer prediction on only the sublayer specified by the inter-layer prediction control information received by the reception unit.

If a current picture of a current main layer belongs to the sublayer specified as the sublayer for which the inter-layer prediction is performed by the inter-layer prediction control information, the decoding unit may decode the encoded data of the current picture using the inter-layer prediction.

The inter-layer prediction control information may specify a highest sublayer for which the inter-layer prediction is allowed; and the decoding unit may decode using the inter-layer prediction, the encoded data of the picture belonging to the sublayers from a lowest sublayer to the highest sublayer specified by the inter-layer prediction control information.

The inter-layer prediction control information may be set for each main layer.

The inter-layer prediction control information may be set as a parameter common to all the main layers.

The reception unit may receive inter-layer pixel prediction control information that controls whether to perform inter-layer pixel prediction, which is pixel prediction between the plurality of main layers, and inter-layer syntax prediction control information that controls whether to perform inter-layer syntax prediction, which is syntax prediction between the plurality of main layers, the inter-layer pixel prediction control information and the inter-layer syntax prediction control information being set independently as the inter-layer prediction control information; and the decoding unit may perform the inter-layer pixel prediction based on the inter-layer pixel prediction control information received by the reception unit, and perform the inter-layer syntax prediction based on the inter-layer syntax prediction control information received by the reception unit.

The inter-layer pixel prediction control information may control using the sublayer, whether to perform the inter-layer pixel prediction; the decoding unit may perform the inter-layer pixel prediction on only the sublayer specified by the inter-layer pixel prediction control information; the inter-layer syntax prediction control information may control whether to perform the inter-layer syntax prediction for each picture or slice; and the decoding unit may perform the inter-layer syntax prediction on only the picture or slice specified by the inter-layer syntax prediction control information.

The inter-layer pixel prediction control information may be transmitted as a nal unit (nal_unit), a video parameter set (VPS (Video Parameter Set)), or an extension video parameter set (vps_extension).

The inter-layer syntax prediction control information may be transmitted as a nal unit (nal_unit), a picture parameter set (PPS (Picture Parameter Set)), or a slice header (SliceHeader).

Further, an aspect of the present technique is an image processing method including: receiving encoded data in which an image with a plurality of main layers is encoded, and inter-layer prediction control information controlling whether to perform inter-layer prediction, which is prediction between the plurality of main layers, with the use of a sublayer; and decoding each main layer of the received encoded data by performing the inter-layer prediction on only the sublayer specified by the received inter-layer prediction control information.

Another aspect of the present technique is an image processing device including: an encoding unit that encodes each main layer of the image data by performing inter-layer prediction, which is prediction between a plurality of main layers, on only a sublayer specified by inter-layer prediction control information that controls whether to perform the inter-layer prediction with the use of a sublayer; and a transmission unit that transmits encoded data obtained by encoding by the encoding unit, and the inter-layer prediction control information.

If a current picture of a current main layer belongs to the sublayer specified as the sublayer for which the inter-layer prediction is performed by the inter-layer prediction control information, the encoding unit may encode the image data of the current picture using the inter-layer prediction.

The inter-layer prediction control information may specify a highest sublayer for which the inter-layer prediction is allowed; and the encoding unit may encode using the inter-layer prediction, the image data of the picture belonging to the sublayers from a lowest sublayer to the highest sublayer specified by the inter-layer prediction control information.

The inter-layer prediction control information may be set for each main layer.

The inter-layer prediction control information may be set as parameters common to all the main layers.

The encoding unit may perform inter-layer pixel prediction as pixel prediction between the plurality of main layers based on inter-layer pixel prediction control information that controls whether to perform the inter-layer pixel prediction and that is set as the inter-layer prediction control information; the encoding unit may perform inter-layer syntax prediction as syntax prediction between the plurality of main layers based on inter-layer syntax prediction control information that controls whether to perform the inter-layer syntax prediction and that is set as the inter-layer prediction control information independently from the inter-layer pixel prediction control information; and the transmission unit may transmit the inter-layer pixel prediction control information and the inter-layer syntax prediction control information that are set independently from each other as the inter-layer prediction control information.

The inter-layer pixel prediction control information may control using the sublayer, whether to perform the inter-layer pixel prediction; the encoding unit may perform the inter-layer pixel prediction on only the sublayer specified by the inter-layer pixel prediction control information; the inter-layer syntax prediction control information may control whether to perform the inter-layer syntax prediction for each picture or slice; and the encoding unit may perform the inter-layer syntax prediction on only the picture or slice specified by the inter-layer syntax prediction control information.

The transmission unit may transmit the inter-layer pixel prediction control information as a nal unit (nal_unit), a video parameter set (VPS (Video Parameter Set)), or an extension video parameter set (vps_extension).

The transmission unit may transmit the inter-layer syntax prediction control information as a nal unit (nal_unit), a picture parameter set (PPS (Picture Parameter Set)), or a slice header (SliceHeader).

Further, another aspect of the present technique is an image processing method including: encoding each main layer of the image data by performing inter-layer prediction, which is prediction between a plurality of main layers, on only a sublayer specified by inter-layer prediction control information that controls whether to perform the inter-layer prediction with the use of a sublayer; and transmitting encoded data obtained by the encoding, and the inter-layer prediction control information.

In an aspect of the present technique, the encoded data in which the image with the plural main layers is encoded, and the inter-layer prediction control information that controls whether to perform the inter-layer prediction, which is the prediction between the main layers, using the sublayer are received and the inter-layer prediction is performed on just the sublayer specified by the received inter-layer prediction control information; thus, each main layer of the received encoded data is decoded.

In another aspect of the present technique, the inter-layer prediction is performed on just the sublayer specified by the inter-layer prediction control information that controls whether to perform the inter-layer prediction, which is the prediction between the main layers, using the sublayer; thus, each main layer of the image data is encoded and the encoded data obtained by the encoding and the inter-layer prediction control information are transmitted.

Effects of the Invention

According to the present disclosure, the image can be encoded and decoded and particularly, the deterioration in encoding efficiency can be suppressed.

BRIEF DESCRIPTION OF DRAWINGS

FIG. 5 is a diagram for describing an example of syntax of a video parameter set.
FIG. 8 is a diagram for describing an example of the syntax of a video parameter set.
FIG. 29 is a flowchart for describing an example of the syntax of a video parameter set.

FIG. 36 is a diagram for describing an example of the syntax of a video parameter set.

FIG. 57 is a diagram illustrating an example of a sequence parameter set.

FIG. 58 is a diagram illustrating an example of the sequence parameter set, which is subsequent to FIG. 57.

FIG. 59 is a diagram illustrating an example of a slice header.

FIG. 60 is a diagram illustrating an example of the slice header, which is subsequent to FIG. 59.

FIG. 61 is a diagram illustrating an example of the slice header, which is subsequent to FIG. 60.

FIG. 96 is an explanatory diagram illustrating a specific example of MPD.

MODE FOR CARRYING OUT THE INVENTION

Modes (hereinafter, embodiments) for carrying out the present disclosure are hereinafter described. The description is made in the following order:
0. Summary
1. First embodiment (image encoding device)
2. Second embodiment (image decoding device)
3. Third embodiment (image encoding device)
4. Fourth embodiment (image decoding device)
5. Fifth embodiment (image encoding device)
6. Sixth embodiment (image decoding device)
7. Summary 2
8. Seventh embodiment (image encoding device)
9. Eighth embodiment (image decoding device)
10. Summary 3
11. Ninth embodiment (image encoding device)
12. Tenth embodiment (image decoding device)
13. Eleventh embodiment (inter-layer syntax prediction control)
14. Others
15. Twelfth embodiment (computer)
16. Application example
17. Application example of scalable encoding
18. Thirteenth embodiment (set/unit/module/processor)
19. Fourteenth embodiment (application example of MPEG-DASH content reproducing system)
20. Fifteenth embodiment (application example of Wi-Fi wireless communication system)

<0. Summary>
<Encoding Method>

The present technique will be described based on an example in which the present technique is applied to encode or decode the image in HEVC (High Efficiency Video Coding) method.

<Coding Unit>

In the AVC (Advanced Video Coding) method, the layer structure of macroblocks and submacroblocks is defined. The macroblocks of 16 pixels×16 pixels, however, are not the optimum for the picture frame as high as UHD (Ultra High Definition: 4000 pixels×2000 pixels) to be encoded by the next-generation encoding method.

Figure 1:
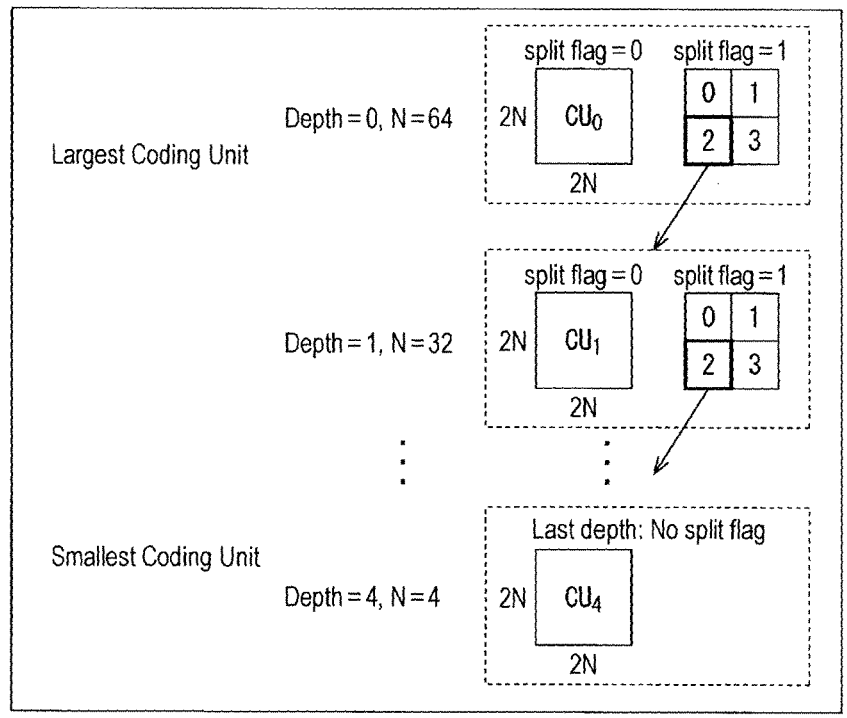
FIG. 1 is a diagram for describing a structure example of a coding unit.

In contrast to this, in the HEVC method, the coding unit (CU (Coding Unit)) is defined as illustrated in FIG. 1.

CU is also referred to as Coding Tree Block (CTB) and is the partial region of the image in the unit of picture that plays a role similar to the macroblock in the AVC method. While the latter is fixed to the size of 16×16 pixels, the size of the former is not fixed and will be specified in the image compression information in each sequence.

For example, in the sequence parameter set (SPS (Sequence Parameter Set)) included in the encoded data to be output, the maximum size of CU (LCU (Largest Coding Unit)) and the minimum size of CU (SCU (Smallest Coding Unit)) are defined.

In each LCU, by splitting the unit in the range that the size does not become less than the size of SCU as split-flag=1, the unit can be divided into the smaller CUs. In the example of FIG. 1, the size of LCU is 128 and the maximum layer depth is 5. When the split flag has a value of "1", the CU with a size of 2N×2N is divided into CUs with a size of N×N in a one-lower layer.

Moreover, the CU is divided into prediction units (Prediction Units (PUs)), each region serving as the unit of process in the inter prediction or intra prediction (partial region of the image in the unit of picture), and into transform units (Transform Units (TUs)), each region serving as the unit of process in the orthogonal transform (partial region of the image in the unit of picture). At present, in the HEVC method, in addition to the 4×4 and 8×8 orthogonal transforms, 16×16 and 32×32 orthogonal transforms can be used.

In the case of such an encoding method that the CU is defined and the various processes are performed in the unit of CU like in the HEVC method, the macroblock in the AVC method corresponds to the LCU and the block (subblock) corresponds to the CU. Moreover, the motion compensation block in the AVC method corresponds to the PU. However, since CU has the layer structure, the highest layer LCU has a size that is generally set larger than the macroblock in the AVC method and has, for example, 128×128 pixels.

Therefore, in the description below, the LCU includes the macroblocks in the AVC method and the CU includes the block (subblock) in the AVC method. In other words, the term "block" used in the description below refers to any partial region in the picture and the size, shape, and characteristic, etc. are not limited. Therefore, "block" includes any region (unit of process) such as TU, PU, SCU, CU, LCU, subblock, macroblock, or a slice. Needless to say, other regions (unit of process) than the above are also included. If there is a necessity to limit the size or the unit of process, the description will be made as appropriate.

In this specification, CTU (Coding Tree Unit) is the unit including the parameter when the process is performed by the CTB (Coding Tree Block) of the LCU (Largest Coding Unit) and the LCU base (level) thereof. Moreover, CU (Coding Unit) in CTU is the unit including the parameter when the process is performed by the CB (Coding Block) and the CU base (level) thereof.

<Mode Selection>

To achieve the higher encoding efficiency in the AVC and HEVC encoding methods, the selection of appropriate prediction mode is important.

For example, the selection may be made from among methods mounted in the reference software (made public in http://iphome.hhi.de/suehring/tml/index.htm) of H.264/MPEG-4 AVC called JM (Joint Model).

In JM, the selection can be made from between two mode determination methods: High Complexity Mode and Low Complexity Mode as described below. In either mode, the cost function value related to the prediction modes Mode is calculated and the prediction mode for minimizing the value is selected as the optimum mode for the block to the macroblock.

The cost function in the High Complexity Mode is as expressed in the following Formula (1).

[Mathematical Formula 1]

$$\text{Cost}(\text{Mode} \in \Omega) = D + \lambda * R \qquad (1)$$

In this formula, $\Omega$ is the universal set of the candidate modes for encoding the block to the macroblock, D is the differential energy between the decoded image and the input image when the encoding is performed in the prediction mode, $\lambda$ is the Lagrange multiplier given as the function of the quantization parameter, and R is the total code amount including the orthogonal transform coefficient when the encoding is performed in that mode.

In other words, to encode in High Complexity Mode requires the calculation of the parameters D and R; thus, the temporary encoding process needs to be performed once by the entire candidate modes and this requires a larger amount of calculation.

The cost function in Low Complexity Mode is represented by the following formula (2).

[Mathematical Formula 2]

$$\text{Cost}(\text{Mode} \in \Omega) = D + QP2\text{Quant}(QP) * \text{HeaderBit} \qquad (2)$$

In this formula, D is the differential energy between the predicted image and the input image, which is different from that in the case of High Complexity Mode. QP2Quant (QP) is given as the function of the quantization parameter QP, and HeaderBit is the code amount on the information belonging to Header, such as the motion vector or mode that does not include the orthogonal transform coefficient.

That is to say, Low Complexity Mode requires the prediction process on each candidate mode but does not need the decoded image; thus, the encoding process is not necessary. Thus, the amount of calculation may be smaller than that of High Complexity Mode.

<Layer Encoding>

Figure 2:
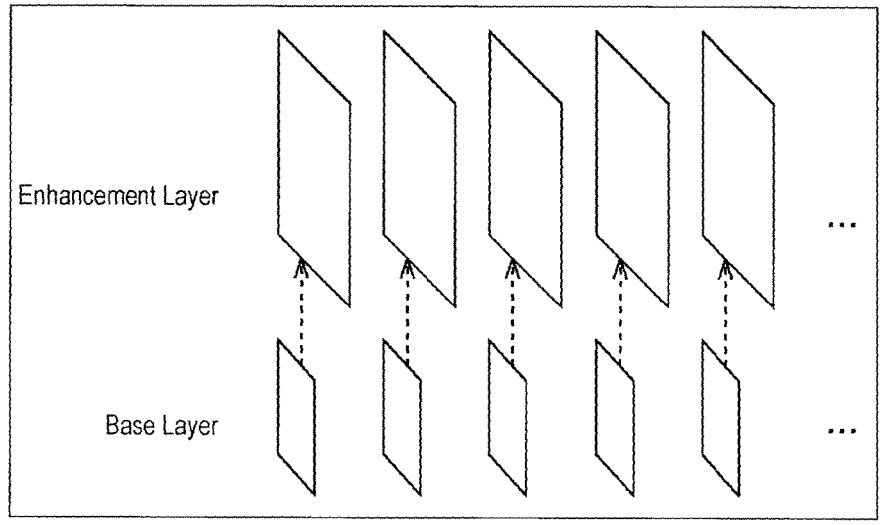
FIG. 2 is a diagram for describing an example of spatial scalable encoding.
Figure 3:
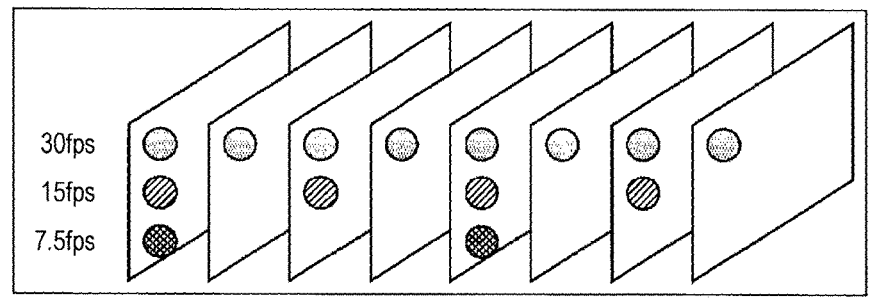
FIG. 3 is a diagram for describing an example of temporal scalable encoding.
Figure 4:
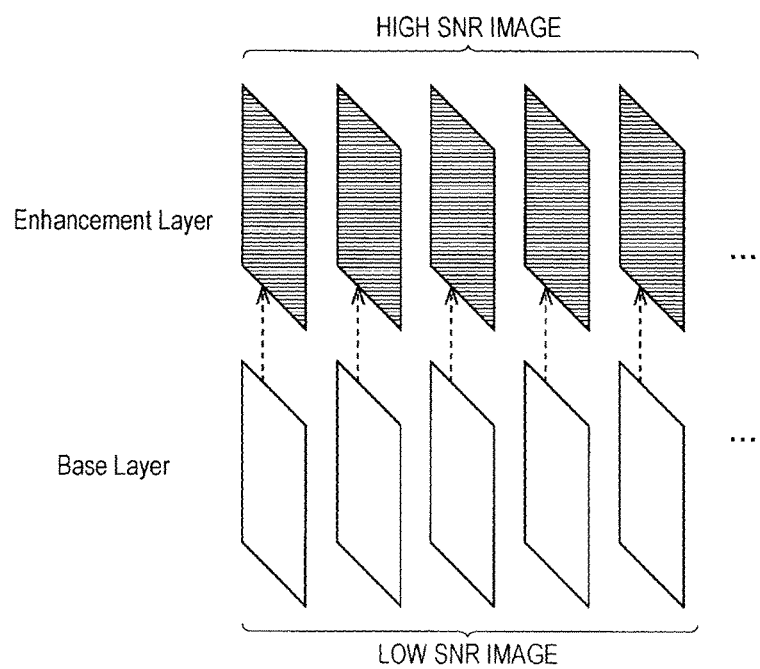
FIG. 4 is a diagram for describing an example of scalable encoding of a signal-to-noise ratio.

The conventional image encoding method such as MPEG2 or AVC has the scalability (scalability) function as illustrated in FIG. 2 to FIG. 4. The scalable encoding (layer encoding) is the method of dividing the image into a plurality of layers (layering) and encoding the image for every layer.

In the layering of the image, one image is divided into a plurality of images (layers) based on a predetermined parameter. Basically, each layer is composed of differential data so as to reduce the redundancy. For example, in the case where one image is divided into two layers of a base layer and an enhancement layer, the image with lower image quality than the original image is obtained from the data of just the base layer and by synthesizing the data of the base layer and the data of the enhancement layer, the original image (i.e., the high-quality image) is obtained.

By layering the image in this manner, the image with various image qualities can be obtained easily in accordance with the circumstances. For example, the image compression information of just the base layer (base layer) is transmitted to the terminal with low process capacity, such as the cellular phone, where the moving image with the low spatial temporal resolution or low image quality is reproduced; on the other hand, in addition to the information of the base layer (base layer), the image compression information of the enhancement layer (enhancement layer) is transmitted to the terminal with high process capacity, such as a TV or a personal computer, where the moving image with high spatial temporal resolution or high image quality is reproduced. Thus, the image compression information depending on the capacity of the terminal or the network can be transmitted from a server without the transcoding process.

An example of the parameters that provide the scalability is the spatial scalability (spatial scalability) as illustrated in FIG. 2. In the case of this spatial scalability (spatial scalability), the resolution is different for each layer. In other words, as illustrated in FIG. 2, each picture is divided into two layers of the base layer with lower spatial resolution than the original image and the enhancement layer that provides the original image (with the original spatial resolution) by being combined with the image of the base layer. Needless to say, this number of layers is just an example and may be determined arbitrarily.

Another parameter that provides the scalability is temporal resolution (temporal scalability) as illustrated in FIG. 3. In the case of the temporal scalability (temporal scalability), the frame rate is different for each layer. In other words, the layers are divided to have the different frame rate as illustrated in FIG. 3. The moving image with a higher frame rate can be obtained by adding the layer with a high frame rate to the layer with a low frame rate; by summing up all the layers, the original moving image (with the original frame rate) can be obtained. This number of layers is just an example and may be determined arbitrarily.

Another parameter that provides the scalability is the signal-to-noise ratio (SNR (Signal to Noise ratio)) (SNR scalability). In the case of the SNR scalability (SNR scalability), the SN ratio is different for each layer. In other words, as illustrated in FIG. 4, each picture is divided into two layers of the base layer with lower SNR than the original image and the enhancement layer that provides the original image (with the original SNR) by being combined with the image of the base layer. That is to say, in the image compression information of the base layer (base layer), the information on the image with the low PSNR is transmitted; by adding the image compression information of the enhancement layer (enhancement layer) thereto, the image with the high PSNR can be reconstructed. Needless to say, this number of layers is just an example and may be determined arbitrarily.

Other parameter than those above may be employed as the parameter that provides the scalability. For example, the bit-depth scalability (bit-depth scalability) can be given in which the base layer (base layer) includes an 8-bit (bit) image and by adding the enhancement layer (enhancement layer) thereto, a 10-bit (bit) image can be obtained.

Further, the chroma scalability (chroma scalability) is given in which the base layer (base layer) includes the component image of 4:2:0 format and by adding the enhancement layer (enhancement layer) thereto, the component image of 4:2:2 format can be obtained.

<Video Parameter Set>

In HEVC, the video parameter set (VPS (Video Parameter Set)) as illustrated in FIG. 5 is defined in addition to the sequence parameter set (SPS (Sequence Parameter Set)) and the picture parameter set (PPS (Picture Parameter Set)).

<Control of Inter-layer Prediction>

In the scalable encoding, performing the prediction process between the layers for all the pictures leads to the increase in calculation amount.

Figure 6:
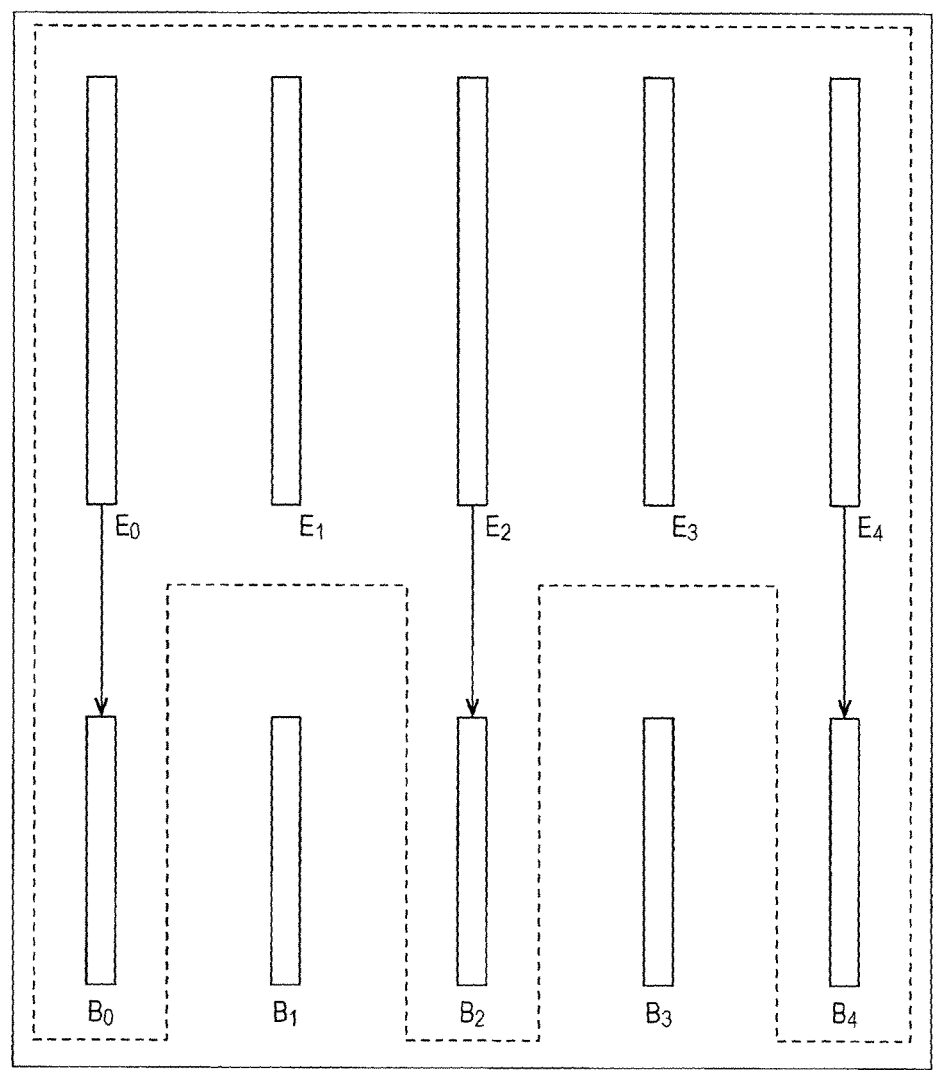
FIG. 6 is a diagram for describing an example of inter-layer prediction.

In view of this, Non-Patent Document 2 has suggested that the on/off (on/off) of the prediction process between the layers is specified in NAL unit (NAL_Unit) for each picture (Picture) as illustrated in FIG. 6.

In this method, however, the information controlling the on/off (on/off) of the prediction process between the layers is generated and transmitted for each picture; thus, there is a risk that the code amount is increased by the transmission of the information to deteriorate the encoding efficiency.

<Layer Structure>

In view of the above, a method of controlling the prediction process between the layers more efficiently is considered. First, the image data are divided into a plurality of layers as illustrated in FIG. 2 to FIG. 4 in the scalable encoding (layer encoding). In the description below, the layer is referred to as a main layer for the convenience.

Figure 7:
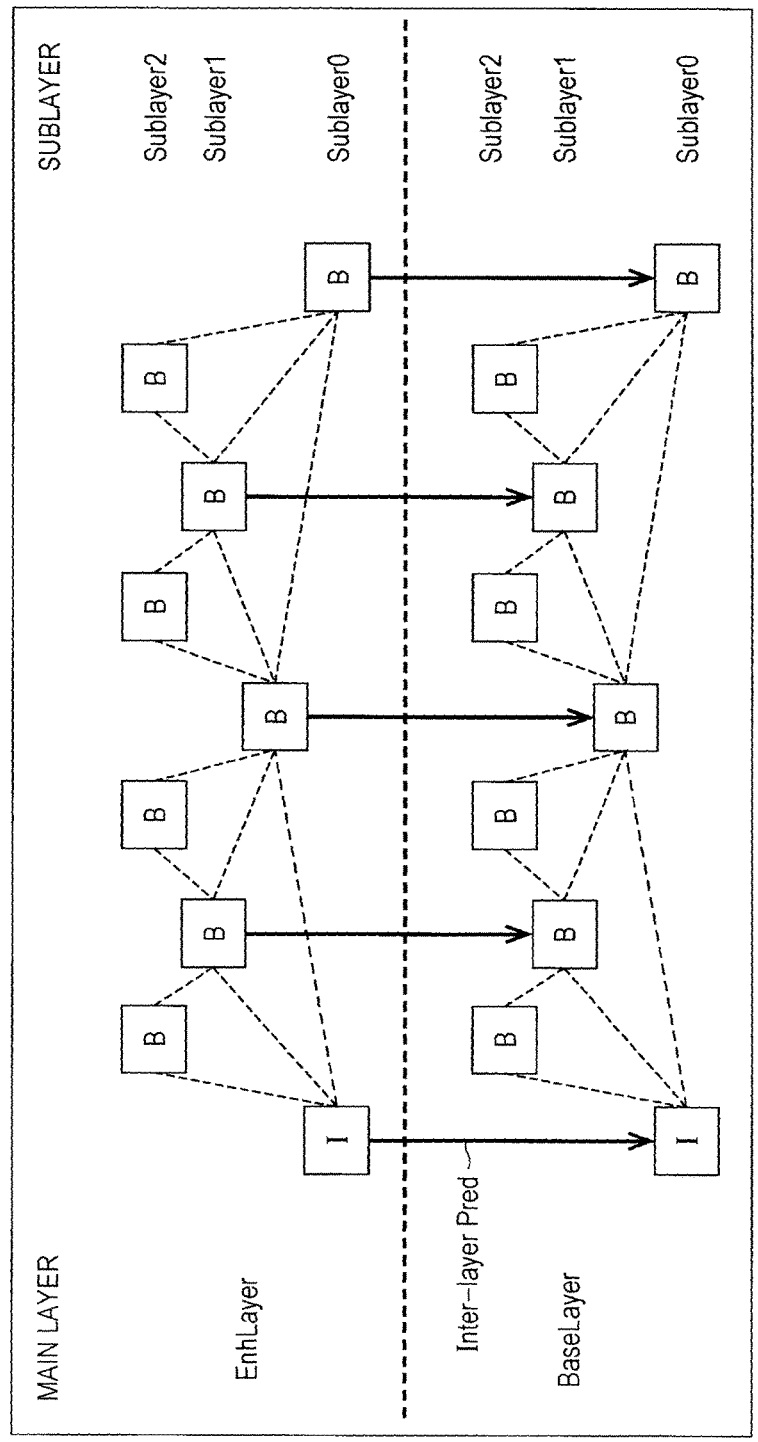
FIG. 7 is a diagram for describing an example of control of the inter-layer prediction using a sublayer.

A picture group of each main layer constitutes a sequence of the main layer. In the sequence, the picture forms a layer structure (GOP: Group Of Picture) as illustrated in FIG. 7 in a manner similar to the moving image data of the single main layer. In the description below, the layer in one main layer is referred to as a sublayer for the convenience.

In the example of FIG. 7, the main layer includes two layers of a base layer (Baselayer) and an enhancement layer (Enhlayer). The base layer is the layer that forms the image with just the main layer thereof without depending on another main layer. The data of the base layer are encoded and decoded without referring to the other main layers. The enhancement layer is the main layer that provides the image by being combined with the data of the base layer. The data of the enhancement layer can use the prediction process between the enhancement layer and the corresponding base layer (the prediction process between the main layers (also referred to as inter-layer prediction)).

The number of main layers of the encoded data that have been divided into layers by the scalable encoding may be determined arbitrarily. In the description below, each main layer is set as the base layer or the enhancement layer and any of the base layers is set as the reference destination of each enhancement layer.

In the example of FIG. 7, each of the base layer and the enhancement layer has the GOP structure including three sublayers of a sublayer 0 (Sublayer0), a sublayer 1 (Sublayer1), and a sublayer 2 (Sublayer2). A rectangle illustrated in FIG. 7 represents a picture and a letter therein represents the type of the picture. For example, the rectangle with a letter of I therein represents the I picture, and the rectangle with a letter of B therein represents the B picture. The dotted line between the rectangles represents the dependence relation (reference relation). As indicated by each dotted line, the picture on the higher sublayer depends on the picture of the lower sublayer. In other words, the picture of the sublayer 2 (Sublayer2) refers to the picture of the sublayer 1 or the picture of the sublayer 0. Moreover, the picture of the sublayer 1 refers to the picture of the sublayer 0. The picture of the sublayer 0 refers to the picture of the sublayer 0 as appropriate.

The number of layers of the sublayers (the number of sublayers) may be determined arbitrarily. The GOP structure may also be determined arbitrarily and is not limited to the example of FIG. 7.

<Control of Inter-layer Prediction Using Sublayer>

The control of the inter-layer prediction is conducted using the sublayers with respect to the image data with the structure as above. In other words, the inter-layer prediction control information that controls whether to perform the prediction between the plural main layers in each picture using the sublayer is generated and transmitted. On the encoding side, only the sublayer that is specified in the inter-layer prediction control information is subjected to the inter-layer prediction in the encoding; on the decoding side, only the sublayer that is specified in the inter-layer prediction control information is subjected to the inter-layer prediction in the decoding.

In other words, only the picture belonging to the sublayer that is specified by the inter-layer prediction control information can use the inter-layer prediction. That is to say, simply specifying the sublayer enables the control of the inter-layer prediction for all the pictures in the main layer. Therefore, it is not necessary to control each picture individually and the picture may be controlled for each main layer, thereby drastically reducing the amount of information that is necessary for the control. As a result, the deterioration in encoding efficiency by the inter-layer prediction control can be suppressed.

As the inter-layer prediction control information, the information that specifies the sublayer for which the inter-layer prediction is allowed may be used; alternatively, the information that specifies the highest sublayer for which the inter-layer prediction is allowed may be used.

For example, as indicated in the example of FIG. 7, in the pictures of the higher sublayers 2, the picture and the reference picture are close to each other on the time axis. Therefore, the efficiency by the inter prediction process is high and the improvement of the encoding efficiency by the inter-layer prediction is not high.

On the other hand, in the pictures in the sublayer 1 and the sublayer 0, the picture and the reference picture are far from each other on the time axis and in the encoding process by the single layer, more CUs for which the intra prediction is performed are selected. In other words, the improvement in encoding efficiency by the prediction between the layers is high.

In other words, the encoding efficiency can be improved more in the lower sublayers by the application of the inter-layer prediction. Therefore, in the case of conducting the inter-layer prediction in some sublayers, the control is desirably made to perform the inter-layer prediction on the sublayers from the lowest sublayer to a predetermined low sublayer.

In that case, up to which sublayer the inter-layer prediction is allowed may be specified. Thus, simply one sublayer may be specified, which can further reduce the amount of the inter-layer prediction control information.

<Video Parameter Set>

In HEVC, the video parameter set (VPS (Video Parameter Set)) is defined in addition to the sequence parameter set (SPS (Sequence Parameter Set)) and the picture parameter set (PPS).

The video parameter set (VPS) is generated for the entire encoded data that have been subjected to the scalable encoding. The video parameter set (VPS) stores the information related to all the main layers.

The sequence parameter set (SPS) is generated for each main layer. The sequence parameter set (SPS) stores the information related to the main layer.

The picture parameter set (PPS) is generated for every picture of each main layer. This picture parameter set stores the information related to the picture of the main layer.

The inter-layer prediction control information may be transmitted for every main layer in, for example, the sequence parameter set (SPS) or may be transmitted in the video parameter set (VPS) as the information common to all the main layers.

FIG. 8 illustrates an example of the syntax of the video parameter set. The parameter max_layer_minus1 represents the maximum number of layers (main layers) for which the scalable encoding is performed. The parameter vps_max_sub_layer_minus1 represents the maximum number of sublayers (maximum number of sublayers) included in each main layer for which the scalable encoding is performed.

The parameter max_sub_layer_for_inter_layer_prediction[i] represents the sublayer for which the inter-layer prediction is performed. The parameter max_sub_layer_for_inter_layer_prediction[i] represents the highest sublayer among the sublayers for which the inter-layer prediction is performed. The inter-layer prediction is performed for the sublayers ranging from the lowest sublayer to the sublayer specified by the parameter max_sub_layer_for_inter_layer_prediction[i].

This parameter max_sub_layer_for_inter_layer_prediction[i] is set for every main layer (i). In other words, the parameter max_sub_layer_for_inter_layer_prediction[i] is set for each of the main layers lower than or equal to the parameter max_layer_minus1. The value of the parameter max_sub_layer_for_inter_layer_prediction[i] is set to the value less than or equal to the parameter vps_max_sub_layer_minus1.

The inter-layer prediction can be performed for any parameter. For example, in the AVC scalable encoding, the motion vector information, the mode information, the decode pixel value, the prediction residual signal, and the like are given as the parameters for which the inter-layer prediction is performed. In HEVC, additionally, the flag (flag) related to the orthogonal transform skip (Transform Skip), the reference picture, the quantization parameter, the scaling list (Scaling List), the adaptive offset, and the like are given. The number of parameters for which the inter-layer prediction is performed may be determined arbitrarily and may be either one or more than one.

For the convenience of description, a case is hereinafter described in which the motion prediction between the layers (generation of motion vector information) is performed as an example of the inter-layer prediction.

Next, an example in which the present technique as above is applied to a specific device will be described.

<1. First Embodiment>
<Scalable Encoding Device>

Figure 9:
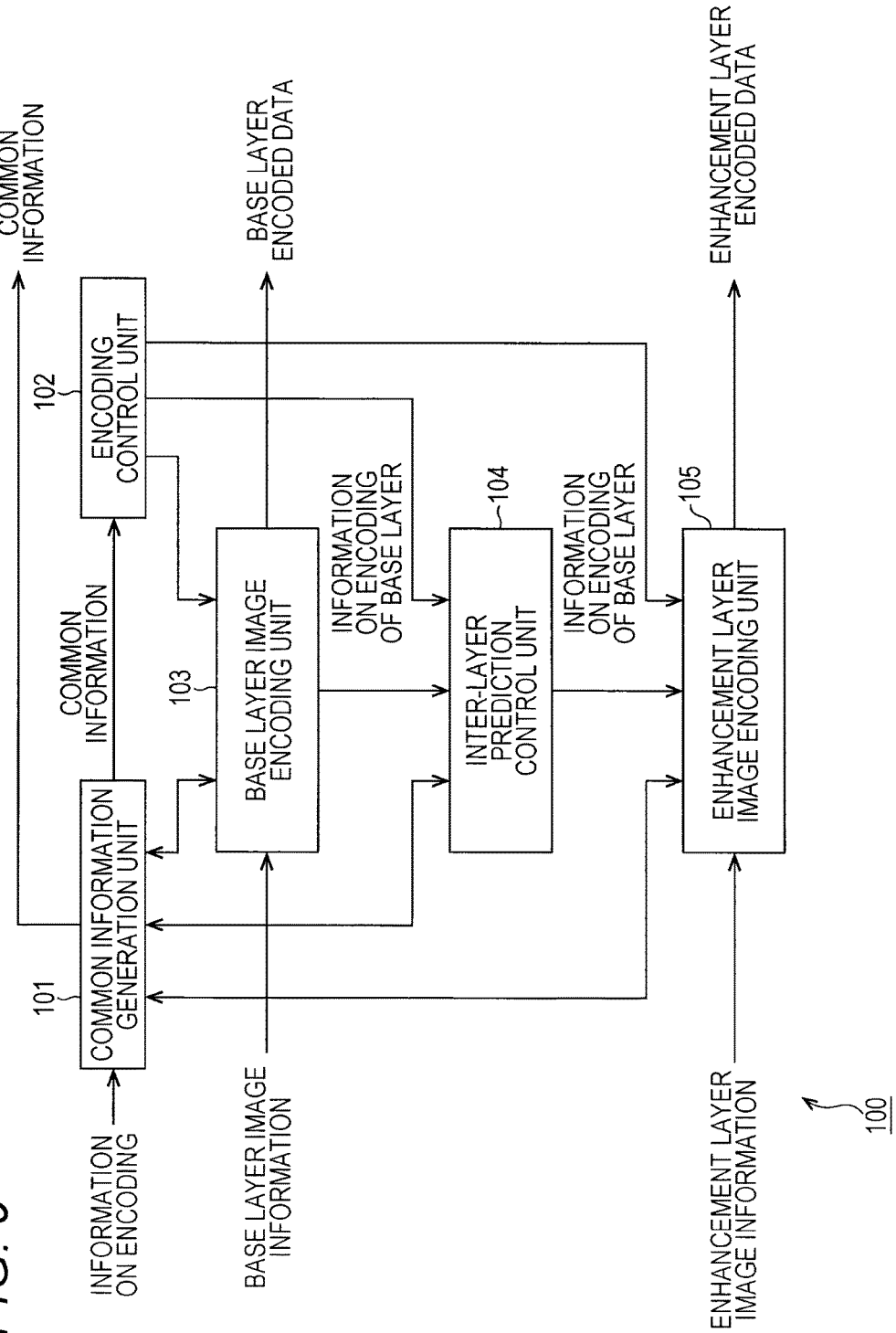
FIG. 9 is a block diagram illustrating an example of a main structure of a scalable encoding device.

FIG. 9 is a block diagram illustrating an example of a main structure of a scalable encoding device.

A scalable encoding device 100 illustrated in FIG. 9 encodes each layer of image data divided into a baser layer and an enhancement layer. The parameter used as the reference in the layering may be determined arbitrarily. The scalable encoding device 100 includes a common information generation unit 101, an encoding control unit 102, a base layer image encoding unit 103, an inter-layer prediction control unit 104, and an enhancement layer image encoding unit 105.

The common information generation unit 101 acquires the information related to the encoding of the image data to be stored in a NAL unit, for example. The common information generation unit 101 acquires the necessary information from the base layer image encoding unit 103, the inter-layer prediction control unit 104, the enhancement layer image encoding unit 105, and the like as necessary. Based on those pieces of information, the common information generation unit 101 generates the common information as the information related to all the main layers. The common information includes, for example, the video parameter set, etc. The common information generation unit 101 outputs the generated common information out of the scalable encoding device 100 as the NAL unit. The common information generation unit 101 supplies the generated common information also to the encoding control unit 102. Moreover, the common information generation unit 101 supplies some of or all the pieces of the generated common information to the base layer image encoding unit 103 to the enhancement layer image encoding unit 105 as necessary. For example, the common information generation unit 101 supplies the inter-layer prediction execution maximum sublayer (max_sub_layer_for_inter_layer_prediction[i]) of the current main layer to be processed to the inter-layer prediction control unit 104.

The encoding control unit 102 controls the encoding of each main layer by controlling the base layer image encoding unit 103 to the enhancement layer image encoding unit 105 based on the common information supplied from the common information generation unit 101.

The base layer image encoding unit 103 acquires the image information of the base layer (base layer image information). The base layer image encoding unit 103 encodes the base layer image information without referring to the other layers and generates and outputs the encoded data of the base layer (base layer encoded data). The base layer image encoding unit 103 supplies the information related to the encoding of the base layer acquired in the encoding to the inter-layer prediction control unit 104.

The inter-layer prediction control unit 104 stores the information related to the encoding of the base layer supplied from the base layer image encoding unit 103. The inter-layer prediction control unit 104 acquires the inter-layer prediction execution maximum sublayer (max_sub_layer_for_inter_layer_prediction[i]) of the current main layer supplied from the common information generation unit 101. Based on that piece of information, the inter-layer prediction control unit 104 controls the supply of the stored information related to the encoding of the base layer to the enhancement layer image encoding unit 105.

The enhancement layer image encoding unit 105 acquires the image information of the enhancement layer (enhancement layer image information). The enhancement layer image encoding unit 105 encodes the enhancement layer image information. On this occasion, the enhancement layer image encoding unit 105 performs the inter-layer prediction with reference to the information related to the encoding of the baser layer in accordance with the control of the inter-layer prediction control unit 104. More specifically, for example, if the current sublayer to be processed is the sublayer for which the inter-layer prediction is allowed, the enhancement layer image encoding unit 105 acquires the information related to the encoding of the base layer supplied from the inter-layer prediction control unit 104 and performs the inter-layer prediction with reference to the information, and encodes the enhancement layer image information by using the prediction result. For example, if the current sublayer is the sublayer for which the inter-layer prediction is prohibited, the enhancement layer image encoding unit 105 encodes the enhancement layer image information without performing the inter-layer prediction. Through the encoding as above, the enhancement layer image encoding unit 105 generates and outputs the encoded data of the enhancement layer (enhancement layer encoded data).

<Base Layer Image Encoding Unit>

Figure 10:
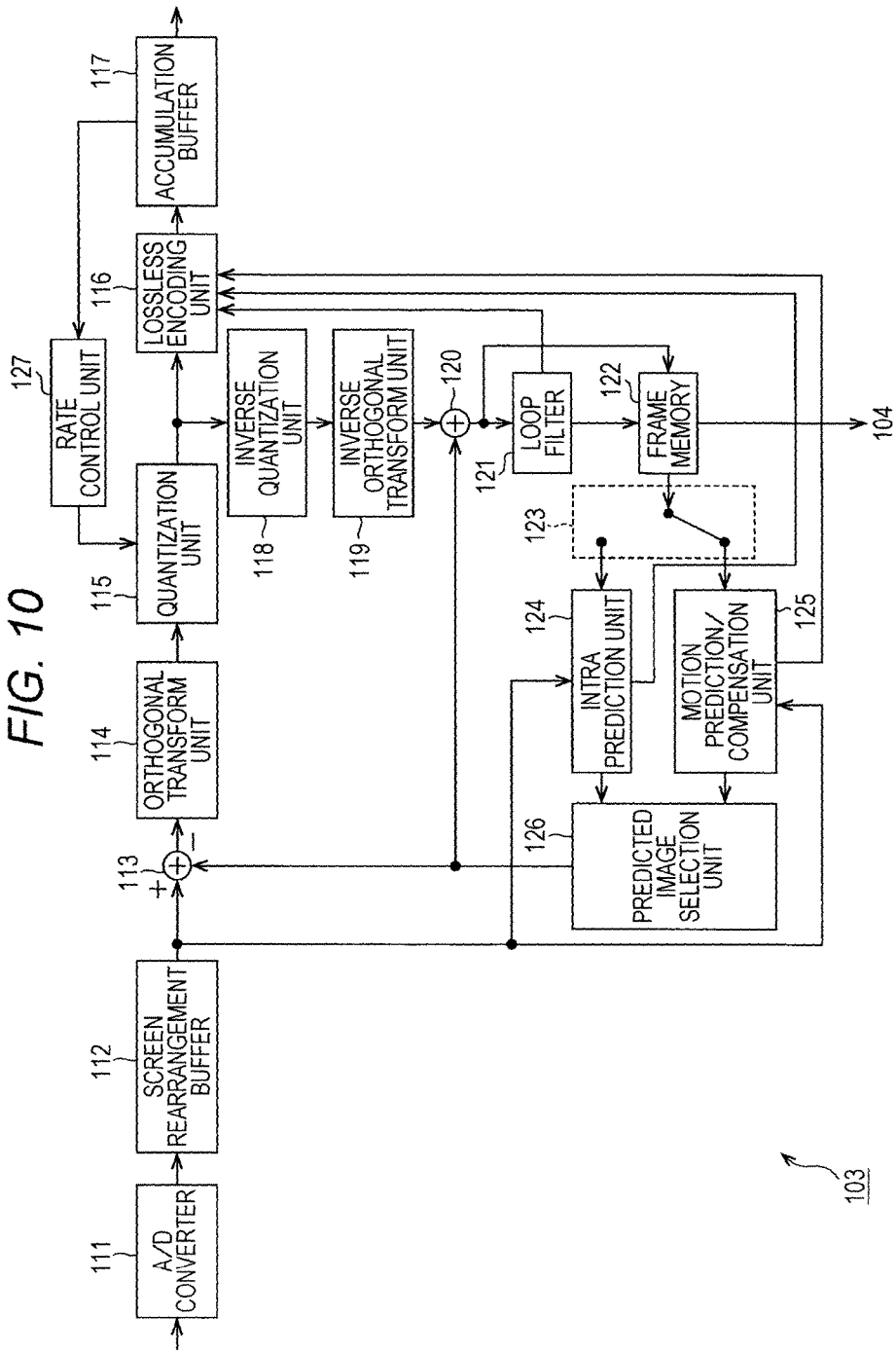
FIG. 10 is a block diagram illustrating an example of a main structure of a base layer image encoding unit.

FIG. 10 is a block diagram illustrating an example of a main structure of the base layer image encoding unit 103 of FIG. 9. As illustrated in FIG. 10, the base layer image encoding unit 103 includes an A/D converter 111, a screen rearrangement buffer 112, a calculation unit 113, an orthogonal transform unit 114, a quantization unit 115, a lossless encoding unit 116, an accumulation buffer 117, an inverse quantization unit 118, and an inverse orthogonal transform unit 119. The base layer image encoding unit 103 further includes a calculation unit 120, a loop filter 121, a frame memory 122, a selection unit 123, an intra prediction unit 124, a motion prediction/compensation unit 125, a predicted image selection unit 126, and a rate control unit 127.

The A/D converter 111 performs the A/D conversion on the input image data (base layer image information) and supplies and stores the converted image data (digital data) to and in the screen rearrangement buffer 112. The screen rearrangement buffer 112 rearranges the images, whose frames have been displayed in the order of storage, in the order of the encoding in accordance with GOP (Group Of Picture), and supplies the images whose frames have been rearranged to the calculation unit 113. The screen rearrangement buffer 112 supplies the images whose frames have been rearranged also to the intra prediction unit 124 and the motion prediction/compensation unit 125.

The calculation unit 113 subtracts the predicted image supplied from the intra prediction unit 124 or the motion prediction/compensation unit 125 through the predicted image selection unit 126 from the image read out from the screen rearrangement buffer 112, and outputs the differential information to the orthogonal transform unit 114. For example, in the case of the image for which the intra-encoding is performed, the calculation unit 113 subtracts the predicted image supplied from the intra prediction unit 124 from the image read out from the screen rearrangement buffer 112. On the other hand, in the case of the image for which the inter-encoding is performed, the calculation unit 113 subtracts the predicted image supplied from the motion prediction/compensation unit 125 from the image read out from the screen rearrangement buffer 112.

The orthogonal transform unit 114 performs the orthogonal transform such as the discrete cosine transform or Karhunen-Loeve transform on the differential information supplied from the calculation unit 113. The orthogonal transform unit 114 supplies the transform coefficient to the quantization unit 115.

The quantization unit 115 quantizes the transform coefficient supplied from the orthogonal transform unit 114. The quantization unit 115 quantizes the quantization parameter set based on the information related to the target value of the code amount that is supplied from the rate control unit 127. The quantization unit 115 supplies the quantized transform coefficient to the lossless encoding unit 116.

The lossless encoding unit 116 encodes the transform coefficient that has been quantized in the quantization unit 115 in the arbitrary encoding method. Since the coefficient data have been quantized under the control of the rate control unit 127, the code amount is the target value set by the rate control unit 127 (or approximates to the target value).

The lossless encoding unit 116 acquires the information representing the mode of the intra prediction from the intra prediction unit 124, and acquires the information representing the mode of the inter prediction or the differential motion vector information from the motion prediction/compensation unit 125. Moreover, the lossless encoding unit 116 generates the NAL unit of the base layer including the sequence parameter set (SPS), the picture parameter set (PPS), and the like as appropriate.

The lossless encoding unit 116 encodes these pieces of information in the arbitrary encoding method and produces (multiplexes) some pieces of the encoded data (also referred to as encoded stream). The lossless encoding unit 116 supplies the encoded data to the accumulation buffer 117 and accumulates the data therein.

Examples of the encoding method of the lossless encoding unit 116 include the variable-length encoding and the arithmetic encoding. As the variable-length encoding, for example, CAVLC (Context-Adaptive Variable Length Coding) defined in H.264/AVC is given. As the arithmetic encoding, for example, CABAC (Context-Adaptive Binary Arithmetic Coding) is given.

The accumulation buffer 117 temporarily holds the encoded data (base layer encoded data) supplied from the lossless encoding unit 116. The accumulation buffer 117 outputs the held base layer encoded data to, for example, a transmission path or a recording device (recording medium) in the later stage, which is not shown, at a predetermined timing. In other words, the accumulation buffer 117 also serves as a transmission unit that transmits the encoded data.

The transform coefficient quantized in the quantization unit 115 is also supplied to the inverse quantization unit 118. The inverse quantization unit 118 inversely-quantizes the quantized transform coefficient by a method corresponding to the quantization by the quantization unit 115. The inverse quantization unit 118 supplies the obtained transform coefficient to the inverse orthogonal transform unit 119.

The inverse orthogonal transform unit 119 performs the inverse orthogonal transform on the transform coefficient supplied from the inverse quantization unit 118 by a method corresponding to the orthogonal transform process by the orthogonal transform unit 114. The output that has been subjected to the inverse orthogonal transform (recovered differential information) is supplied to the calculation unit 120.

The calculation unit 120 adds the predicted image from the intra prediction unit 124 or the motion prediction/compensation unit 125 through the predicted image selection unit 126 to the recovered differential information that corresponds to the inverse orthogonal transform result supplied from the inverse orthogonal transform unit 119, thereby providing the locally decoded image (decoded image). The decoded image is supplied to a loop filter 121 or a frame memory 122.

The loop filter 121 includes a deblocking filter or an adaptive loop filter or the like and filters the reconstructed image supplied from the calculation unit 120 as appropriate. For example, the loop filter 121 removes the block distortion of the reconstructed image by deblock-filtering the reconstructed image. Moreover, for example, the loop filter 121 improves the image quality by loop-filtering the result of the deblocking filter process (reconstructed image from which the block distortion has been removed) using a Wiener Filter (Wiener Filter). The loop filter 121 supplies the filter process result (hereinafter referred to as decoded image) to the frame memory 122.

The loop filter 121 may conduct any other filtering process on the reconstructed image. The loop filter 121 can supply the information such as the filter coefficient used in the filtering to the lossless encoding unit 116 as necessary to encode the information.

The frame memory 122 stores the supplied decoded image and supplies the stored decoded image to the selection unit 123 as the reference image at a predetermined timing.

More specifically, the frame memory 122 stores the reconstructed image supplied from the calculation unit 120 and the decoded image supplied from the loop filter 121. The frame memory 122 supplies the stored reconstructed image to the intra prediction unit 124 through the selection unit 123 at a predetermined timing or upon a request from the outside, for example from the intra prediction unit 124. The frame memory 122 supplies the stored decoded image to the motion prediction/compensation unit 125 through the selection unit 123 at a predetermined timing or upon a request from the outside, for example from the motion prediction/compensation unit 125.

The selection unit 123 selects the destination to which the reference image supplied from the frame memory 122 is supplied. For example, in the case of the intra prediction, the selection unit 123 supplies the reference image supplied from the frame memory 122 (pixel value in the current picture) to the intra prediction unit 124. On the other hand, in the case of the inter prediction, the selection unit 123 supplies the reference image supplied from the frame memory 122 to the motion prediction/compensation unit 125.

The intra prediction unit 124 performs the intra prediction (in-screen prediction) for generating the predicted image using the pixel value in the current picture as the reference image supplied from the frame memory 122 through the selection unit 123. The intra prediction unit 124 performs the intra prediction in a plurality of prepared intra prediction modes.

The intra prediction unit 124 generates the predicted image in all the intra prediction mode candidates, evaluates the cost function value of each predicted image using the input image supplied from the screen rearrangement buffer 112, and then selects the optimum mode. Upon the selection of the optimum intra prediction mode, the intra prediction unit 124 supplies the predicted image generated in that optimum mode to the predicted image selection unit 126.

As described above, the intra prediction unit 124 supplies the intra prediction mode information representing the employed intra prediction mode to the lossless encoding unit 116 as appropriate where the information is encoded.

The motion prediction/compensation unit 125 performs the motion prediction (inter prediction) using the input image supplied from the screen rearrangement buffer 112 and the reference image supplied from the frame memory 122 through the selection unit 123. The motion prediction/compensation unit 125 generates the predicted image (inter predicted image information) through the motion compensation process according to the detected motion vector. The motion prediction/compensation unit 125 performs such inter prediction in a plurality of prepared inter prediction modes.

The motion prediction/compensation unit 125 generates the predicted image in all the inter prediction mode candidates. The motion prediction/compensation unit 125 evaluates the cost function value of each predicted image using the information including the input image supplied from the screen rearrangement buffer 112 and the generated differential motion vector, and then selects the optimum mode. Upon the selection of the optimum inter prediction mode, the motion prediction/compensation unit 125 supplies the predicted image generated in that optimum mode to the predicted image selection unit 126.

The motion prediction/compensation unit 125 supplies the information representing the employed inter prediction mode and the information necessary for the process in the inter prediction mode when the encoded data are decoded, to the lossless encoding unit 116 where the information is encoded. The necessary information includes, for example, the information of the generated differential motion vector and the flag representing the index of the prediction motion vector as the prediction motion vector information.

The predicted image selection unit 126 selects the source from which the predicted image is supplied to the calculation unit 113 or the calculation unit 120. For example, in the case of the intra encoding, the predicted image selection unit 126 selects the intra prediction unit 124 as the source from which the predicted image is supplied, and supplies the predicted image supplied from the intra prediction unit 124 to the calculation unit 113 or the calculation unit 120. In the case of the inter encoding, the predicted image selection unit 126 selects the motion prediction/compensation unit 125 as the source from which the predicted image is supplied, and supplies the predicted image supplied from the motion prediction/compensation unit 125 to the calculation unit 113 or the calculation unit 120.

The rate control unit 127 controls the rate of the quantization operation of the quantization unit 115 based on the code amount of the encoded data accumulated in the accumulation buffer 117 so that the overflow or the underflow does not occur.

The frame memory 122 supplies the stored decoded image to the inter-layer prediction control unit 104 as the information related to the encoding of the base layer.

<Enhancement Layer Image Encoding Unit>

Figure 11:
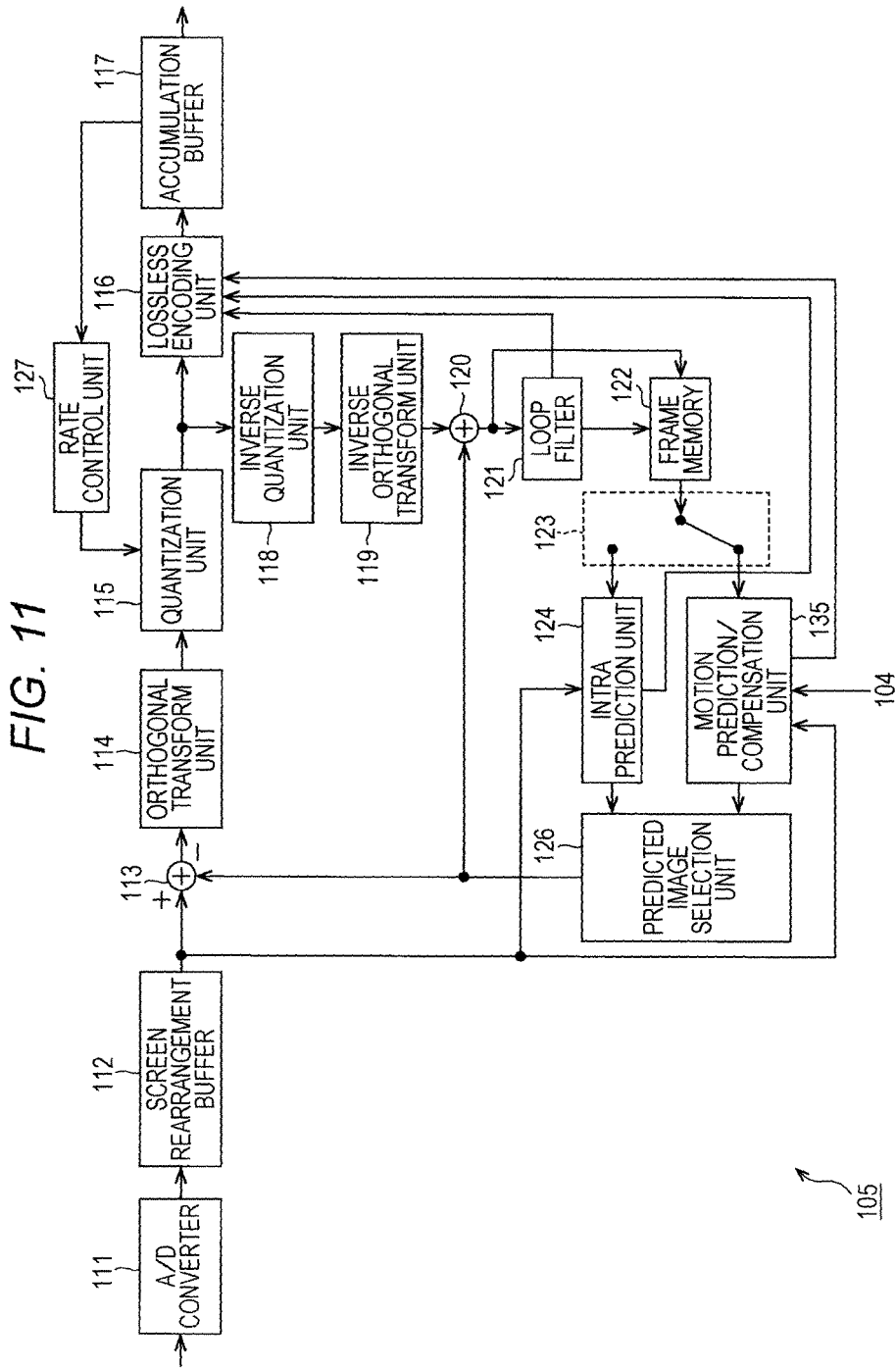
FIG. 11 is a block diagram illustrating an example of a main structure of an enhancement layer image encoding unit.

FIG. 11 is a block diagram illustrating an example of a main structure of the enhancement layer image encoding unit 105 of FIG. 9. As illustrated in FIG. 11, the enhancement layer image encoding unit 105 has a structure basically similar to the base layer image encoding unit 103 of FIG. 10.

However, each unit of the enhancement layer image encoding unit 105 performs the process to encode the enhancement layer image information instead of the base layer. In other words, the A/D converter 111 of the enhancement layer image encoding unit 105 performs the A/D conversion on the enhancement layer image information and the accumulation buffer 117 of the enhancement layer image encoding unit 105 outputs the enhancement layer encoded data to, for example, a transmission path or a recording device (recording medium) in a later stage, which is not shown.

The enhancement layer image encoding unit 105 has a motion prediction/compensation unit 135 instead of the motion prediction/compensation unit 125.

The motion prediction/compensation unit 135 can perform the motion prediction between the main layers in addition to the motion prediction between the pictures as conducted by the motion prediction/compensation unit 125. The motion prediction/compensation unit 135 acquires the information related to the encoding of the base layer supplied from the inter-layer prediction control unit 104 (for example, the decoded image of the base layer). The motion prediction/compensation unit 135 performs the motion prediction of the main layers using the information related to the encoding of the base layer as one of the candidate modes of the inter prediction.

<Common Information Generation Unit and Inter-layer Prediction Control Unit>

Figure 12:
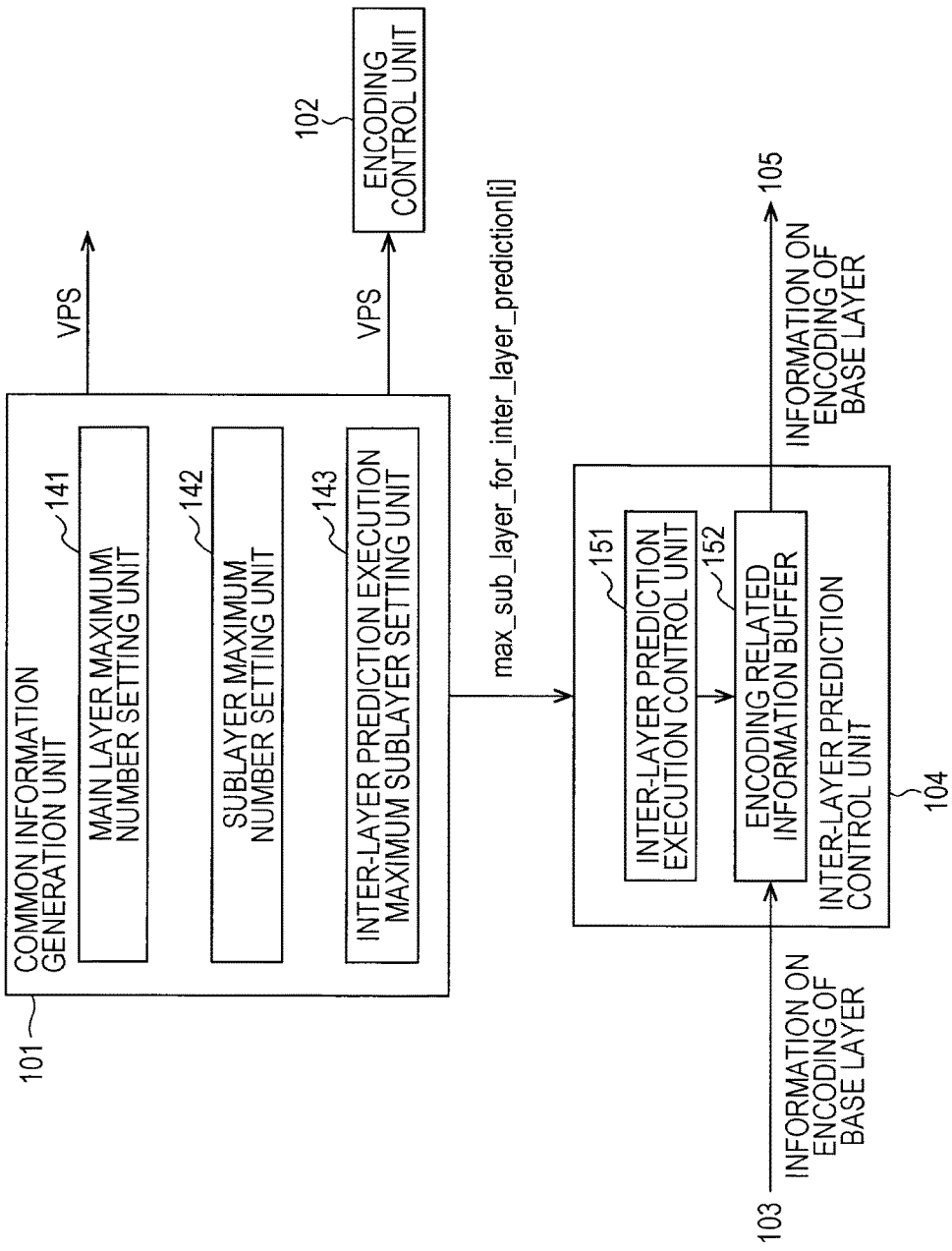
FIG. 12 is a block diagram illustrating an example of a main structure of a common information generation unit and an inter-layer prediction control unit.

FIG. 12 is a block diagram illustrating an example of a main structure of the common information generation unit 101 and the inter-layer prediction control unit 104 of FIG. 9.

As illustrated in FIG. 12, the common information generation unit 101 includes a main layer maximum number setting unit 141, a sublayer maximum number setting unit 142, and an inter-layer prediction execution maximum sublayer setting unit 143. Moreover, the inter-layer prediction control unit 104 includes an inter-layer prediction execution control unit 151 and an encoding related information buffer 152.

The main layer maximum number setting unit 141 sets the information (max_layer_minus1) representing the maximum number of main layers. The sublayer maximum number setting unit 142 sets the information (vps_max_sub_layer_minus1) representing the maximum number of sublayers. The inter-layer prediction execution maximum sublayer setting unit 143 sets the information (max_sub_layer_for_inter_layer_prediction[i]) that specifies the highest sublayer among the sublayers for which the inter-layer prediction of the current main layer is allowed.

The common information generation unit 101 outputs those pieces of information to the outside of the scalable encoding device 100 as the common information (video parameter set (VPS)). Moreover, the common information generation unit 101 supplies the common information (video parameter set (VPS)) to the encoding control unit 102. Further, the common information generation unit 101 supplies to the inter-layer prediction control unit 104, the information (max_sub_layer_for_inter_layer_prediction[i]) that specifies the highest sublayer among the sublayers for which the inter-layer prediction of the current main layer is allowed.

The inter-layer prediction execution control unit 151 controls the execution of the inter-layer prediction based on the common information supplied from the common information generation unit 101. More specifically, the inter-layer prediction execution control unit 151 controls the encoding related information buffer 152 based on the information (max_sub_layer_for_inter_layer_prediction[i]) that is supplied from the common information generation unit 101 and that specifies the highest sublayer among the sublayers for which the inter-layer prediction is allowed.

The encoding related information buffer 152 acquires and stores the information related to the encoding of the base layer supplied from the base layer image encoding unit 103 (for example, the base layer decoded image). The encoding related information buffer 152 supplies the stored information related to the encoding of the base layer to the enhancement layer image encoding unit 105 in accordance with the control of the inter-layer prediction execution control unit 151.

The inter-layer prediction execution control unit 151 controls the supply of the information related to the encoding of the base layer from the encoding related information buffer 152. For example, if the inter-layer prediction of the current sublayer is allowed in the information (max_sub_layer_for_inter_layer_prediction[i]) that specifies the highest sublayer among the sublayers for which the inter-layer prediction is allowed, the inter-layer prediction execution control unit 151 supplies the information related to the encoding of the base layer stored in the encoding related information buffer 152 (for example, the base layer decoded image) of the current sublayer to the enhancement layer image encoding unit 105.

For example, if the inter-layer prediction of the current sublayer is not allowed in the information (max_sub_layer_for_inter_layer_prediction[i]) that specifies the highest sublayer among the sublayers for which the inter-layer prediction is allowed, the inter-layer prediction execution control unit 151 does not supply the information related to the encoding of the base layer stored in the encoding related information buffer 152 (for example, the base layer decoded image) of the current sublayer to the enhancement layer image encoding unit 105.

The scalable encoding device 100 transmits the inter-layer prediction control information that controls the inter-layer prediction using the sublayer; therefore, the deterioration in encoding efficiency by the inter-layer prediction control can be suppressed. Accordingly, the scalable encoding device 100 can suppress the deterioration in image quality due to the encoding and decoding.

<Flow of Encoding Process>

Next described is the flow of each process executed by the scalable encoding device 100 as above. First, an example of the flow of the encoding process is described with reference to the flowchart of FIG. 13.

Upon the start of the encoding process, in step S101, the common information generation unit 101 of the scalable encoding device 100 generates the common information. In step S102, the encoding control unit 102 processes the first main layer.

In step S103, the encoding control unit 102 determines whether the current main layer to be processed is the base layer or not based on the common information generated in step S101. If it has been determined that the current main layer is the base layer, the process advances to step S104.

In step S104, the base layer image encoding unit 103 performs the base layer encoding process. After the end of the process in step S104, the process advances to step S108.

In step S103, if it has been determined that the current main layer is the enhancement layer, the process advances to step S105. In step S105, the encoding control unit 102 decides the baser layer corresponding to (i.e., used as the reference destination by) the current main layer.

In step S106, the inter-layer prediction control unit 104 performs the inter-layer prediction control process.

In step S107, the enhancement layer image encoding unit 105 performs the enhancement layer encoding process. After the end of the process in step S107, the process advances to step S108.

In step S108, the encoding control unit 102 determines whether all the main layers have been processed or not. If it has been determined that there is still an unprocessed main layer, the process advances to step S109.

In step S109, the encoding control unit 102 processes the next unprocessed main layer (current main layer). After the end of the process in step S109, the process returns to step S103. The process from step S103 to step S109 is repeated to encode the main layers.

If it has been determined that all the main layers are already processed in step S108, the encoding process ends.

<Flow of Common Information Generation Process>

Figure 13:
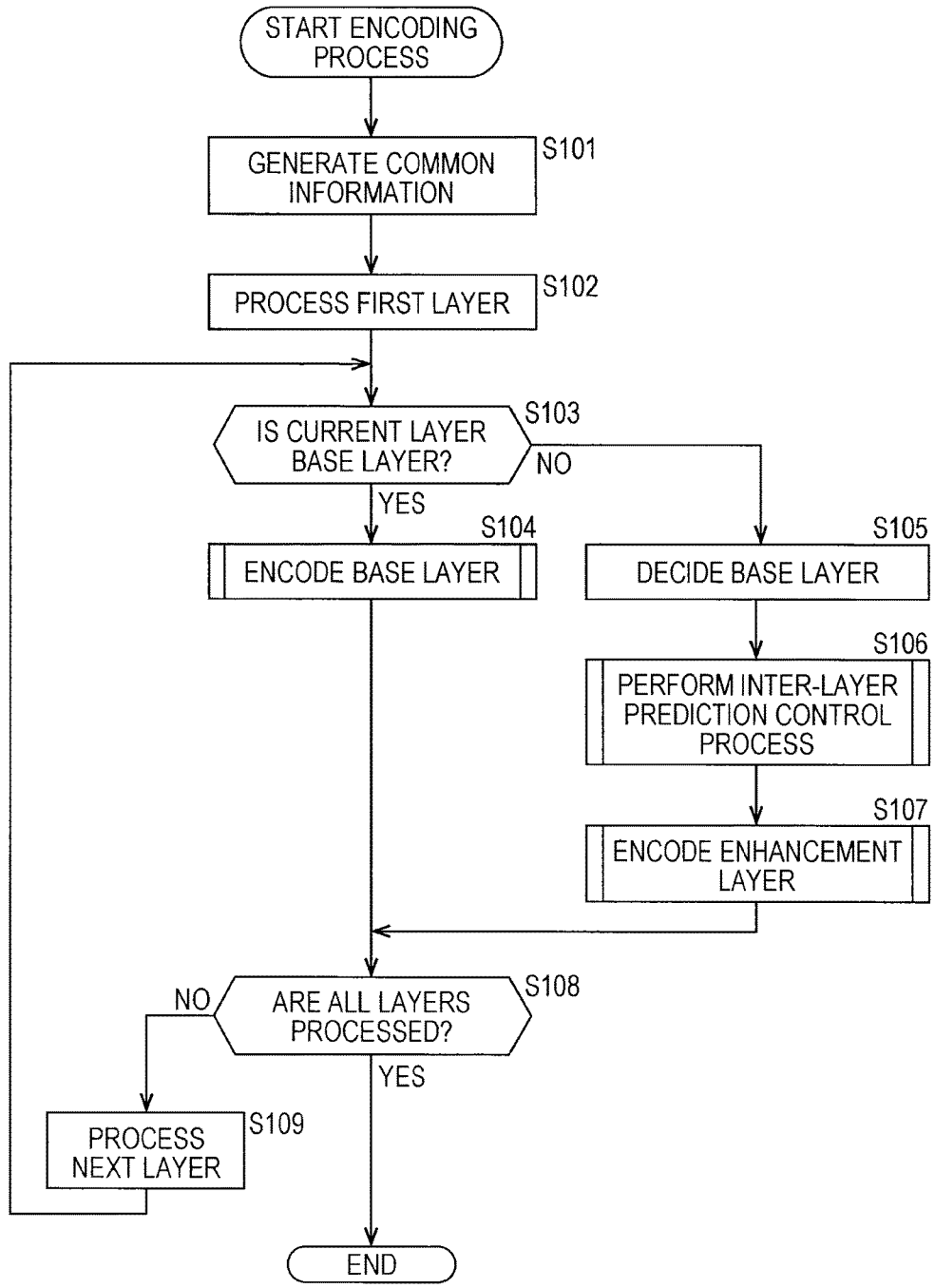
FIG. 13 is a flowchart for describing an example of the flow of the encoding process.

Next, an example of the flow of the common information generation process executed in step S101 in FIG. 13 is described with reference to the flowchart of FIG. 14.

Upon the start of the common information generation process, the main layer maximum number setting unit 141 sets the parameter (max_layer_minus1) in step S121. In step S122, the sublayer maximum number setting unit 142 sets the parameter (vps_max_sub_layers_minus1). In step S123, the inter-layer prediction execution maximum sublayer setting unit 143 sets the parameter (max_sub_layer_for_inter_layer_prediction[i]) of each main layer.

In step S124, the common information generation unit 101 generates the video parameter set including the parameters set in step S121 to step S123 as the common information.

In step S125, the common information generation unit 101 supplies the video parameter set generated by the process in step S124 to the encoding control unit 102 and to the outside of the scalable encoding device 100. Moreover, the common information generation unit 101 supplies the parameter (max_sub_layer_for_inter_layer_prediction[i]) set in step S123 to the inter-layer prediction control unit 104.

After the end of the process in step S125, the common information generation process ends and the process returns to FIG. 13.

<Flow of Base Layer Encoding Process>

Next, an example of the flow of the base layer encoding process to be executed in step S104 in FIG. 13 is described with reference to the flowchart of FIG. 15.

In step S141, the A/D converter 111 of the base layer image encoding unit 103 performs the A/D conversion on the input image information (image data) of the base layer. In step S142, the screen rearrangement buffer 112 stores the image information (digital data) of the base layer that has been subjected to the A/D conversion, and rearranges the pictures from the order of display to the order of encoding.

In step S143, the intra prediction unit 124 performs the intra prediction process in the intra prediction mode. In step S144, the motion prediction/compensation unit 125 performs a motion prediction/compensation process for performing the motion prediction or the motion compensation in the inter prediction mode. In step S145, the predicted image selection unit 126 decides the optimum mode based on each cost function value output from the intra prediction unit 124 and the motion prediction/compensation unit 125. In other words, the predicted image selection unit 126 selects any one of the predicted image generated by the intra prediction unit 124 and the predicted image generated by the motion prediction/compensation unit 125. In step S146, the calculation unit 113 calculates the difference between the image rearranged by the process in step S142 and the predicted image selected by the process in step S145. The difference data contains fewer pieces of data than the original image data. Therefore, as compared to the encoding of the original data as it is, the data amount can be compressed.

In step S147, the orthogonal transform unit 114 performs the orthogonal transform process on the differential information generated by the process in step S146. In step S148, the quantization unit 115 quantizes the orthogonal transform coefficient obtained by the process in step S147 using the quantization parameter calculated by the rate control unit 127.

The differential information quantized by the process in step S148 is decoded locally as below. In other words, in step S149, the quantized coefficient (also referred to as quantization coefficient) generated by the process in step S148 is inversely quantized by the inverse quantization unit 118 with the characteristic corresponding to the characteristic of the quantization unit 115. In step S150, the inverse orthogonal transform unit 119 performs the inverse orthogonal transform on the orthogonal transform coefficient obtained by the process in step S147. In step S151, the calculation unit 120 adds the predicted image to the locally decoded differential information to thereby generate the locally decoded image (image corresponding to the input to the calculation unit 113).

In step S152, the loop filter 121 filters the image generated by the process in step S151, thereby removing the block distortion, etc. In step S153, the frame memory 122 stores the image from which the block distortion, etc. have been removed by the process in step S152. Note that the image not filtered by the loop filter 121 is also supplied from the calculation unit 120 to the frame memory 122 and stored therein. The image stored in the frame memory 122 is used in the process of step S143 or step S144.

In step S154, the frame memory 122 supplies the image stored therein as the information related to the encoding of the base layer to the inter-layer prediction control unit 104 and stores the information therein.

In step S155, the lossless encoding unit 116 encodes the coefficient quantized by the process in step S148. In other words, the data corresponding to the differential image is subjected to the lossless encoding such as the variable-length encoding or the arithmetic encoding.

On this occasion, the lossless encoding unit 116 encodes the information related to the prediction mode of the predicted image selected by the process in step S145 and adds the information to the encoded data obtained by encoding the differential image. In other words, the lossless encoding unit 116 encodes the optimum intra prediction mode information supplied from the intra prediction unit 124 or the information according to the optimum inter prediction mode supplied from the motion prediction/compensation unit 125, and adds the information to the encoded data.

In step S156, the accumulation buffer 117 accumulates the base layer encoded data obtained by the process in step S155. The base layer encoded data accumulated in the accumulation buffer 117 are read out as appropriate and transmitted to the decoding side through the transmission path or the recording medium.

In step S157, the rate control unit 127 controls the rate of the quantization operation of the quantization unit 115 based on the code amount of encoded data (amount of generated codes) accumulated in the accumulation buffer 117 by the process in step S156 so as to prevent the overflow or the underflow. Moreover, the rate control unit 127 supplies the information related to the quantization parameter to the quantization unit 115.

Upon the end of the process in step S157, the base layer encoding process ends and the process returns to FIG. 13. The base layer encoding process is executed in the unit of picture, for example. In other words, each picture of the current layer is subjected to the base layer encoding. However, each process in the base layer encoding process is performed in the unit of each process.

<Flow of Inter-layer Prediction Control Process>

Figure 16:
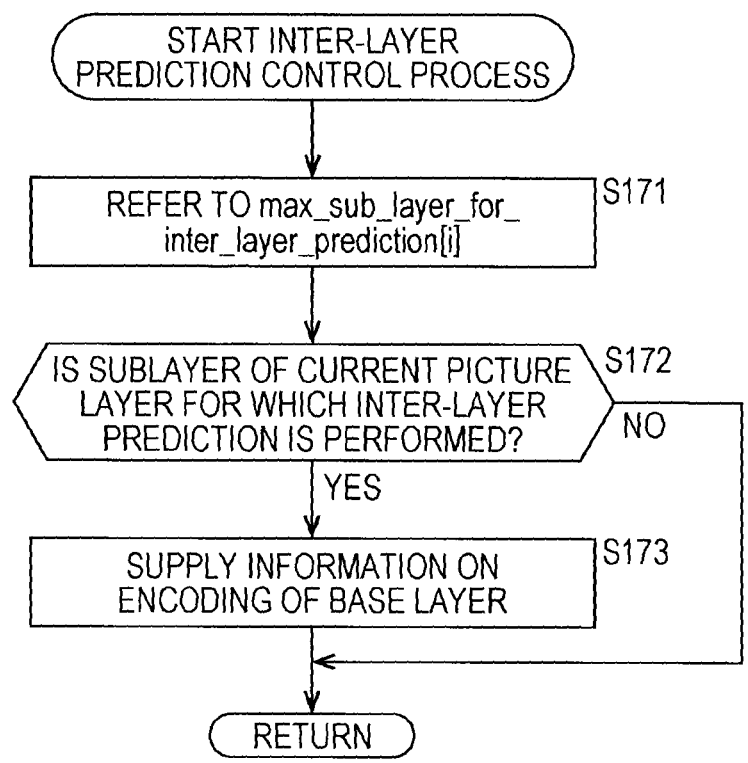
FIG. 16 is a flowchart for describing an example of the flow of an inter-layer prediction control process.

Next, an example of the flow of the inter-layer prediction control process to be executed in step S106 in FIG. 13 is described with reference to the flowchart of FIG. 16.

Figure 14:
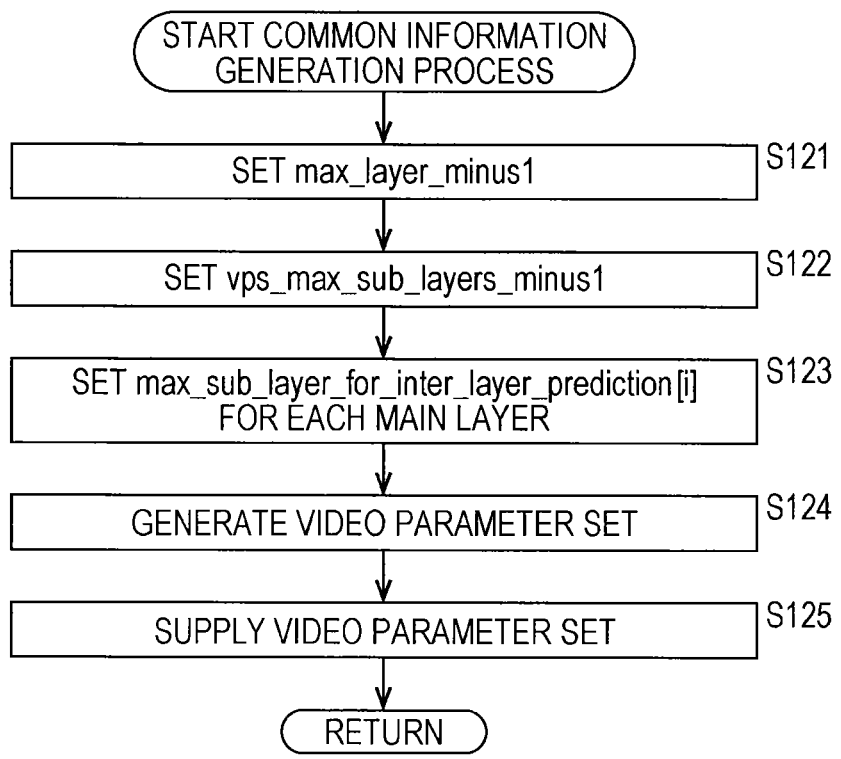
FIG. 14 is a flowchart for describing an example of the flow of a common information generation process.

Upon the start of the inter-layer prediction control process, the inter-layer prediction execution control unit 151 refers to the parameter (max_sub_layer_for_inter_layer_prediction[i]) supplied from the common information generation unit 101 through the common information generation process of FIG. 14 in step S171.

In step S172, the inter-layer prediction execution control unit 151 determines whether the sublayer of the current picture is the layer for which the inter-layer prediction is performed or not based on the value of the parameter. If it has been determined that the layer specified by the parameter (max_sub_layer_for_inter_layer_prediction[i]) is the higher sublayer than the current sublayer and the inter-layer prediction in the current sublayer is allowed for that sublayer, the process advances to step S173.

In step S173, the inter-layer prediction execution control unit 151 controls the encoding related information buffer 152 to supply the information related to the encoding of the base layer stored in the encoding related information buffer 152 to the enhancement layer image encoding unit 105. Upon the end of the process in step S173, the inter-layer prediction control process ends, and the process returns to FIG. 13.

If it has been determined that the inter-layer prediction in the current sublayer is not allowed in step S172, the information related to the encoding of the base layer is not supplied and the inter-layer prediction control process ends;

thus, the process returns to FIG. 13. In other words, the inter-layer prediction is not performed in the encoding of that current sublayer.

<Flow of Enhancement Layer Encoding Process>

Next, an example of the flow of the enhancement layer encoding process to be executed in step S107 in FIG. 13 is described with reference to the flowchart of FIG. 17.

Each process in step S191 to step S193 and step S195 to step S206 in the enhancement layer encoding process is executed similarly to each process in step S141 to step S143, step S145 to step S153, and step S155 to step S157 in the base layer encoding process. However, each process in the enhancement layer encoding process is performed on the enhancement layer image information by each process unit in the enhancement layer image encoding unit 105.

In step S194, the motion prediction/compensation unit 135 performs the motion prediction/compensation process on the enhancement layer image information.

Upon the end of the process in step S206, the enhancement layer encoding process ends and the process returns to FIG. 13. The enhancement layer encoding process is executed in the unit of picture, for example. In other words, each picture of the current layer is subjected to the enhancement layer encoding process. However, each process in the enhancement layer encoding process is performed in the unit of each process.

<Flow of Motion Prediction/Compensation Process>

Figure 17:
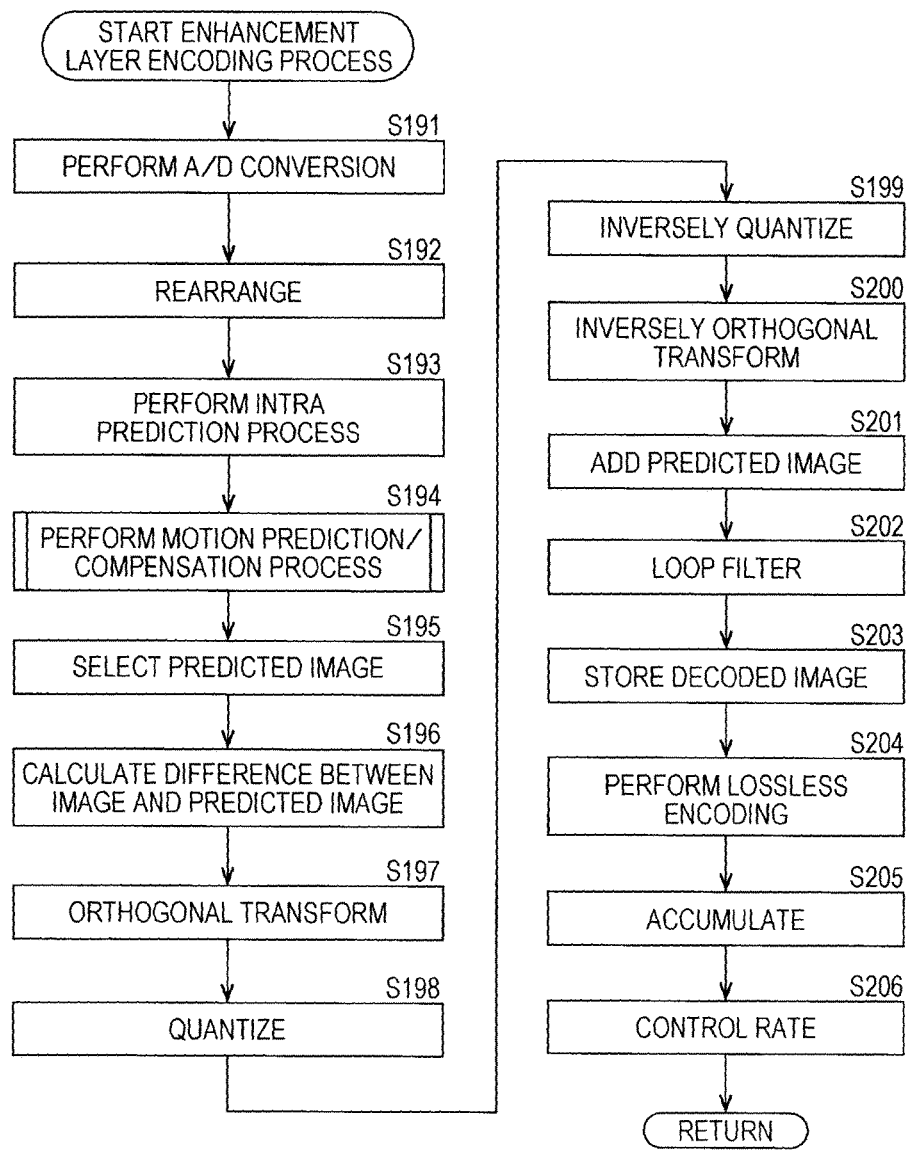
FIG. 17 is a flowchart for describing an example of the flow of an enhancement layer encoding process.
Figure 18:
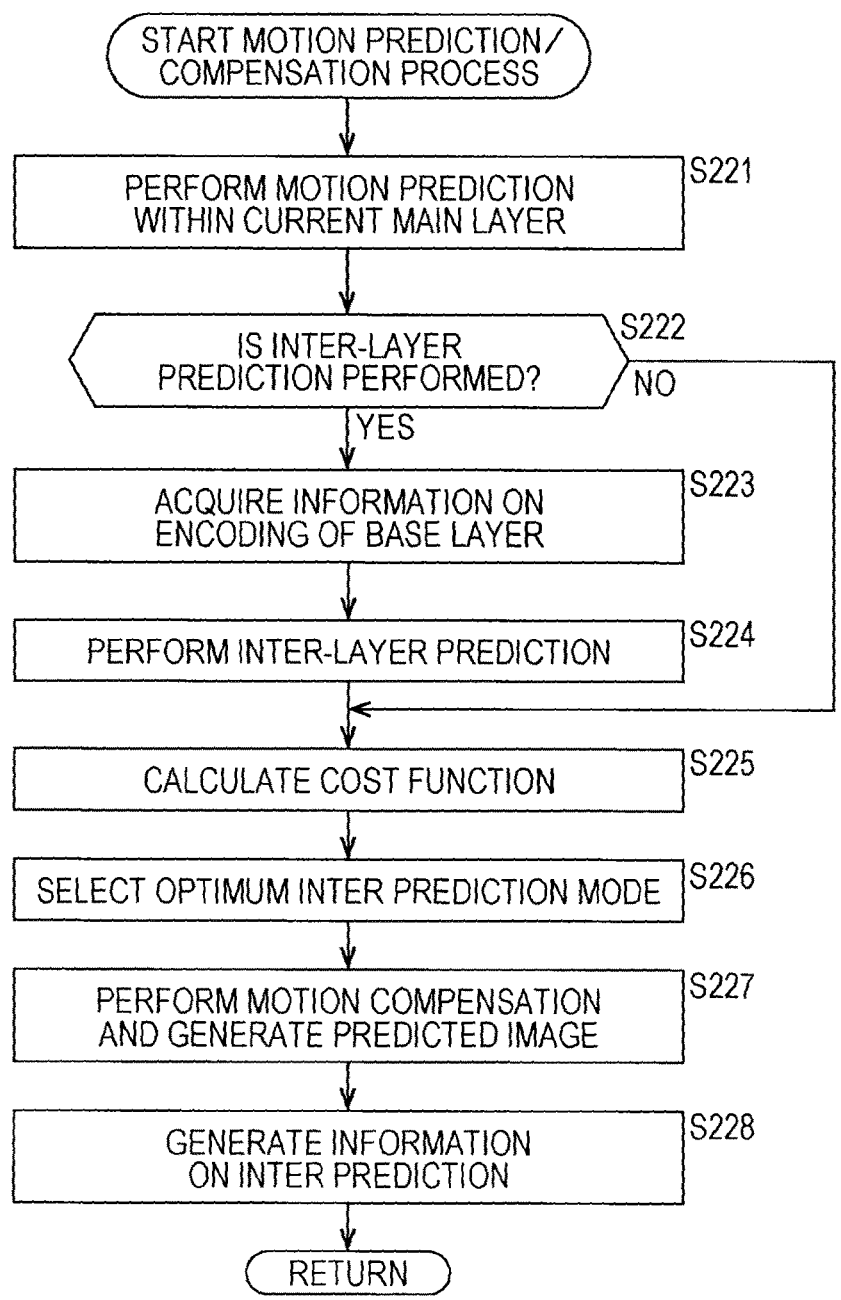
FIG. 18 is a flowchart for describing an example of the flow of a motion prediction/compensation process.

Next, an example of the flow of the motion prediction/compensation process to be executed in step S194 in FIG. 17 is described with reference to the flowchart of FIG. 18.

Upon the start of the motion prediction/compensation process, the motion prediction/compensation unit 135 performs the motion prediction in the current main layer in step S221.

In step S222, the motion prediction/compensation unit 135 determines whether to perform the inter-layer prediction for the current picture. The information related to the encoding of the base layer is supplied from the inter-layer prediction control unit 104 and if it is determined that the inter-layer prediction is performed, the process advances to step S223.

In step S223, the motion prediction/compensation unit 135 acquires the information related to the encoding of the base layer supplied from the inter-layer prediction control unit 104. In step S224, the motion prediction/compensation unit 135 performs the inter-layer prediction using the information acquired in step S223. After the end of the process in step S224, the process advances to step S225.

If it has been determined that the information related to the encoding of the base layer is not supplied from the inter-layer prediction control unit 104 and the inter-layer prediction is not performed step S222, the inter-layer prediction for the current picture is omitted and the process advances to step S225.

In step S225, the motion prediction/compensation unit 135 calculates the cost function value in regard to each prediction mode. In step S226, the motion prediction/compensation unit 135 selects the optimum inter prediction mode based on the cost function value.

In step S227, the motion prediction/compensation unit 135 generates the predicted image by performing the motion compensation in the optimum inter prediction mode selected in step S226. In step S228, the motion prediction/compensation unit 135 generates the information related to the inter prediction in regard to the optimum inter prediction mode.

Upon the end of the process in step S228, the motion prediction/compensation process ends and the process returns to FIG. 17. In this manner, the motion prediction/compensation process that uses the inter-layer prediction as appropriate is performed. This process is executed in the unit of block, for example. However, each process in the motion prediction/compensation process is performed in the unit of each process.

By executing each process as above, the scalable encoding device 100 can suppress the deterioration in encoding efficiency and suppress the deterioration in image quality due to the encoding and decoding.

<2. Second Embodiment>

<Scalable Decoding Device>

Figure 19:
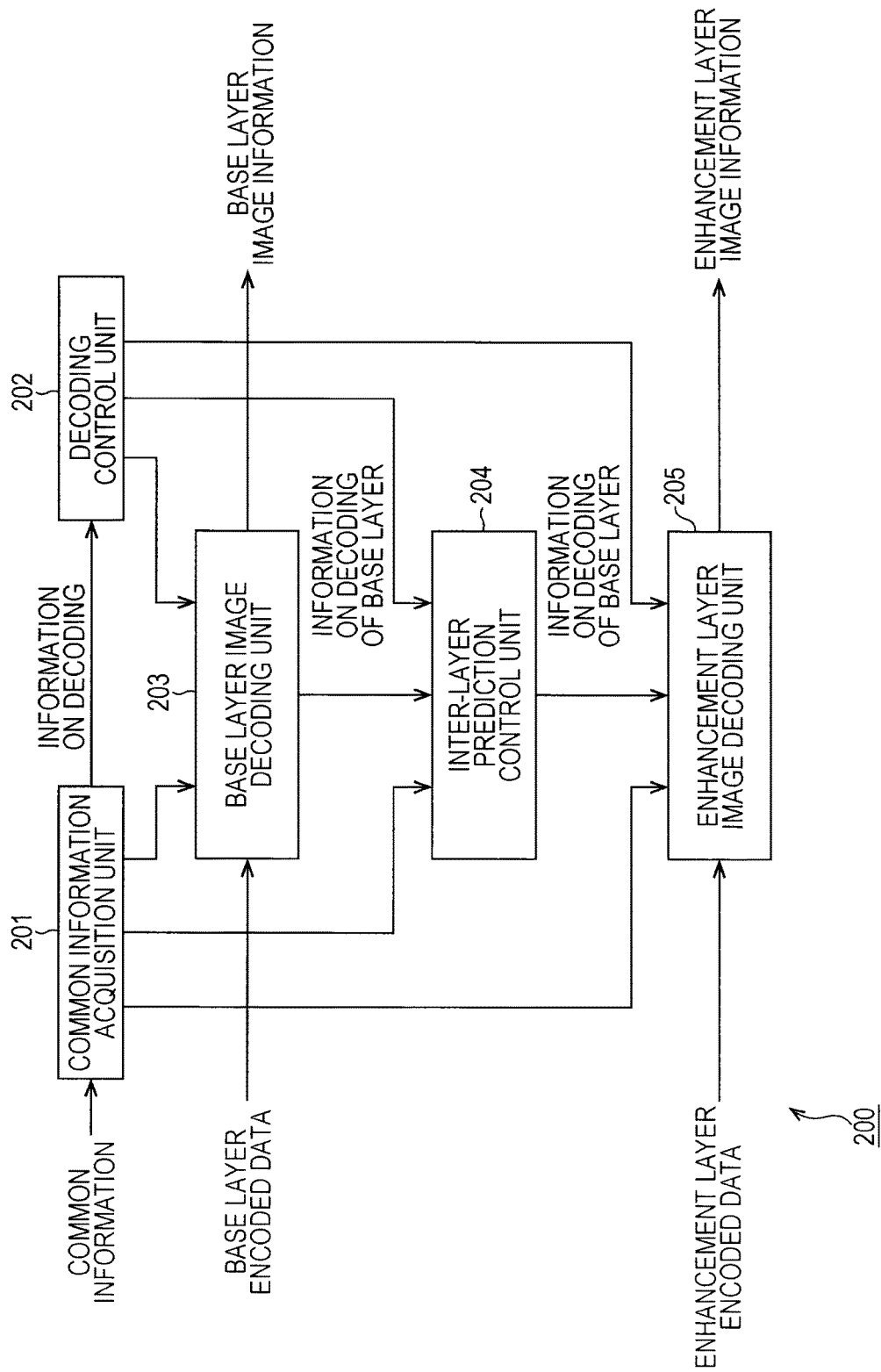
FIG. 19 is a block diagram illustrating an example of a main structure of a scalable decoding device.

Next described is the decoding of the encoded data (bit stream) that have been subjected to scalable encoding (layer-encoding) as above. FIG. 19 is a block diagram illustrating an example of a main structure of a scalable decoding device corresponding to the scalable encoding device 100 of FIG. 9. A scalable decoding device 200 illustrated in FIG. 19 scalably decodes the encoded data obtained by scalably encoding the image data by the scalable encoding device 100, for example, by a method corresponding to the encoding method.

As illustrated in FIG. 19, the scalable decoding device 200 includes a common information acquisition unit 201, a decoding control unit 202, a base layer image decoding unit 203, an inter-layer prediction control unit 204, and an enhancement layer image decoding unit 205.

The common information acquisition unit 201 acquires the common information (such as video parameter set (VPS)) transmitted from the encoding side. The common information acquisition unit 201 extracts the information related to the decoding from the acquired common information, and supplies the information to the decoding control unit 202. The common information acquisition unit 201 supplies some or all of the pieces of common information to the base layer image decoding unit 203 to the enhancement layer image decoding unit 205 as appropriate.

The decoding control unit 202 acquires the information related to the decoding supplied from the common information acquisition unit 201, and based on that information, controls the base layer image decoding unit 203 to the enhancement layer image decoding unit 205, thereby controlling the decoding of each main layer.

The base layer image decoding unit 203 is the image decoding unit corresponding to the base layer image encoding unit 103, and for example, acquires the base layer encoded data obtained by encoding the base layer image information with the base layer image encoding unit 103. The base layer image decoding unit 203 decodes the base layer encoded data without referring to the other layers and reconstructs and outputs the base layer image information. The base layer image decoding unit 203 supplies the information related to the decoding of the base layer obtained by the decoding to the inter-layer prediction control unit 204.

The inter-layer prediction control unit 204 controls the execution of the inter-layer prediction by the enhancement layer image decoding unit 205. The inter-layer prediction control unit 204 acquires and stores the information related to the decoding of the base layer supplied from the base layer image decoding unit 203. Moreover, the inter-layer prediction control unit 204 supplies to the enhancement layer image decoding unit 205, the stored information related to the decoding of the base layer in the decoding of the sublayer for which the inter-layer prediction is allowed.

The enhancement layer image decoding unit 205 is the image decoding unit corresponding to the enhancement layer image encoding unit 105, and for example, acquires the enhancement layer encoded data obtained by encoding the enhancement layer image information by the enhancement layer image encoding unit 105. The enhancement layer image decoding unit 205 decodes the enhancement layer encoded data. On this occasion, the enhancement layer image decoding unit 205 performs the inter-layer prediction with reference to the information related to the decoding of the base layer in accordance with the control of the inter-layer prediction control unit 204. More specifically, for example, if the current sublayer to be processed is the sublayer for which the inter-layer prediction is allowed, the enhancement layer image decoding unit 205 acquires the information related to the decoding of the base layer supplied from the inter-layer prediction control unit 204, performs the inter-layer prediction with reference to the information, and decodes the enhancement layer encoded data by using the prediction result. On the other hand, if the current sublayer is the sublayer for which the inter-layer prediction is prohibited, the enhancement layer image decoding unit 205 decodes the enhancement layer encoded data without performing the inter-layer prediction. By the encoding as above, the enhancement layer image decoding unit 205 reconstructs the enhancement layer image information and outputs the information.

<Base Layer Image Decoding Unit>

Figure 20:
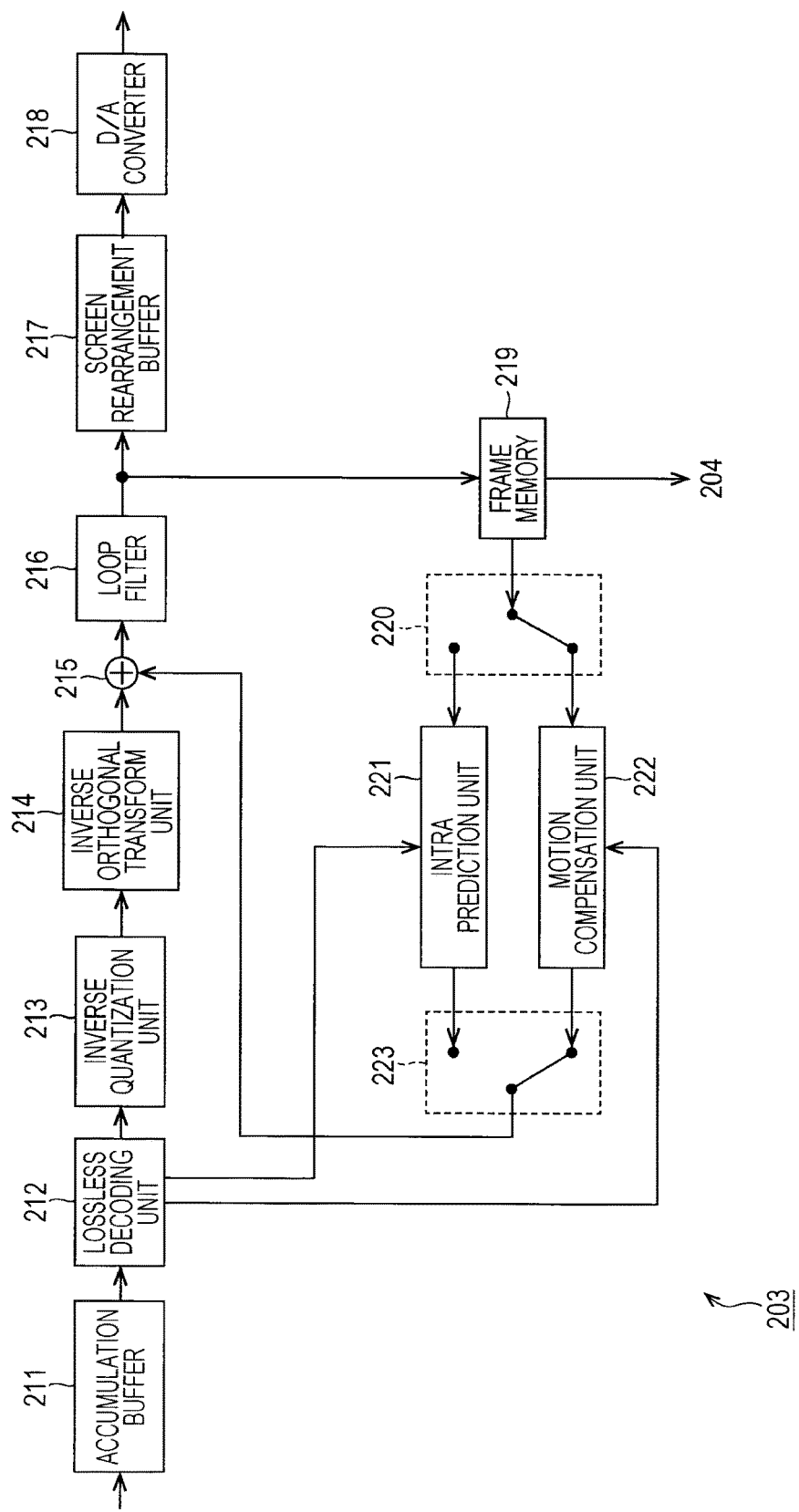
FIG. 20 is a block diagram illustrating an example of a main structure of a base layer image decoding unit.

FIG. 20 is a block diagram illustrating an example of a main structure of the base layer image decoding unit 203 of FIG. 19. As illustrated in FIG. 20, the base layer image decoding unit 203 includes an accumulation buffer 211, a lossless decoding unit 212, an inverse quantization unit 213, an inverse orthogonal transform unit 214, a calculation unit 215, a loop filter 216, a screen rearrangement buffer 217, and a D/A converter 218. The base layer image decoding unit 203 includes a frame memory 219, a selection unit 220, an intra prediction unit 221, a motion compensation unit 222, and a selection unit 223.

The accumulation buffer 211 also serves as a reception unit that receives the transmitted base layer encoded data. The accumulation buffer 211 receives and accumulates the transmitted base layer encoded data and supplies the encoded data to the lossless decoding unit 212 at a predetermined timing. The base layer encoded data includes the information necessary for the decoding, such as the prediction mode information.

The lossless decoding unit 212 decodes the information, which has been supplied from the accumulation buffer 211 and encoded by the lossless encoding unit 116, by a method corresponding to the encoding method of the lossless encoding unit 116. The lossless decoding unit 212 supplies the coefficient data obtained by quantizing the decoded differential image, to the inverse quantization unit 213.

Moreover, the lossless decoding unit 212 extracts and acquires the NAL unit including, for example, the video parameter set (VPS), the sequence parameter set (SPS), and the picture parameter set (PPS) included in the base layer encoded data. The lossless decoding unit 212 extracts the information related to the optimum prediction mode from those pieces of information, and determines which one of the intra prediction mode and the inter prediction mode has been selected as the optimum prediction mode based on the information. Then, the lossless decoding unit 212 supplies the information related to the optimum prediction mode to one of the intra prediction unit 221 and the motion compensation unit 222 with the selected mode. In other words, for example, if the intra prediction mode has been selected as the optimum prediction mode in the base layer image encoding unit 103, the information related to that optimum prediction mode is supplied to the intra prediction unit 221. On the other hand, if the inter prediction mode has been selected as the optimum prediction mode in the base layer image encoding unit 103, the information related to that optimum prediction mode is supplied to the motion compensation unit 222.

Furthermore, the lossless decoding unit 212 extracts the information necessary for the inverse quantization, such as the quantization matrix or the quantization parameter, from the NAL unit or the like and supplies the information to the inverse quantization unit 213.

The inverse quantization unit 213 inversely quantizes the quantized coefficient data obtained by decoding by the lossless decoding unit 212 by a method corresponding to the quantization method of the quantization unit 115. Note that this inverse quantization unit 213 is a process unit similar to the inverse quantization unit 118. Therefore, the description of the inverse quantization unit 213 can apply to the inverse quantization unit 118. However, the data input and output destination needs to be set in accordance with the device as appropriate. The inverse quantization unit 213 supplies the obtained coefficient data to the inverse orthogonal transform unit 214.

The inverse orthogonal transform unit 214 performs the inverse orthogonal transform on the coefficient data supplied from the inverse quantization unit 213 by a method corresponding to the orthogonal transform method of the orthogonal transform unit 114. Note that the inverse orthogonal transform unit 214 is a process unit similar to the inverse orthogonal transform unit 119. In other words, the description of the inverse orthogonal transform unit 214 can apply to the inverse orthogonal transform unit 119. However, the data input and output destination needs to be set in accordance with the device as appropriate.

Through the inverse orthogonal transform process, the inverse orthogonal transform unit 214 obtains the decoded residual data corresponding to the residual data before the orthogonal transform in the orthogonal transform unit 114. The decoded residual data obtained from the inverse orthogonal transform are supplied to the calculation unit 215. To the calculation unit 215, the predicted image is supplied from the intra prediction unit 221 or the motion compensation unit 222 through the selection unit 223.

The calculation unit 215 sums up the decoded residual data and the predicted image, thereby providing the decoded image data corresponding to the image data before the predicted image is subtracted by the calculation unit 113. The calculation unit 215 supplies the decoded image data to the loop filter 216.

The loop filter 216 performs the filter process with the deblocking filter, the adaptive loop filter, or the like on the supplied decoded image as appropriate, and supplies the obtained image to the screen rearrangement buffer 217 and the frame memory 219. For example, the loop filter 216 removes the block distortion of the decoded image by performing the deblocking filter process on the decoded image. Further, the loop filter 216 improves the image by performing the loop filter process on the deblocking filter process result (decoded image from which the block distortion has been removed) using the Wiener Filter (Wiener Filter). Note that this loop filter 216 is a process unit similar to the loop filter 121.

Note that the decoded image output from the calculation unit 215 can be supplied to the screen rearrangement buffer 217 and the frame memory 219 without having the loop filter 216 therebetween. In other words, the filter process by the loop filter 216 can be omitted either partially or entirely.

The screen rearrangement buffer 217 rearranges the decoded images. In other words, the order of frames rearranged according to the encoding order by the screen rearrangement buffer 112 is rearranged in the original order of display. The D/A converter 218 performs the D/A conversion on the image supplied from the screen rearrangement buffer 217, and outputs the image to a display, which is not shown, where the image is displayed.

The frame memory 219 stores the supplied decoded images and supplies the stored decoded images to the selection unit 220 as reference images at a predetermined timing or upon a request from the outside, such as from the intra prediction unit 221 or the motion compensation unit 222.

The frame memory 219 supplies the stored decoded images to the inter-layer prediction control unit 204 as the information related to the decoding of the base layer.

The selection unit 220 selects the destination to which the reference images supplied from the frame memory 219 are supplied. The selection unit 220, in the case of decoding the intra-encoded image, supplies the reference image supplied from the frame memory 219 to the intra prediction unit 221. On the other hand, in the case of decoding the inter-encoded image, the selection unit 220 supplies the reference image supplied from the frame memory 219 to the motion compensation unit 222.

To the intra prediction unit 221, the information representing the intra prediction mode obtained by decoding the header information and the like are supplied from the lossless decoding unit 212 as appropriate. The intra prediction unit 221 performs the intra prediction using the reference image acquired from the frame memory 219 in the intra prediction mode used in the intra prediction unit 124, and generates the predicted image. The intra prediction unit 221 supplies the generated predicted image to the selection unit 223.

The motion compensation unit 222 acquires the information obtained by decoding the header information (such as the optimum prediction mode information and the reference image information) from the lossless decoding unit 212.

The motion compensation unit 222 performs the motion compensation using the reference image acquired from the frame memory 219 in the inter prediction mode represented by the optimum prediction mode information acquired from the lossless decoding unit 212, and generates the predicted image.

The selection unit 223 supplies the predicted image from the intra prediction unit 221 or the predicted image from the motion compensation unit 222 to the calculation unit 215. In the calculation unit 215, the predicted image generated using the motion vector and the decoded residual data (differential image information) from the inverse orthogonal transform unit 214 are united, whereby the original image is obtained.

<Enhancement Layer Image Encoding Unit>

Figure 21:
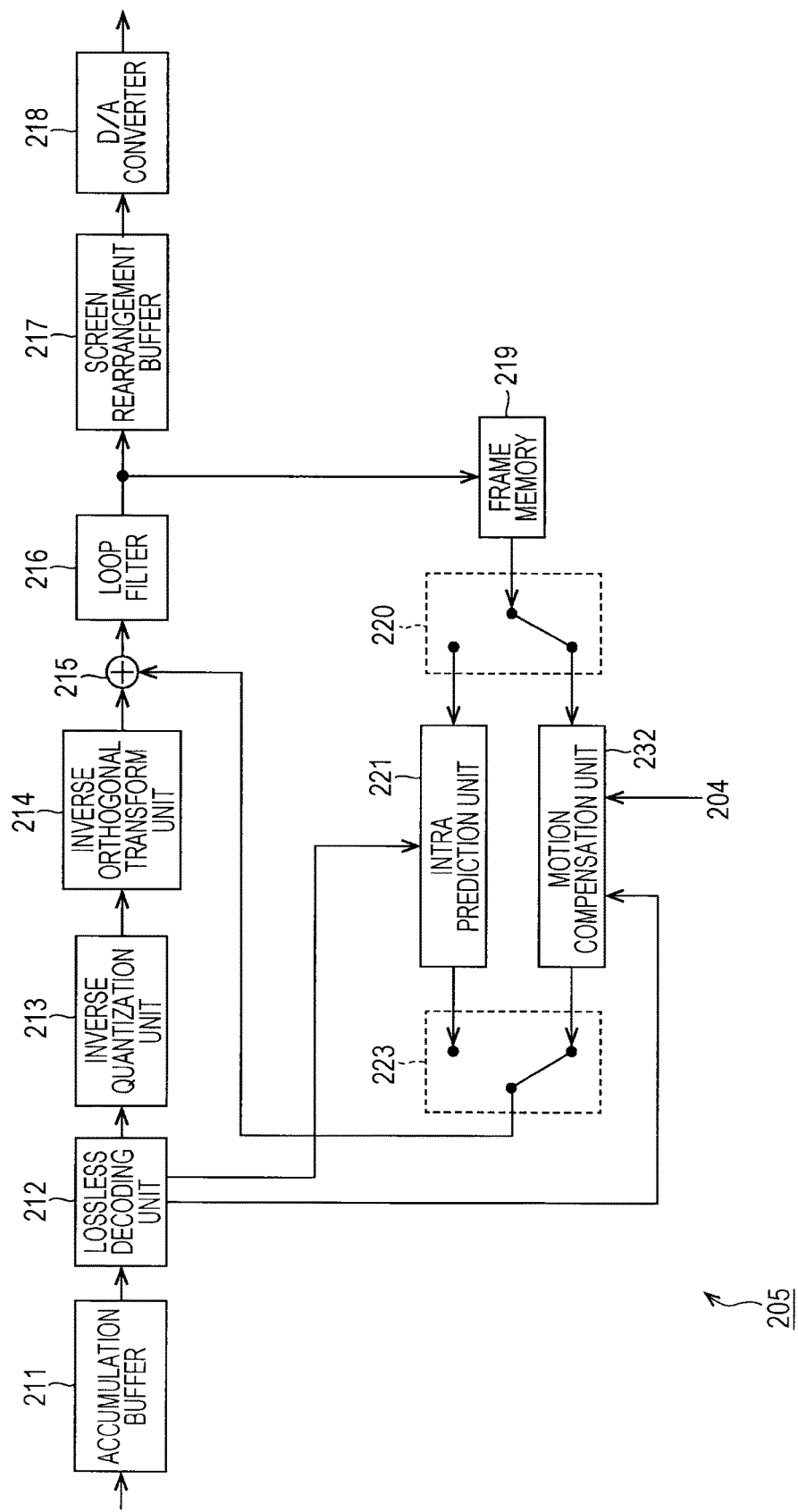
FIG. 21 is a block diagram illustrating an example of a main structure of the enhancement layer image decoding unit.

FIG. 21 is a block diagram illustrating an example of a main structure of the enhancement layer image decoding unit 205 of FIG. 19. As illustrated in FIG. 21, the enhancement layer image decoding unit 205 has a structure basically similar to the base layer image decoding unit 203 of FIG. 20.

However, each unit of the enhancement layer image decoding unit 205 performs the process to decode the encoded data of not the base layer but the enhancement layer. In other words, the accumulation buffer 211 of the enhancement layer image decoding unit 205 stores the enhancement layer encoded data and the D/A converter 218 of the enhancement layer image decoding unit 205 outputs the enhancement layer image information to, for example, a recording device (recoding medium) or a transmission path in a later stage, which is not shown.

The enhancement layer image decoding unit 205 has a motion compensation unit 232 instead of the motion compensation unit 222.

The motion compensation unit 232 performs not just the motion compensation between pictures as conducted by the motion compensation unit 222 but also the motion compensation between the main layers. In this case, the motion compensation unit 232 acquires the information (for example, the base layer decoded image) related to the decoding of the base layer that is supplied from the inter-layer prediction control unit 204. The motion compensation unit 232 performs the motion compensation of the main layer using the information related to the decoding of the base layer.

<Common Information Acquisition Unit and Inter-layer Prediction Control Unit>

Figure 22:
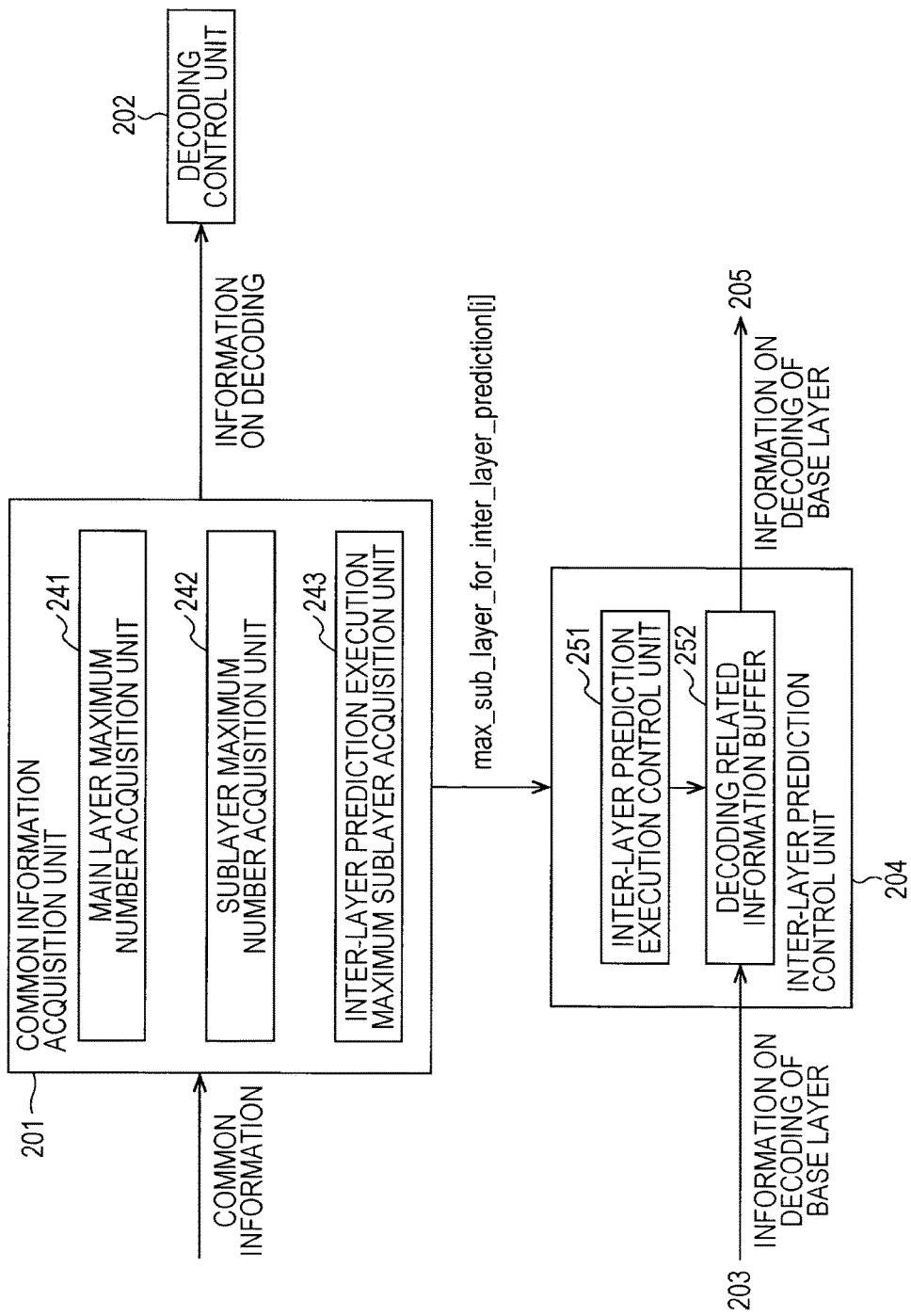
FIG. 22 is a block diagram illustrating an example of a main structure of a common information acquisition unit and an inter-layer prediction control unit.

FIG. 22 is a block diagram illustrating an example of a main structure of the common information acquisition unit 201 and the inter-layer prediction control unit 204 of FIG. 19.

As illustrated in FIG. 22, the common information acquisition unit 201 includes a main layer maximum number acquisition unit 241, a sublayer maximum number acquisition unit 242, and an inter-layer prediction execution maximum sublayer acquisition unit 243. The inter-layer prediction control unit 204 includes an inter-layer prediction execution control unit 251 and a decoding related information buffer 252.

The main layer maximum number acquisition unit 241 acquires the information (max_layer_minus1) representing the maximum number of main layers included in the common information transmitted from the encoding side. The sublayer maximum number acquisition unit 242 acquires the information (vps_max_sub_layer_minus1) representing the maximum number of sublayers included in the common information transmitted from the encoding side. The inter-layer prediction execution maximum sublayer acquisition unit 243 acquires the information (max_sub_layer_for_inter_layer_prediction[i]) that specifies the highest sublayer among the sublayers for which the inter-layer prediction of the current main layer is allowed included in the common information transmitted from the encoding side.

The common information acquisition unit 201 supplies the information related to the decoding included in the acquired common information (such as a video parameter set (VPS)) to the decoding control unit 202. Moreover, the common information acquisition unit 201 supplies to the inter-layer prediction control unit 204, the information (max_sub_layer_for_inter_layer_prediction[i]) that specifies the highest sublayer among the sublayers for which the inter-layer prediction of the current main layer is allowed.

The inter-layer prediction execution control unit 251 controls the execution of the inter-layer prediction based on the common information supplied from the common information acquisition unit 201. More specifically, the inter-layer prediction execution control unit 251 controls the decoding related information buffer 252 based on the information (max_sub_layer_for_inter_layer_prediction[i]) that is supplied from the common information acquisition unit 201 and that specifies the highest sublayer among the sublayers for which the inter-layer prediction is allowed.

The decoding related information buffer 252 acquires and stores the information (such as the base layer decoded image) related to the decoding of the base layer supplied from the base layer image decoding unit 203. The decoding related information buffer 252 supplies the stored information related to the encoding of the base layer to the enhancement layer image decoding unit 205 in accordance with the control of the inter-layer prediction execution control unit 251.

The inter-layer prediction execution control unit 251 controls the supply of the information related to the decoding of the base layer from this decoding related information buffer 252. For example, if the inter-layer prediction of the current sublayer is allowed in the information (max_sub_layer_for_inter_layer_prediction[i]) that specifies the highest sublayer among the sublayers for which the inter-layer prediction is allowed, the inter-layer prediction execution control unit 251 supplies the information related to the decoding of the base layer stored in the decoding related information buffer 252 in regard to the current sublayer (for example, the base layer decoded image) to the enhancement layer image decoding unit 205.

On the other hand, if the inter-layer prediction of the current sublayer is not allowed in the information (max_sub_layer_for_inter_layer_prediction[i]) that specifies the highest sublayer among the sublayers for which the inter-layer prediction is allowed, the inter-layer prediction execution control unit 251 does not supply the information related to the decoding of the base layer stored in the decoding related information buffer 252 in regard to the current sublayer (for example, the base layer decoded image) to the enhancement layer image decoding unit 205.

Thus, the scalable decoding device 200 transmits the inter-layer prediction control information that controls the inter-layer prediction using the sublayer; therefore, the deterioration in encoding efficiency by the inter-layer prediction control can be suppressed. This can suppress the deterioration in image quality due to the encoding and decoding in the scalable decoding device 200.

<Flow of Decoding Process>

Next described is the flow of processes to be executed by the scalable decoding device 200 as above. First, an example of the flow of the decoding process is described with reference to the flowchart of FIG. 23.

Upon the start of the decoding process, in step S301, the common information acquisition unit 201 of the scalable decoding device 200 acquires the common information. In step S302, the decoding control unit 202 processes the first main layer.

In step S303, the decoding control unit 202 determines whether the current main layer to be processed is the base layer or not based on the common information acquired in step S301 and transmitted from the encoding side. If it has been determined that the current main layer is the base layer, the process advances to step S304.

In step S304, the base layer image decoding unit 203 performs the base layer decoding process. Upon the end of the process of step S304, the process advances to step S308.

If it has been determined that the current main layer is the enhancement layer in step S303, the process advances to step S305. In step S305, the decoding control unit 202 decides the base layer corresponding to the current main layer (i.e., the base layer used as the reference destination).

In step S306, the inter-layer prediction control unit 204 performs the inter-layer prediction control process.

In step S307, the enhancement layer image decoding unit 205 performs the enhancement layer decoding process. Upon the end of the process of step S307, the process advances to step S308.

In step S308, the decoding control unit 202 determines whether all the main layers have been processed or not. If it has been determined that the unprocessed main layer still exists, the process advances to step S309.

In step S309, the decoding control unit 202 processes the next unprocessed main layer (current main layer). Upon the end of the process of step S309, the process returns to step S303. The process from step S303 to step S309 is executed repeatedly to decode the main layers.

If it has been determined that all the main layers are already processed in step S308, the decoding process ends.

<Flow of Common Information Acquisition Process>

Figure 23:
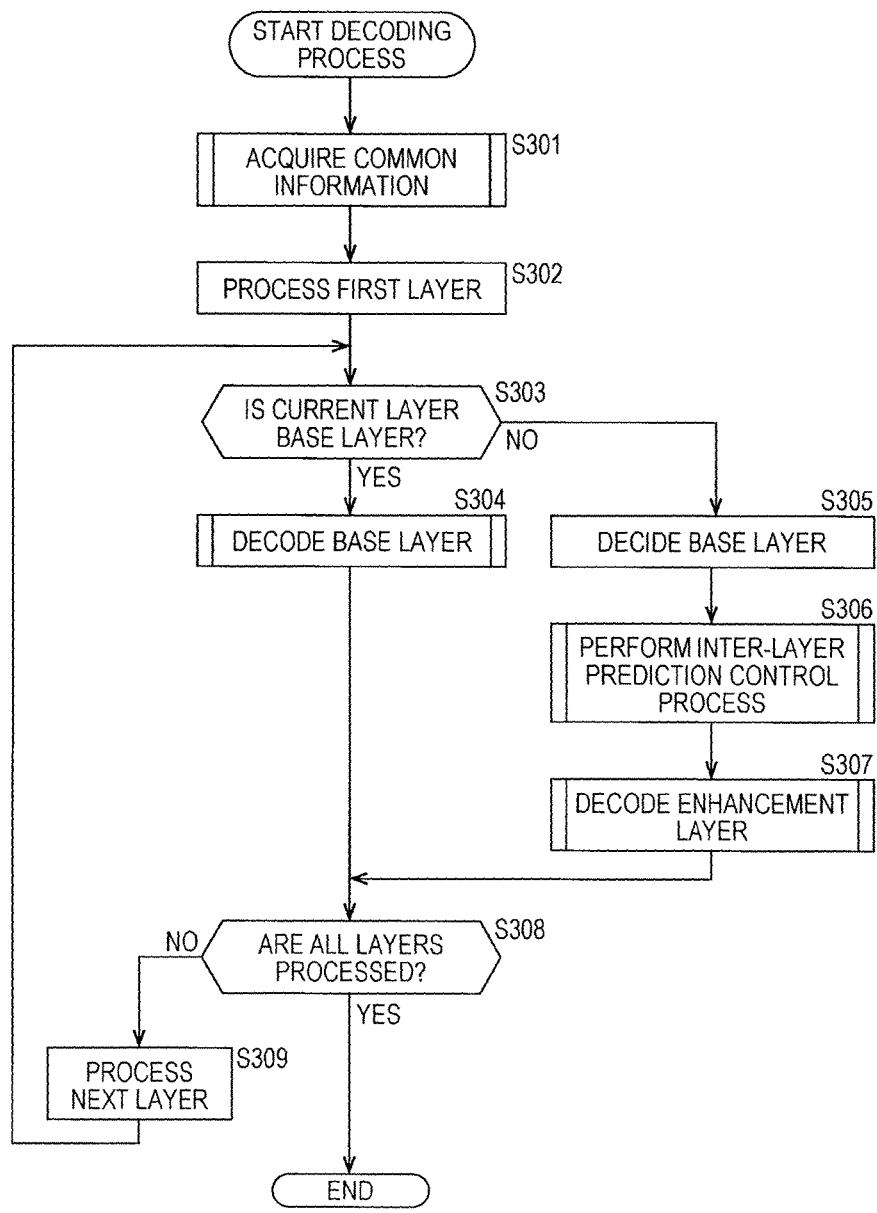
FIG. 23 is a flowchart for describing an example of the decoding process.

Next, an example of the flow of the common information acquisition process to be executed in step S301 of FIG. 23 is described with reference to the flowchart of FIG. 24.

Upon the start of the common information acquisition process, the common information acquisition unit 201 acquires the video parameter set (VPS) transmitted from the encoding side in step S321.

In step S322, the main layer maximum number acquisition unit 241 acquires the parameter (max_layer_minus1) from the video parameter set. In step S323, the sublayer maximum number acquisition unit 242 acquires the parameter (vps_max_sub_layers_minus1) from the video parameter set. In step S324, the inter-layer prediction execution maximum sublayer acquisition unit 243 acquires the parameter (max_sub_layer_for_inter_layer_prediction[i]) for each main layer.

In step S325, the common information acquisition unit 201 extracts the information necessary for the control of the decoding from the video parameter and supplies the information as the information related to the decoding to the decoding control unit 202.

Upon the end of the process of step S325, the common information acquisition process ends and the process returns to FIG. 23.

<Flow of Base Layer Decoding Process>

Next, an example of the flow of the base layer decoding process to be executed in step S304 in FIG. 23 is described with reference to the flowchart of FIG. 25.

Upon the start of the base layer decoding process, the accumulation buffer 211 of the base layer image decoding unit 203 accumulates the bit streams of the base layers transmitted from the encoding side in step S341. In step S342, the lossless decoding unit 212 decodes the bit stream (the encoded differential image information) of the base layer supplied from the accumulation buffer 211. In other words, the I picture, the P picture, and the B picture encoded by the loss less encoding unit 116 are decoded. On this occasion, various other pieces of information than the differential image information included in the bit stream such as the header information are also decoded.

In step S343, the inverse quantization unit 213 inversely quantizes the quantized coefficient obtained by the process in step S342.

In step S344, the inverse orthogonal transform unit 214 performs the inverse orthogonal transform on the current block (current TU).

In step S345, the intra prediction unit 221 or the motion compensation unit 222 performs the prediction process and generates the predicted image. In other words, the prediction process is performed in the prediction mode employed in the encoding, which has been determined in the lossless decoding unit 212. More specifically, for example, in the case where the intra prediction is applied in the encoding, the intra prediction unit 221 generates the predicted image in the intra prediction mode that is determined to be optimum in the encoding. On the other hand, in the case where the inter prediction is applied in the encoding, the motion compensation unit 222 generates the predicted image in the inter prediction mode that is determined to be optimum in the encoding.

In step S346, the calculation unit 215 adds the predicted image generated in step S345 to the differential image information generated by the inverse orthogonal transform process in step S344. Thus, the original image is formed by the decoding.

In step S347, the loop filter 216 performs the loop filter process on the decoded image obtained in step S346 as appropriate.

In step S348, the screen rearrangement buffer 217 rearranges the images filtered in step S347. In other words, the order of frames rearranged for encoding by the screen rearrangement buffer 112 is rearranged to be the original order of display.

In step S349, the D/A converter 218 performs the D/A conversion on the image whose order of frames has been rearranged in step S348. This image is output to and displayed on a display, which is not shown.

In step S350, the frame memory 219 stores the image subjected to the loop filter process in step S347.

In step S351, the frame memory 219 supplies the decoded image stored in step S350 to the decoding related information buffer 252 of the inter-layer prediction control unit 204 as the information related to the decoding of the base layer and stores the information in the decoding related information buffer 252.

Upon the end of the process of step S351, the base layer decoding process ends and the process returns to FIG. 23. The base layer decoding process is executed in the unit of picture, for example. In other words, the base layer decoding process is executed for each picture of the current layer. However, each process in the base layer decoding process is performed in the unit of each process.

<Flow of Inter-layer Prediction Control Process>

Figure 26:
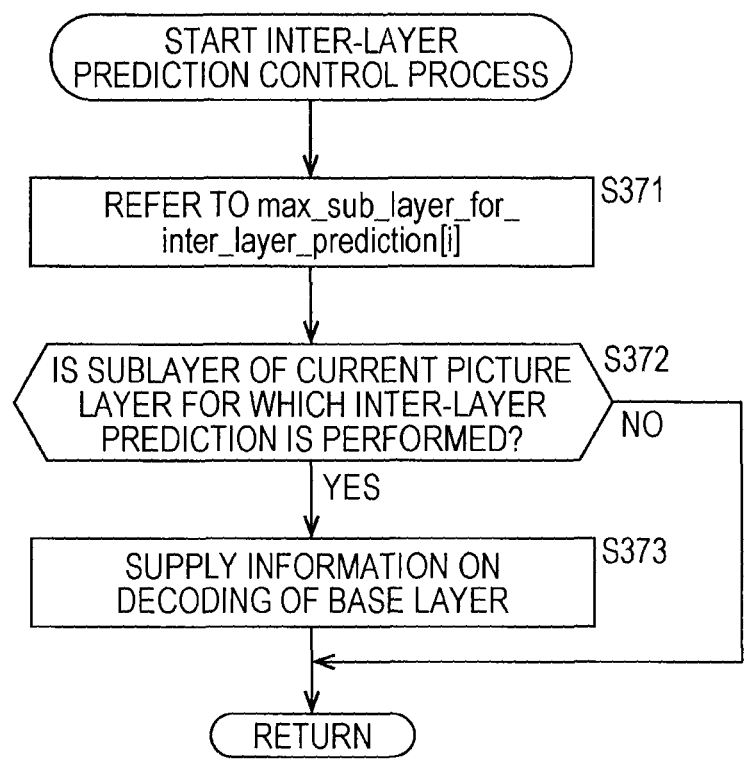
FIG. 26 is a flowchart for describing an example of the flow of the inter-layer prediction control process.

Next, an example of the flow of the inter-layer prediction control process to be executed in step S306 in FIG. 23 is described with reference to the flowchart of FIG. 26.

Figure 24:
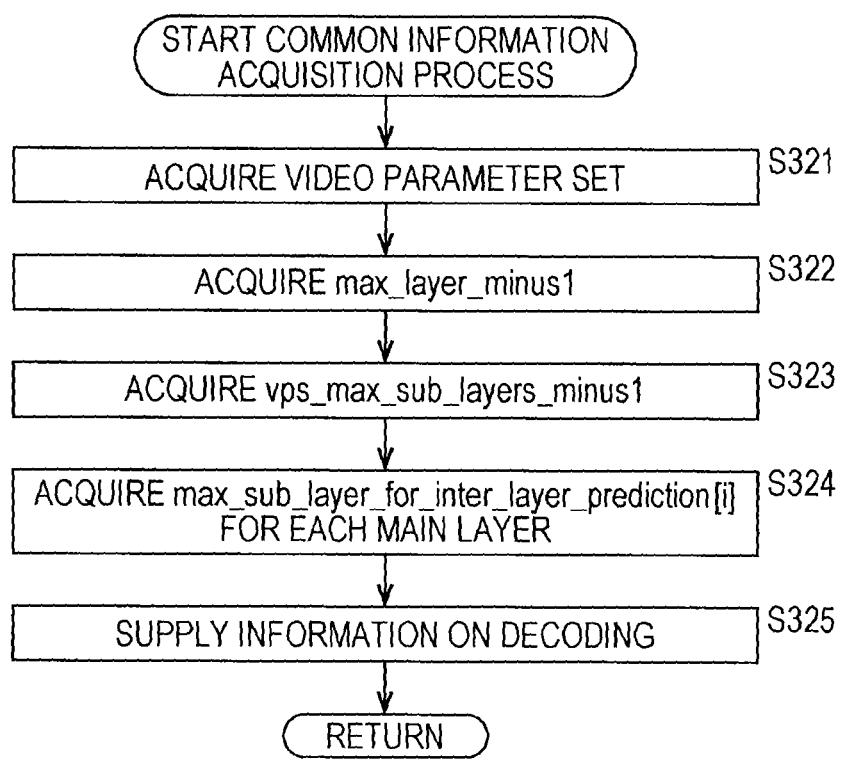
FIG. 24 is a flowchart for describing an example of the flow of the common information acquisition process.

Upon the start of the inter-layer prediction control process, the inter-layer prediction execution control unit 251 refers to the parameter (max_sub_layer_for_inter_layer_prediction[i]) supplied from the common information acquisition unit 201 by the common information generation process in FIG. 24 in step S371.

In step S372, the inter-layer prediction execution control unit 251 determines whether the current sublayer of the current picture is the layer for which the inter-layer prediction is performed based on the value of the parameter. If the layer specified by the parameter (max_sub_layer_for_inter_layer_prediction[i]) is the higher sublayer than the current sublayer and it is determined that the inter-layer prediction of the current sublayer is allowed, the process advances to step S373.

In step S373, the inter-layer prediction execution control unit 251 controls the decoding related information buffer 252 to supply the information related to the decoding of the base layer stored in the decoding related information buffer 252 to the enhancement layer image decoding unit 205. Upon the end of the process of step S373, the inter-layer prediction control process ends and the process returns to FIG. 23.

If it has been determined that the inter-layer prediction of the current sublayer is not allowed in step S372, the inter-layer prediction control process ends without the supply of the information related to the encoding of the base layer and the process returns to FIG. 23. In other words, the inter-layer prediction is not performed in the encoding of this current sublayer.

<Flow of Enhancement Layer Decoding Process>

Next, an example of the flow of the enhancement layer decoding process to be executed in step S307 in FIG. 23 is described with reference to the flowchart of FIG. 27.

The processes from step S391 to step S394 and step S396 to step S400 in the enhancement layer decoding process are performed in a manner similar to the processes from step S341 to step S344 and step S346 to step S350 in the base layer decoding process. However, each process of the enhancement layer decoding process is performed on the enhancement layer encoded data by each process unit of the enhancement layer image decoding unit 205.

In step S395, the intra prediction unit 221 or the motion compensation unit 232 performs the prediction process on the enhancement layer encoded data.

Upon the end of the process of step S400, the enhancement layer decoding process ends and the process returns to FIG. 23. The enhancement layer decoding process is executed in the unit of picture, for example. In other words, the enhancement layer decoding process is executed for each picture of the current layer. However, each process in the enhancement layer decoding process is performed in the unit of each process.

<Flow of Prediction Process>

Figure 27:
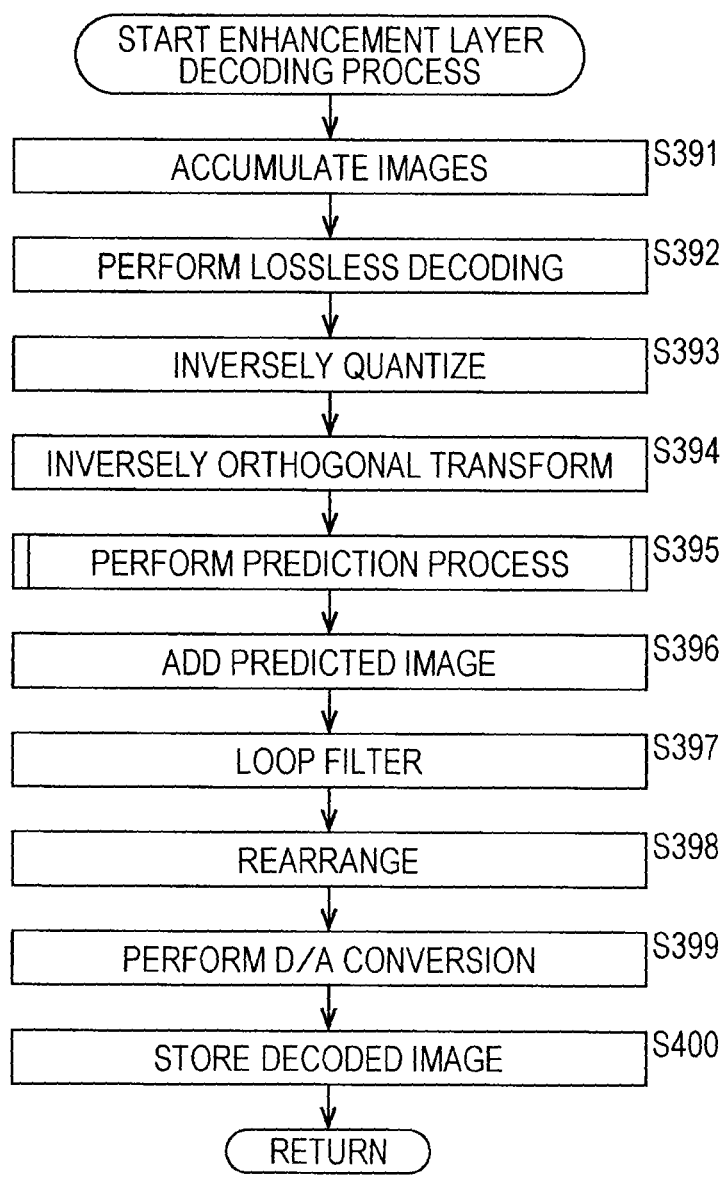
FIG. 27 is a flowchart for describing an example of the flow of the enhancement layer decoding process.
Figure 28:
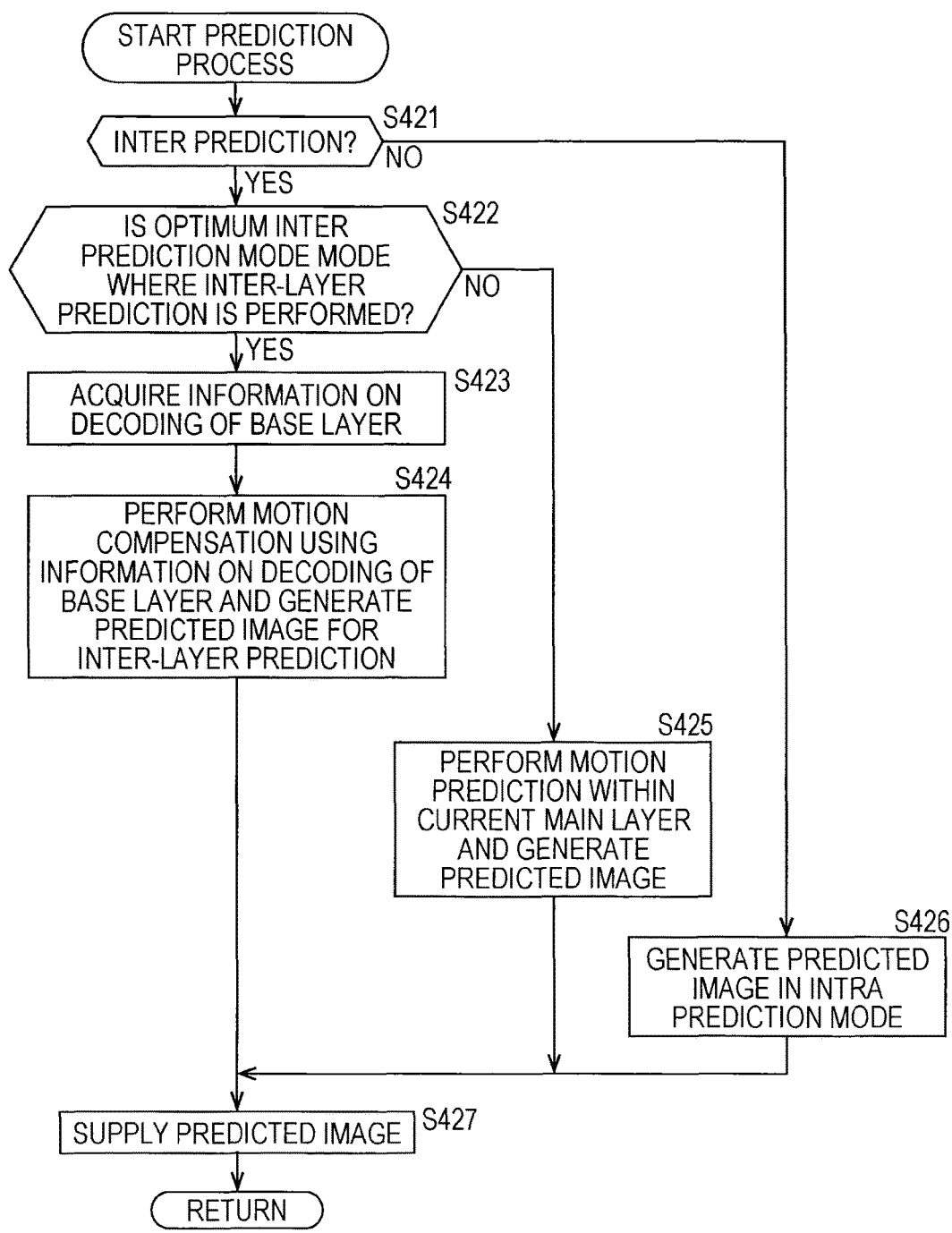
FIG. 28 is a flowchart for describing an example of the flow of the prediction process.

Next, an example of the flow of the prediction process to be executed in step S395 in FIG. 27 is described with reference to the flowchart of FIG. 28.

Upon the start of the prediction process, the motion compensation unit 232 determines whether the prediction mode is the inter prediction or not in step S421. If it has been determined that the prediction mode is the inter prediction, the process advances to step S422.

In step S422, the motion compensation unit 232 determines whether the optimum inter prediction mode as the inter prediction mode employed in the encoding is the mode in which the inter-layer prediction is performed. If it has been determined that the optimum inter prediction mode is the mode in which the inter-layer prediction is performed, the process advances to step S423.

In step S423, the motion compensation unit 232 acquires the information related to the decoding of the base layer. In step S424, the motion compensation unit 232 performs the motion compensation using the information related to the base layer, and generates the predicted image for the inter-layer prediction. Upon the end of the process of step S424, the process advances to step S427.

If it has been determined in step S422 that the optimum inter prediction mode is not the mode in which the inter-layer prediction is performed, the process advances to step S425. In step S425, the motion compensation unit 232 performs the motion compensation in the current main layer, and generates the predicted image. Upon the end of the process of step S425, the process advances to step S427.

If it has been determined in step S421 that the optimum inter prediction mode is the intra prediction, the process advances to step S426. In step S426, the intra prediction unit 221 generates the predicted image in the optimum intra prediction mode as the intra prediction mode employed in the encoding. Upon the end of the process of step S426, the process advances to step S427.

In step S427, the selection unit 223 selects the predicted image and supplies the image to the calculation unit 215. Upon the end of the process of step S427, the prediction ends and the process returns to FIG. 27.

By executing the processes as above, the scalable decoding device 200 can suppress the deterioration in encoding efficiency and the deterioration in image quality due to encoding and decoding.

<3. Third Embodiment>
<Specification of Sublayer for Each Main Layer>

Although the description has been made to specify the maximum value of the number of sublayers in each main layer by the parameter (vps_max_sub_layers_minus1) in the video parameter set (VPS), for example, as the common information, the present disclosure is not limited thereto and the number of sublayers in each main layer may be specified individually.

FIG. 29 illustrates an example of the syntax of the video parameter set in this case. As illustrated in FIG. 29, in this case, the parameter (vps_num_sub_layers_minus1[i]) is set instead of the parameter (vps_max_sub_layers_minus1) in the video parameter set (VPS).

This parameter (vps_num_sub_layers_minus1[i]) is the parameter set for each main layer, and specifies the number of layers of the sublayers (number of sublayers) in the corresponding main layer. In other words, this parameter specifies the number of sublayers of each main layer individually.

Figure 30:
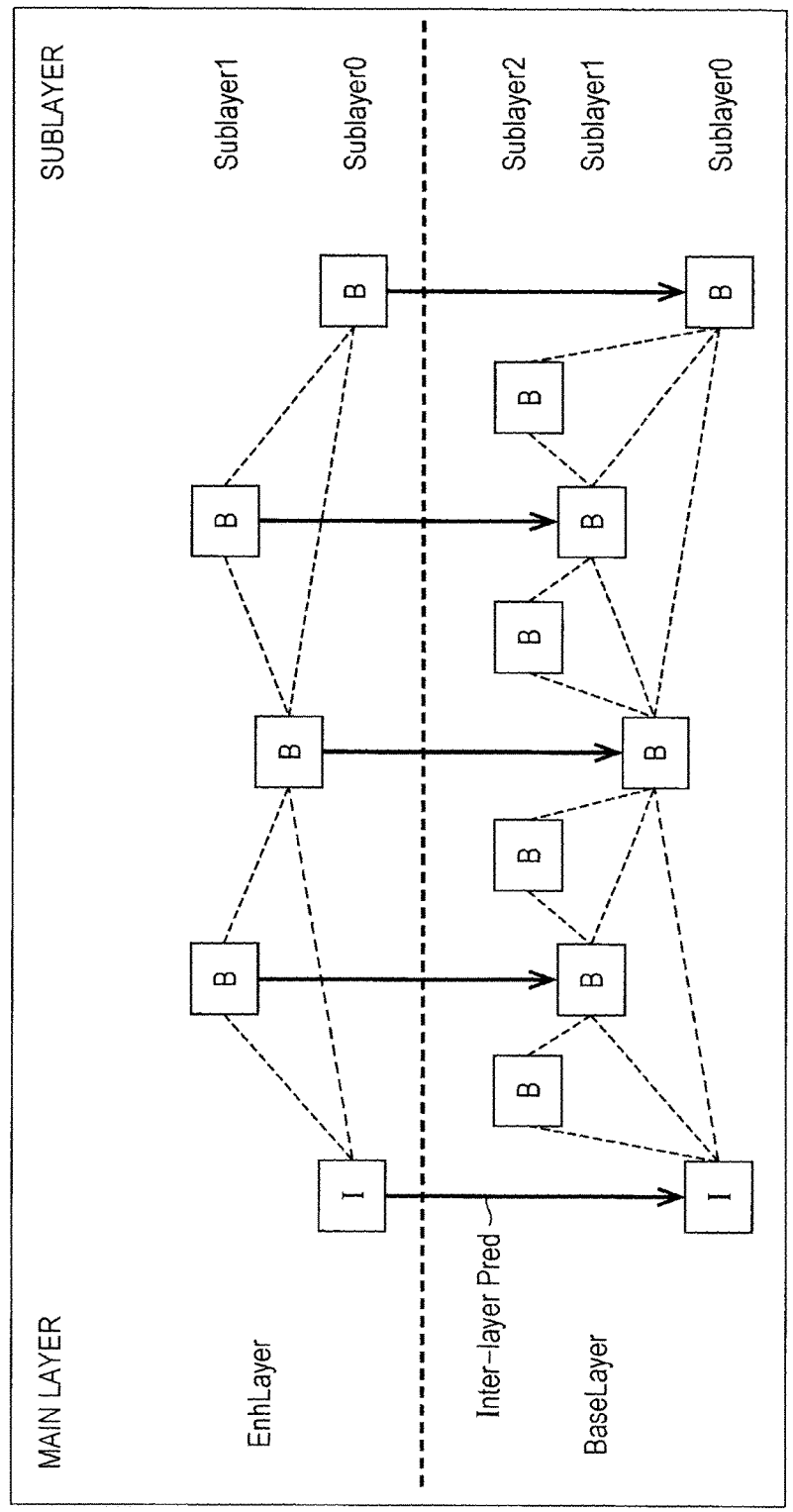
FIG. 30 is a diagram for describing a structure example of a sublayer.
Figure 31:
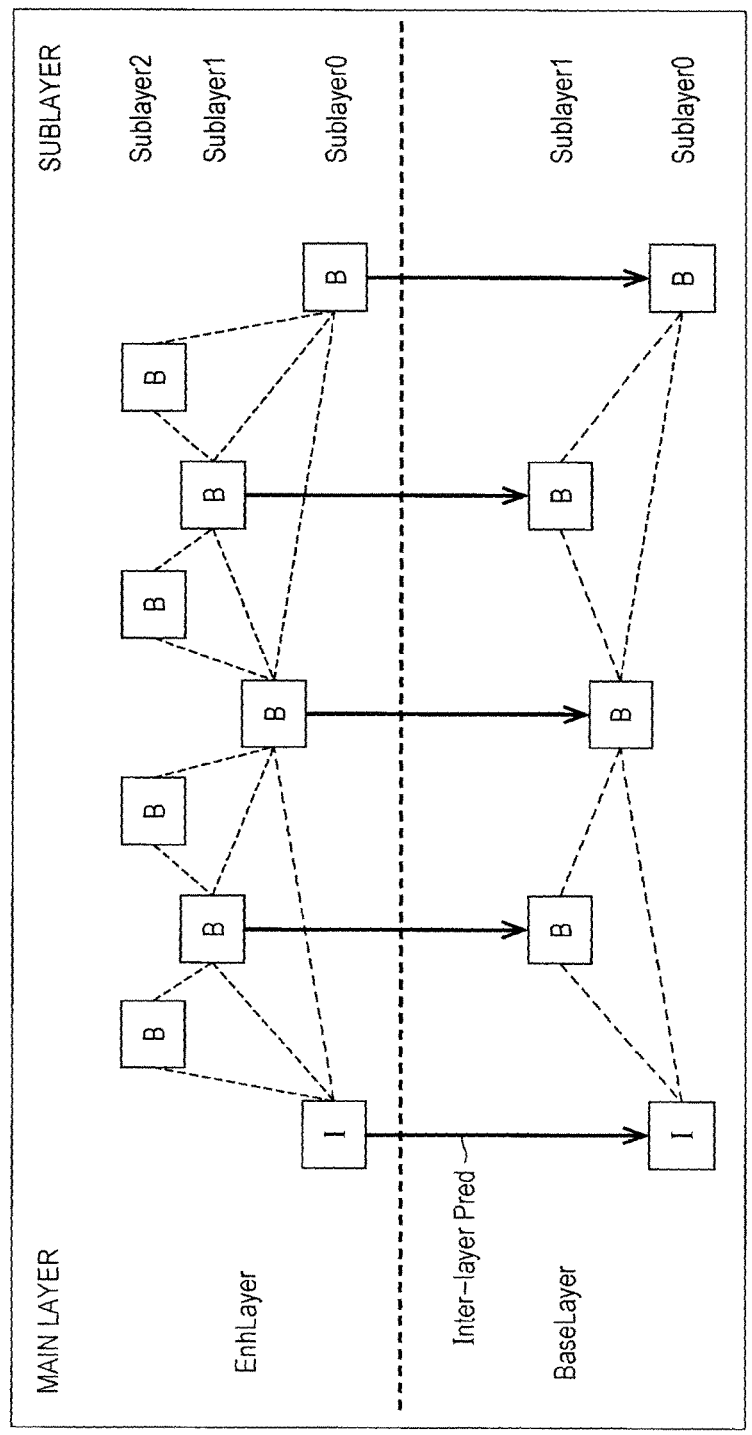
FIG. 31 is a diagram for describing another structure example of a sublayer.

There are various methods for the layering; for example, the number of sublayers can be made different for each main layer (for example, GOP structure). In the case of the example illustrated in FIG. 30, in the main layer, the higher layer (enhancement layer) contains fewer sublayers than the lower layer (base layer). In the case of the example illustrated in FIG. 31, in the main layer, the higher layer (enhancement layer) contains more sublayers than the lower layer (base layer).

By specifying the number of sublayers individually in each main layer with the parameter (vps_num_sub_layers_minus1[i]), the scalable encoding device 100 and the scalable decoding device 200 can perform more specific (more accurate) control over the inter-layer prediction by using this value.

For example, the value of the parameter (max_sub_layer_for_inter_layer_prediction) is less than or equal to the parameter (vps_max_sub_layers_minus1) in the above description; however, even though the value greater than the number of sublayers of both the base layer and the enhancement layer is set to the parameter (max_sub_layer_for_inter_layer_prediction), the actual number of sublayers is the highest layer. In other words, for correctly controlling the inter-layer prediction, it is necessary to additionally know the number of sublayers of the base layer and the enhancement layer.

Thus, the value of the parameter (max_sub_layer_for_inter_layer_prediction) is set to less than or equal to the number of sublayers, which is the smaller number between the number of sublayers of the base layer and the number of sublayers of the enhancement layer, by using the value of the parameter (vps_num_sub_layers_minus1[i]). Therefore, the inter-layer prediction can be controlled more easily and accurately.

<Common Information Generation Unit and Inter-layer Prediction Control Unit>

Figure 32:
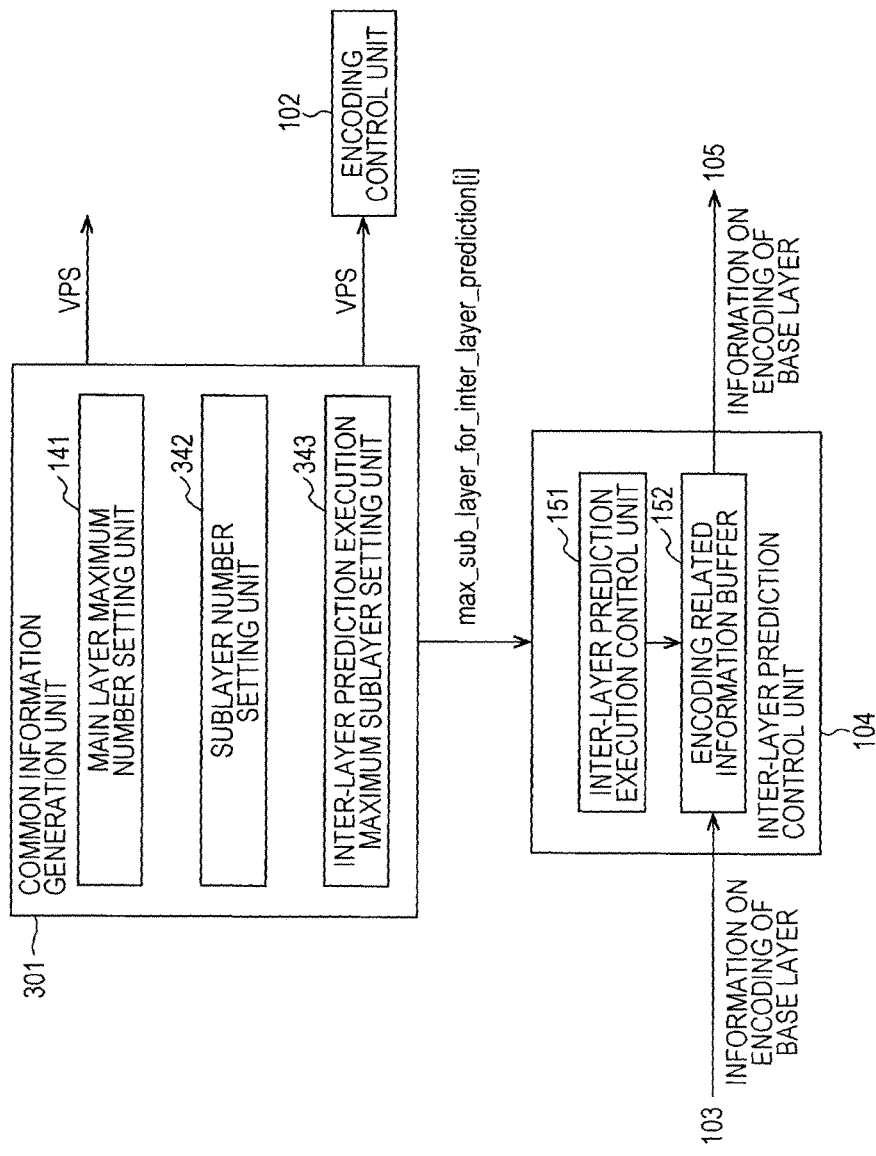
FIG. 32 is a block diagram illustrating an example of a main structure of a common information generation unit and an inter-layer prediction control unit.

FIG. 32 is a block diagram illustrating an example of a main structure of the common information generation unit and the inter-layer prediction control unit of the scalable encoding device 100 in this case. In this case, the scalable encoding device 100 includes a common information generation unit 301 instead of the common information generation unit 101.

As illustrated in FIG. 32, the common information generation unit 301 is a process unit basically similar to the common information generation unit 101 and has the similar structure except that the common information generation unit 301 has a sublayer number setting unit 342 and an inter-layer prediction execution maximum sublayer setting unit 343 instead of the sublayer maximum number setting unit 142 and the inter-layer prediction execution maximum sublayer setting unit 143.

The sublayer number setting unit 342 sets the parameter (vps_num_sub_layers_minus1[i]), which is the information that specifies the number of sublayers of the corresponding main layer. The sublayer number setting unit 342 sets the parameter (vps_num_sub_layers_minus1[i]) for each main layer (i).

The inter-layer prediction execution maximum sublayer setting unit 343 sets the parameter (max_sub_layer_for_inter_layer_prediction[i]), which is the information that specifies the highest sublayer among the sublayers for which the inter-layer prediction is allowed in the corresponding main layer based on the value of the parameter (vps_num_sub_layers_minus1[i]) set by the sublayer number setting unit 342.

Thus, the scalable encoding device 100 can control the inter-layer prediction more easily and accurately.

<Flow of Common Information Generation Process>

Figure 33:
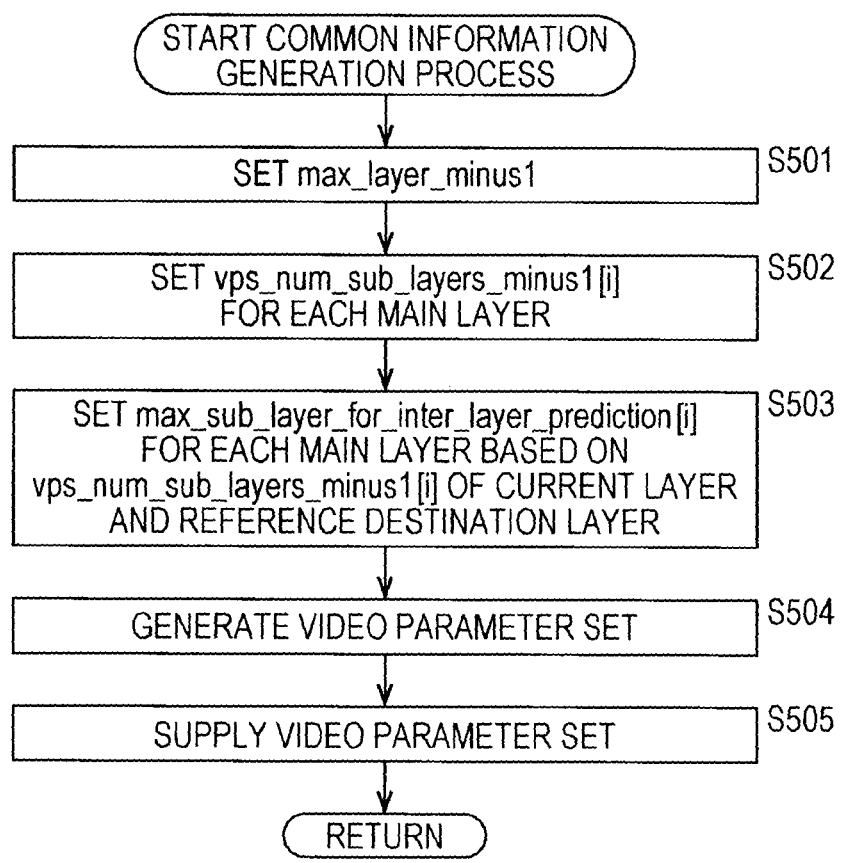
FIG. 33 is a flowchart for describing an example of the flow of the common information generation process.

An example of the flow of the common information generation process in this case is described with reference to the flowchart of FIG. 33. Upon the start of the common information generation process, the main layer maximum number setting unit 141 sets the parameter (max_layer_minus1) in step S501.

In step S502, the sublayer number setting unit 342 sets the parameter (vps_num_sub_layers_minus1[i]) for each main layer.

In step S503, the inter-layer prediction execution maximum sublayer setting unit 343 sets the parameter (max_sub_layer_for_inter_layer_prediction[i]) for each main layer based on the parameter (vps_num_sub_layers_minus1[i]) of the current layer and the reference destination layer.

In step S504, the common information generation unit 101 generates the video parameter set including the parameters set in step S501 to step S503 as the common information.

In step S505, the common information generation unit 101 supplies the video parameter set generated by the process in step S504 to the outside of the scalable encoding device 100 and to the encoding control unit 102. The common information generation unit 101 also supplies the parameter (max_sub_layer_for_inter_layer_prediction[i]) set in step S503 to the inter-layer prediction control unit 104.

Upon the end of the process of step S505, the common information generation process ends and the process returns to FIG. 13.

By the processes as above, the scalable encoding device 100 can perform the inter-layer prediction more easily and accurately.

<4. Fourth Embodiment>
<Common Information Acquisition Unit and Inter-layer Prediction Control Unit>

Figure 34:
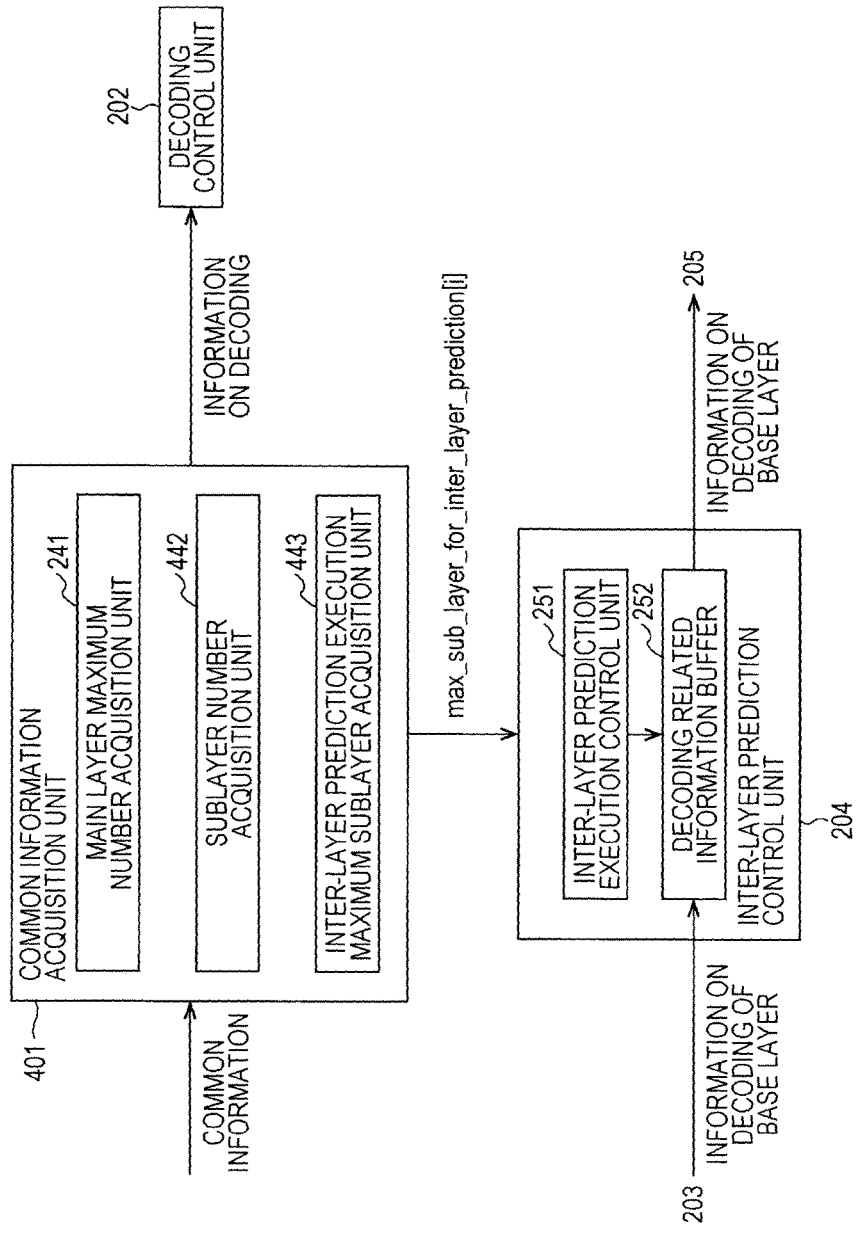
FIG. 34 is a block diagram illustrating an example of a main structure of a common information acquisition unit and an inter-layer prediction control unit.

Next, the scalable decoding device 200 is described. FIG. 34 is a block diagram illustrating an example of a main structure of the common information acquisition unit and the inter-layer prediction control unit of the scalable decoding device 200. In this case, the scalable decoding device 200 has a common information acquisition unit 401 instead of the common information acquisition unit 201.

As illustrated in FIG. 34, the common information acquisition unit 401 is a process unit basically similar to the common information acquisition unit 201 and has the similar structure except that the common information acquisition unit 401 has a sublayer number acquisition unit 442 and an inter-layer prediction execution maximum sublayer acquisition unit 443 instead of the sublayer maximum number acquisition unit 242 and the inter-layer prediction execution maximum sublayer acquisition unit 243.

The sublayer number acquisition unit 442 acquires the parameter (vps_num_sub_layers_minus1[i]) included in the common information transmitted from the encoding side. The inter-layer prediction execution maximum sublayer acquisition unit 443 acquires the parameter (max_sub_layer_for_inter_layer_prediction[i]) included in the common information transmitted from the encoding side. As described above, this parameter (max_sub_layer_for_inter_layer_prediction[i]) is set by using the value of the parameter (vps_num_sub_layers_minus1[i]) on the encoding side.

The common information acquisition unit 401 supplies the information related to the decoding included in the acquired common information (such as the video parameter set (VPS)) to the decoding control unit 202. Further, the common information acquisition unit 401 supplies the information that specifies the highest sublayer among the sublayers for which the inter-layer prediction of the current main layer is allowed (max_sub_layer_for_inter_layer_prediction[i]), to the inter-layer prediction control unit 204.

Thus, the scalable decoding device 200 can control the inter-layer prediction more easily and accurately.

<Flow of Common Information Acquisition Process>

Figure 35:
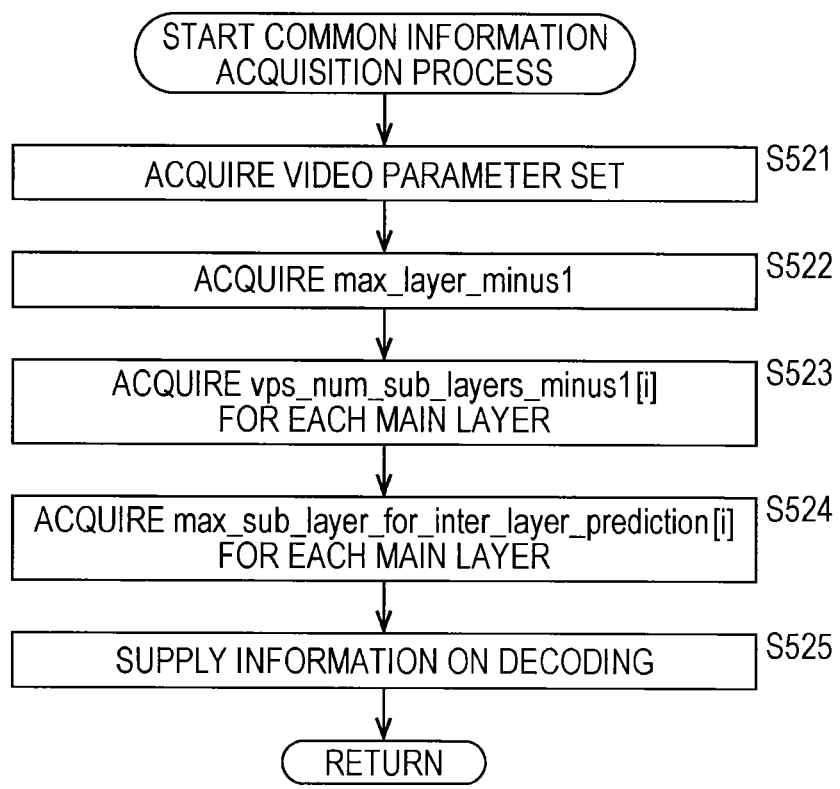
FIG. 35 is a flowchart for describing an example of the flow of the common information acquisition process.

Next, an example of the flow of the common information acquisition process to be executed in step S301 in FIG. 23 is described with reference to the flowchart of FIG. 35.

Upon the start of the common information acquisition process, the common information acquisition unit 401 acquires the video parameter set (VPS) transmitted from the encoding side in step S521.

In step S522, the main layer maximum number acquisition unit 241 acquires the parameter (max_layer_minus1) from the video parameter set.

In step S523, the sublayer number acquisition unit 442 acquires the parameter (vps_num_sub_layers_minus1[i]) for each main layer from the video parameter set (VPS).

In step S524, the inter-layer prediction execution maximum sublayer acquisition unit 443 acquires the parameter (max_sub_layer_for_inter_layer_prediction[i]) for each main layer from the video parameter set (VPS).

In step S525, the common information acquisition unit 401 extracts the information necessary for the control of the decoding from the video parameter set, and supplies the information as the information related to the decoding to the decoding control unit 202. The common information acquisition unit 401 supplies the parameter (max_sub_layer_for_inter_layer_prediction[i]) set in step S523 to the inter-layer prediction control unit 204.

Upon the end of the process in step S525, the common information acquisition process ends and the process returns to FIG. 23.

By performing the processes as above, the scalable decoding device 200 can control the inter-layer prediction more easily and accurately.

<5. Fifth Embodiment>
<Inter-layer Prediction Control Information Common to Main Layers>

In the above description, the parameter (max_sub_layer_for_inter_layer_prediction[i]) is set for each main layer; however, the present disclosure is not limited thereto and this value may be used commonly among all the main layers.

Further, the control information (flag) controlling whether the inter-layer prediction control information is set for each main layer or set as the value common to all the main layers may be set.

FIG. 36 illustrates an example of the syntax of the video parameter set in this case. As illustrated in FIG. 36, in this case, the flag (unified_max_sub_layer_for_inter_layer_prediction_flag) controlling which parameter is set as the inter-layer prediction control information in the video parameter set (VPS) is set.

If this flag (unified_max_sub_layer_inter_layer_prediction_flag) is true, the parameter (unified_max_sub_layer_for_inter_layer_prediction) common to all the main layers is set. On the contrary, if the flag (unified_max_sub_layer_inter_layer_prediction_flag) is false, the parameter (max_sub_layer_for_inter_layer_prediction[i]) is set for each main layer.

By setting the parameter (unified_max_sub_layer_for_inter_layer_prediction) instead of the parameter (max_sub_layer_for_inter_layer_prediction[i]), the amount of information of the inter-layer prediction control information can be reduced further, thereby suppressing the deterioration in encoding efficiency by the inter-layer prediction control and the deterioration in image quality due to encoding and decoding.

If the parameter is the value common to all the layers, however, the amount of information is reduced but the accuracy is deteriorated. This may result in the less accurate control of the inter-layer prediction. In view of this, by using the flag to control whether the information that specifies the highest sublayer of the sublayers for which the inter-layer prediction is allowed is set for each layer or set as the value common to all the layers, it is possible to deal with various circumstances and achieve the more adaptive inter-layer prediction control.

<Common Information Generation Unit and Inter-layer Prediction Control Unit>

Figure 37:
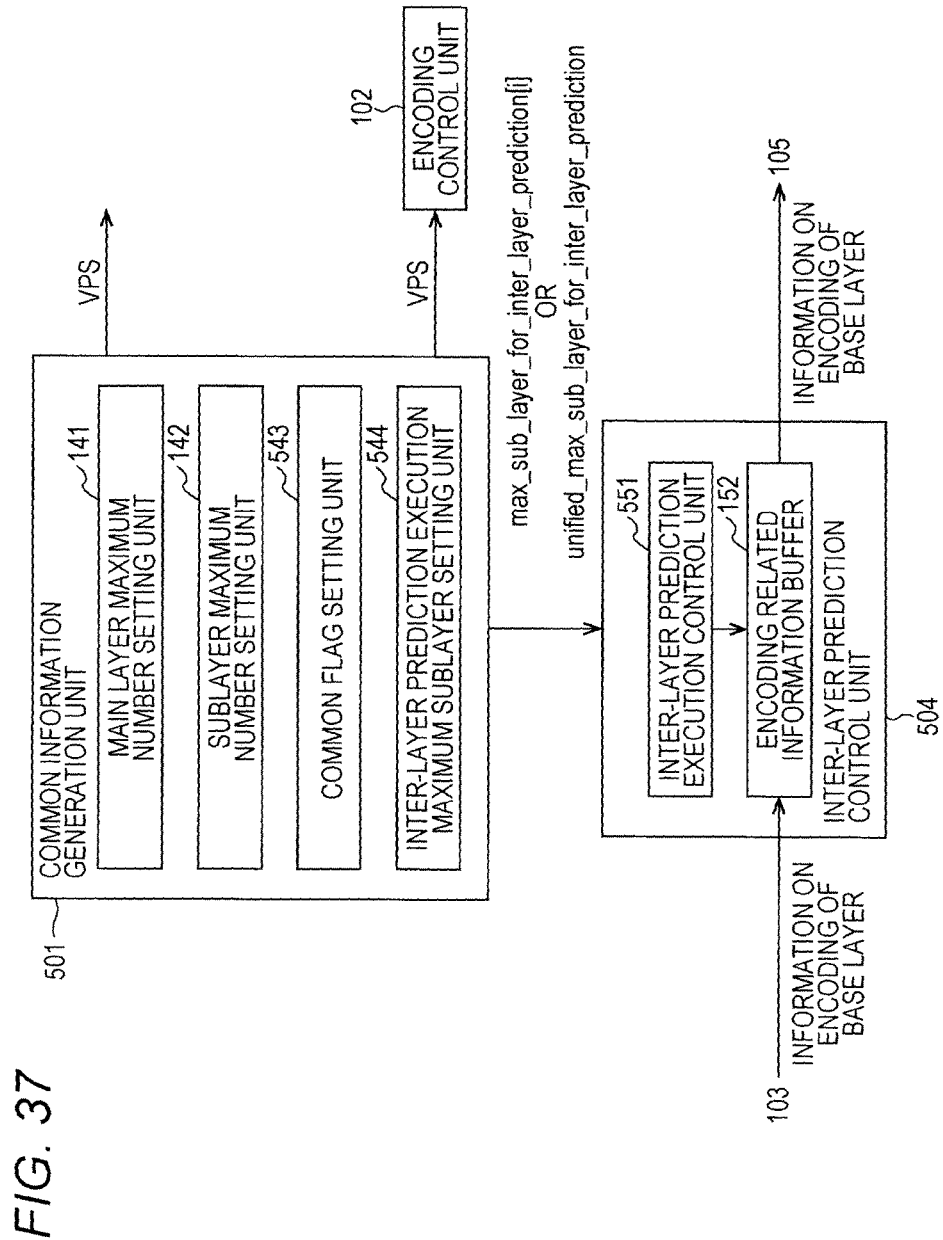
FIG. 37 is a block diagram illustrating an example of a main structure of a common information generation unit and an inter-layer prediction control unit.

FIG. 37 is a block diagram illustrating an example of a main structure of the inter-layer prediction control unit and the common information generation unit of the scalable encoding device 100. In this case, the scalable encoding device 100 includes a common information generation unit 501 instead of the common information generation unit 101. The scalable encoding device 100 includes an inter-layer prediction control unit 504 instead of the inter-layer prediction control unit 104.

As illustrated in FIG. 37, the common information generation unit 501 is a process unit basically similar to the common information generation unit 101 except that the common information generation unit 501 has a common flag setting unit 543 and an inter-layer prediction execution maximum sublayer setting unit 544 instead of the inter-layer prediction execution maximum sublayer setting unit 143.

The common flag setting unit 543 sets the flag (unified_max_sub_layer_inter_layer_prediction_flag) that controls which parameter to set as the inter-layer prediction control information.

The inter-layer prediction execution maximum sublayer setting unit 544 sets the information that specifies the highest sublayer among the sublayers for which the inter-layer prediction is allowed based on the value of the flag (unified_max_sub_layer_inter_layer_prediction_flag) set by the common flag setting unit 543 and the value of the parameter (vps_max_sub_layers_minus1) set by the sublayer maximum number setting unit 142. For example, if the flag (unified_max_sub_layer_inter_layer_prediction_flag) is true, the inter-layer prediction execution maximum sublayer setting unit 544 sets the parameter (unified_max_sub_layer_for_inter_layer_prediction) common to all the main layers. If the flag (unified_max_sub_layer_inter_layer_prediction_flag) is false, the inter-layer prediction execution maximum sublayer setting unit 544 sets the parameter (max_sub_layer_for_inter_layer_prediction[i]) for each main layer.

Thus, the scalable encoding device 100 can control the inter-layer prediction more adaptively.

<Flow of Common Information Generation Process>

Figure 38:
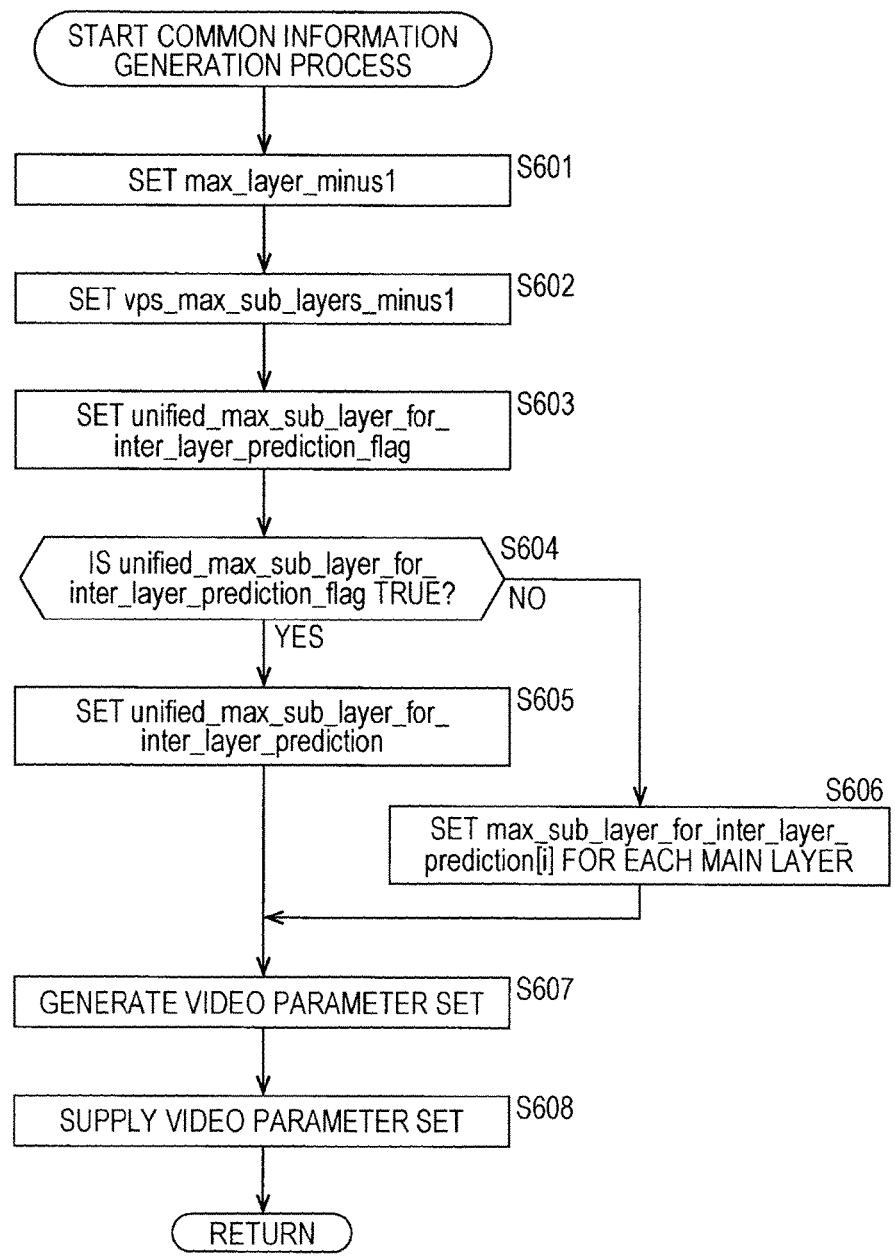
FIG. 38 is a flowchart for describing an example of the flow of the common information generation process.

An example of the flow of the common information generation process in this case is described with reference to the flowchart of FIG. 38. Upon the start of the common information generation process, the main layer maximum number setting unit 141 sets the parameter (max_layer_minus1) in step S601. In step S602, the sublayer maximum number setting unit 142 sets the parameter (vps_max_sub_layers_minus1).

In step S603, the common flag setting unit 543 sets the flag (unified_max_sub_layer_inter_layer_prediction_flag) controlling which parameter to set.

In step S604, the inter-layer prediction execution maximum sublayer setting unit 544 determines whether the value of the flag (unified_max_sub_layer_inter_layer_prediction_flag) is true or not. If it has been determined that the flag is true, the process advances to step S605.

In step S605, the inter-layer prediction execution maximum sublayer setting unit 544 sets the parameter (unified_max_sub_layer_for_inter_layer_prediction) common to all the main layers. Upon the end of the process of step S605, the process advances to step S607.

If it has been determined that the flag is false in step S604, the process advances to step S606. In step S606, the inter-layer prediction execution maximum sublayer setting unit 544 sets the parameter (max_sub_layer_for_inter_layer_prediction[i]) for each main layer. Upon the end of the process of step S606, the process advances to step S607.

In step S607, the common information generation unit 501 generates the video parameter set including each parameter set in step S601 to step S606 as the common information.

In step S608, the common information generation unit 501 supplies the video parameter set generated by the process in step S607 to the outside of the scalable encoding device 100 and to the encoding control unit 102. The common information generation unit 501 supplies the parameter (max_sub_layer_for_inter_layer_prediction[i]) set in step S503 to the inter-layer prediction control unit 504.

Upon the end of the process of step S608, the common information generation process ends and the process returns to FIG. 13.

<Flow of Inter-layer Prediction Control Process>

Figure 39:
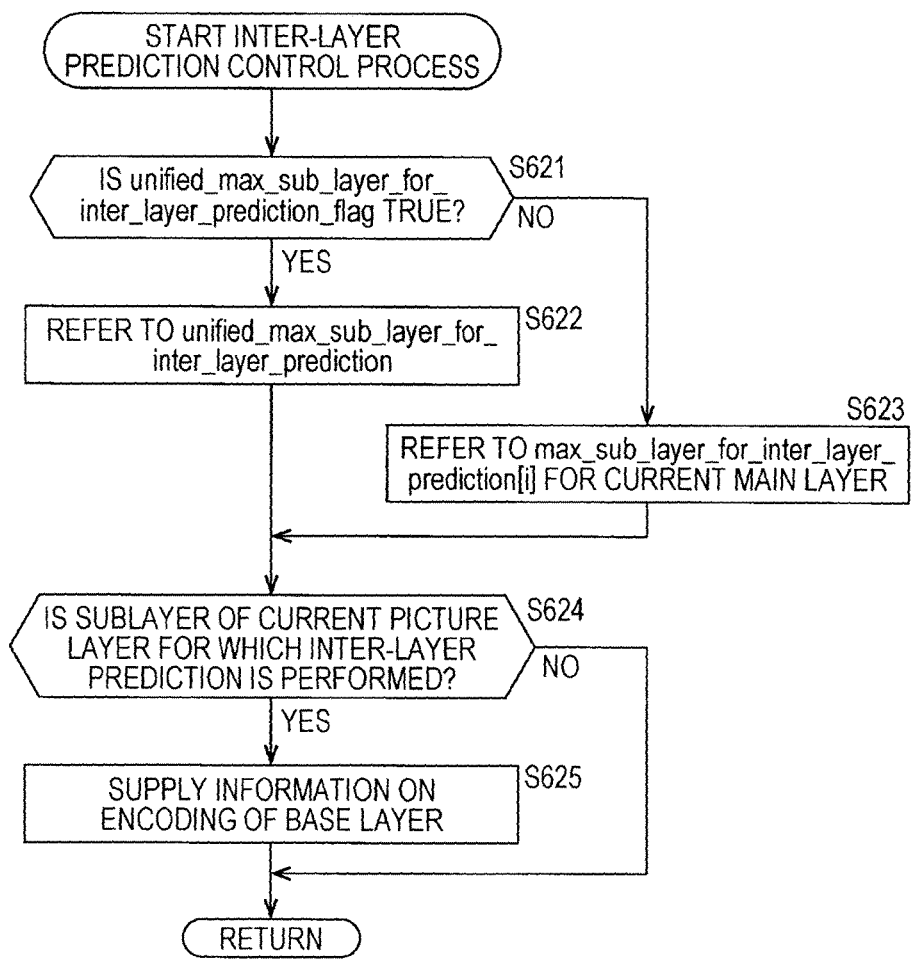
FIG. 39 is a flowchart for describing an example of the flow of the inter-layer prediction control process.

Next, an example of the flow of the inter-layer prediction control process in this case is described with reference to the flowchart of FIG. 39.

Upon the start of the inter-layer prediction control process, the inter-layer prediction execution control unit 551 determines whether the value of the flag (unified_max_sub_layer_inter_layer_prediction_flag) is true or false in step S621. If it has been determined that the value is true, the process advances to step S622.

In step S622, the inter-layer prediction execution control unit 551 refers to the parameter (unified_max_sub_layer_for_inter_layer_prediction) common to all the main layers. Upon the end of the process of step S622, the process advances to step S624.

If it has been determined that the value is false in step S621, the process advances to step S623.

In step S623, the inter-layer prediction execution control unit 551 refers to the parameter (max_sub_layer_for_inter_layer_prediction[i]) for each main layer. Upon the end of the process of step S623, the process advances to step S624.

In step S624, based on those pieces of information, the inter-layer prediction execution control unit 551 determines whether the current sublayer is the layer for which the inter-layer prediction is performed. If it has been determined that the current sublayer is the layer for which the inter-layer prediction is performed, the process advances to step S625.

In step S625, the inter-layer prediction execution control unit 551 controls the encoding related information buffer 152 to supply the information related to the encoding of the base layer stored in the encoding related information buffer 152 to the enhancement layer image encoding unit 105. Upon the end of the process of step S624, the inter-layer prediction control process ends and the process returns to FIG. 13.

If it has been determined that the inter-layer prediction of the current sublayer is not allowed in step S624, the inter-layer prediction control process ends without supplying the information related to the encoding of the base layer and the process returns to FIG. 13. In other words, the inter-layer prediction is not performed in the encoding of this current sublayer.

By performing the processes as above, the scalable encoding device 100 can control the inter-layer prediction more easily and correctly.

<6. Sixth Embodiment >

<Common Information Acquisition Unit and Inter-layer Prediction Control Unit>

Figure 40:
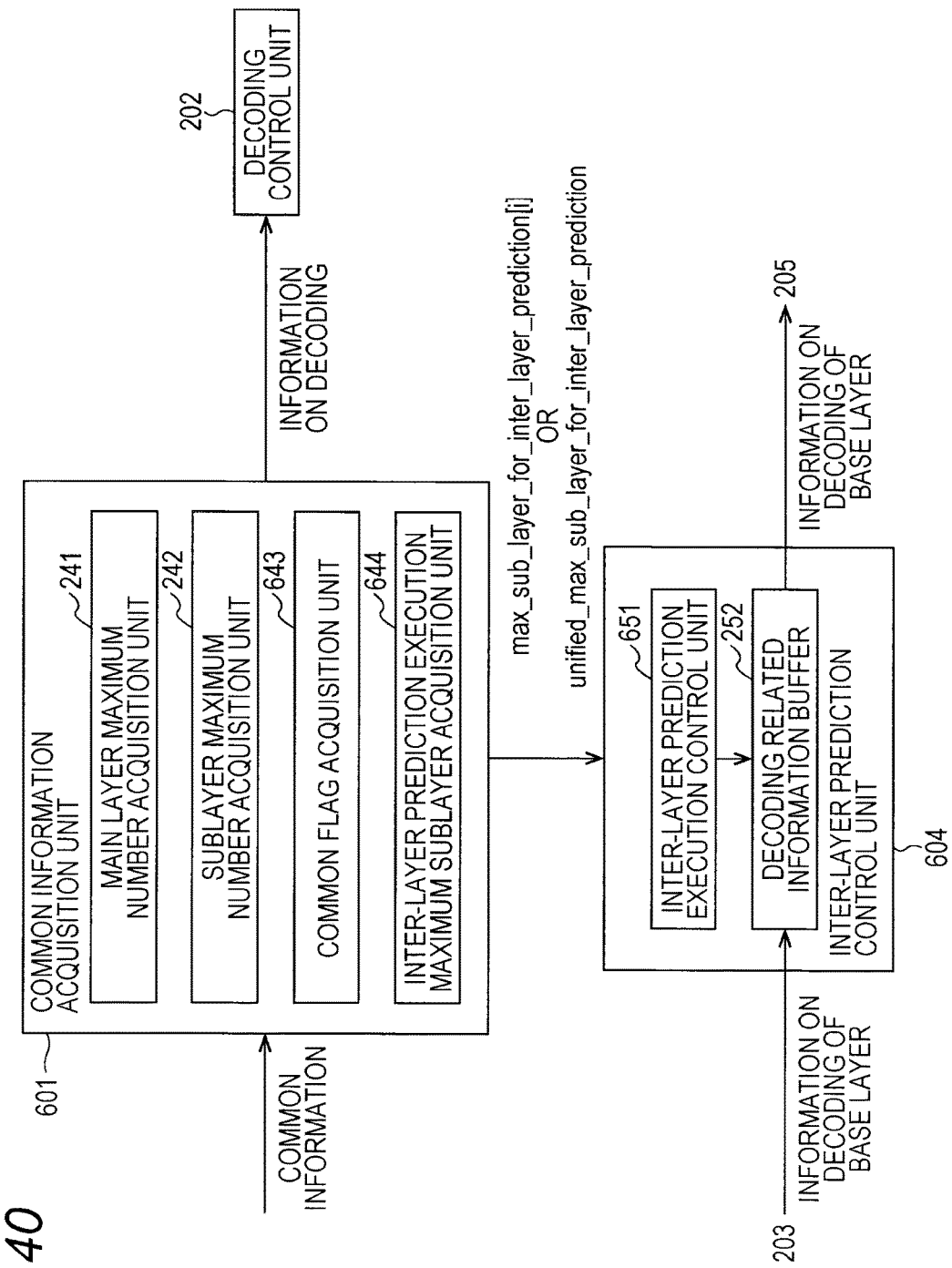
FIG. 40 is a block diagram illustrating an example of a main structure of a common information acquisition unit and an inter-layer prediction control unit.

Next, the scalable decoding device 200 is described. FIG. 40 is a block diagram illustrating an example of a main structure of the common information generation unit and the inter-layer prediction control unit in this case.

As illustrated in FIG. 40, in this case, the scalable decoding device 200 includes a common information acquisition unit 601 instead of the common information acquisition unit 201. Moreover, the scalable decoding device 200 includes an inter-layer prediction control unit 604 instead of the inter-layer prediction control unit 204.

The common information acquisition unit 601 is a process unit basically similar to the common information acquisition unit 201 except that the common information acquisition unit 601 has a common flag acquisition unit 643 and an inter-layer prediction execution maximum sublayer acquisition unit 644 instead of the inter-layer prediction execution maximum sublayer acquisition unit 243.

The common flag acquisition unit 643 acquires the flag (unified_max_sub_layer_inter_layer_prediction_flag) controlling which parameter to set as the inter-layer prediction control information.

The inter-layer prediction execution maximum sublayer acquisition unit 644 acquires the parameter (unified_max_sub_layer_for_inter_layer_prediction) common to all the main layers if the flag (unified_max_sub_layer_inter_layer_prediction_flag) is true. If the flag (unified_max_sub_layer_inter_layer_prediction_flag) is false, the inter-layer prediction execution maximum sublayer setting unit 343 acquires the parameter (max_sub_layer_for_inter_layer_prediction[i]) for each main layer.

The common information acquisition unit 601 supplies the information (such as video parameter set (VPS)) related to the decoding included in the acquired common information to the decoding control unit 202. Moreover, the common information acquisition unit 601 supplies the parameter (unified_max_sub_layer_for_inter_layer_prediction) or the parameter (max_sub_layer_for_inter_layer_prediction[i]) to the inter-layer prediction control unit 604.

Based on the parameter (unified_max_sub_layer_for_inter_layer_prediction) or the parameter (max_sub_layer_for_inter_layer_prediction[i]) supplied from the common information acquisition unit 601, the inter-layer prediction execution control unit 651 controls the readout of the decoding related information buffer 252 and controls the execution of the inter-layer prediction.

Thus, the scalable decoding device 200 can control the inter-layer prediction more adaptively.

<Flow of Common Information Acquisition Process>

Figure 41:
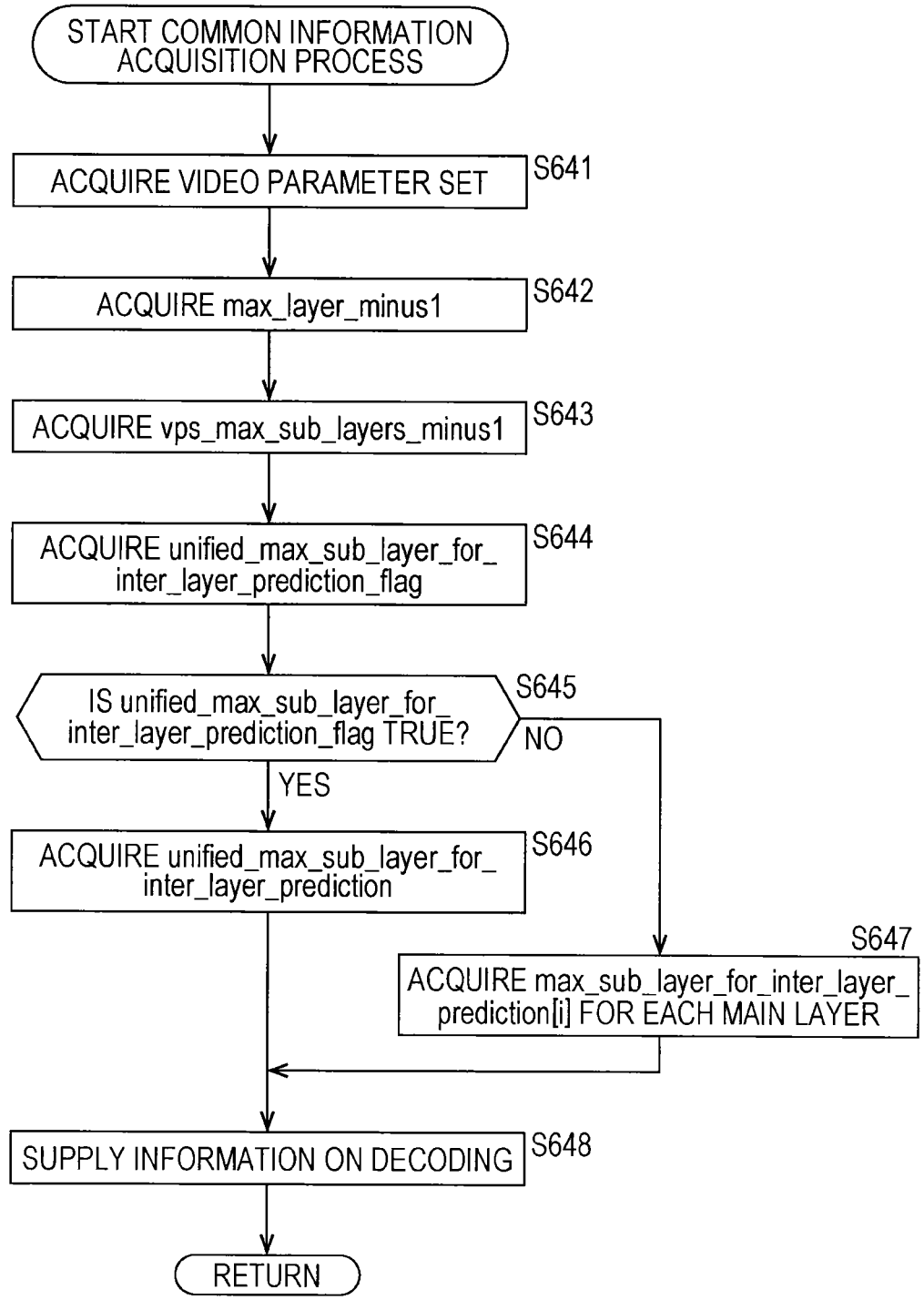
FIG. 41 is a flowchart for describing an example of the flow of the common information acquisition process.

Next, an example of the flow of the common information acquisition process to be executed in step S301 in FIG. 23 is described with reference to the flowchart of FIG. 41.

Upon the start of the common information acquisition process, the common information acquisition unit 601 acquires the video parameter set (VPS) transmitted from the encoding side in step S641.

In step S642, the main layer maximum number acquisition unit 241 acquires the parameter (max_layer_minus1) from the video parameter set.

In step S643, the sublayer maximum number acquisition unit 242 acquires the parameter (vps_max_sub_layers_minus1) from the video parameter set (VPS).

In step S644, the common flag acquisition unit 643 acquires the flag (unified_max_sub_layer_inter_layer_prediction_flag) from the video parameter set (VPS).

In step S645, the inter-layer prediction execution maximum sublayer acquisition unit 644 determines whether the flag (unified_max_sub_layer_inter_layer_prediction_flag) is true or not. If it has been determined that the flag is true, the process advances to step S646.

In step S646, the inter-layer prediction execution maximum sublayer acquisition unit 644 acquires the parameter (unified_max_sub_layer_for_inter_layer_prediction) common to all the layers from the video parameter set (VPS). Upon the end of the process of step S646, the process advances to step S648.

If it has been determined that the flag is false in step S645, the process advances to step S647. In step S647, the inter-layer prediction execution maximum sublayer acquisition unit 644 acquires the parameter (max_sub_layer_for_inter_layer_prediction[i]) for each main layer from the video parameter set (VPS). Upon the end of the process of step S647, the process advances to step S648.

In step S648, the common information acquisition unit 601 extracts the information necessary for controlling the decoding from the video parameter set and supplies the information to the decoding control unit 202 as the information related to the decoding. The common information acquisition unit 601 supplies the parameter (unified_max_sub_layer_for_inter_layer_prediction) set in step S646 or the parameter (max_sub_layer_for_inter_layer_prediction[i]) set in step S647 to the inter-layer prediction control unit 604.

Upon the end of the process of step S648, the common information acquisition process ends and the process returns to FIG. 23.

<Flow of Inter-layer Prediction Control Process>

Figure 42:
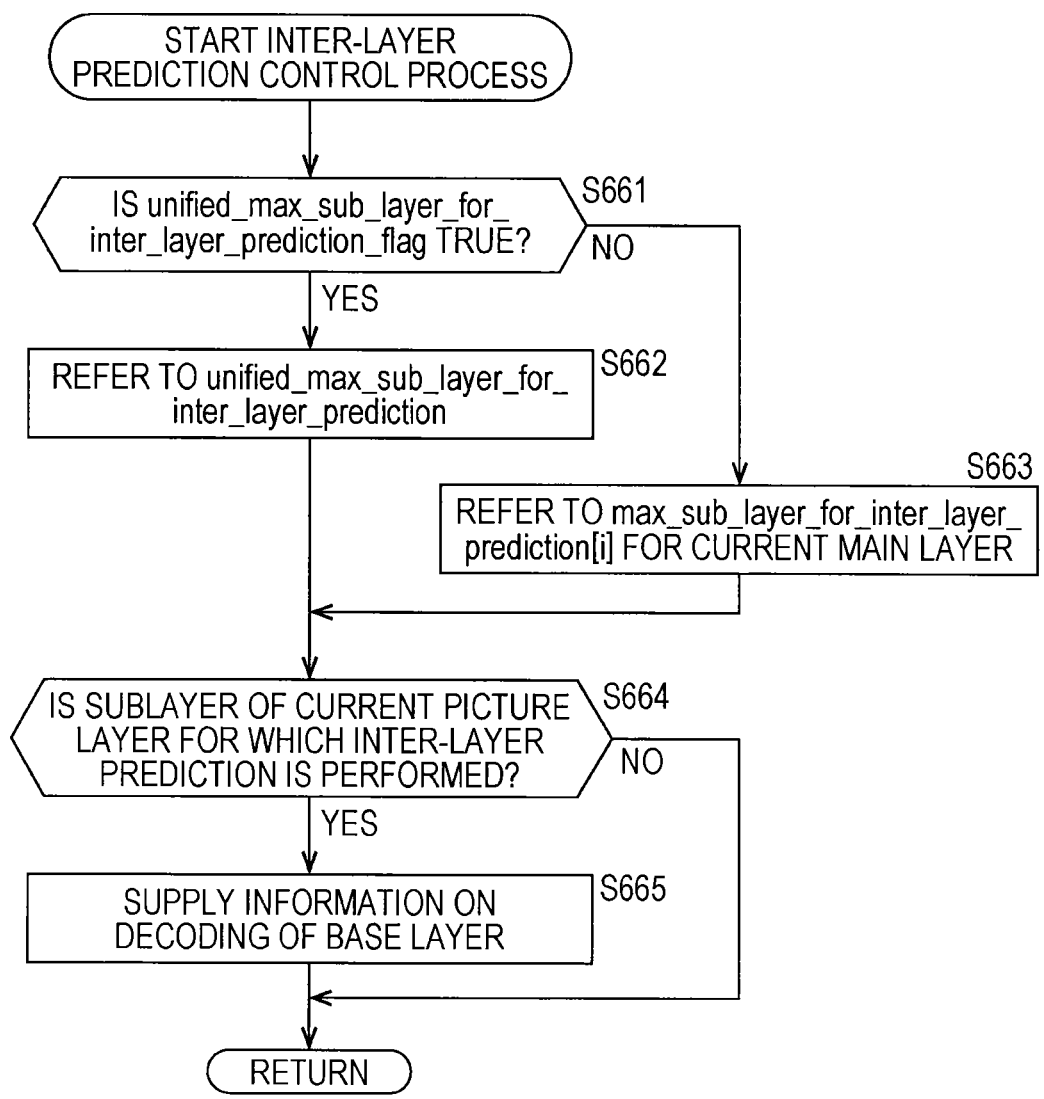
FIG. 42 is a flowchart for describing an example of the flow of the inter-layer prediction control process.

Next, an example of the flow of the inter-layer prediction control process in this case is described with reference to the flowchart of FIG. 42.

Upon the start of the inter-layer prediction control process, the inter-layer prediction execution control unit 651 determines whether the value of the flag (unified_max_sub_layer_inter_layer_prediction_flag) istrue or false in step S661. If it has been determined the value is true, the process advances to step S662.

In step S662, the inter-layer prediction execution control unit 651 refers to the parameter (unified_max_sub_layer_for_inter_layer_prediction). Upon the end of the process of step S662, the process advances to step S664.

If it has been determined the value is false in step S661, the process advances to step S663.

In step S663, the inter-layer prediction execution control unit 651 refers to the parameter (max_sub_layer_for_inter_layer_prediction[i]). Upon the end of the process of step S663, the process advances to step S664.

In step S664, based on the value of the parameter referred to in step S662 or step S663, the inter-layer prediction execution control unit 651 determines whether the current sublayer of the current picture is the layer for which the inter-layer prediction is performed. If it has been determined that the inter-layer prediction of the current sublayer is allowed, the process advances to step S665.

In step S665, the inter-layer prediction execution control unit 651 controls the decoding related information buffer 252 to supply the information related to the decoding of the base layer stored in the decoding related information buffer 252 to the enhancement layer image decoding unit 205. Upon the end of the process in step S665, the inter-layer prediction control process ends and the process returns to FIG. 23.

If it has been determined that the inter-layer prediction of the current sublayer is not allowed in step S664, the inter-layer prediction control process ends without supplying the information related to the encoding of the base layer and the process returns to FIG. 23. In other words, the inter-layer prediction is not performed in the encoding of this current sublayer.

By executing each process as above, the scalable decoding device 200 can control the inter-layer prediction more adaptively.

<7. Summary 2>

In regard to the inter-layer prediction, for example in HEVC, examination on the prediction using the pixel (Pixel) information between layers has been made in Liwei Guo (Chair), Yong He, Do-Kyoung Kwon, Jinwen Zan, Haricharan Lakshman, Jung Won Kang, "Description of Tool Experiment A2: Inter-layer Texture Prediction Signaling in SHVC", JCTVC-K1102, Joint Collaborative Team on Video Coding (JCT-VC) of ITU-T SG 16 WP 3 and ISO/IEC JTC 1/SC 29/WG 1111th Meeting: Shanghai, CN, 10-19 Oct. 2012.

Moreover, examination on the prediction using the syntax (Syntax) information (for example, intra prediction mode information or motion information) between layers has been made in Vadim Seregin, Patrice Onno, Shan Liu, Tammy Lee, Chulkeun Kim, Haitao Yang, Haricharan Laksman, "Description of Tool Experiment C5: Inter-layer syntax prediction using HEVC base layer", JCTVC-K1105, Joint Collaborative Team on Video Coding (JCT-VC) of ITU-T SG 16 WP 3 and ISO/IEC JTC 1/SC 29/WG 1111th Meeting: Shanghai, CN, 10-19 Oct. 2012.

Figure 43:
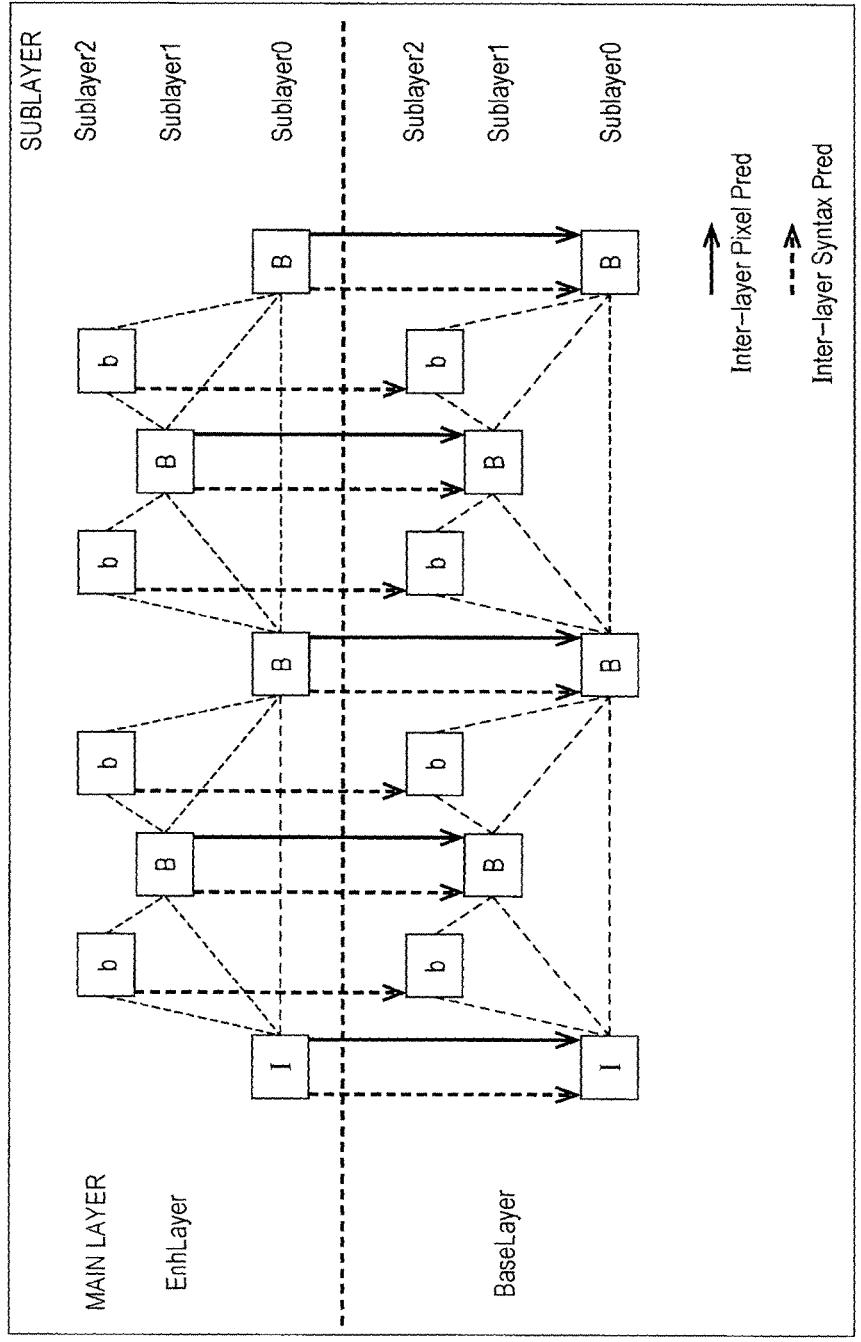
FIG. 43 is a diagram for describing an example of the control of the inter-layer pixel prediction and the inter-layer syntax prediction.

The characteristics of the pixel prediction as the prediction using the pixel information and the syntax prediction as the prediction using the syntax information are compared with reference to FIG. 43.

First, in regard to the pixel prediction, the intra layer prediction (Intra-layer Prediction) that uses as a reference image (reference picture), the picture in the same layer as the image (current picture) is compared to the inter-layer prediction (Inter-layer Prediction) that uses the picture in a different picture from the current picture as the reference picture.

In the case of the pixel prediction, as the distance on the time axis between the reference picture and the current picture in the intra layer prediction (the distance is also referred to as prediction distance) is farther, the prediction efficiency becomes lower, in which case the inter-layer prediction gets more accurate relatively. In contrast to this, as the prediction distance in the intra layer prediction is closer, the prediction efficiency becomes higher, in which case the inter-layer prediction gets less accurate relatively.

In other words, as illustrated in FIG. 43, in the picture in which the distance on the time axis between the reference image and the image is long, i.e., the picture whose sublayer (temporal layer depth) is lower, the prediction accuracy of the intra layer inter prediction is likely to be reduced. Therefore, in the intra layer prediction (intra-layer), it is highly likely that the encoding is performed by the intra prediction even in the inter picture. However, since the prediction accuracy of the inter-layer pixel prediction (Inter-layer Pixel Prediction) is high, the encoding efficiency can be improved to be higher than in the case of the intra-layer intra prediction.

On the other hand, in the picture in which the distance on the time axis between the reference image and the image is short, i.e., the picture whose sublayer (temporal layer depth) is higher, the inter prediction by the intra-layer prediction (intra-layer) is efficient. Thus, even though the inter-layer pixel prediction (Inter-layer Pixel Prediction) is applied, the drastic improvement of the encoding efficiency as compared to the intra layer inter prediction cannot be expected.

Moreover, in the pixel prediction, the image information needs to be stored in the memory for sharing the information between the layers, which increases the memory access.

On the other hand, the correlation of the syntax between the layers is high and the prediction efficiency of the inter-layer prediction is relatively high regardless of the sublayer of the current picture. In other words, as illustrated in FIG. 43, the syntax (Syntax) information such as the motion information and the intra prediction mode information has the high correlation between the layers (base layer and enhancement layer) in any sublayer. Therefore, the improvement of the encoding efficiency due to the inter-layer syntax prediction (Inter-layer Syntax Prediction) can be expected without depending on the sublayer of the current picture.

Moreover, in the case of the syntax prediction, the syntax information may be shared between the layers; thus, the memory access does not increase as compared to the pixel prediction. In other words, the information to be stored for the inter-layer syntax prediction (Inter-layer Syntax Prediction) is one piece of prediction mode information or motion information for each PU (Prediction Unit) and the increase in memory access is low as compared to the inter-layer pixel prediction (Inter-layer Pixel Prediction) in which all the pixels should be saved.

In this manner, when the pixel prediction and the syntax prediction with the different characteristics are controlled similarly, the sufficient improvement of the encoding efficiency may not be achieved.

In view of this, the pixel prediction and the syntax prediction may be controlled independently in the control of the inter-layer prediction as described in the first to six embodiments. In other words, the on/off control of the inter-layer pixel prediction and the inter-layer syntax prediction may be performed independently.

For example, the information that controls the on/off (on/off) of the inter-layer pixel prediction (Inter-layer Pixel Prediction) and the information that controls the on/off (on/off) of the inter-layer syntax prediction (Inter-layer Syntax Prediction) may be encoded independently.

In the inter-layer pixel prediction (Inter-layer Pixel Prediction), the information controlling up to which sublayer (also referred to as temporal layer) the prediction process is performed may be transmitted in, for example, the video parameter set (VPS (Video Parameter Set)) or the extension video parameter set (vps_extension) in the image compression information to be output. The control information on the inter-layer pixel prediction may be transmitted in the nal unit (nal_unit).

In the inter-layer pixel syntax prediction (Inter-layer Syntax Prediction), the control information controlling the execution (on/off (on/off)) of the inter-layer syntax prediction for each picture (Picture) or slice (Slice) may be transmitted in, for example, the picture parameter set (PPS (Picture Parameter Set)) or the slice header (SliceHeader) in the image compression information to be output. The control information on the inter-layer syntax prediction may be transmitted in the nal unit (nal_unit).

Note that the control of the inter-layer prediction as above can be applied even when the base layer (Baselayer) is encoded in AVC.

Through the aforementioned process, the trade-off (trade-off) between the calculation amount and the encoding efficiency can be performed as appropriate.

<8. Seventh Embodiment>

<Common Information Generation Unit and Inter-layer Prediction Control Unit>

Figure 44:
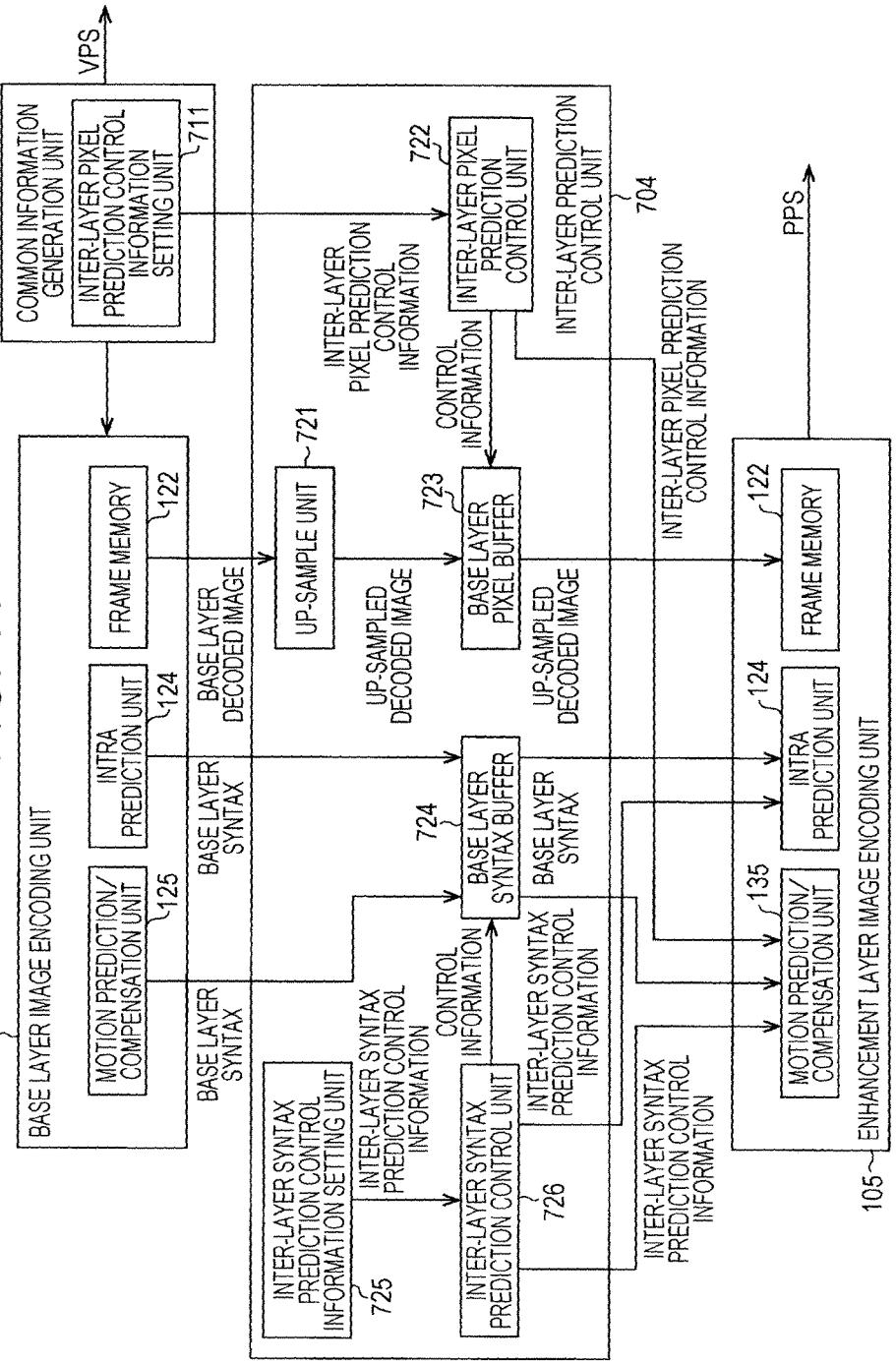
FIG. 44 is a block diagram illustrating an example of a main structure of a common information generation unit and an inter-layer prediction control unit.

FIG. 44 is a block diagram illustrating an example of a main structure of the common information generation unit and the inter-layer prediction control unit of the scalable encoding device 100 in the case described in <7. Summary 2>. As illustrated in FIG. 44, in this case, the scalable encoding device 100 includes a common information generation unit 701 instead of the common information generation unit 101 and an inter-layer prediction control unit 704 instead of the inter-layer prediction control unit 104.

As illustrated in FIG. 44, the common information generation unit 701 includes an inter-layer pixel prediction control information setting unit 711.

The inter-layer pixel prediction control information setting unit 711 sets the inter-layer pixel prediction control information as the control information that controls the execution (on/off) of the inter-layer pixel prediction in the enhancement layer. The inter-layer pixel prediction control information is, for example, the information that specifies the highest sublayer for which the inter-layer pixel prediction is allowed. In this case, in the enhancement layer, the inter-layer pixel prediction is performed on the sublayers from the lowest sublayer to the layer specified by the inter-layer pixel prediction control information, and the inter-layer pixel prediction is prohibited for the sublayers higher than the layer specified by the inter-layer pixel prediction control information.

Note that the inter-layer pixel prediction control information setting unit 711 may set the inter-layer pixel prediction control information for each enhancement layer or may set the inter-layer pixel prediction control information as the control information common to all the enhancement layers.

Further, the inter-layer pixel prediction control information setting unit 711 can set the inter-layer pixel prediction control information based on any piece of information. For example, this setting may be conducted based on user instruction or on the condition of hardware or software.

The inter-layer pixel prediction control information setting unit 711 supplies the set inter-layer pixel prediction control information to the inter-layer prediction control unit 704 (inter-layer pixel prediction control unit 722). The inter-layer pixel prediction control information setting unit 711 transmits the inter-layer pixel prediction control information as the common information in, for example, the video parameter set (VPS (Video Parameter Set)) or the extension video parameter set (vps_extension). Moreover, the inter-layer pixel prediction control information setting unit 711 may transmit the inter-layer pixel prediction control information in the nal unit (nal_unit).

As illustrated in FIG. 44, the inter-layer prediction control unit 704 includes an up-sample unit 721, an inter-layer pixel prediction control unit 722, a base layer pixel buffer 723, a base layer syntax buffer 724, an inter-layer syntax prediction control information setting unit 725, and an inter-layer syntax prediction control unit 726.

Upon the acquisition of the decoded image of the base layer (also called base layer decoded image) from the frame memory 122 of the base layer image encoding unit 103, the up-sample unit 721 performs the up-sample process (resolution conversion) on the base layer decoded image in accordance with the ratio of, for example, the resolution between the base layer and the enhancement layer. The up-sample unit 721 supplies the base layer decoded image that has been subjected to the up-sample process (also referred to as up-sampled decoded image) to the base layer pixel buffer 723.

Upon the acquisition of the inter-layer pixel prediction control information from the inter-layer pixel prediction control information setting unit 711, the inter-layer pixel prediction control unit 722 controls the execution of the inter-layer pixel prediction in the encoding of the enhancement layer based on the acquired information. In other words, the inter-layer pixel prediction control unit 722 controls the supply of the up-sampled decoded image of the base layer stored in the base layer pixel buffer 723 to the enhancement layer image encoding unit 105 in accordance with the inter-layer pixel prediction control information.

More specifically, if the sublayer to which the current picture to be encoded by the enhancement layer image encoding unit 105 belongs is the layer for which the inter-layer pixel prediction is allowed by the inter-layer pixel prediction control information, the inter-layer pixel prediction control unit 722 allows the supply of the up-sampled decoded image stored in the base layer pixel buffer 723. If the sublayer to which the current picture belongs is the layer for which the inter-layer pixel prediction is prohibited by the inter-layer pixel prediction control information, the inter-layer pixel prediction control unit 722 prohibits the supply of the up-sampled decoded image stored in the base layer pixel buffer 723.

By supplying the inter-layer pixel prediction control information to the motion prediction/compensation unit 135 of the enhancement layer image encoding unit 105, the inter-layer pixel prediction control unit 722 controls the execution of the inter-layer pixel prediction by the motion prediction/compensation unit 135 of the enhancement layer image encoding unit 105.

The base layer pixel buffer 723 stores the up-sampled decoded image supplied from the up-sample unit 721, and supplies the up-sampled decoded image to the frame memory 122 of the enhancement layer image encoding unit 105 as the reference image (reference) of the inter-layer pixel prediction in accordance with the control of the inter-layer pixel prediction control unit 722. In the inter-layer pixel prediction, the motion prediction/compensation unit 135 of the enhancement layer image encoding unit 105 uses the up-sampled decoded image of the base layer stored in the frame memory 122 as the reference image.

The base layer syntax buffer 724 acquires the syntax information (also referred to as base layer syntax) such as the prediction mode information from the intra prediction unit 124 of the base layer image encoding unit 103, and stores the information therein. The base layer syntax buffer 724 acquires the syntax information (also referred to as the base layer syntax) such as the motion information from the motion prediction/compensation unit 125 of the base layer image encoding unit 103 and stores the information therein.

Based on the control of the inter-layer syntax prediction control unit 726, the base layer syntax buffer 724 supplies the base layer syntax to the motion prediction/compensation unit 135 or the intra prediction unit 124 of the enhancement layer image encoding unit 105 as appropriate.

More specifically, for example, if the inter-layer syntax prediction for the current picture to be processed by the intra prediction of the intra prediction unit 124 of the enhancement layer image encoding unit 105 is allowed by the inter-layer syntax prediction control unit 726, the base layer syntax buffer 724 supplies the base layer syntax such as the stored prediction mode information to the intra prediction unit 124 of the enhancement layer image encoding unit 105. With the base layer syntax (such as prediction mode information) supplied in this manner, the intra prediction unit 124 of the enhancement layer image encoding unit 105 performs the inter-layer syntax prediction.

Moreover, if the inter-layer syntax prediction for the current picture to be processed by the inter prediction of the motion prediction/compensation unit 135 of the enhancement layer image encoding unit 105 is allowed by the inter-layer syntax prediction control unit 726, the base layer syntax buffer 724 supplies the base layer syntax such as the stored motion information to the motion prediction/compensation unit 135 of the enhancement layer image encoding unit 105. With the base layer syntax (such as motion information) supplied in this manner, the motion prediction/compensation unit 135 of the enhancement layer image encoding unit 105 performs the inter-layer syntax prediction.

The inter-layer syntax prediction control information setting unit 725 sets the inter-layer syntax prediction control information as the control information that controls the execution (on/off) of the inter-layer syntax prediction in the enhancement layer. The inter-layer syntax prediction control information refers to the information that specifies whether the execution of the inter-layer syntax prediction is allowed or not for each picture or slice.

Based on any piece of information, the inter-layer syntax prediction control information setting unit 725 can set the inter-layer syntax prediction control information. For example, this setting may be conducted based on user instruction or on the condition of hardware or software.

The inter-layer syntax prediction control information setting unit 725 supplies the set inter-layer syntax prediction control information to the inter-layer syntax prediction control unit 726.

The inter-layer syntax prediction control unit 726 acquires the inter-layer syntax prediction control information from the inter-layer syntax prediction control information setting unit 725. The inter-layer syntax prediction control unit 726 controls the execution of the inter-layer syntax prediction in the encoding of the enhancement layer in accordance with the inter-layer syntax prediction control information. In other words, the inter-layer syntax prediction control unit 726 controls the supply of the base layer syntax stored in the base layer syntax buffer 724 to the enhancement layer image encoding unit 105 in accordance with the inter-layer syntax prediction control information.

More specifically, if the current picture to be encoded (or the current slice to be encoded) by the enhancement layer image encoding unit 105 is the picture (or the slice) for which the inter-layer syntax prediction is allowed by the inter-layer syntax prediction control information, the inter-layer syntax prediction control unit 726 allows the supply of the base layer syntax stored in the base layer syntax buffer 724. On the other hand, if the current picture (or the current slice) is the picture (or the slice) for which the inter-layer syntax prediction is prohibited by the inter-layer syntax prediction control information, the inter-layer syntax prediction control unit 726 prohibits the supply of the base layer syntax stored in the base layer syntax buffer 724.

By the supply of the inter-layer syntax prediction control information to the motion prediction/compensation unit 135 or the intra prediction unit 124 of the enhancement layer image encoding unit 105, the inter-layer syntax prediction control unit 726 controls the execution of the inter-layer syntax prediction by the motion prediction/compensation unit 135 or the intra prediction unit 124 of the enhancement layer image encoding unit 105.

In this manner, the scalable encoding device 100 can control the inter-layer pixel prediction and the inter-layer syntax prediction more easily and more appropriately, thereby enabling the appropriate trade-off (trade-off) between the calculation amount and the encoding efficiency. In other words, the scalable encoding device 100 can suppress the deterioration in encoding efficiency by controlling the inter-layer prediction more adaptively.

<Flow of Common Information Generation Process>

An example of the flow of the common information generation process in this case is described with reference to the flowchart of FIG. 45. Upon the start of the common information generation process, the common information generation unit 701 sets the parameter (max_layer_minus1) in step S701.

In step S702, the common information generation unit 701 sets the parameter (vps_num_sub_layers_minus1[i]) for each main layer.

In step S703, the inter-layer pixel prediction control information setting unit 711 sets the inter-layer pixel prediction control information for each main layer.

In step S704, the common information generation unit 701 generates the video parameter set including various pieces of information set in step S701 to step S703 as the common information.

In step S705, the common information generation unit 701 supplies the video parameter set generated in the process of step S704 to the outside of the scalable encoding device 100 and transmits the video parameter set.

Upon the end of the process of step S705, the common information generation process ends and the process returns to FIG. 13.

<Flow of Base Layer Encoding Process>

Next, an example of the flow of the base layer encoding process in this case is described with reference to the flowchart of FIG. 46.

Figure 15:
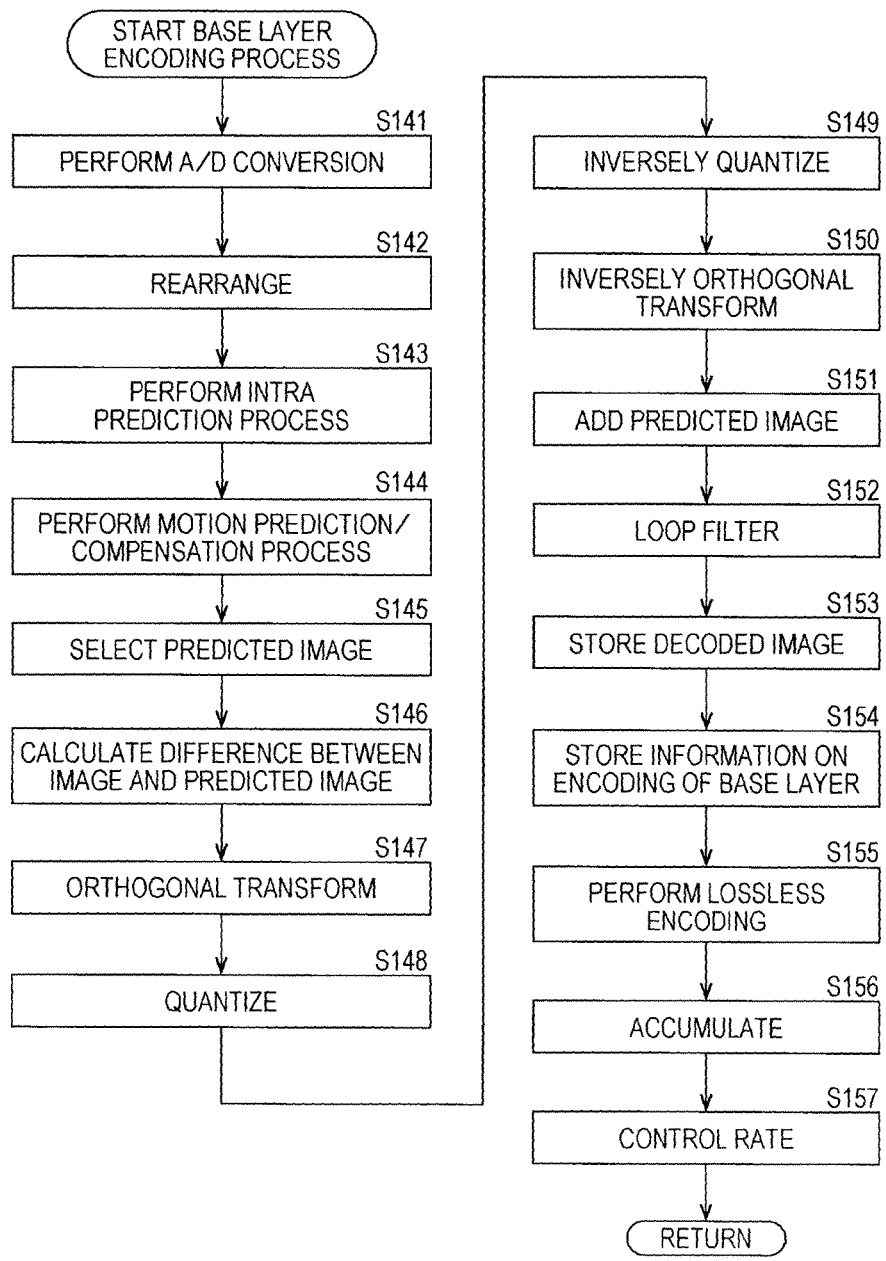
FIG. 15 is a flowchart for describing an example of the flow of a base layer encoding process.

In this case, upon the start of the base layer encoding process, each process of step S711 to step S723 is executed in a manner similar to each process in step S141 to step S153 of FIG. 15.

In step S724, the up-sample unit 721 up-samples the base layer decoded image obtained by the process in step S722.

In step S725, the base layer pixel buffer 723 stores the up-sampled decoded image obtained by the process in step S724.

In step S726, the base layer syntax buffer 724 stores the base layer syntax obtained in the intra prediction process in step S713 or the inter motion prediction process in step S714, for example.

Then, each process of step S727 to step S729 is executed in a manner similar to each process in step S155 to step S157 of FIG. 15.

Upon the end of the process in step S729, the base layer encoding process ends and the process returns to FIG. 13. The base layer encoding process is executed in the unit of picture, for example. In other words, each picture of the current layer is subjected to the base layer encoding process. However, each process in the base layer encoding process is performed in the unit of each process.

<Flow of Inter-layer Prediction Control Process>

Next, an example of the flow of the inter-layer prediction control process in this case is described with reference to the flowchart of FIG. 47.

Figure 45:
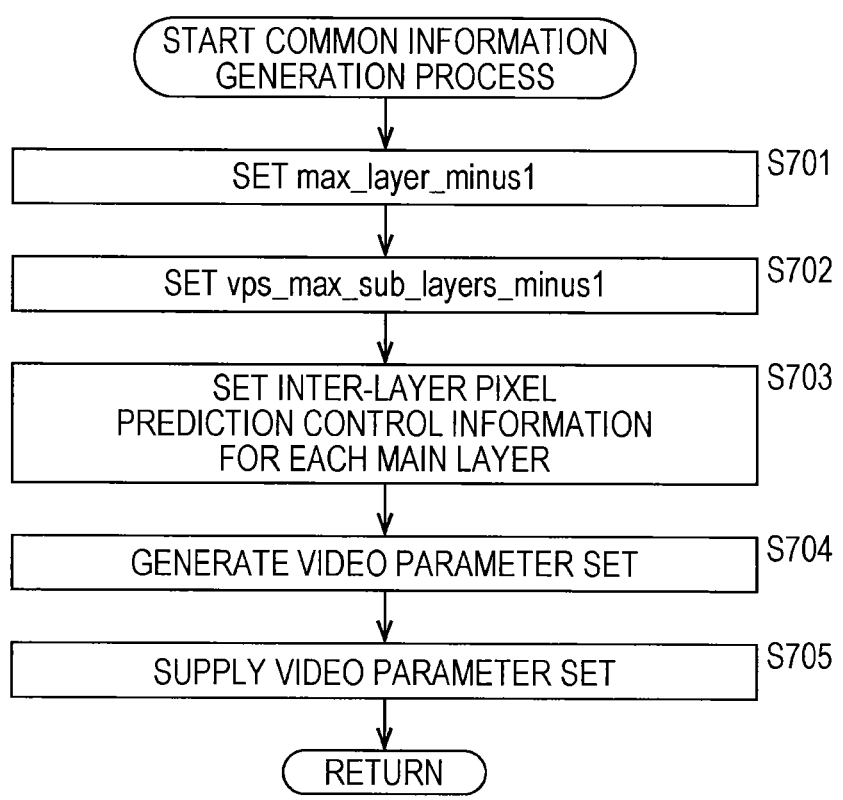
FIG. 45 is a flowchart for describing an example of the flow of the common information generation process.

Upon the start of the inter-layer prediction control process, in step S731, the inter-layer pixel prediction control unit 722 refers to the inter-layer pixel prediction control information set by the process in step S703 of FIG. 45.

In step S732, the inter-layer pixel prediction control unit 722 determines whether the sublayer of the current picture of the enhancement layer is the layer for which the inter-layer pixel prediction is performed. If it has been determined that the inter-layer pixel prediction is performed, the process advances to step S733.

In step S733, the base layer pixel buffer 723 supplies the stored up-sampled decoded image to the frame memory 122 of the enhancement layer image encoding unit 105.

Upon the end of the process of step S733, the process advances to step S734. If it has been determined that the inter-layer pixel prediction is not performed in step S732, the process advances to step S734.

In step S734, the inter-layer syntax prediction control information setting unit 725 sets the inter-layer syntax prediction control information.

In step S735, the inter-layer syntax prediction control unit 726 determines whether the current picture (or slice) of the enhancement layer is the picture (or slice) for which the inter-layer syntax prediction is performed with reference to the inter-layer syntax prediction control information set in step S734. If it has been determined that the inter-layer syntax prediction is performed, the process advances to step S736.

In step S736, the base layer syntax buffer 724 supplies the stored base layer syntax to the motion prediction/compensation unit 135 or the intra prediction unit 124 of the enhancement layer image encoding unit 105.

Upon the end of the process of step S736, the inter-layer prediction control process ends and the process returns to FIG. 13. If it has been determined that the inter-layer syntax prediction is not performed in step S735 of FIG. 47, the inter-layer prediction control process ends and the process returns to FIG. 13.

<Flow of Enhancement Layer Encoding Process>

Next, an example of the flow of the enhancement layer encoding process in this case is described with reference to the flowchart of FIG. 48.

Figure 46:
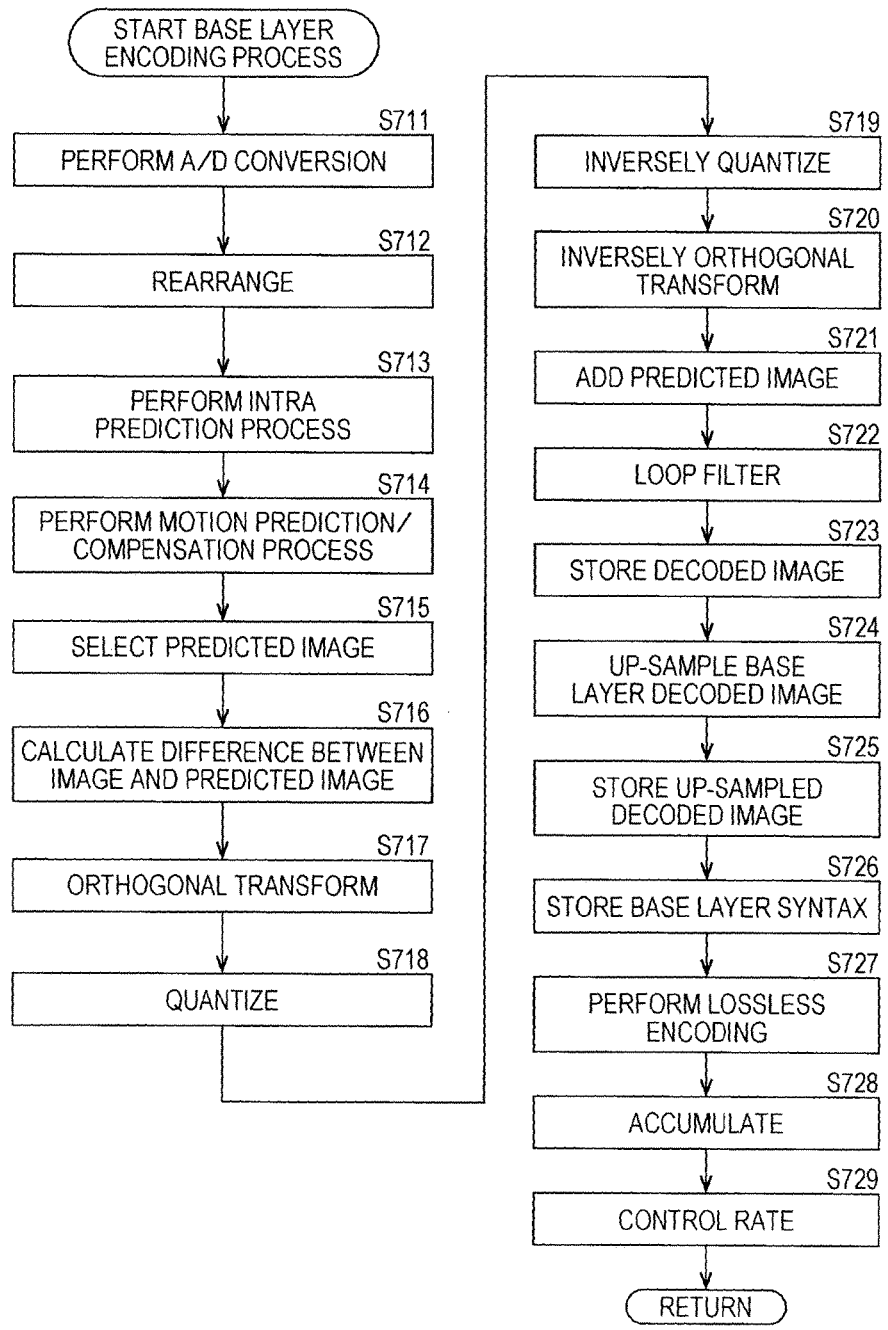
FIG. 46 is a flowchart for describing an example of the flow of the base layer encoding process.

Each process of step S741 and step S742 and each process of step S745 to step S756 in the enhancement layer encoding process are executed in a manner similar to each process in step S711 and step S712 and step S715 to step S723, and each process in step S727 to step S729 in the base layer encoding process (FIG. 46). Each process in the enhancement layer encoding process, however, is performed on the enhancement layer image information by each process unit of the enhancement layer image encoding unit 105.

Figure 48:
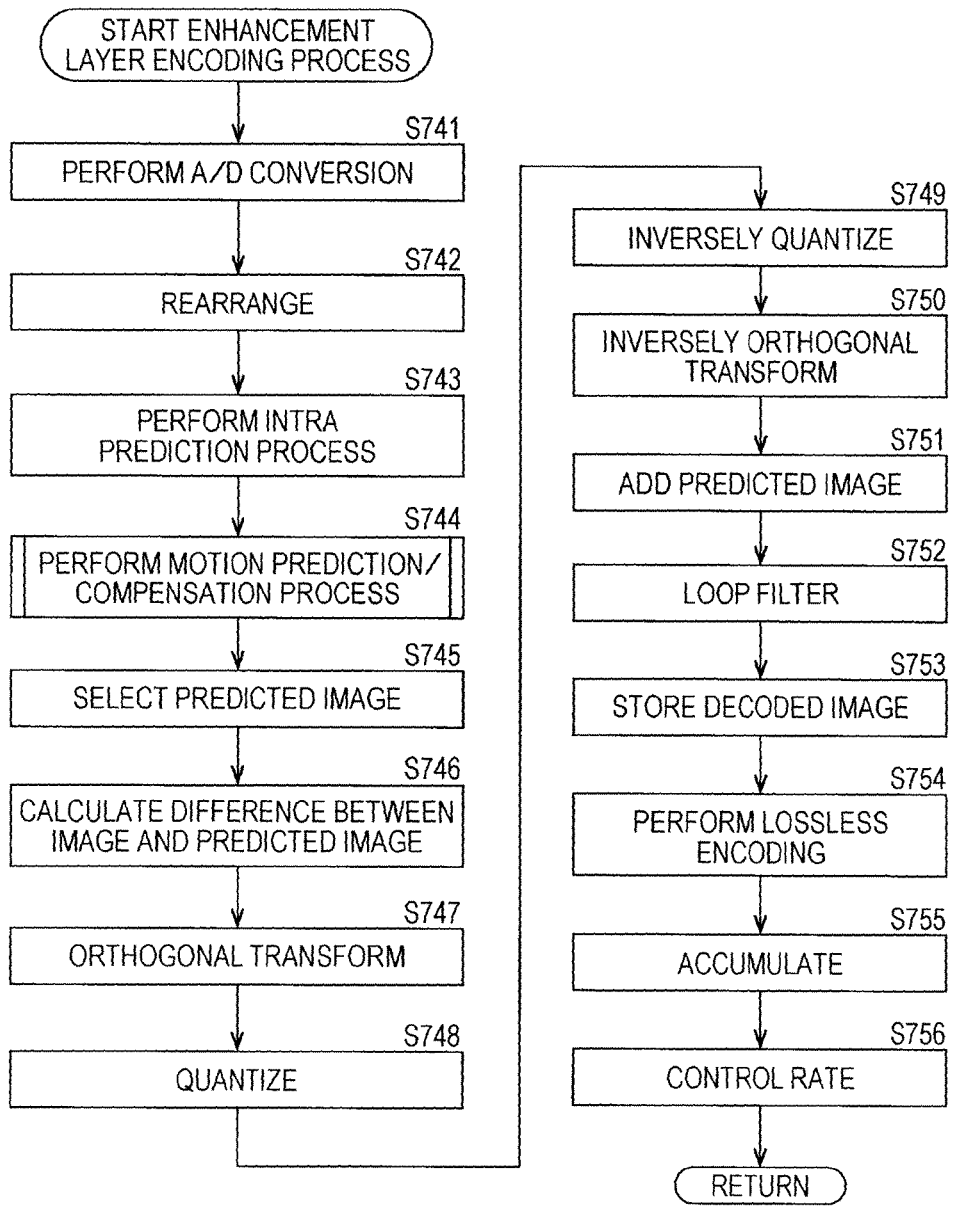
FIG. 48 is a flowchart for describing an example of the flow of the enhancement layer encoding process.

Note that in step S743 of FIG. 48, the intra prediction unit 124 of the enhancement layer image encoding unit 105 performs the intra prediction process corresponding to the inter-layer syntax prediction on the enhancement layer.

In step S744, the motion prediction/compensation unit 135 performs the motion prediction/compensation process that corresponds also to the inter-layer pixel prediction and the inter-layer syntax prediction on the enhancement layer.

Upon the end of the process in step S756, the enhancement layer encoding process ends and the process returns to FIG. 13. The enhancement layer encoding process is executed in the unit of picture, for example. In other words, each picture of the current layer is subjected to the enhancement layer encoding process. However, each process in the enhancement layer encoding process is performed in the unit of each process.

<Flow of Motion Prediction/Compensation Process>

Figure 49:
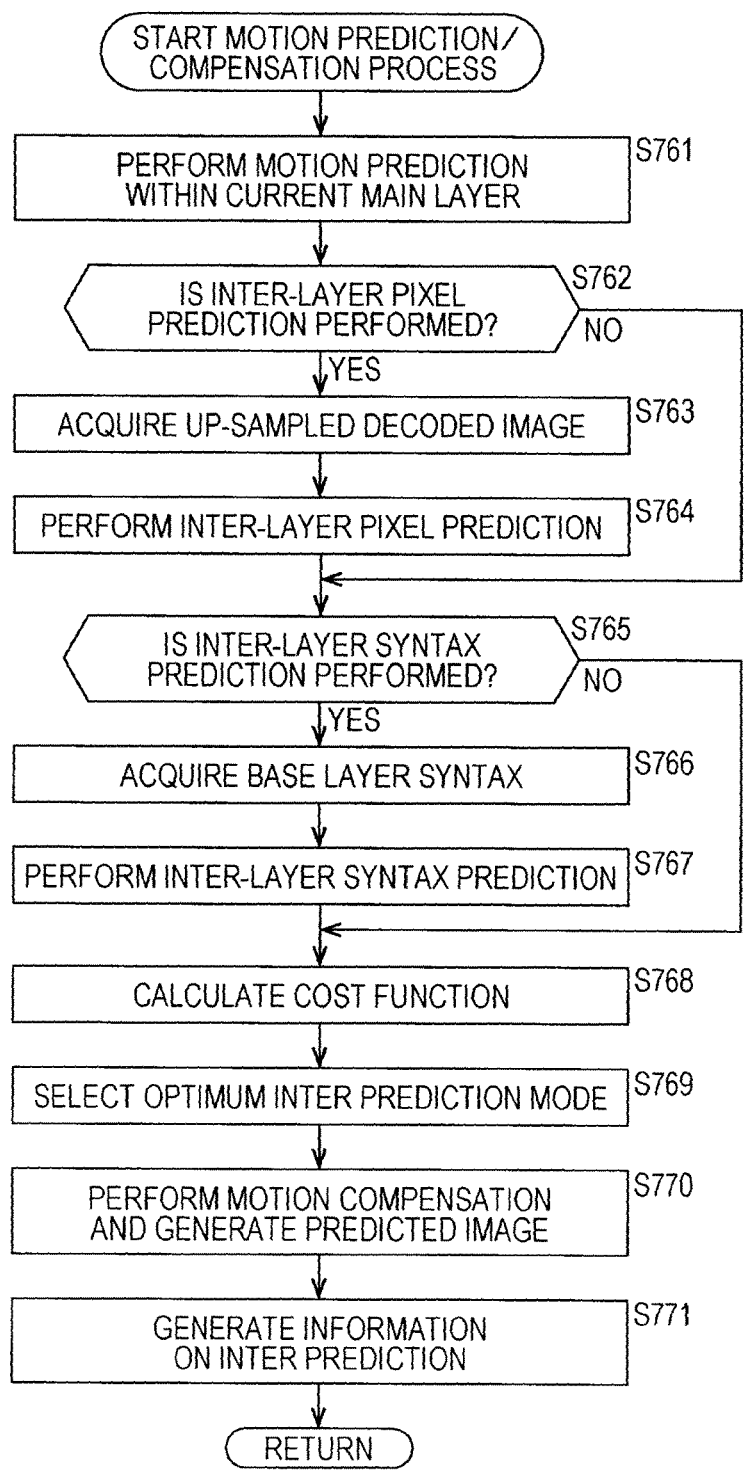
FIG. 49 is a flowchart for describing an example of the flow of the motion prediction/compensation process.

Next, an example of the flow of the motion prediction/compensation process to be executed in step S744 in FIG. 48 is described with reference to the flowchart of FIG. 49.

Upon the start of the motion prediction/compensation process, the motion prediction/compensation unit 135 performs the motion prediction in the current main layer in step S761.

In step S762, the motion prediction/compensation unit 135 determines whether to perform the inter-layer pixel prediction for the current picture. If it has been determined that the inter-layer pixel prediction is performed based on the inter-layer pixel prediction control information supplied from the inter-layer pixel prediction control unit 722, the process advances to step S763.

In step S763, the motion prediction/compensation unit 135 acquires the up-sampled decoded image of the base layer from the frame memory 122. In step S764, the motion prediction/compensation unit 135 performs the inter-layer pixel prediction with reference to the up-sampled decoded image acquired in step S763. Upon the end of the process of step S764, the process advances to step S765.

If it has been determined that the inter-layer pixel prediction is not performed in step S762, the process advances to step S765.

In step S765, the motion prediction/compensation unit 135 determines whether to perform the inter-layer syntax prediction for the current picture. If it has been determined that the inter-layer syntax prediction is performed based on the inter-layer syntax prediction control information supplied from the inter-layer syntax prediction control unit 726, the process advances to step S766.

In step S766, the motion prediction/compensation unit 135 acquires the base layer syntax such as the motion information from the base layer syntax buffer 724. In step S767, the motion prediction/compensation unit 135 performs the inter-layer syntax prediction using the base layer syntax acquired in step S766. Upon the end of the process of step S767, the process advances to step S768.

If it has been determined that the inter-layer syntax prediction is not performed in step S765, the process advances to step S768.

In step S768, the motion prediction/compensation unit 135 calculates the cost function in regard to each prediction mode. In step S769, the motion prediction/compensation unit 135 selects the optimum inter prediction mode based on the cost function value.

In step S770, the motion prediction/compensation unit 135 performs the motion compensation in the optimum inter prediction mode selected in step S769 and generates the predicted image. In step S771, the motion prediction/compensation unit 135 generates the information related to the inter prediction based on the optimum inter prediction mode.

Upon the end of the process of step S771, the motion prediction/compensation process ends and the process returns to FIG. 48. In this manner, the motion prediction/compensation process corresponding to the inter-layer pixel prediction and the inter-layer syntax prediction is performed. This process is executed in the unit of block, for example. However, each process in the motion prediction/compensation process is performed in the unit of each process.

<Flow of Intra Prediction Process>

Figure 50:
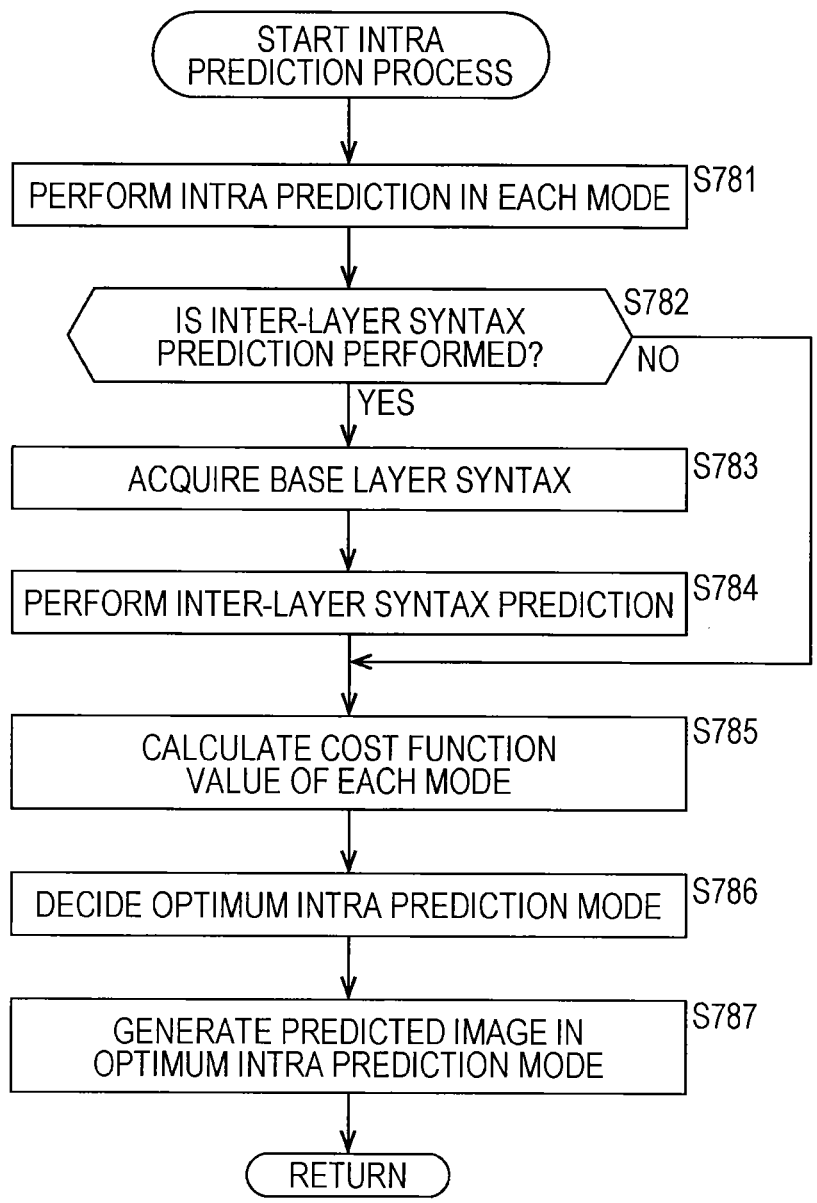
FIG. 50 is a flowchart for describing an example of the flow of the intra prediction process.

Next, an example of the flow of the intra prediction process to be executed in step S743 in FIG. 48 is described with reference to the flowchart of FIG. 50.

Upon the start of the intra prediction process, the intra prediction unit 124 of the enhancement layer image encoding unit 105 performs the intra prediction in each intra prediction mode in the layer in step S781.

In step S782, the intra prediction unit 124 determines whether to perform the inter-layer syntax prediction for the current picture. If it has been determined that the inter-layer syntax prediction is performed based on the inter-layer syntax prediction control information supplied from the inter-layer syntax prediction control unit 726, the process advances to step S783.

In step S783, the intra prediction unit 124 acquires the base layer syntax such as the prediction mode information from the base layer syntax buffer 724. In step S784, the intra prediction unit 124 performs the inter-layer syntax prediction using the base layer syntax acquired in step S783. Upon the end of the process of step S784, the process advances to step S785.

If it has been determined that the inter-layer syntax prediction is not performed in step S782, the process advances to step S785.

In step S785, the intra prediction unit 124 calculates the cost function value in each intra prediction mode in which the intra prediction (including the inter-layer syntax prediction) is performed.

In step S786, the intra prediction unit 124 decides the optimum intra prediction mode based on the cost function value calculated in step S785.

In step S787, the intra prediction unit 124 generates the predicted image in the optimum intra prediction mode decided in step S786.

Upon the end of the process of step S787, the intra prediction process ends and the process returns to FIG. 48.

By executing the processes as above, the scalable encoding device 100 can control the inter-layer pixel prediction and the inter-layer syntax prediction more easily and more appropriately, thereby enabling the more appropriate trade-off (trade-off) between the calculation amount and the encoding efficiency. In other words, the scalable encoding device 100 can suppress the deterioration in encoding efficiency by controlling the inter-layer prediction more adaptively. In other words, the scalable encoding device 100 can suppress the deterioration in image quality due to the encoding and decoding.

<9. Eighth Embodiment>

<Common Information Acquisition Unit and Inter-layer Prediction Control Unit>

Figure 51:
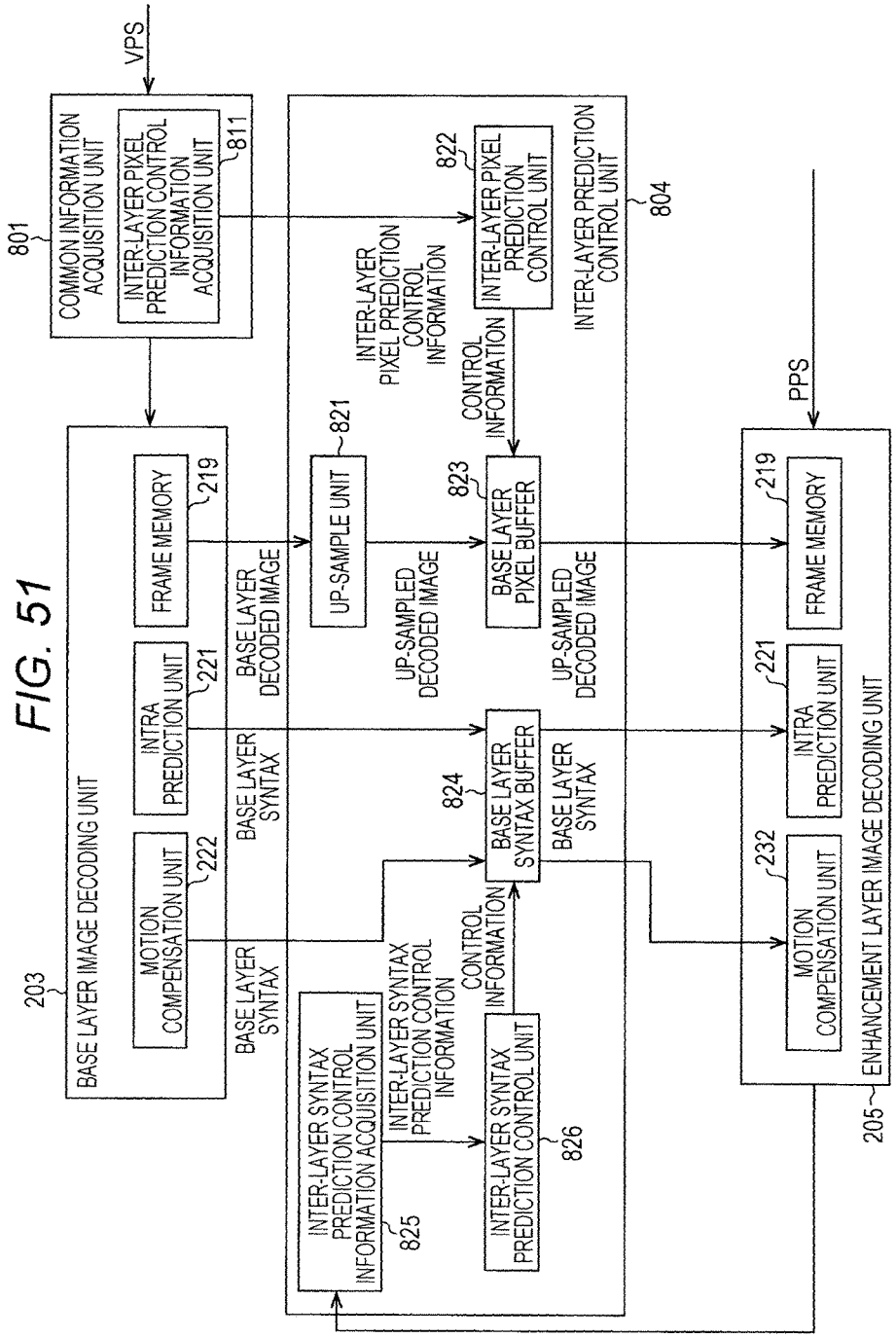
FIG. 51 is a block diagram illustrating an example of a main structure of a common information acquisition unit and an inter-layer prediction control unit.

Next, the scalable decoding device 200 is described. FIG. 51 is a block diagram illustrating an example of a main structure of the common information acquisition unit and the inter-layer prediction control unit of the scalable decoding device 200 in the case described in <7. Summary 2>. In this case, the scalable decoding device 200 includes a common information acquisition unit 801 instead of the common information acquisition unit 201 and an inter-layer prediction control unit 804 instead of the inter-layer prediction control unit 204.

As illustrated in FIG. 51, the common information acquisition unit 801 includes an inter-layer pixel prediction control information acquisition unit 811.

The inter-layer pixel prediction control information acquisition unit 811 acquires the inter-layer pixel prediction control information as the common information transmitted as the video parameter set or the like from, for example, the scalable encoding device 100.

The inter-layer pixel prediction control information acquisition unit 811 supplies the acquired inter-layer pixel prediction control information to the inter-layer prediction control unit 804 (inter-layer pixel prediction control unit 822).

As illustrated in FIG. 51, the inter-layer prediction control unit 804 includes an up-sample unit 821, an inter-layer pixel prediction control unit 822, a base layer pixel buffer 823, a base layer syntax buffer 824, an inter-layer syntax prediction control information acquisition unit 825, and an inter-layer syntax prediction control unit 826.

Upon the acquisition of the base layer decoded image from the frame memory 219 of the base layer image decoding unit 203, the up-sample unit 821 performs the up-sample process (resolution conversion process) on the base layer decoded image in accordance with the ratio of, for example, the resolution between the base layer and the enhancement layer. The up-sample unit 821 supplies the obtained up-sampled decoded image to the base layer pixel buffer 823.

The inter-layer pixel prediction control unit 822 acquires the inter-layer pixel prediction control information from the inter-layer pixel prediction control information acquisition unit 811. The inter-layer pixel prediction control unit 822 controls the supply of the up-sampled decoded image of the base layer stored in the base layer pixel buffer 823 to the enhancement layer image decoding unit 205 in accordance with the inter-layer pixel prediction control information.

More specifically, if the sublayer to which the current picture to be decoded by the enhancement layer image decoding unit 205 belongs is the layer for which the inter-layer pixel prediction is allowed by the inter-layer pixel prediction control information, the inter-layer pixel prediction control unit 822 allows the supply of the up-sampled decoded image stored in the base layer pixel buffer 823. If the sublayer to which the current picture belongs is the layer for which the inter-layer pixel prediction is prohibited by the inter-layer pixel prediction control information, the inter-layer pixel prediction control unit 822 prohibits the supply of the up-sampled decoded image stored in the base layer pixel buffer 823.

The base layer pixel buffer 823 stores the up-sampled decoded image supplied from the up-sample unit 821, and supplies the up-sampled decoded image to the frame memory 219 of the enhancement layer image decoding unit 205 as the reference image (reference) of the inter-layer pixel prediction as appropriate in accordance with the control of the inter-layer pixel prediction control unit 822.

The base layer syntax buffer 824 acquires the base layer syntax such as the prediction mode information from the intra prediction unit 221 of the base layer image decoding unit 203, and stores the information therein. The base layer syntax buffer 824 acquires the base layer syntax such as the motion information from the motion compensation unit 222 of the base layer image decoding unit 203, and stores the information therein.

Based on the control of the inter-layer syntax prediction control unit 826, the base layer syntax buffer 824 supplies the base layer syntax to the motion compensation unit 232 or the intra prediction unit 221 of the enhancement layer image decoding unit 205 as appropriate. For example, the base layer syntax buffer 824 supplies the base layer syntax such as the stored prediction mode information to the intra prediction unit 221 of the enhancement layer image decoding unit 205. For example, the base layer syntax buffer 824 supplies the base layer syntax such as the stored motion information to the motion compensation unit 232 of the enhancement layer image decoding unit 205.

The inter-layer syntax prediction control information acquisition unit 825 acquires through the enhancement layer image decoding unit 205, the inter-layer syntax prediction control information transmitted as the picture parameter set or the like from, for example, the scalable encoding device 100.

The inter-layer syntax prediction control information acquisition unit 825 supplies the acquired inter-layer syntax prediction control information to the inter-layer syntax prediction control unit 826.

The inter-layer syntax prediction control unit 826 acquires the inter-layer syntax prediction control information from the inter-layer syntax prediction control information acquisition unit 825. Based on the inter-layer syntax prediction control information, the inter-layer syntax prediction control unit 826 controls the supply of the base layer syntax stored in the base layer syntax buffer 824 to the enhancement layer image decoding unit 205.

More specifically, if the current picture to be decoded (or current slice to be decoded) by the enhancement layer image decoding unit 205 is the picture (or slice) for which the inter-layer syntax prediction is allowed by the inter-layer syntax prediction control information, the inter-layer syntax prediction control unit 826 allows the supply of the base layer syntax stored in the base layer syntax buffer 824. On the other hand, if the current picture (or current slice) is the picture (or slice) for which the inter-layer syntax prediction is prohibited by the inter-layer syntax prediction control information, the inter-layer syntax prediction control unit 826 prohibits the supply of the base layer syntax stored in the base layer syntax buffer 824.

The intra prediction unit 221 of the enhancement layer image decoding unit 205 performs the intra prediction in the optimum intra prediction mode based on the information related to the prediction mode supplied from, for example, the scalable encoding device 100, and generates the predicted image. If the inter-layer syntax prediction is specified as the optimum intra prediction mode in that case, i.e., if the intra prediction of the inter-layer syntax prediction is performed in the encoding, the intra prediction unit 221 performs the intra prediction using the base layer syntax supplied from the base layer syntax buffer 824 and generates the predicted image.

The motion compensation unit 232 of the enhancement layer image decoding unit 205 performs the motion compensation in the optimum inter prediction mode based on the information related to the prediction mode supplied from, for example, the scalable encoding device 100, and generates the predicted image. If the inter-layer pixel prediction is specified as the optimum intra prediction mode in that case, i.e., if the inter prediction of the inter-layer pixel prediction is performed in the encoding, the motion compensation unit 232 performs the motion compensation with reference to the up-sampled decoded image of the base layer stored in the frame memory 219 and generates the predicted image.

If the inter-layer syntax prediction is specified as the optimum intra prediction mode, i.e., if the inter prediction of the inter-layer syntax prediction is performed in the encoding, the motion compensation unit 232 performs the motion compensation with reference to the decoded image of the enhancement layer stored in the frame memory 219 using the base layer syntax supplied from the base layer syntax buffer 824 and generates the predicted image.

Thus, the scalable decoding device 200 can control the inter-layer pixel prediction and the inter-layer syntax prediction more easily and appropriately, thereby enabling the more appropriate trade-off (trade-off) between the calculation amount and the encoding efficiency. In other words, the scalable decoding device 200 can suppress the deterioration in encoding efficiency by controlling the inter-layer prediction more adaptively.

<Flow of Common Information Acquisition Process>

An example of the flow of the common information acquisition process in this case is described with reference to the flowchart of FIG. 52. Upon the start of the common information acquisition process, the common information acquisition unit 801 acquires the video parameter set (VPS) transmitted from the encoding side in step S801.

In step S802, the common information acquisition unit 801 acquires the parameter (max_layer_minus1) from the video parameter set.

In step S803, the common information acquisition unit 801 acquires the parameter (vps_num_sub_layers_minus1 [i]) for each main layer from the video parameter set (VPS).

In step S804, the inter-layer pixel prediction control information acquisition unit 811 acquires the inter-layer pixel prediction control information for each main layer from the video parameter set (VPS).

In step S805, the inter-layer pixel prediction control information acquisition unit 811 supplies the inter-layer pixel prediction control information acquired in step S804 to the inter-layer pixel prediction control unit 822.

Upon the end of the process in step S805, the common information acquisition process ends and the process returns to FIG. 23.

<Flow of Base Layer Decoding Process>

Figure 53:
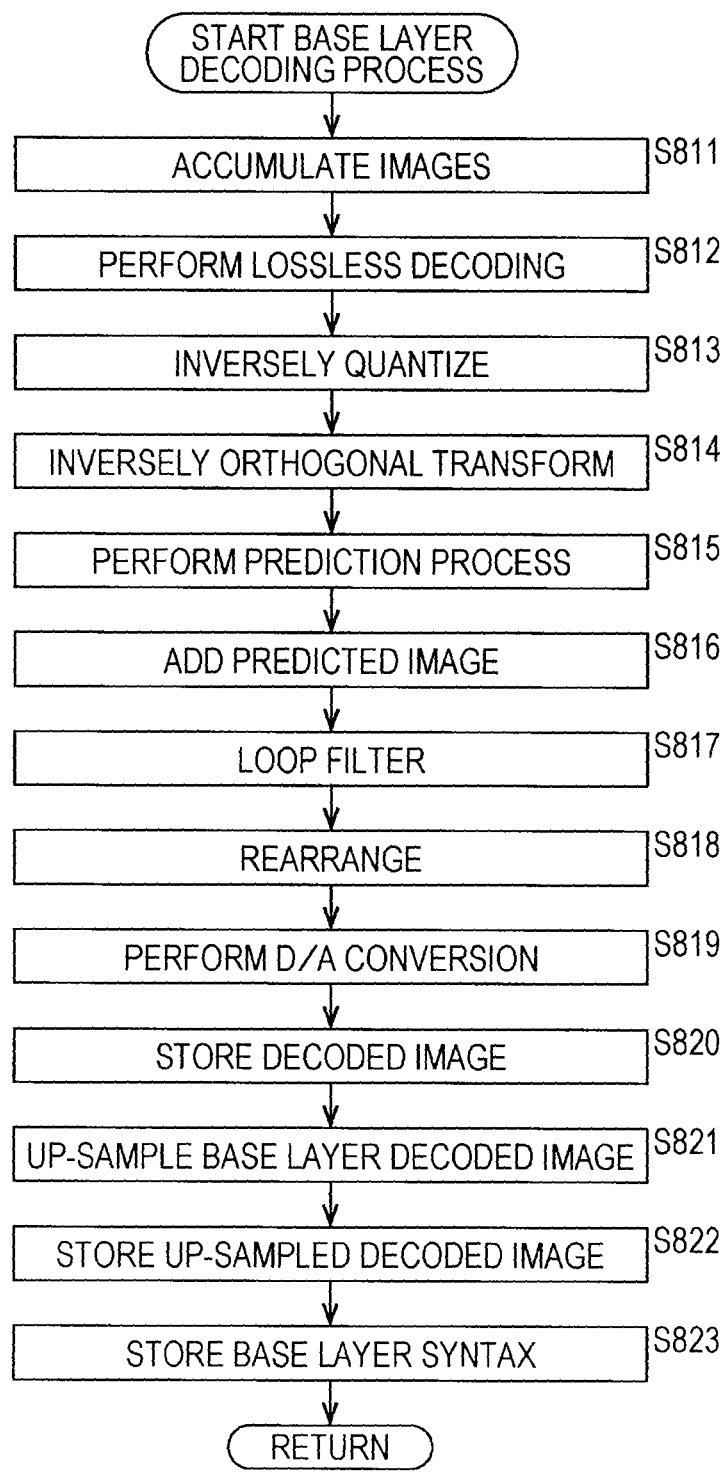
FIG. 53 is a flowchart for describing an example of the flow of the base layer decoding process.

Next, an example of the flow of the base layer decoding process is described with reference to the flowchart of FIG. 53.

Figure 25:
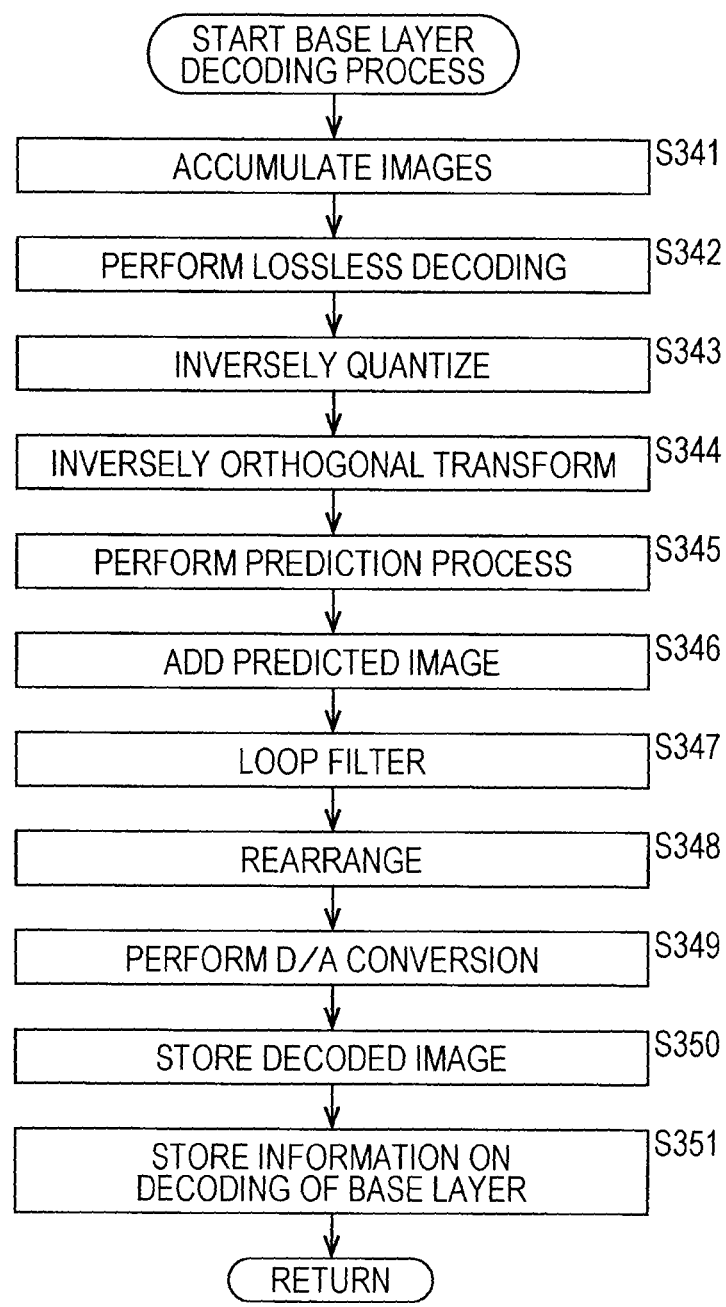
FIG. 25 is a flowchart for describing an example of the flow of the base layer decoding process.

In this case, upon the start of the base layer decoding process, each process in step S811 to step S820 is executed in a manner similar to each process in step S341 to step S350 in FIG. 25.

In step S821, the up-sample unit 821 performs the up-sample process on the base layer decoded image.

In step S822, the base layer pixel buffer 823 stores the up-sampled decoded image obtained by the process of step S821.

In step S823, the base layer syntax buffer 824 stores the base layer syntax (such as intra prediction mode information or motion information) obtained in the prediction process in step S815, etc.

Upon the end of the process in step S823, the base layer decoding process ends and the process returns to FIG. 23. The base layer decoding process is executed in the unit of picture, for example. In other words, the base layer decoding process is executed for each picture of the current picture. However, each process in the base layer decoding process is performed in the unit of each process.

<Flow of Inter-layer Prediction Control Process>

Next, an example of the flow of the inter-layer prediction control process in this case is described with reference to the flowchart of FIG. 54.

Figure 52:
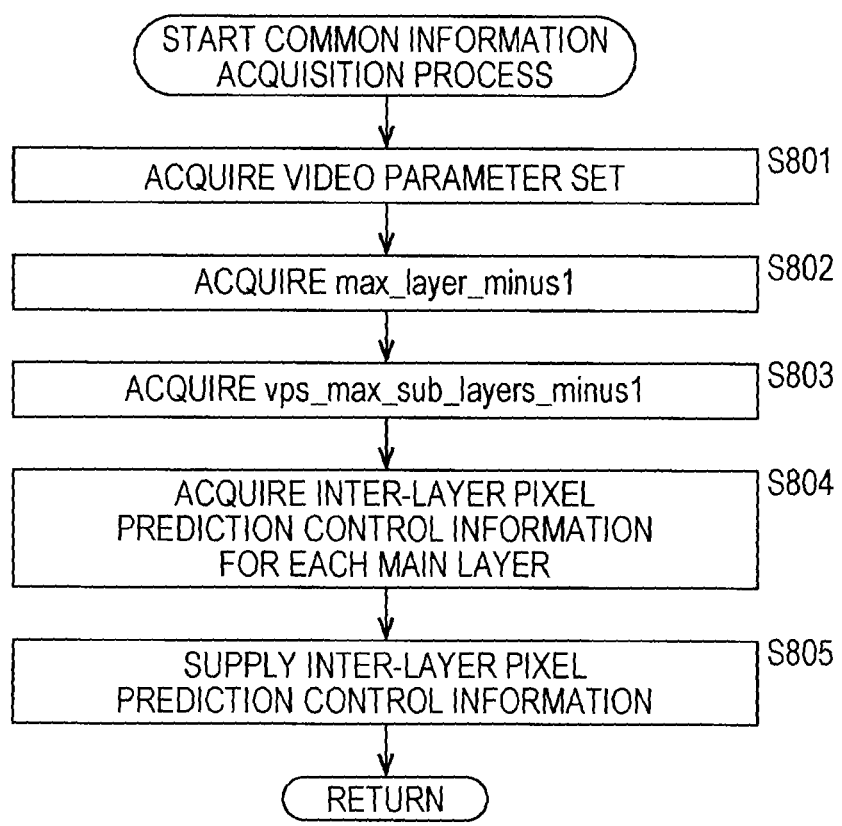
FIG. 52 is a flowchart for describing an example of the flow of the common information acquisition process.

Upon the start of the inter-layer prediction control process, in step S831, the inter-layer pixel prediction control unit 822 refers to the inter-layer pixel prediction control information supplied by the process of step S805 in FIG. 52.

In step S832, the base layer pixel buffer 823 supplies the stored up-sampled decoded image to the frame memory 219 of the enhancement layer image decoding unit 205.

Upon the end of the process of step S833, the process advances to step S834. If it has been determined that the inter-layer pixel prediction is not performed in step S832, the process advances to step S834.

In step S834, the inter-layer syntax prediction control information acquisition unit 825 acquires the inter-layer syntax prediction control information.

In step S835, the inter-layer syntax prediction control unit 826 determines whether the current picture (or slice) of the enhancement layer is the picture (or slice) for which the inter-layer syntax prediction is performed with reference to the inter-layer syntax prediction control information acquired in step S834. If it has been determined that the inter-layer syntax prediction is performed, the process advances to step S836.

In step S836, the base layer syntax buffer 824 supplies the stored base layer syntax to the motion compensation unit 232 or the intra prediction unit 221 of the enhancement layer image decoding unit 205.

Upon the end of the process of step S836, the inter-layer prediction control process ends and the process returns to FIG. 23. If it has been determined that the inter-layer syntax prediction is not performed in step S835 in FIG. 54, the inter-layer prediction control process ends and the process returns to FIG. 23.

<Flow of Prediction Process>

Since the enhancement layer decoding process is executed in a manner similar to that in the case described with reference to the flowchart of FIG. 27, the description is omitted.

Next, an example of the flow of the prediction process in this case is described with reference to the flowcharts of FIG. 55 and FIG. 56.

Upon the start of the prediction process, the motion compensation unit 232 determines whether the prediction mode is the inter prediction or not in step S841. If it has been determined that the prediction mode is the inter prediction, the process advances to step S842.

In step S842, the motion compensation unit 232 determines whether the optimum inter prediction mode is the mode in which the inter-layer pixel prediction is performed or not. If it has been determined that the optimum inter prediction mode is the mode in which the inter-layer pixel prediction is performed, the process advances to step S843.

In step S843, the motion compensation unit 232 acquires the up-sampled decoded image of the base layer.

In step S844, the motion compensation unit 232 performs the motion compensation using the up-sampled decoded image of the base layer and generates the predicted image. Upon the end of the process of step S844, the process advances to step S849.

If it has been determined that the optimum inter prediction mode is not the mode in which the inter-layer pixel prediction is performed in step S842, the process advances to step S845.

In step S845, the motion compensation unit 232 determines whether the optimum inter prediction mode is the mode in which the inter-layer syntax prediction is performed. If it has been determined that the optimum inter prediction mode is the mode in which the inter-layer syntax prediction is performed, the process advances to step S846.

In step S846, the motion compensation unit 232 acquires the base layer syntax such as the motion information.

In step S847, the motion compensation unit 232 performs the motion compensation using the base layer syntax and generates the predicted image. Upon the end of the process of step S847, the process advances to step S849.

If it has been determined that the optimum inter prediction mode is not the mode in which the inter-layer syntax prediction is performed in step S845, the process advances to step S848.

In step S848, the motion compensation unit 232 performs the motion compensation in the current main layer and generates the predicted image. Upon the end of the process of step S848, the process advances to step S849.

In step S849, the motion compensation unit 232 supplies the thusly generated predicted image to the calculation unit 215 through the selection unit 223. Upon the end of the process of step S849, the prediction process ends and the process returns to FIG. 27.

Figure 55:
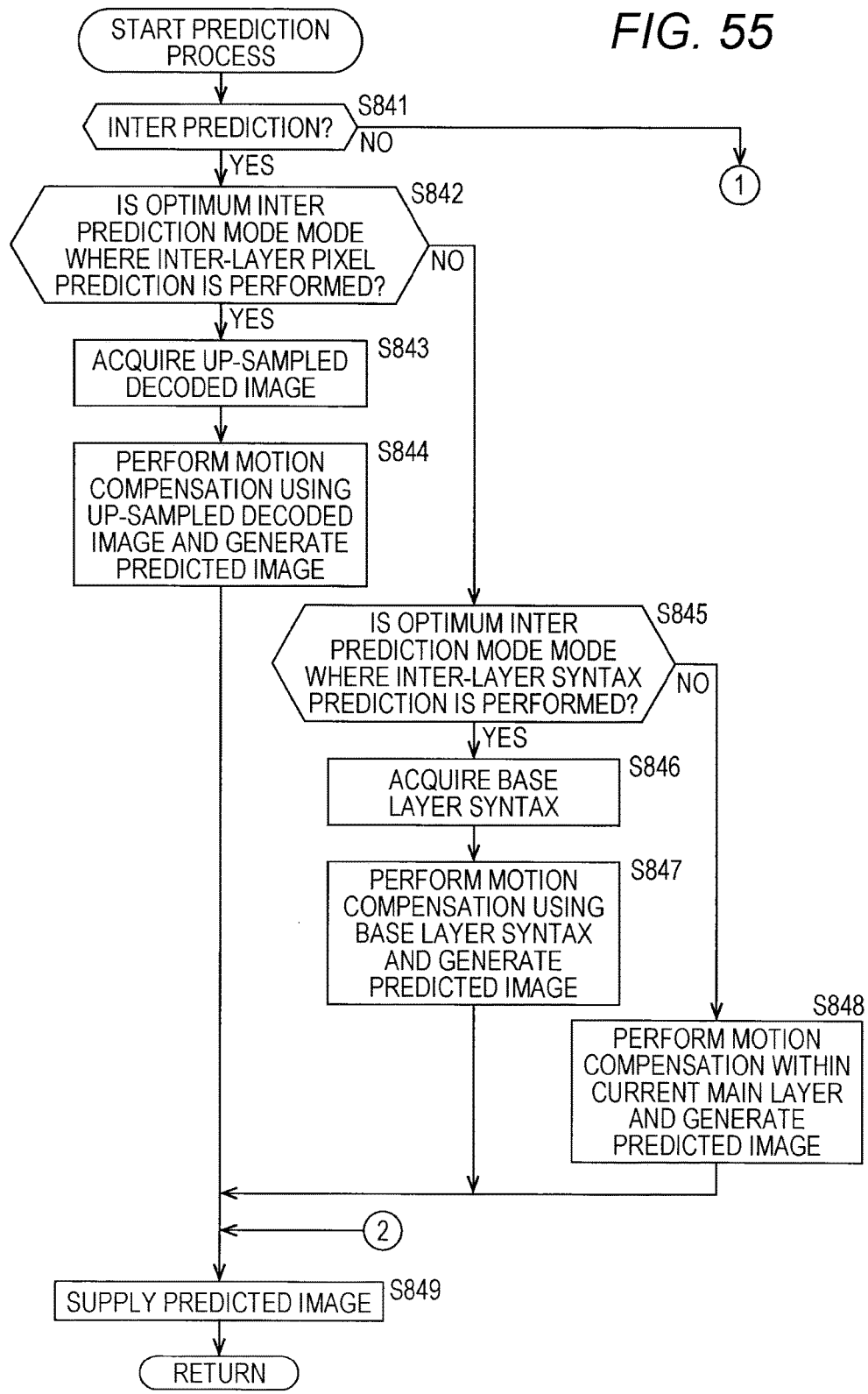
FIG. 55 is a flowchart for describing an example of the flow of the prediction process.
Figure 56:
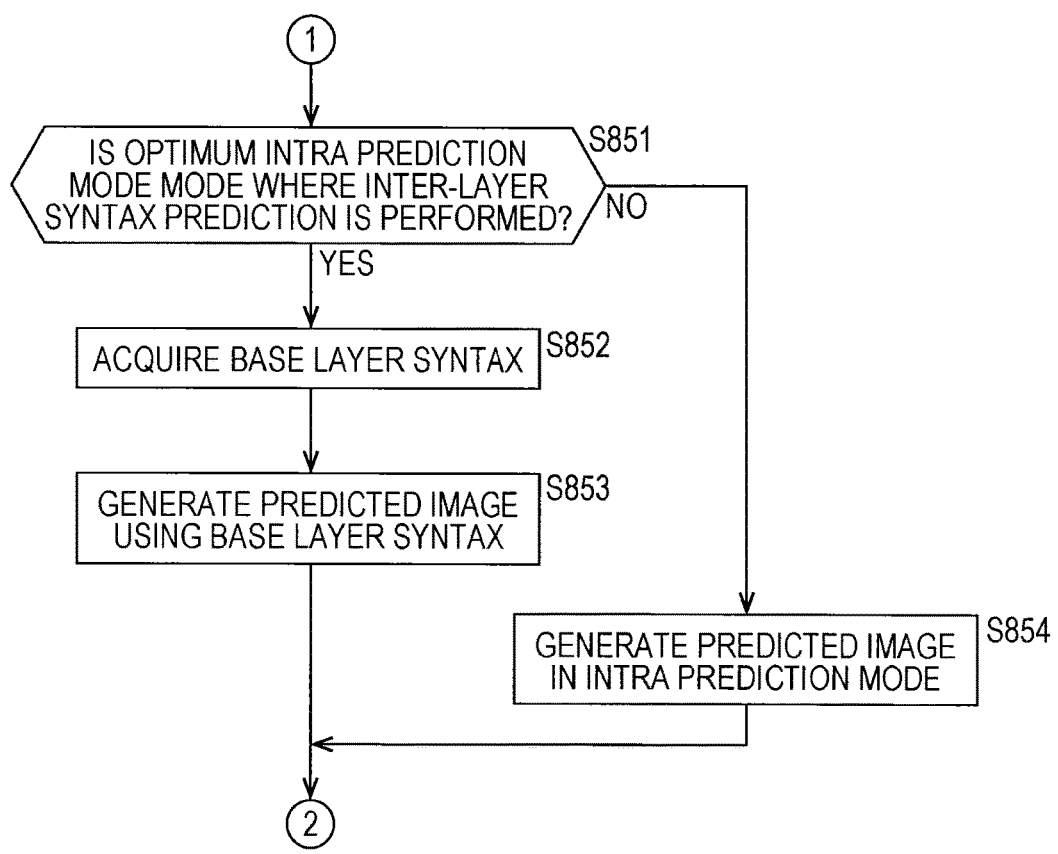
FIG. 56 is a flowchart for describing an example of the flow of the prediction process, which is subsequent to FIG. 55.

If it has been determined that the prediction mode is the intra prediction in step S841 in FIG. 55, the process advances to FIG. 56.

In step S851 in FIG. 56, the intra prediction unit 221 of the enhancement layer image decoding unit 205 determines whether the optimum intra prediction mode is the mode in which the inter-layer syntax prediction is performed or not. If it has been determined that the optimum intra prediction mode is the mode in which the inter-layer syntax prediction is performed, the process advances to step S852.

In step S852, the intra prediction unit 221 acquires the base layer syntax such as the intra prediction mode information.

In step S853, the intra prediction unit 221 performs the intra prediction using the base layer syntax and generates the predicted image. Upon the end of the process of step S853, the process returns to step S849 in FIG. 55.

If it has been determined that the optimum intra prediction mode is not the mode in which the inter-layer syntax prediction is performed in step S851 in FIG. 56, the process advances to step S854.

In step S854, the intra prediction unit 221 generates the predicted image in the optimum intra prediction mode as the intra prediction mode employed in the encoding. Upon the end of the process of step S854, the process returns to step S849 in FIG. 55.

By executing each process as above, the scalable decoding device 200 can control the inter-layer pixel prediction and the inter-layer syntax prediction more easily and appropriately, thereby enabling more appropriate trade-off (trade-off) between the calculation amount and the encoding efficiency. In other words, the scalable decoding device 200 can suppress the deterioration in encoding efficiency by controlling the inter-layer prediction more adaptively. In other words, the scalable decoding device 200 can suppress the deterioration in image quality due to the encoding and decoding.

<10. Summary 3>

In regard to the inter-layer prediction, for example, in the case of SHVC (Scalable High Efficiency Video Coding), two frame works of texture BL (TextureBL) and reference index (Ref_idx) are suggested in Jianle Chen, Jill Boyce, Yan Ye, Miska M. Hannuksela, "SHVC Test Model 1 (SHM 1)", JCTVC-L1007, Joint Collaborative Team on Video Coding (JCT-VC) of ITU-T SG16 WP3 and ISO/IEC JTC1/SC29/WG1112th Meeting: Geneva, CH, 14-23 Jan. 2013.

In the case of the texture BL (TextureBL) framework, the decoded image of the base layer (Baselayer) (or the up-sampled (upsample) image thereof) is encoded as one (intra BL (IntraBL) mode) of the intra prediction modes (Intra Prediction Mode). Syntax (Syntax) changes at or below the CU level (CU-level) from the version1 (Version 1) are possible.

On the other hand, in the case of the reference index (Ref_idx) framework, the decoded image of the base layer (Baselayer) (or the up-sampled (upsample) image) is stored in the long-term (Long-Term) reference frame (also called long-term reference frame) and the prediction process using this is performed. Syntax (Syntax) changes at or below the CU level (CU-level) from the version 1 (Version 1) are impossible.

In all the pictures (Pictures), however, the inter-layer texture prediction (Inter-layer Texture Prediction) requires the motion compensation in both the base layer (Baselayer) and the enhancement layer (Enhancementlayer) in the decoding. This may increase the calculation amount and the load in the decoding process. This applies not just to the case of the texture BL (TextureBL) framework but also to the case of the reference index (Ref_idx) framework.

In view of this, the execution of the inter-layer texture prediction (inter-layer texture prediction) is controlled for each picture (Picture) by controlling the value of syntax (syntax) in regard to the long-term (Long-Term) reference frame storing the decoded image of the base layer (Baselayer) (or the up-sampled (upsample) image thereof).

FIG. 57 and FIG. 58 illustrate examples of the syntax of the sequence parameter set (sep_parameter_set_rbsp). As illustrated in FIG. 58, the sequence parameter set (sep_parameter_set_rbsp) includes the syntax used_by_curr_pic_lt_sps_flag[i] in regard to the long-term reference frame.

The syntax used_by_curr_pic_lt_sps_flag[i] is the flag controlling whether the i-th candidate of the long-term reference picture specified in the sequence parameter set is used as the reference image. If this value is "0", the i-th candidate of the long-term reference picture is not used.

FIG. 59 to FIG. 61 are diagrams illustrating examples of the syntax of the slice header (slice_segment_header). As illustrated in FIG. 59, the slice header (slice_segment_header) includes the syntax used_by_curr_pic_lt_flag[i] in regard to the long-term reference frame.

The syntax used_by_curr_pic_lt_flag[i] is the flag controlling whether the i-th entry of the long-term RPS (Reference Picture Set) in the current picture is used as the reference image by the current picture. If this value is "0", the i-th entry of the long-term RPS is not used.

For example, the execution of the inter-layer texture prediction is controlled for each picture by controlling the syntax value thereof. In other words, for example, the value of the syntax used_by_curr_pic_lt_sps_flag[i] or the syntax used_by_curr_pic_lt_flag[i] is set to "0" to prevent the inter-layer texture prediction (inter-layer texture prediction). On the contrary, the value of the syntax used_by_curr_pic_lt_sps_flag[i] or the syntax used_by_curr_pic_lt_flag[i] is set to "1" to enable the inter-layer texture prediction.

In this manner, the execution of the inter-layer texture prediction can be controlled for every picture by controlling the value of the syntax in regard to the long-term reference frame. Therefore, the execution of the motion compensation of each layer in the decoding process can be controlled as appropriate, thereby suppressing the increase in load of the decoding process.

<11. Ninth Embodiment>
<Image Encoding Device>

Figure 62:
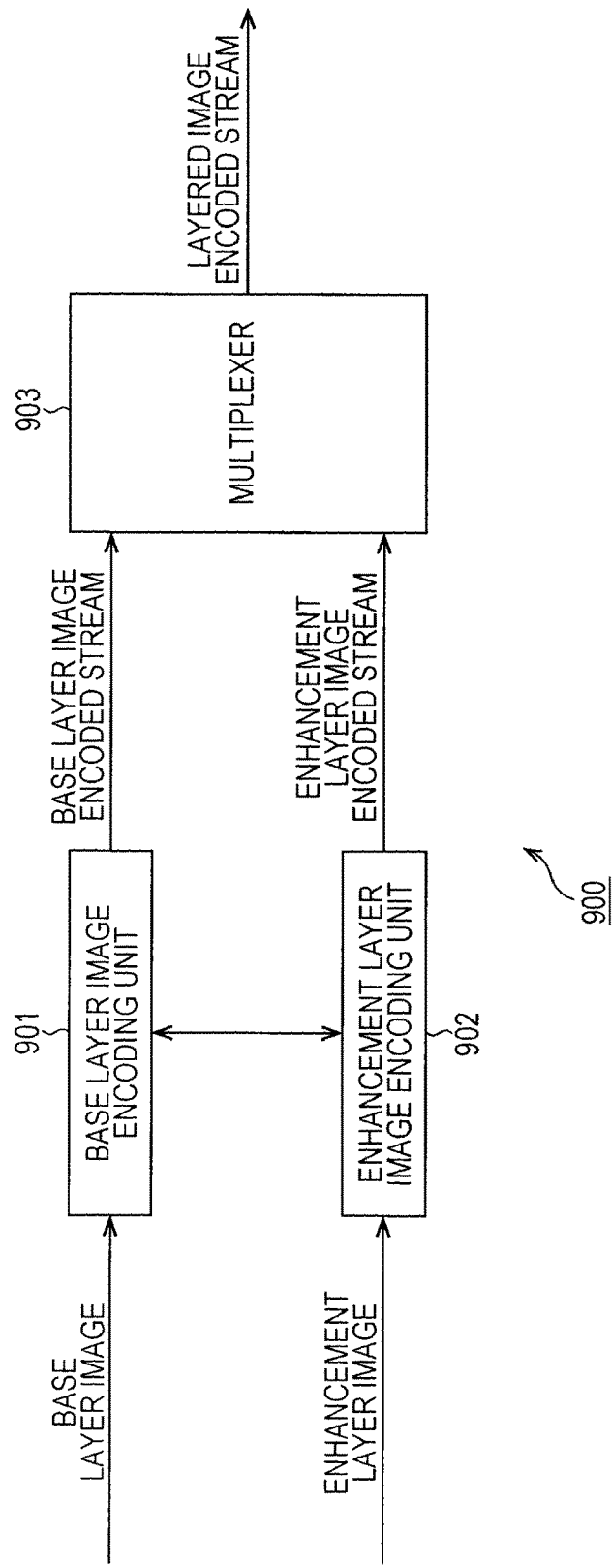
FIG. 62 is a block diagram illustrating an example of a main structure of an image encoding device.

Next, a device for achieving the present technique as above and a method for the same are described. FIG. 62 is a diagram illustrating an image encoding device according to an aspect of an image processing device to which the present technique has been applied. An image encoding device 900 illustrated in FIG. 62 is a device for performing the layer image encoding. This image encoding device 900 is an image processing device basically similar to the scalable encoding device 100 of FIG. 9; however, for the convenience of description, the description on the components that are not directly relevant to the present technique described in <10. Summary 3> (such as the common information generation unit 101, the encoding control unit 102, and the inter-layer prediction control unit 104) is omitted.

As illustrated in FIG. 62, the image encoding device 900 includes a base layer image encoding unit 901, an enhancement layer image encoding unit 902, and a multiplexer 903.

The base layer image encoding unit 901 is a process unit basically similar to the base layer image encoding unit 103 (FIG. 9) and encodes the base layer image to generate the base layer image encoding stream. The enhancement layer image encoding unit 902 is a process unit basically similar to the enhancement layer image encoding unit 105 (FIG. 9) and encodes the enhancement layer image to generate the enhancement layer image encoded stream. The multiplexer 903 multiplexes the base layer image encoded stream generated by the base layer image encoding unit 901 and the enhancement layer image encoded stream generated by the enhancement layer image encoding unit 902, thereby generating a layer image encoded stream. The multiplexer 903 transmits the generated layer image encoded stream to the decoding side.

The base layer image encoding unit 901 supplies the decoded image (also referred to as base layer decoded image) obtained in the encoding of the base layer to the enhancement layer image encoding unit 902.

The enhancement layer image encoding unit 902 acquires the base layer decoded image supplied from the base layer image encoding unit 901, and stores the image therein. The enhancement layer image encoding unit 902 uses the stored base layer decoded image as the reference image in the prediction process in the encoding of the enhancement layer.

<Base Layer Image Encoding Unit>

Figure 63:
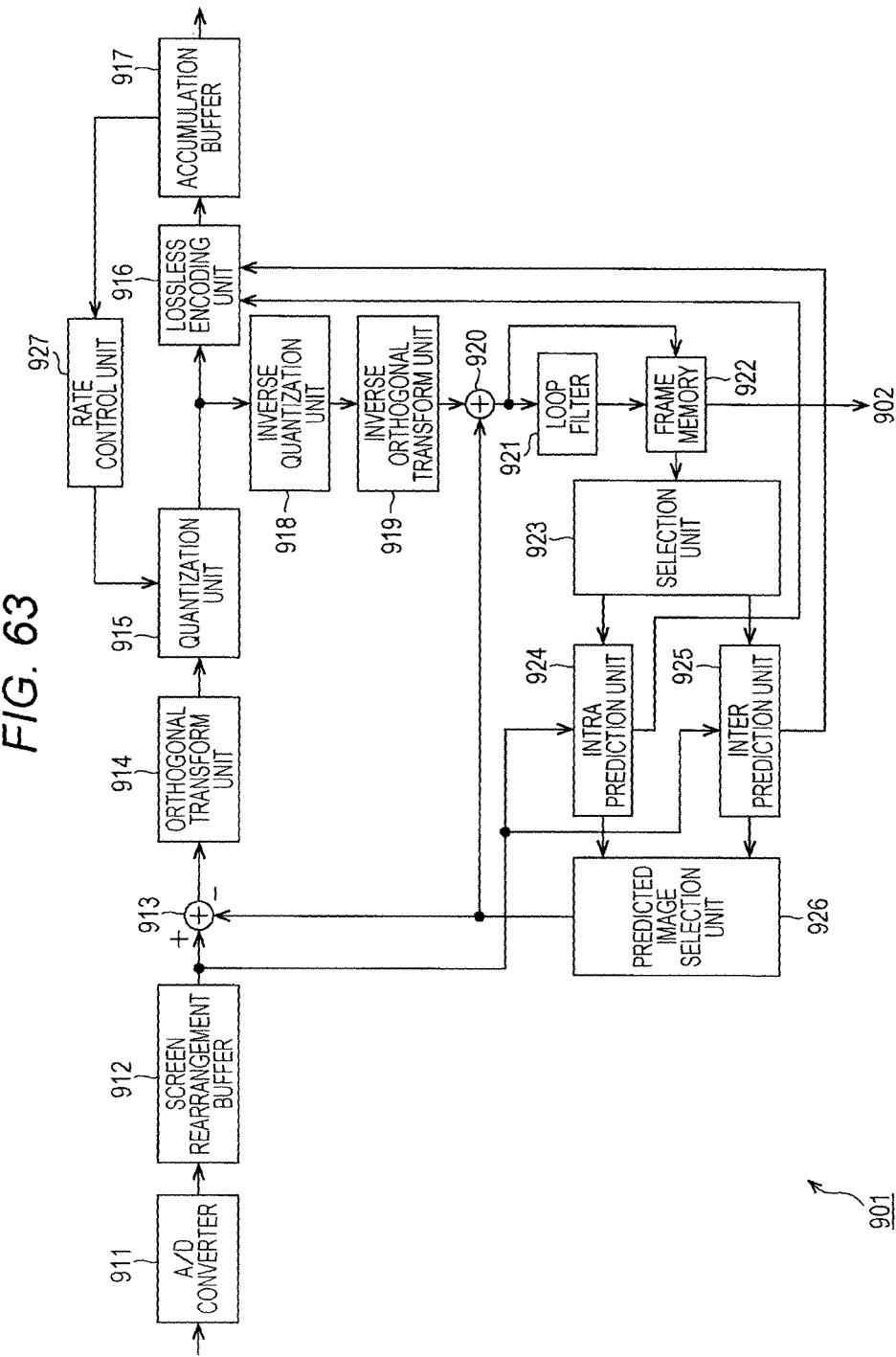
FIG. 63 is a block diagram illustrating an example of a main structure of a base layer image encoding unit.

FIG. 63 is a block diagram illustrating an example of a main structure of the base layer image encoding unit 901 of FIG. 62. As illustrated in FIG. 63, the base layer image encoding unit 901 includes an A/D converter 911, a screen rearrangement buffer 912, a calculation unit 913, an orthogonal transform unit 914, a quantization unit 915, a lossless encoding unit 916, an accumulation buffer 917, an inverse quantization unit 918, and an inverse orthogonal transform unit 919. Moreover, the base layer image encoding unit 901 includes a calculation unit 920, a loop filter 921, a frame memory 922, a selection unit 923, an intra prediction unit 924, an inter prediction unit 925, a predicted image selection unit 926, and a rate control unit 927.

The A/D converter 911 is a process unit similar to the A/D converter 111 (FIG. 10) of the base layer image encoding unit 103. The screen rearrangement buffer 912 is a process unit similar to the screen rearrangement buffer 112 (FIG. 10) of the base layer image encoding unit 103. The calculation unit 913 is a process unit similar to the calculation unit 113 (FIG. 10) of the base layer image encoding unit 103. The orthogonal transform unit 914 is a process unit similar to the orthogonal transform unit 114 (FIG. 10) of the base layer image encoding unit 103. The quantization unit 915 is a process unit similar to the quantization unit 115 (FIG. 10) of the base layer image encoding unit 103. The lossless encoding unit 916 is a process unit similar to the lossless encoding unit 116 (FIG. 10) of the base layer image encoding unit 103. The accumulation buffer 917 is a process unit similar to the accumulation buffer 117 (FIG. 10) of the base layer image encoding unit 103.

The inverse quantization unit 918 is a process unit similar to the inverse quantization unit 118 (FIG. 10) of the base layer image encoding unit 103. The inverse orthogonal transform unit 919 is a process unit similar to the inverse orthogonal transform unit 119 (FIG. 10) of the base layer image encoding unit 103. The calculation unit 920 is a process unit similar to the calculation unit 120 (FIG. 10) of the base layer image encoding unit 103. The loop filter 921 is a process unit similar to the loop filter 121 (FIG. 10) of the base layer image encoding unit 103.

The frame memory 922 is a process unit similar to the frame memory 122 (FIG. 10) of the base layer image encoding unit 103. However, the frame memory 922 supplies the stored decoded image (also referred to as base layer decoded image) to the enhancement layer image encoding unit 902.

The selection unit 923 is a process unit similar to the selection unit 123 (FIG. 10) of the base layer image encoding unit 103.

The intra prediction unit 924 is a process unit similar to the intra prediction unit 124 (FIG. 10) of the base layer image encoding unit 103. The intra prediction unit 924 performs the in-screen prediction (also referred to as intra prediction) for each predetermined block (in the unit of block) for the current picture as the image of the frame to be processed, and generates the predicted image. In the case of the intra prediction, the pixel values of the processed pixels (also referred to as peripheral pixels) located spatially around the current block to be processed (i.e., located around the current block in the current picture) are used as the reference image used in the prediction. The intra prediction unit 924 acquires the reference image from the reconstructed image stored in the frame memory 922 (through the selection unit 923).

In this intra prediction (i.e., way of generating the predicted image), there are a plurality of methods (also referred to as intra prediction modes) prepared in advance as candidates. The intra prediction unit 924 performs the intra prediction in all the prepared intra prediction modes. Then, the intra prediction unit 924 calculates the cost function value of the predicted image of all the generated intra prediction modes using the input image supplied from the screen rearrangement buffer 912, and selects the optimum mode based on the cost function value.

Upon the selection of the optimum intra prediction mode, the intra prediction unit 924 supplies the predicted image generated in the optimum mode to the predicted image selection unit 926. Then, the intra prediction unit 924 supplies the intra prediction mode information, etc. representing the employed intra prediction mode to the lossless encoding unit 916 as appropriate where the information is encoded.

The inter prediction unit 925 is a process unit similar to the motion prediction/compensation unit 125 (FIG. 10) of the base layer image encoding unit 103. The inter prediction unit 925 performs the inter-screen prediction (also referred to as inter prediction) for every predetermined block (in the unit of block) for the current picture, and generates the predicted image. In the case of the inter prediction, the pixel values of the processed pixels located temporally around the current block to be processed (i.e., of the block located corresponding to the current block in the picture different from the current picture) are used as the reference image used in the prediction. The inter prediction unit 925 acquires the reference image from the reconstructed image stored in the frame memory 922 (through the selection unit 923).

The inter prediction is composed of the motion prediction and the motion compensation. The inter prediction unit 925 performs the motion prediction for the current block using the image data (input image) of the current block supplied from the screen rearrangement buffer 912 and the image data of the reference image supplied as the reference image from the frame memory 922, and detects the motion vector. Then, the inter prediction unit 925 performs the motion compensation process in accordance with the detected motion vector using the reference image, and generates the predicted image of the current block.

In the inter prediction (i.e., way of generating the predicted image), a plurality of methods (also referred to as inter prediction modes) is prepared in advance as candidates. The inter prediction unit 925 performs the inter prediction in all the prepared inter prediction modes. The inter prediction unit 925 performs the inter prediction in all the prepared inter prediction modes. The inter prediction unit 925 calculates the cost function values of the predicted images of all the generated inter prediction modes with the use of the input image supplied from the screen rearrangement buffer 912 or the information of the generated differential motion vector, and selects the optimum mode based on the cost function values.

Upon the selection of the optimum inter prediction mode, the inter prediction unit 925 supplies the predicted image generated in the optimum mode to the predicted image selection unit 926. When the information representing the employed inter prediction mode or the encoded data are decoded, the inter prediction unit 925 supplies the information necessary in the process in the inter prediction mode to the lossless encoding unit 916 where the information is encoded. The necessary information corresponds to, for example, the information of the generated differential motion vector or the flag representing the index of the predicted motion vector as the prediction motion vector information.

The predicted image selection unit 926 is a process unit similar to the predicted image selection unit 126 (FIG. 10) of the base layer image encoding unit 103. The rate control unit 927 is a process unit similar to the rate control unit 127 (FIG. 10) of the base layer image encoding unit 103.

Note that the base layer image encoding unit 901 encodes without referring to the other layers. In other words, the intra prediction unit 924 and the inter prediction unit 925 do not use the decoded images of the other layers as the reference image.

<Enhancement Layer Image Encoding Unit>

Figure 64:
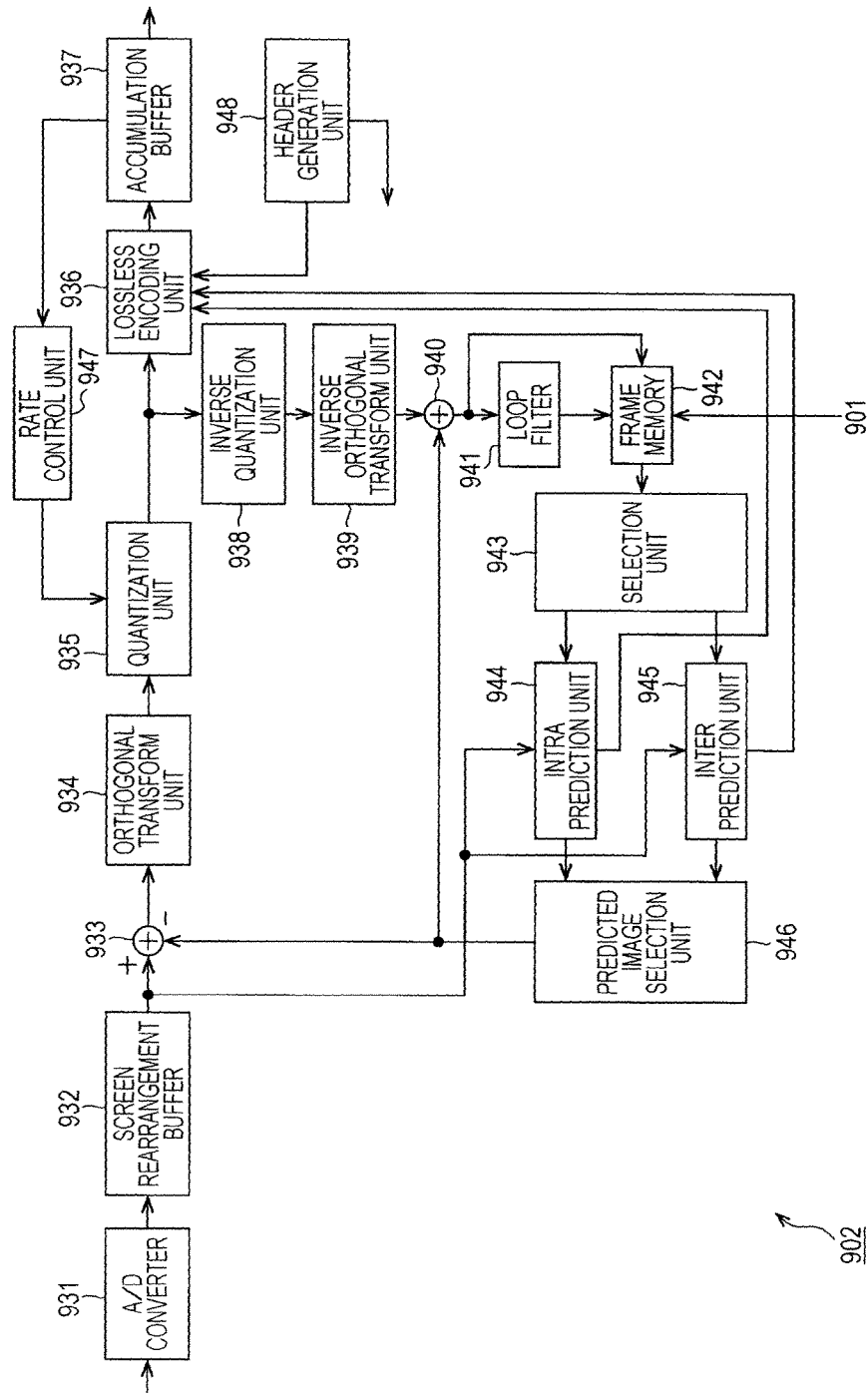
FIG. 64 is a block diagram illustrating an example of a main structure of an enhancement layer image encoding unit.

FIG. 64 is a block diagram illustrating an example of a main structure of the enhancement layer image encoding unit 902 of FIG. 62. As illustrated in FIG. 64, the enhancement layer image encoding unit 902 has a structure basically similar to the base layer image encoding unit 901 of FIG. 63.

In other words, the enhancement layer image encoding unit 902 includes, as illustrated in FIG. 64, an A/D converter 931, a screen rearrangement buffer 932, a calculation unit 933, an orthogonal transform unit 934, a quantization unit 935, a lossless encoding unit 936, an accumulation buffer 937, an inverse quantization unit 938, and an inverse orthogonal transform unit 939. The enhancement layer image encoding unit 902 further includes a calculation unit 940, a loop filter 941, a frame memory 942, a selection unit 943, an intra prediction unit 944, an inter prediction unit 945, a predicted image selection unit 946, and a rate control unit 947.

The A/D converter 931 to the rate control unit 947 correspond to the A/D converter 911 to the rate control unit 927 of FIG. 63, respectively and perform the process of the corresponding process units. However, each unit of the enhancement layer image encoding unit 902 performs the process to encode the image information of not the base layer but the enhancement layer. Therefore, although the description on the A/D converter 911 to the rate control unit 927 of FIG. 63 can apply to the A/D converter 931 to the rate control unit 947, the data to be processed in that case need to be the data of the enhancement layer, not the base layer. Moreover, in that case, the process unit from which the data are input or to which the data are output needs to be replaced by the corresponding process unit in the A/D converter 931 to the rate control unit 947.

Note that the enhancement layer image encoding unit 902 performs the encoding with reference to the information of the other layer (for example, base layer). The enhancement layer image encoding unit 902 performs the above process in <10. Summary 3>.

For example, the frame memory 942 can store a plurality of reference frames, and not just stores the decoded image of the enhancement layer (also referred to as enhancement layer decoded image) but also acquires the base layer decoded image from the base layer image encoding unit 901 and stores the image as the long-term reference frame. On this occasion, the base layer decoded image stored in the frame memory 942 may be the image that has been up-sampled (for example, the frame memory 942 may up-sample the base layer decoded image supplied from the base layer image encoding unit 901 and store the up-sampled image).

In a manner similar to the case of the base layer image encoding unit 901, the image stored in the frame memory 942, i.e., the enhancement layer decoded image or the base layer decoded image is used as the reference image in the prediction process by the intra prediction unit 944 or the inter prediction unit 945.

In other words, the intra prediction unit 944 has the texture BL (texture BL) mode as one candidate of the intra prediction. In the case of the texture BL mode, not the current picture of the enhancement layer but the current picture decoded image of the base layer is used as the reference image. In other words, the intra prediction unit 944 acquires the pixel value of the block (also referred to as collocated block) of the current picture of the base layer, which corresponds to the current block of the enhancement layer, from the long-term reference frame of the frame memory 942 (through the selection unit 943), and performs the intra prediction using the pixel value as the reference image.

Then, the intra prediction unit 944 calculates and evaluates the cost function value in a manner similar to the other intra prediction modes. In other words, the intra prediction unit 944 selects the optimum intra prediction mode from among all the candidates of the intra prediction modes including the texture BL mode.

Similarly, the inter prediction unit 945 has the reference index (Ref_idx) mode as one candidate of the inter prediction. In the case of the reference index mode, the decoded image of not the picture of the enhancement layer but the picture of the base layer is used as the reference image. In other words, the inter prediction unit 945 acquires the base layer decoded image stored in the long-term reference frame of the frame memory 942 as the reference image, and performs the inter prediction (motion prediction or motion compensation) using the image.

Then, the inter prediction unit 945 calculates and evaluates the cost function value in a manner similar to the inter prediction mode. In other words, the inter prediction unit 945 selects the optimum inter prediction mode from among all the candidates of the inter prediction modes including the reference index mode.

Incidentally, as illustrated in FIG. 64, the enhancement layer image encoding unit 902 further includes a header generation unit 948.

The header generation unit 948 generates, for example, the header information such as the sequence parameter set (SPS), the picture parameter set (PPS), and the slice header. On this occasion, the header generation unit 948 controls the value of the syntax used_by_curr_pic_lt_sps_flag[i] in regard to the long-term reference frame of the sequence parameter set (sep_parameter_set_rbsp) or the value of the syntax used_by_curr_pic_lt_flag[i] in regard to the long-term reference frame of the slice header (slice_segment_header).

For example, the header generation unit 948 sets the value of the syntax used_by_curr_pic_lt_sps_flag[i] or the syntax used_by_curr_pic_lt_flag[i] to "0" relative to the picture for which the inter-layer texture prediction is prohibited. In addition, the header generation unit 948 sets the value of the syntax used_by_curr_pic_lt_sps_flag[i] or the syntax used_by_curr_pic_lt_flag[i] to "1" relative to the picture for which the inter-layer texture prediction is allowed.

The header generation unit 948 supplies the thusly generated header information to the lossless encoding unit 936. The lossless encoding unit 936 encodes the header information supplied from the header generation unit 948, supplies the header information with the information contained in the encoded data (encoded stream) to the accumulation buffer 117, and transmits the data to the decoding side.

In addition, the header generation unit 948 supplies the thusly generated header information to each process unit of the enhancement layer image encoding unit 902 as appropriate. Each process unit of the enhancement layer image encoding unit 902 performs the process in accordance with the header information as appropriate.

The intra prediction unit 944 performs the intra prediction in accordance with the value of the syntax used_by_curr_pic_lt_sps_flag[i] or the syntax used_by_curr_pic_lt_flag[i] set by the header generation unit 948. For example, if the value of the syntax used_by_curr_pic_lt_sps_flag[i] or the syntax used_by_curr_pic_lt_flag[i] is "0", the intra prediction unit 944 performs the intra prediction without the use of the texture BL mode. That is to say, for this picture, the base layer decoded image is not used in the intra prediction. In other words, the motion compensation for the inter-layer texture prediction is omitted in the intra prediction for this picture. On the contrary, in the case where the syntax used_by_curr_pic_lt_sps_flag[i] or the syntax used_by_curr_pic_lt_flag[i] is "1", the intra prediction unit 944 performs the intra prediction using the texture BL mode as one candidate.

The inter prediction unit 945 performs the inter prediction based on the value of the syntax used_by_curr_pic_lt_sps_flag[i] or the syntax used_by_curr_pic_lt_flag[i] set by the header generation unit 948. For example, in the case where the value of the syntax used_by_curr_pic_lt_sps_flag[i] or the syntax used_by_curr_pic_lt_flag[i] is "0", the inter prediction unit 945 performs the inter prediction without using the reference index mode. In other words, for this picture, the base layer decoded image is not used in the inter prediction. In the inter prediction for this picture, the motion compensation for the inter-layer texture prediction is omitted. On the contrary, if the value of the syntax used_by_curr_pic_lt_sps_flag[i] or the syntax used_by_curr_pic_lt_flag[i] is "1", the inter prediction unit 945 performs the inter prediction using the reference index mode as one candidate.

In this manner, the image encoding device 900 can control the execution of the inter-layer texture prediction in the decoding process of the enhancement layer for every picture by controlling the value of the syntax for the long-term reference frame, performing the intra prediction or the inter prediction based on the value of the syntax, and further transmitting the value of the syntax to the decoding side. In other words, the image encoding device 900 can control the execution of the motion compensation of each layer in the decoding process as appropriate, thereby suppressing the increase in load in the decoding process.

<Flow of Image Encoding Process>

Next, the flow of each process to be executed by the image encoding device 900 as above is described. First, an example of the flow of the image encoding process is described with reference to the flowchart of FIG. 65.

Upon the start of the image encoding process, in step S901, the base layer image encoding unit 901 of the image encoding device 900 encodes the image data of the base layer.

In step S902, the header generation unit 948 of the enhancement layer image encoding unit 902 generates the sequence parameter set of the enhancement layer.

In step S903, the enhancement layer image encoding unit 902 encodes the image data of the enhancement layer using the sequence parameter set generated in step S902.

In step S904, the multiplexer 903 multiplexes the base layer image encoded stream generated by the process of step S901 and the enhancement layer image encoded stream generated by the process of step S903 (i.e., the encoded streams of the layers), thereby generating one system of layered image encoded stream.

Upon the end of the process of step S904, the image encoding process ends.

Note that the header generation unit 948 generates the header information other than the sequence parameter set; however, the description thereto is omitted except the slice header to be described below. Moreover, the base layer image encoding unit 901 (for example, lossless encoding unit 916) generates the header information such as the sequence parameter set, the picture parameter set and the slice header but the description thereto is omitted.

Each process of step S901, step S903, and step S904 is executed for each picture. The process of step S902 is executed for each sequence.

<Flow of Base Layer Encoding Process>

Figure 65:
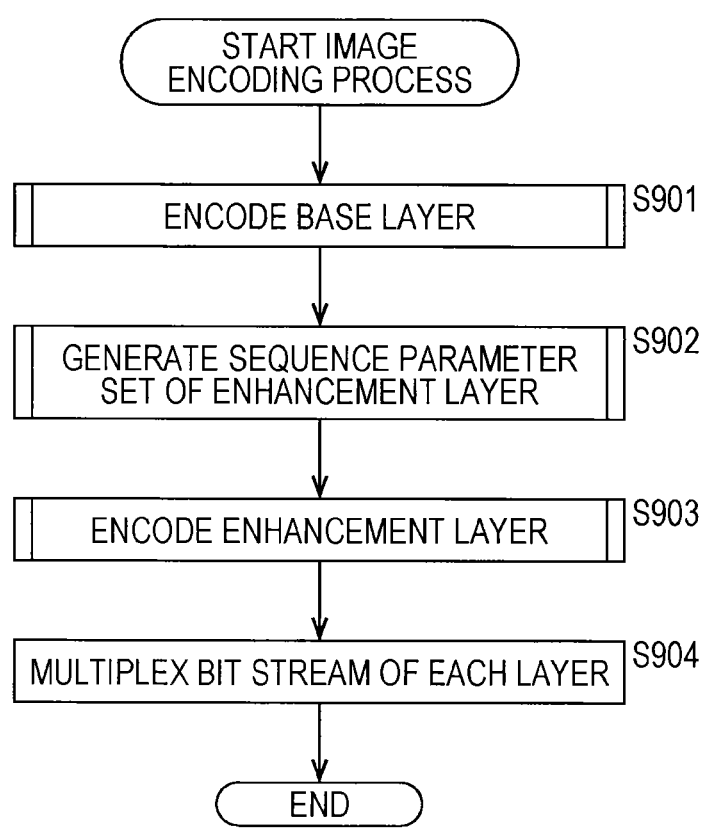
FIG. 65 is a flowchart for describing an example of the flow of the image encoding process.
Figure 66:
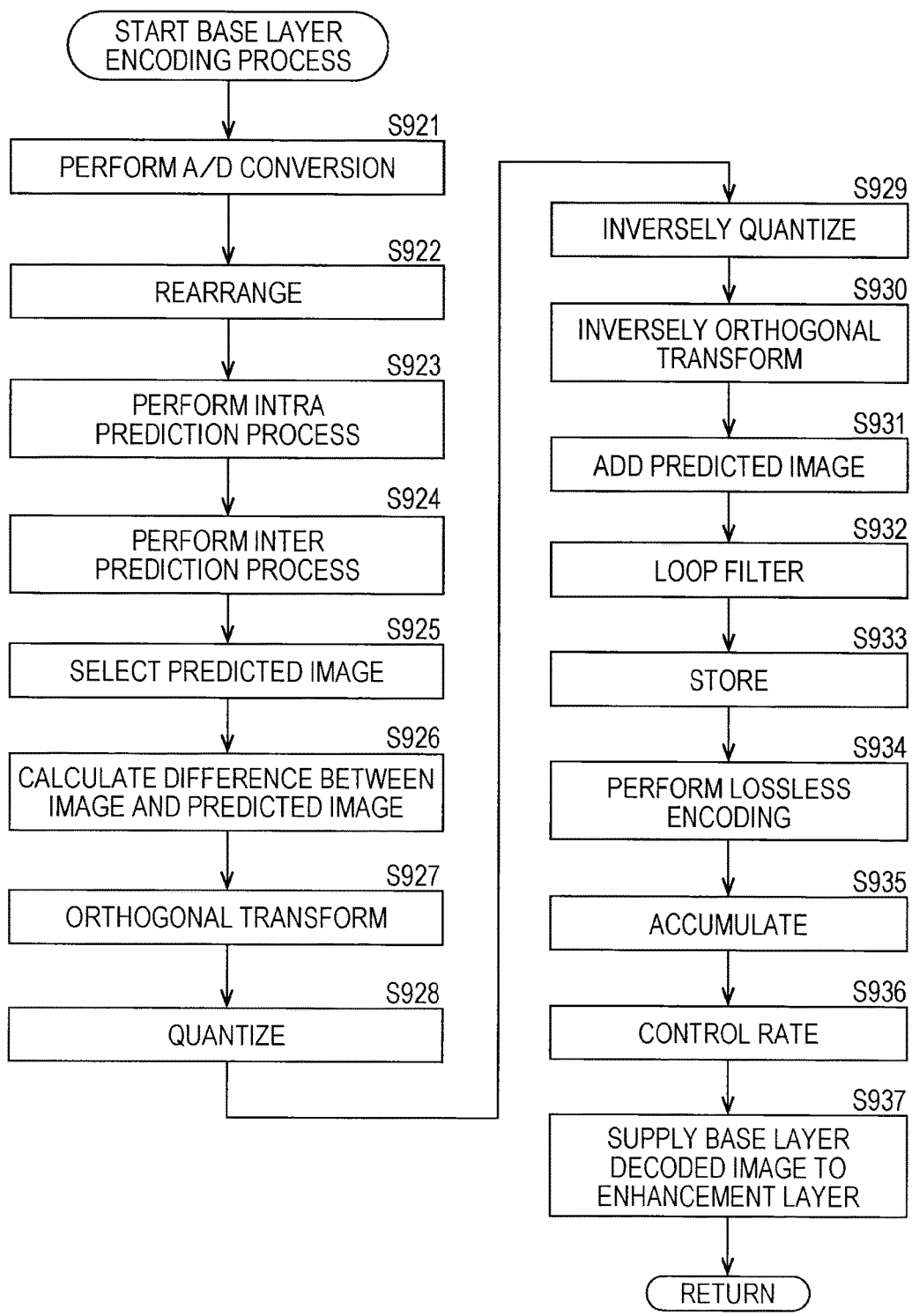
FIG. 66 is a flowchart for describing an example of the flow of the base layer encoding process.

Next, an example of the flow of the base layer encoding process to be executed in step S901 of FIG. 65 is described with reference to the flowchart of FIG. 66.

Upon the start of the base layer encoding process, each process in step S921 to step S923 is executed in a manner similar to each process in step S141 to step S143 of FIG. 15.

In step S924, the inter prediction unit 925 performs the inter prediction process in which the motion compensation or the motion prediction in the inter prediction mode is performed.

Each process in step S925 to step S933 is executed in a manner similar to each process in step S145 to step S153 in FIG. 15. Each process in step S934 to step S936 is executed in a manner similar to each process in step S155 to step S157 in FIG. 15.

In step S937, the frame memory 922 supplies the decoded image of the base layer obtained in the base layer encoding process as above to the encoding process for the enhancement layer.

Upon the end of the process of step S937, the base layer encoding process ends and the process returns to FIG. 65.

<Flow of Sequence Parameter Set Generation Process>

Next, an example of the flow of the sequence parameter set generation process executed in step S902 of FIG. 65 is described with reference to the flowchart of FIG. 67.

Upon the start of the sequence parameter set generation process, the header generation unit 948 of the enhancement layer image encoding unit 902 sets the syntax used_by_curr_pic_lt_sps_flag[i] in regard to the long-term reference frame in step S941.

In step S942, the header generation unit 948 sets the values of other syntaxes, and generates the sequence parameter set including those syntaxes and the syntax used_by_curr_pic_lt_sps_flag[i] set in step S941.

Upon the end of the process in step S942, the sequence parameter set generation process ends and the process returns to FIG. 65.

<Flow of Enhancement Layer Encoding Process>

Next, an example of the flow of the enhancement layer encoding process to be executed in step S903 of FIG. 65 is described with reference to the flowchart of FIG. 68.

Upon the start of the enhancement layer encoding process, each process in step S951 and step S952 is executed in a manner similar to each process in step S191 and step S192 of FIG. 17.

In step S953, the header generation unit 948 sets the syntax used_by_curr_pic_lt_flag[i] in regard to the long-term reference frame.

In step S954, the header generation unit 948 sets the values of other syntaxes, and generates the slice header including those syntaxes and the syntax used_by_curr_pic_lt_flag[i] set in step S953.

In step S955, the intra prediction unit 944 performs the intra prediction process.

In step S956, the inter prediction unit 945 performs the inter prediction process.

Each process in step S957 to step S968 is executed in a manner similar to each process in step S195 to step S206 in FIG. 17.

Upon the end of the process in step S968, the enhancement layer encoding process ends and the process returns to FIG. 65.

<Flow of Intra Prediction Process>

Figure 68:
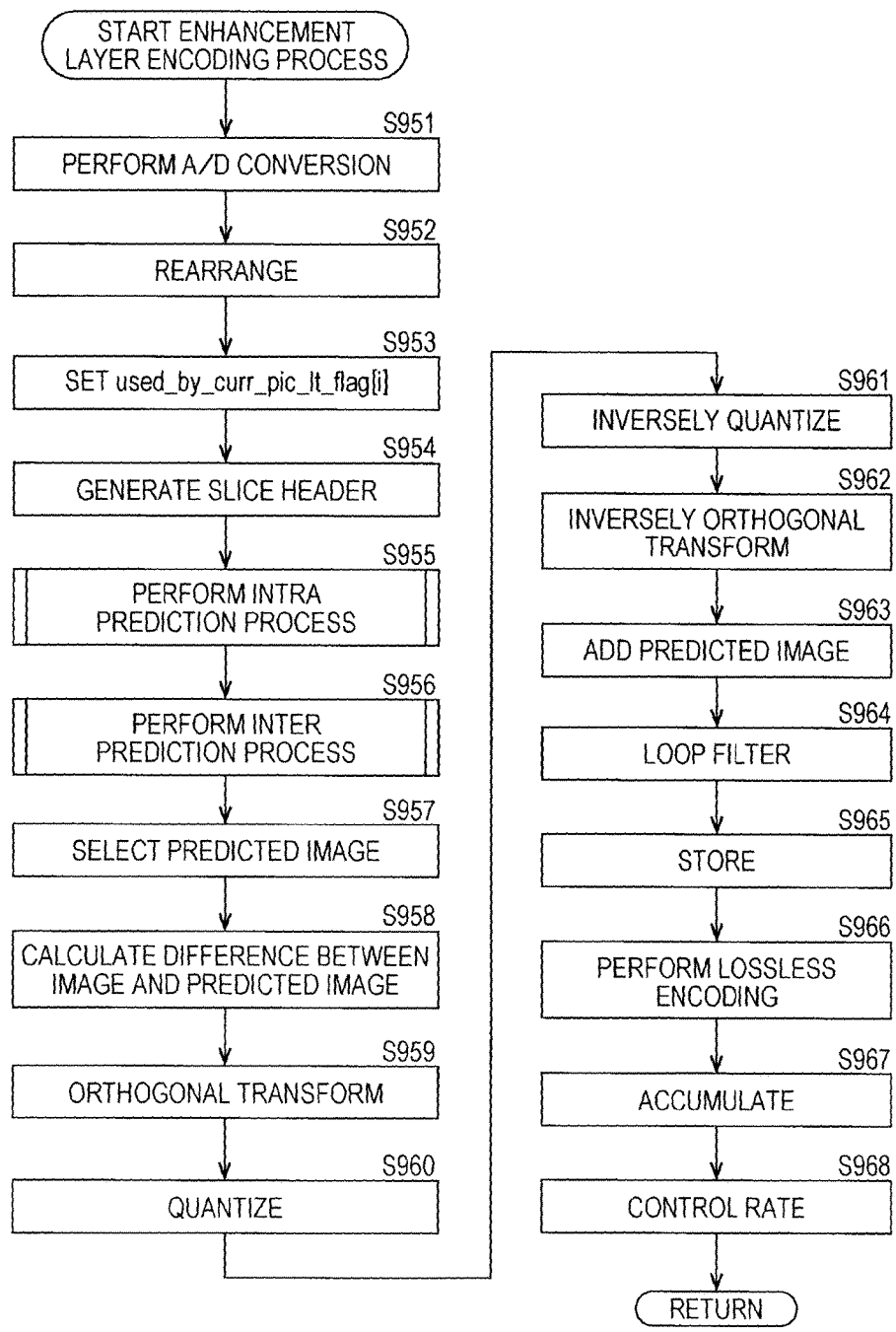
FIG. 68 is a flowchart for describing an example of the flow of the enhancement layer encoding process.
Figure 69:
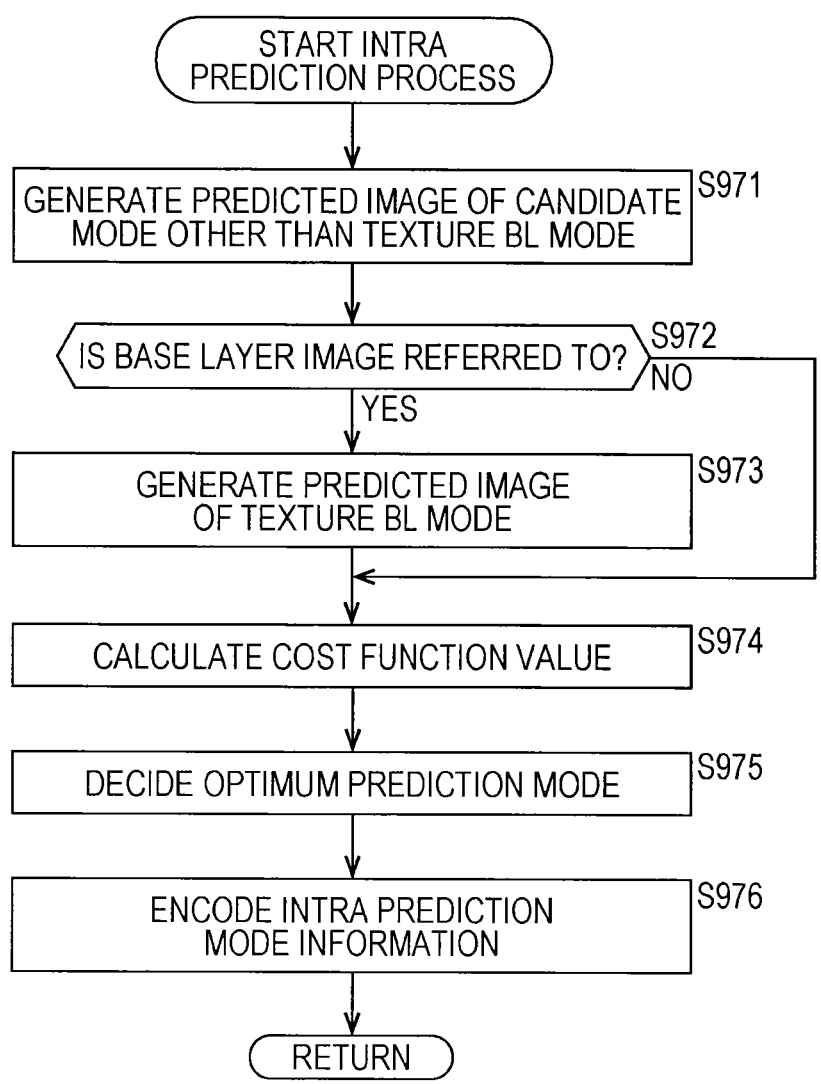
FIG. 69 is a flowchart for describing an example of the flow of the intra prediction process.

Next, an example of the flow of the intra prediction process to be executed in step S955 of FIG. 68 is described with reference to the flowchart of FIG. 69.

Upon the start of the intra prediction process, the intra prediction unit 944 generates the predicted image in each mode by performing the intra prediction in each candidate mode other than the texture BL mode in step S971.

Figure 67:
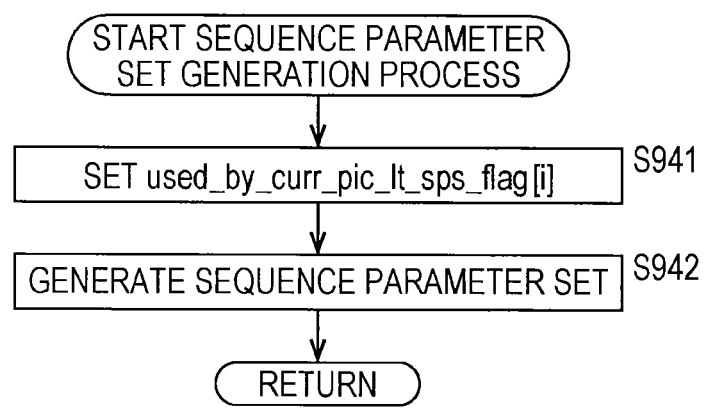
FIG. 67 is a flowchart for describing an example of the flow of the sequence parameter set generation process.

In step S972, the intra prediction unit 944 determines whether the image of the base layer is referred to, on the basis of the syntax used_by_curr_pic_lt_sps_flag[i] of the sequence parameter set (sep_parameter_set_rbsp) set in step S941 of FIG. 67 and the syntax used_by_curr_pic_lt_flag[i] of the slice header (slice_segment_header) set in step S953 of FIG. 68.

For example, if the values of those syntaxes are set to "1" and it has been determined that the image of the base layer is referred to, the process advances to step S973. In step S973, the intra prediction unit 944 performs the intra prediction in the texture BL mode and generates the predicted image of the texture BL mode. Upon the generation of the predicted image in the texture BL mode, the process advances to step S974. If the values of those syntaxes are set to "0" and it has been determined that the image of the base layer is not referred to in step S972, the process advances to step S974.

In step S974, the intra prediction unit 944 calculates the cost function value of the predicted image in each intra prediction mode. In step S975, the intra prediction unit 944 decides the optimum prediction mode using the cost function value calculated in step S974. In step S976, the intra prediction unit 944 encodes the intra prediction mode information, which is the information related to the intra prediction mode decided as the optimum prediction mode in step S975, and supplies the information to the lossless encoding unit 936.

Upon the end of the process in step S976, the intra prediction process ends and the process returns to FIG. 68.

<Flow of Inter Prediction Process>

Figure 70:
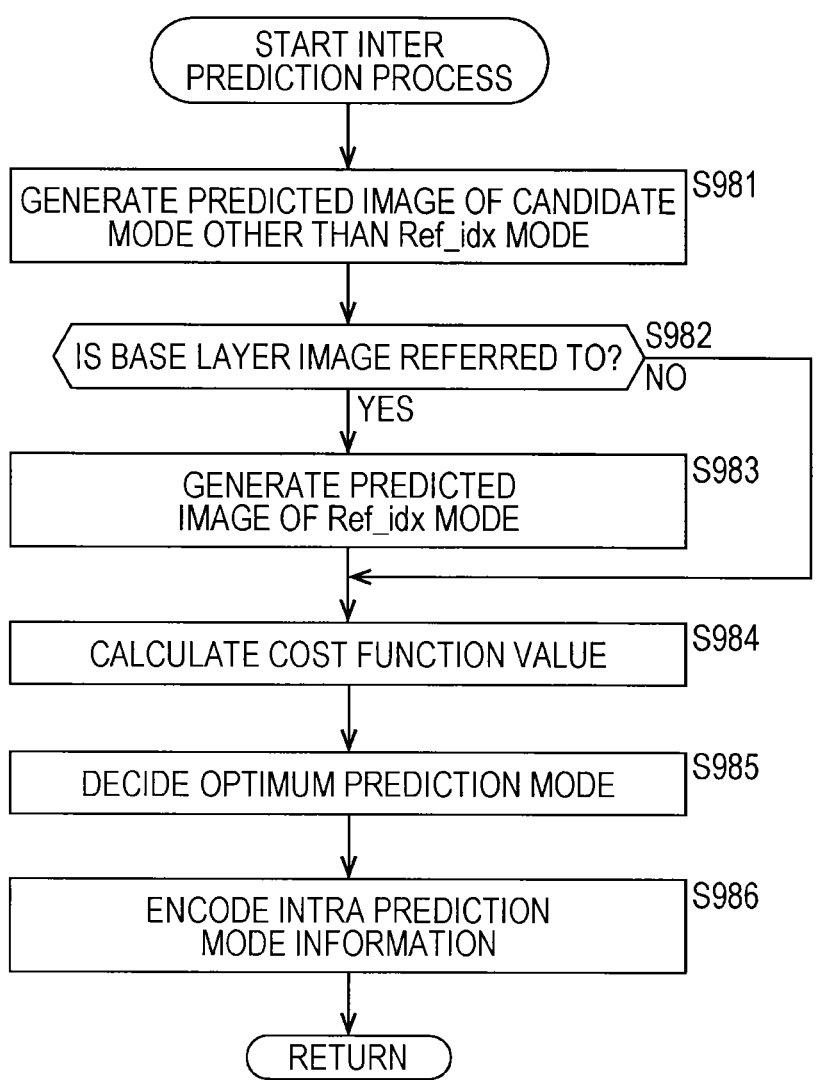
FIG. 70 is a flowchart for describing an example of the flow of the inter prediction process.

Next, an example of the flow of the inter prediction process to be executed in step S956 of FIG. 68 is described with reference to the flowchart of FIG. 70.

Upon the start of the inter prediction process, the inter prediction unit 945 performs the inter prediction in each candidate mode other than the reference index mode in step S981, and generates the predicted image in each mode.

In step S982, the inter prediction unit 945 determines whether the image of the base layer is referred to, on the basis of the syntax used_by_curr_pic_lt_sps_flag[i] of the sequence parameter set (sep_parameter_set_rbsp) set in step S941 of FIG. 67 and the syntax used_by_curr_pic_lt_flag[i] of the slice header (slice_segment_header) set in step S953 of FIG. 68.

For example, if the values of those syntaxes are set to "1" and it has been determined that the image of the base layer is referred to, the process advances to step S983. In step S983, the inter prediction unit 945 performs the inter prediction in the reference index mode and generates the predicted image of the reference index mode. Upon the generation of the predicted image in the reference index mode, the process advances to step S984. If the values of those syntaxes are set to "0" and it has been determined that the image of the base layer is not referred to in step S982, the process advances to step S984.

In step S984, the inter prediction unit 945 calculates the cost function value of the predicted image in each inter prediction mode. In step S985, the inter prediction unit 945 decides the optimum prediction mode using the cost function value calculated in step S984. In step S986, the inter prediction unit 945 encodes the inter prediction mode information, which is the information related to the inter prediction mode decided as the optimum prediction mode in step S985, and supplies the information to the lossless encoding unit 936.

Upon the end of the process in step S986, the inter prediction process ends and the process returns to FIG. 68.

By executing each process as above, the image encoding device 900 (enhancement layer image encoding unit 902) can control the execution of the motion compensation of each layer in the decoding process as appropriate, thereby suppressing the increase in load of the decoding process.

<12. Tenth Embodiment>
<Image Decoding Device>

Figure 71:
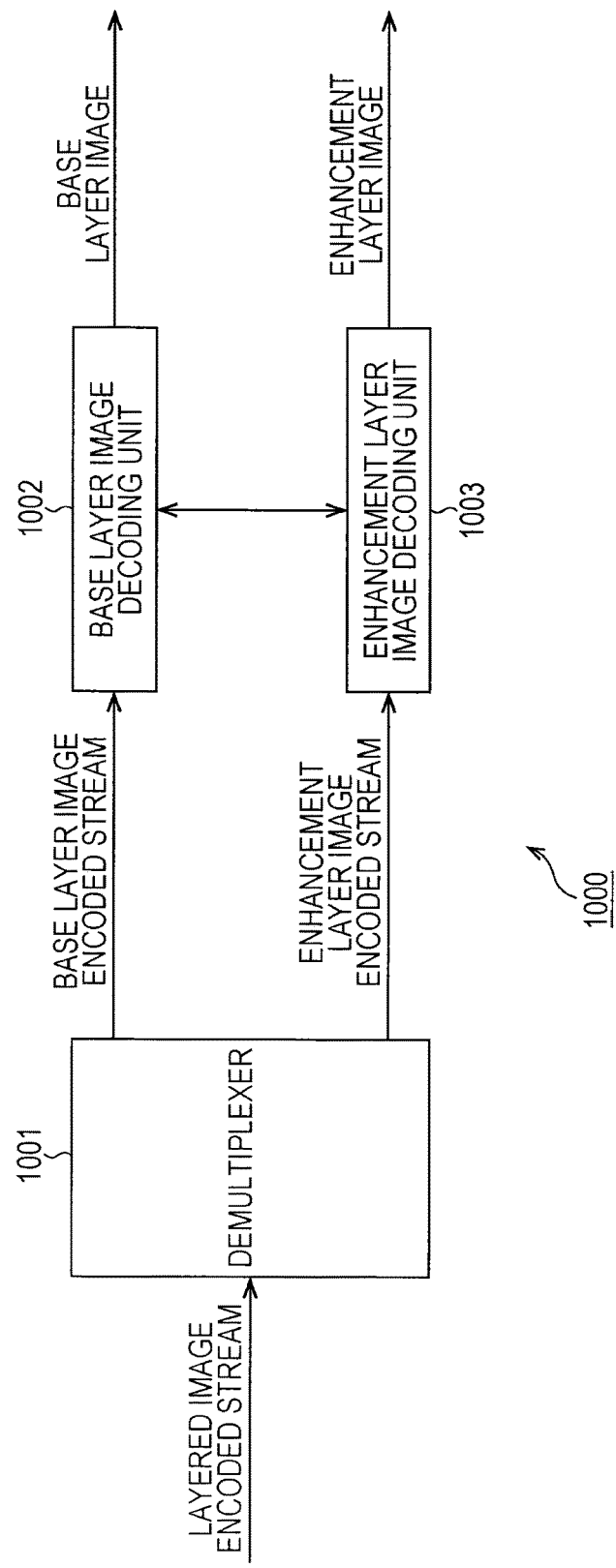
FIG. 71 is a block diagram illustrating an example of a main structure of an image decoding device.

Next, the decoding of the aforementioned encoded data is described. FIG. 71 is a block diagram illustrating an example of a main structure of an image decoding device corresponding to the image encoding device 900 of FIG. 62, which is an aspect of the image processing device to which the present technique has been applied. An image decoding device 1000 illustrated in FIG. 71 decodes the encoded data generated by the image encoding device 900 by a decoding method corresponding to the encoding method (i.e., the encoded data that have been subjected to layer encoding are subjected to layer decoding). This image decoding device 1000 is an image processing device basically similar to the scalable decoding device 200 of FIG. 19; however, for the convenience of description, the description on the components that are not directly relevant to the present technique described in <10. Summary 3> (such as the common information acquisition unit 201, the decoding control unit 202, and the inter-layer prediction control unit 204) is omitted.

As illustrated in FIG. 71, the image decoding device 1000 includes a demultiplexer 1001, a base layer image decoding unit 1002, and an enhancement layer image decoding unit 1003.

The demultiplexer 1001 receives the layered image encoded stream in which the base layer image encoded stream and the enhancement layer image encoded stream are multiplexed and which has been transmitted from the encoding side, demultiplexes the stream, and extracts the base layer image encoded stream and the enhancement layer image encoded stream. The base layer image decoding unit 1002 is a process unit basically similar to the base layer image decoding unit 203 (FIG. 19) and decodes the base layer image encoded stream extracted by the demultiplexer 1001 and provides the base layer image. The enhancement layer image decoding unit 1003 is a process unit basically similar to the enhancement layer image decoding unit 205 (FIG. 19) and decodes enhancement layer image encoded stream extracted by the demultiplexer 1001, and provides the enhancement layer image.

The base layer image decoding unit 1002 supplies the base layer decoded image obtained by the decoding of the base layer to the enhancement layer image decoding unit 1003.

The enhancement layer image decoding unit 1003 acquires the base layer decoded image supplied from the base layer image decoding unit 1002 and stores the image. The enhancement layer image decoding unit 1003 uses the stored base layer decoded image as the reference image in the prediction process in the decoding of the enhancement layer.

<Base Layer Image Decoding Unit>

Figure 72:
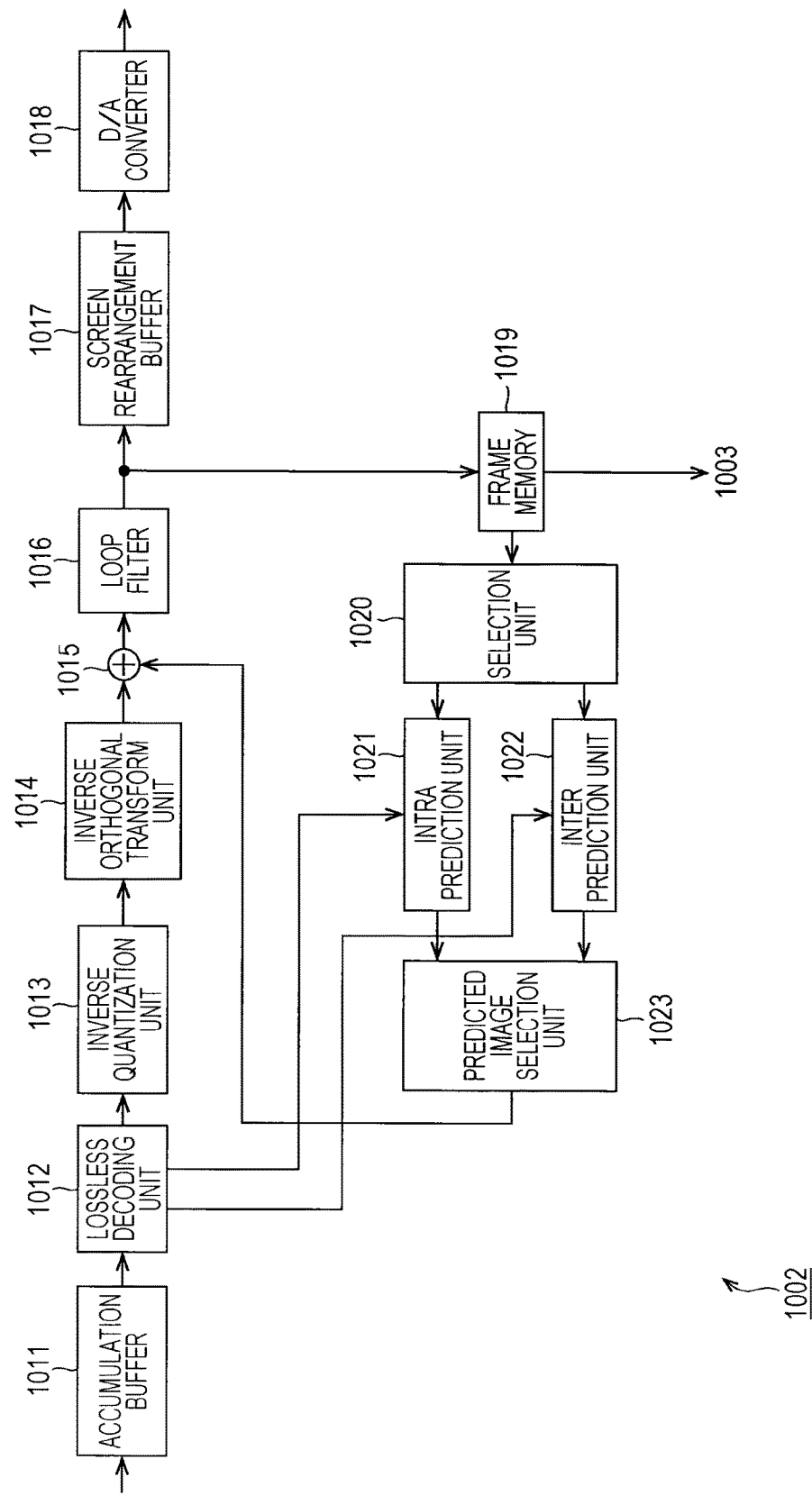
FIG. 72 is a block diagram illustrating an example of a main structure of a base layer image decoding unit.

FIG. 72 is a block diagram illustrating an example of a main structure of the base layer image decoding unit 1002 of FIG. 71. As illustrated in FIG. 72, the base layer image decoding unit 1002 includes an accumulation buffer 1011, a lossless decoding unit 1012, an inverse quantization unit 1013, an inverse orthogonal transform unit 1014, a calculation unit 1015, a loop filter 1016, a screen rearrangement buffer 1017, and a D/A converter 1018. The base layer image decoding unit 1002 further includes a frame memory 1019, a selection unit 1020, an intra prediction unit 1021, an inter prediction unit 1022, and a predicted image selection unit 1023.

The accumulation buffer 1011 is a process unit similar to the accumulation buffer 211 (FIG. 20) of the base layer image decoding unit 203. The lossless decoding unit 1012 is a process unit similar to the lossless decoding unit 212 (FIG. 20) of the base layer image decoding unit 203. The inverse quantization unit 1013 is a process unit similar to the inverse quantization unit 213 (FIG. 20) of the base layer image decoding unit 203. The inverse orthogonal transform unit 1014 is a process unit similar to the inverse orthogonal transform unit 214 (FIG. 20) of the base layer image decoding unit 203. The calculation unit 1015 is a process unit similar to the calculation unit 215 (FIG. 20) of the base layer image decoding unit 203. The loop filter 1016 is a process unit similar to the loop filter 216 (FIG. 20) of the base layer image decoding unit 203. The screen rearrangement buffer 1017 is a process unit similar to the screen rearrangement buffer 217 (FIG. 20) of the base layer image decoding unit 203. The D/A converter 1018 is a process unit similar to the D/A converter 218 (FIG. 20) of the base layer image decoding unit 203.

The frame memory 1019 is a process unit similar to the frame memory 219 (FIG. 20) of the base layer image decoding unit 203. However, the frame memory 1019 supplies the stored decoded image (also referred to as base layer decoded image) to the enhancement layer image decoding unit 1003.

The selection unit 1020 is a process unit similar to the selection unit 220 (FIG. 20) of the base layer image decoding unit 203.

To the intra prediction unit 1021, the intra prediction mode information and the like are supplied from the lossless decoding unit 1012 as appropriate. The intra prediction unit 1021 performs the intra prediction in the intra prediction mode (optimum intra prediction mode) used in the intra prediction in the encoding, and generates the predicted image for each predetermined block (in the unit of block). In this case, the intra prediction unit 1021 performs the intra prediction using the image data of the reconstructed image (image formed by summing up the predicted image selected by the predicted image selection unit 1023 and the decoded residual data (differential image information) from the inverse orthogonal transform unit 214 and subjected to the deblocking filter process as appropriate) supplied from the frame memory 1019 through the selection unit 1020. In other words, the intra prediction unit 1021 uses this reconstructed image as the reference image (peripheral pixels).

The intra prediction unit 1021 supplies the generated predicted image to the predicted image selection unit 1023.

To the inter prediction unit 1022, the optimum prediction mode information or the motion information is supplied from the lossless decoding unit 1012 as appropriate. The inter prediction unit 1022 performs the inter prediction in the inter prediction mode (optimum inter prediction mode) used in the inter prediction in the encoding, and generates the predicted image for each predetermined block (in the unit of block). On this occasion, the inter prediction unit 1022 uses the decoded image (reconstructed image subjected to the loop filtering process or the like) supplied from the frame memory 1019 through the selection unit 1020 as the reference image and performs the inter prediction. The inter prediction unit 1022 supplies the generated predicted image to the predicted image selection unit 1023.

The predicted image selection unit 1023 is a process unit similar to the selection unit 223 (FIG. 20) of the base layer image decoding unit 203.

Note that the base layer image decoding unit 1002 decodes without referring to the other layers. In other words, neither the intra prediction unit 1021 nor the inter prediction unit 1022 uses the decoded image of the other layers as the reference image.

<Enhancement Layer Image Decoding Unit>

Figure 73:
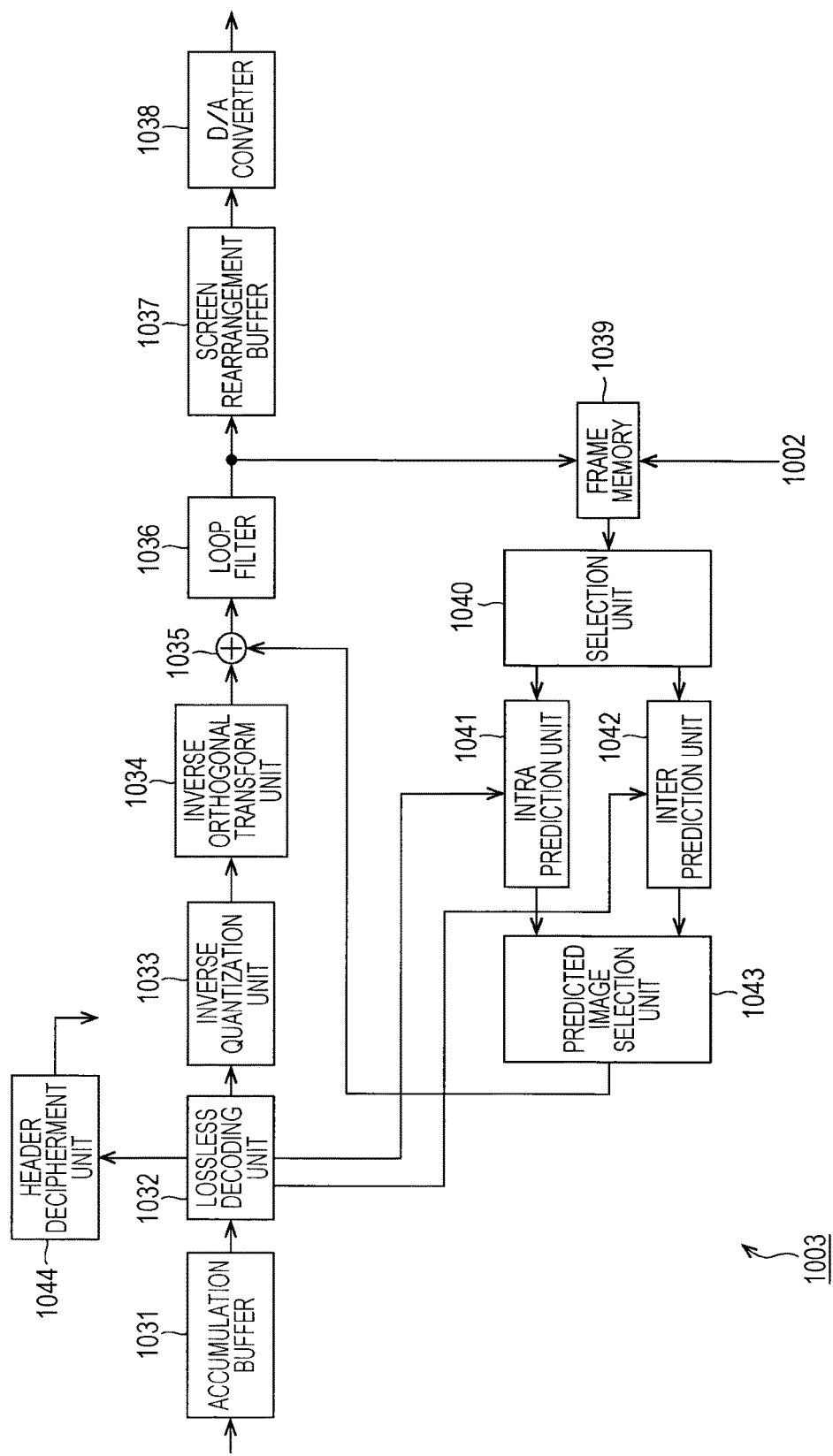
FIG. 73 is a block diagram illustrating an example of a main structure of an enhancement layer image decoding unit.

FIG. 73 is a block diagram illustrating an example of a main structure of the enhancement layer image decoding unit 1003 of FIG. 71. As illustrated in FIG. 73, the enhancement layer image decoding unit 1003 has a structure basically similar to the base layer image decoding unit 1002 of FIG. 72.

In other words, the enhancement layer image decoding unit 1003 includes, as illustrated in FIG. 73, an accumulation buffer 1031, a lossless decoding unit 1032, an inverse quantization unit 1033, an inverse orthogonal transform unit 1034, a calculation unit 1035, a loop filter 1036, a screen rearrangement buffer 1037, and a D/A converter 1038. The enhancement layer image decoding unit 1003 further includes a frame memory 1039, a selection unit 1040, an intra prediction unit 1041, an inter prediction unit 1042, and a predicted image selection unit 1043.

The accumulation buffer 1031 to the predicted image selection unit 1043 correspond to the accumulation buffer 1011 to the predicted image selection unit 1023 in FIG. 72, respectively and perform the process similar to the corresponding process units. Each unit of the enhancement layer image decoding unit 1003, however, performs the process to encode the image information of not the base layer but the enhancement layer. Therefore, the description on the accumulation buffer 1011 to the predicted image selection unit 1023 of FIG. 72 can apply to the process of the accumulation buffer 1031 to the predicted image selection unit 1043; however, in this case, the data to be processed in that case need to be the data of not the base layer but the enhancement layer. Moreover, the process unit from which the data are input or to which the data are output needs to be replaced by the corresponding process unit of the enhancement layer image decoding unit 1003.

Note that the enhancement layer image decoding unit 1003 performs the encoding with reference to the information of the other layers (for example, base layer). The enhancement layer image decoding unit 1003 performs the process described in <10. Summary 3>.

For example, the frame memory 1039 can store a plurality of reference frames, and not just stores the decoded image of the enhancement layer (also referred to as the enhancement layer decoded image) but also acquires the base layer decoded image from the base layer image decoding unit 1002 and stores the image as the long-term reference frame. In this case, the base layer decoded image stored in the frame memory 1039 may be the image subjected to the up-sample process (for example, the frame memory 1039 may up-sample and store the base layer decoded image supplied from the base layer image decoding unit 1002).

In a manner similar to the case of the base layer image decoding unit 1002, the image stored in the frame memory 1039, i.e., the enhancement layer decoded image or the base layer decoded image is used as the reference image in the prediction process by the intra prediction unit 1041 or the inter prediction unit 1042.

For example, if the texture BL (texture BL) mode is employed in the intra prediction in the encoding, the intra prediction unit 1041 performs the intra prediction by the texture BL mode. In other words, the intra prediction unit 1041 acquires the pixel value of the collocated block of the enhancement layer in the current picture of the base layer from the long-term reference frame of the frame memory 1039 (through the selection unit 1040), performs the intra prediction using the pixel value as the reference image, and generates the predicted image. The generated predicted image is supplied to the calculation unit 1035 through the predicted image selection unit 1043.

For example, if the reference index (Ref_idx) mode is employed in the inter prediction in the encoding, the inter prediction unit 1042 performs the inter prediction by the reference index (Ref_idx) mode. In other words, the inter prediction unit 1042 acquires the base layer decoded image stored in the long-term reference frame of the frame memory 1039, performs the inter prediction using the image as the reference image, and generates the predicted image. The generated predicted image is supplied to the calculation unit 1035 through the predicted image selection unit 1043.

As illustrated in FIG. 73, the enhancement layer image decoding unit 1003 further includes a header decipherment unit 1044.

The header decipherment unit 1044 deciphers the header information extracted by the lossless decoding unit, such as the sequence parameter set (SPS), the picture parameter set (PPS), or the slice header. On this occasion, the header decipherment unit 1044 deciphers the value of the syntax used_by_curr_pic_lt_sps_flag[i] in regard to the long-term reference frame of the sequence parameter set (sep_parameter_set_rbsp) or the syntax used_by_curr_pic_lt_flag[i] in regard to the long-term reference frame of the slice header (slice_segment_header).

The header decipherment unit 1044 controls the operation of each process unit of the enhancement layer image decoding unit 1003 based on the result of deciphering the header information. That is to say, each process unit of the enhancement layer image decoding unit 1003 performs the process in accordance with the header information as appropriate.

The intra prediction unit 1041 performs the intra prediction based on the value of the syntax used_by_curr_pic_lt_sps_flag[i] or the syntax used_by_curr_pic_lt_flag[i]. For example, if the value of the syntax used_by_curr_pic_lt_sps_flag[i] or the syntax used_by_curr_pic_lt_flag[i] is "0", the intra prediction unit 1041 performs the intra prediction in other mode than the texture BL mode for that picture. In other words, for this picture, the base layer decoded image is not used in the intra prediction. In other words, the motion compensation for the inter-layer texture prediction is omitted in the intra prediction for this picture. On the contrary, if the value of the syntax used_by_curr_pic_lt_sps_flag[i] or the syntax used_by_curr_pic_lt_flag[i] is "1" and the optimum intra prediction mode is the texture BL mode, the intra prediction unit 1041 performs the intra prediction in the texture BL mode.

The inter prediction unit 1042 performs the inter prediction based on the value of the syntax used_by_curr_pic_lt_sps_flag[i] or the syntax used_by_curr_pic_lt_flag[i]. For example, if the value of the syntax used_by_curr_pic_lt_sps_flag[i] or the syntax used_by_curr_pic_lt_flag[i] is "0", the inter prediction unit 1042 performs the inter prediction in other mode than the reference index mode for that picture. In other words, for this picture, the base layer decoded image is not used in the inter prediction. In other words, the motion compensation for the inter-layer texture prediction is omitted in the inter prediction for this picture. On the contrary, if the value of the syntax used_by_curr_pic_lt_sps_flag[i] or the syntax used_by_curr_pic_lt_flag[i] is "1" and the optimum inter prediction mode is the reference index mode, the inter prediction unit 1042 performs the inter prediction in the reference index mode.

In this manner, the image decoding device 1000 can control the execution of the inter-layer texture prediction for every picture in the process of decoding the enhancement layer by performing the intra prediction or the inter prediction based on the value of the syntax in regard to the long-term reference frame. In other words, the image decoding device 1000 can control the execution of the motion compensation of each layer in the decoding process, thereby suppressing the increase in load in the decoding process.

<Flow of Image Decoding Process>

Next, the flow of each process executed by the image decoding device 1000 as above is described. Next, an example of the flow of the image decoding process is described with reference to the flowchart of FIG. 74.

Upon the start of the image decoding process, the demultiplexer 1001 of the image decoding device 1000 demultiplexes the layered image encoded stream transmitted from the encoding side and generates the bit stream for every layer in step S1001.

In step S1002, the base layer image decoding unit 1002 decodes the base layer image encoded stream obtained by the process in step S1001. The base layer image decoding unit 1002 outputs the data of the base layer image generated by this decoding.

In step S1003, the header decipherment unit 1044 of the enhancement layer image decoding unit 1003 deciphers the sequence parameter set of the header information extracted from the enhancement layer image encoded stream obtained by the process in step S1001.

In step S1004, the enhancement layer image decoding unit 1003 decodes the enhancement layer image encoded stream obtained by the process in step S1001.

Upon the end of the process of step S1004, the image decoding process ends.

Note that the header decipherment unit 1044 also deciphers the header information other than the sequence parameter set; however, the description thereto is omitted except the slice header as described below. Moreover, the base layer image decoding unit 1002 (for example, the lossless decoding unit 1012) also deciphers the header information such as the sequence parameter set, the picture parameter set, or the slice header in regard to the base layer; however, the description thereto is omitted.

Each process in step S1001, step S1002, and step S1004 is executed for every picture. The process in step S1003 is executed for every sequence.

<Flow of Base Layer Decoding Process>

Figure 74:
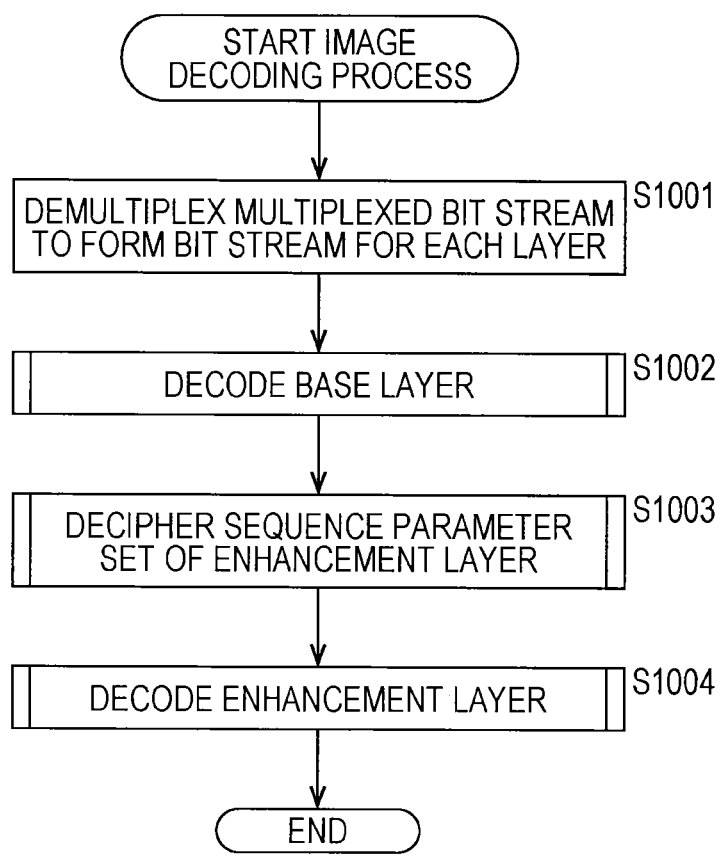
FIG. 74 is a flowchart for describing an example of the flow of the image decoding process.
Figure 75:
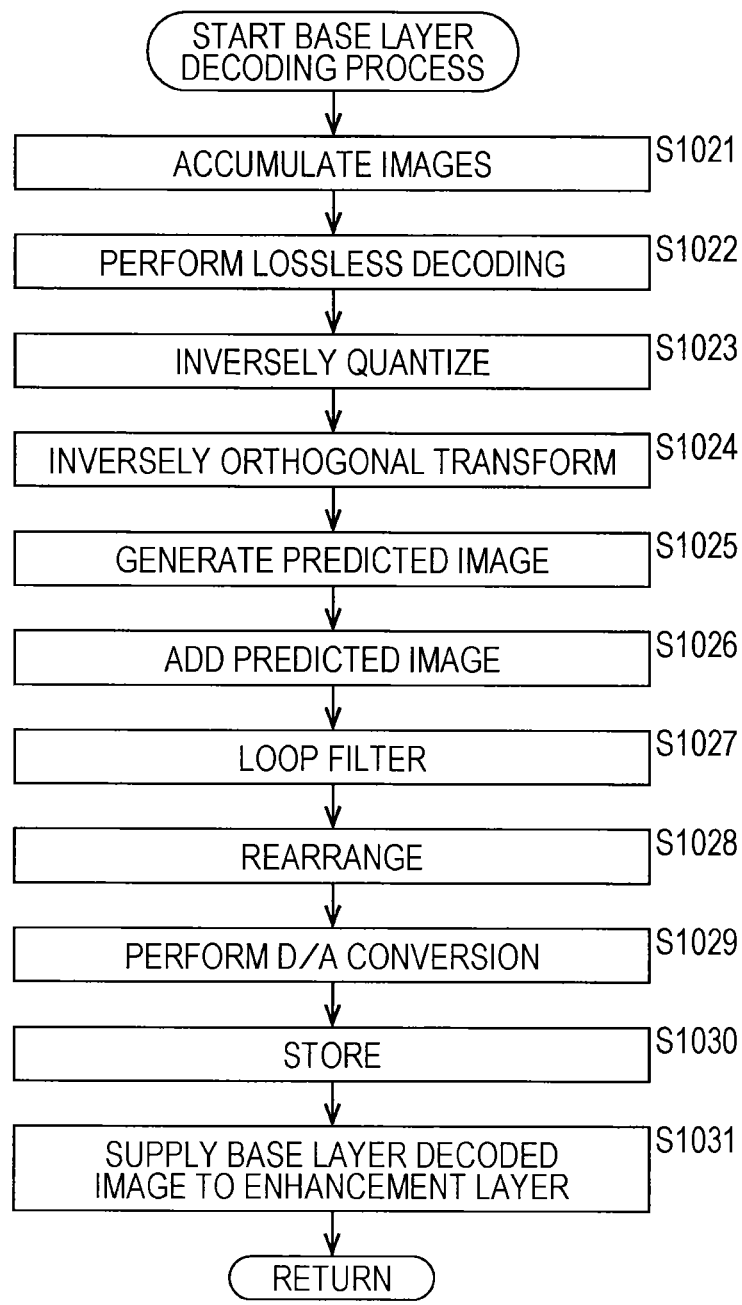
FIG. 75 is a flowchart for describing an example of the flow of the base layer decoding process.

Next, an example of the flow of the base layer decoding process to be executed in step S1002 of FIG. 74 is described with reference to the flowchart of FIG. 75.

Upon the start of the base layer decoding process, each process in step S1021 to step S1030 is executed in a manner similar to each process in step S341 to step S350 in FIG. 25.

In step S1031, the frame memory 1019 supplies the base layer decoded image obtained in the base layer decoding process as above to the decoding process of the enhancement layer.

Upon the end of the process of step S1031, the base layer decoding process ends and the process returns to FIG. 74.

<Flow of Sequence Parameter Set Decipherment Process>

Figure 76:
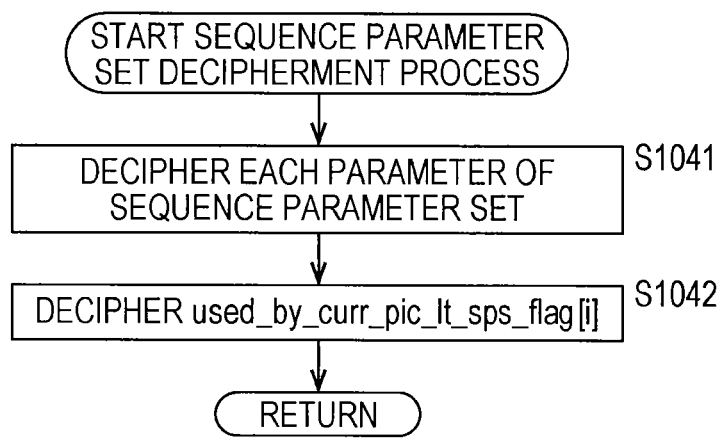
FIG. 76 is a flowchart for describing an example of the flow of the sequence parameter set decipherment process.

Next, an example of the flow of the sequence parameter set decipherment process to be executed in step S1003 of FIG. 74 is described with reference to the flowchart of FIG. 76.

Upon the start of the sequence parameter set decipherment process, the header decipherment unit 1044 of the enhancement layer image decoding unit 1003 deciphers each parameter in the sequence parameter set in step S1041 and controls each process unit based on the decipherment result.

In step S1042, the header decipherment unit 1044 deciphers the syntax used_by_curr_pic_lt_sps_flag[i] in regard to the long-term reference frame of the sequence parameter set, and controls the intra prediction unit 1041 or the inter prediction unit 1042, for example, based on the decipherment result.

Upon the end of the process of step S1042, the sequence parameter set decipherment process ends and the process returns to FIG. 74.

<Flow of Enhancement Layer Decoding Process>

Next, an example of the flow of the enhancement layer decoding process to be executed in step S1004 of FIG. 74 is described with reference to the flowchart of FIG. 77.

Upon the start of the enhancement layer decoding process, each process in step S1051 and step S1052 is executed in a manner similar to each process in step S391 and step S392 of FIG. 27.

In step S1053, the header decipherment unit 1044 deciphers each parameter of the slice header, and controls each process unit based on the decipherment result. In step S1054, the header decipherment unit 1044 deciphers the syntax used_by_curr_pic_lt_flag[i] in regard to the long-term reference frame of the slice header and controls the intra prediction unit 1041 or the inter prediction unit 1042, for example, based on the decipherment result.

Each process in step S1055 and step S1056 is executed in a manner similar to each process in step S393 and step S394 of FIG. 27.

In step S1057, the intra prediction unit 1041 and the inter prediction unit 1042 perform the prediction process and generate the predicted image by the intra prediction or the inter prediction. On this occasion, the intra prediction unit 1041 and the inter prediction unit 1042 perform the prediction process in accordance with the control of the header decipherment unit 1044 based on the decipherment result of the syntax used_by_curr_pic_lt_sps_flag[i] by the process in step S1042 of FIG. 76 and the decipherment result of the syntax used_by_curr_pic_lt_flag[i] by the process in step S1054.

Each process in step S1058 to step S1062 is executed in a manner similar to each process in step S396 to step S400 of FIG. 27.

Upon the end of the process of step S1062, the enhancement layer decoding process ends and the process returns to FIG. 74.

<Flow of Prediction Process>

Figure 77:
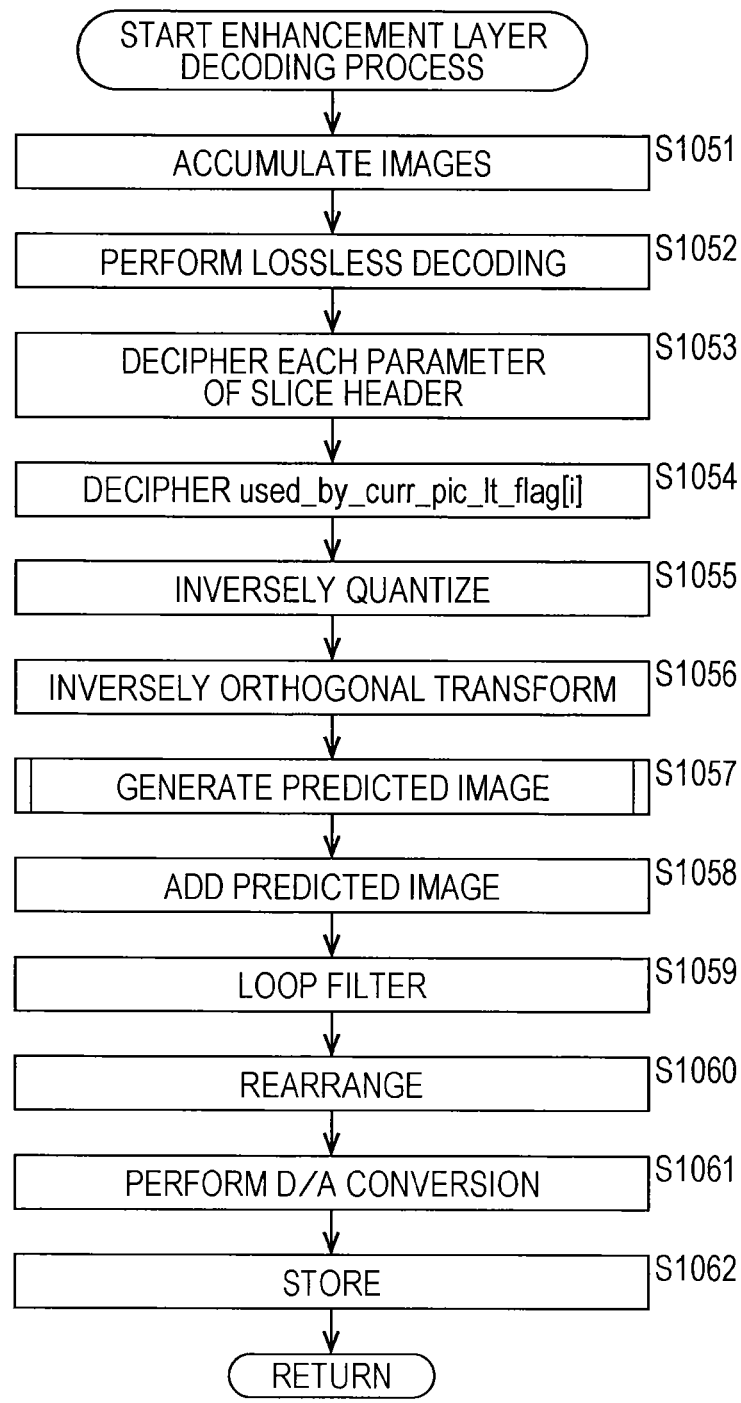
FIG. 77 is a flowchart for describing an example of the flow of the enhancement layer decoding process.
Figure 78:
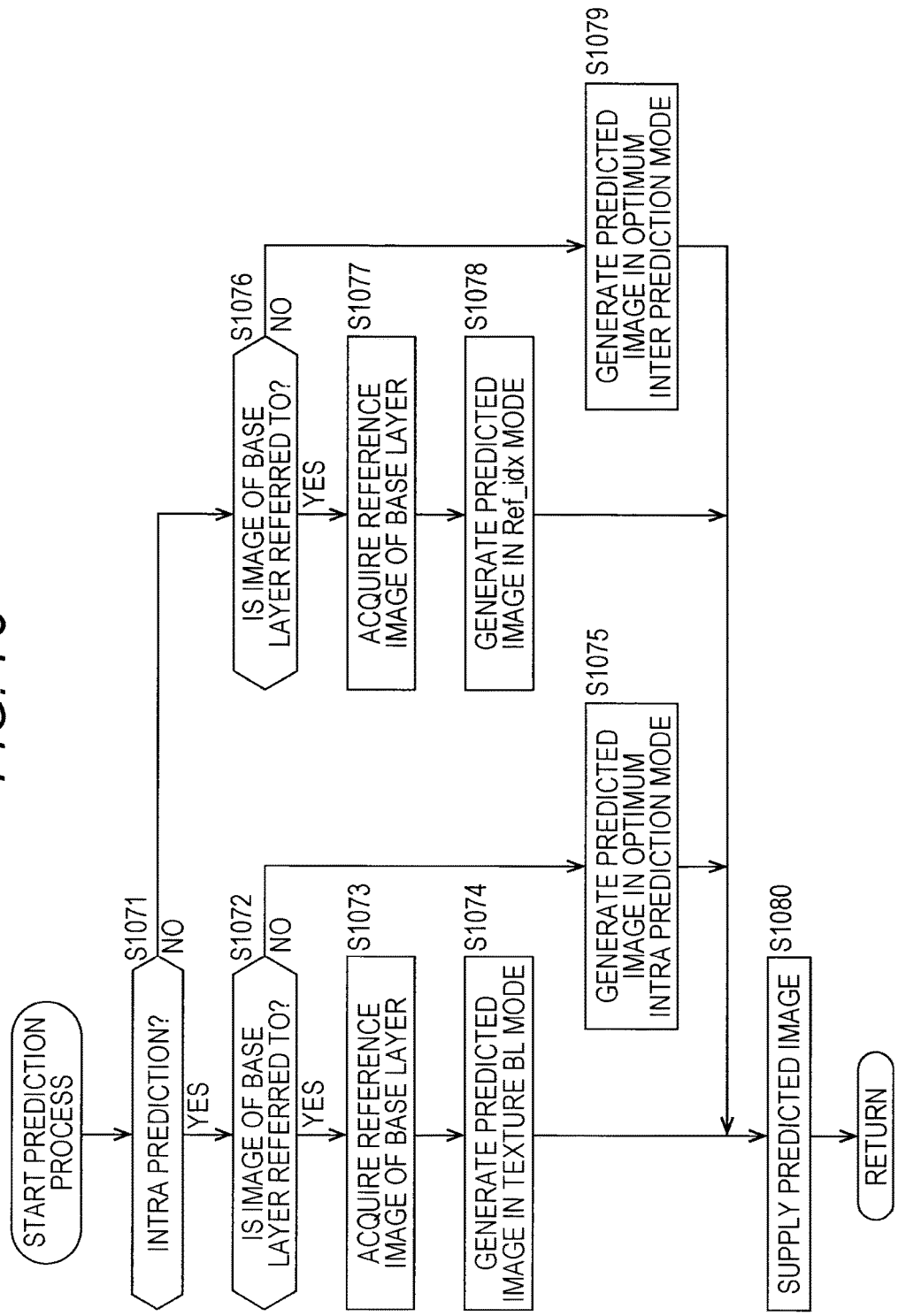
FIG. 78 is a flowchart for describing an example of the flow of the prediction process.

Next, an example of the flow of the prediction process to be executed in step S1057 of FIG. 77 is described with reference to the flowchart of FIG. 78.

Upon the start of the prediction process, the intra prediction unit 1041 and the inter prediction unit 1042 determine whether the optimum mode (mode of the prediction process employed in the encoding) is the intra prediction mode or not in regard to the current block to be processed in step S1071. If it has been determined that the predicted image is generated by the intra prediction, the process advances to step S1072.

In step S1072, the intra prediction unit 1041 determines whether the image of the base layer is referred to. If the inter-layer texture prediction for the current picture to which the current block belongs is controlled to be performed by the header decipherment unit 1044 and the optimum intra prediction mode of the current block is the texture BL mode, the intra prediction unit 1041 determines to refer to the image of the base layer in the prediction process of the current block. In this case, the process advances to step S1073.

In step S1073, the intra prediction unit 1041 acquires the base layer decoded image from the long-term reference frame of the frame memory 1039 as the reference image. In step S1074, the intra prediction unit 1041 performs the intra prediction in the texture BL mode and generates the predicted image. Upon the end of the process of step S1074, the process advances to step S1080.

If the inter-layer texture prediction for the current picture is controlled to be performed by the header decipherment unit 1044 and the optimum intra prediction mode of the current block is not the texture BL mode, or if the inter-layer texture prediction for the current picture is controlled not to be performed by the header decipherment unit 1044 in step S1072, the intra prediction unit 1041 determines not to refer to the image of the base layer in the prediction process of the current block. In this case, the process advances to step S1075.

In step S1075, the intra prediction unit 1041 acquires the enhancement layer decoded image from the frame memory 1039 as the reference image. The intra prediction unit 1041 performs the intra prediction in the optimum intra prediction more, which is not the texture BL mode, and generates the predicted image. Upon the end of the process in step S1075, the process advances to step S1080.

If it has been determined that the optimum mode of the current block is the inter prediction mode in step S1071, the process advances to step S1076.

In step S1076, the inter prediction unit 1042 determines whether the image of the base layer is referred to or not. If the inter-layer texture prediction for the current picture is controlled to be performed by the header decipherment unit 1044 and the optimum intra prediction mode of the current block is the reference index mode, the inter prediction unit 1042 determines to refer to the image of the base layer in the prediction process of the current block. In this case, the process advances to step S1077.

In step S1077, the inter prediction unit 1042 acquires the base layer decoded image from the long-term reference frame of the frame memory 1039 as the reference image. In step S1078, the inter prediction unit 1042 performs the inter prediction in the reference index mode and generates the predicted image. Upon the end of the process of step S1078, the process advances to step S1080.

In step S1076, if the inter-layer texture prediction for the current picture is controlled to be performed by the header decipherment unit 1044 and the optimum inter prediction mode of the current block is not the reference index mode, or if the inter-layer texture prediction for the current picture is controlled not to be performed by the header decipherment unit 1044, the inter prediction unit 1042 determines not to refer to the image of the base layer in the prediction process of the current block. In this case, the process advances to step S1079.

In step S1079, the inter prediction unit 1042 acquires the enhancement layer decoded image from the frame memory 1039 as the reference image. Then, the inter prediction unit 1042 performs the inter prediction in the optimum inter prediction mode, which is not the reference index mode, and generates the predicted image. Upon the end of the process of step S1079, the process advances to step S1080.

In step S1080, the intra prediction unit 1041 or the inter prediction unit 1042 supplies the generated predicted image to the calculation unit 1035 through the predicted image selection unit 1043.

Upon the end of the process in step S1080, the prediction process ends and the process returns to FIG. 77.

In the above prediction process, for example, the motion compensation for the inter-layer texture prediction is omitted if the inter-layer texture prediction for the current picture is controlled not to be performed by the header decipherment unit 1044 like in the process of step S1075 or the process of step S1079 (for example, when the value of the syntax used_by_curr_pic_lt_sps_flag[i] or the syntax used_by_curr_pic_lt_flag[i] is "0").

Therefore, by the execution of each process as above, the image decoding device 1000 (enhancement layer image decoding unit 1003) can suppress the increase in load of the decoding process.

<13. Eleventh Embodiment>
<Inter-layer Syntax Prediction Control>

<7. Summary 2>, <8. Seventh embodiment>, and <9. Eighth embodiment> have described the examples in which the execution of the inter-layer pixel prediction (Inter-layer Pixel Prediction) and the execution of the inter-layer syntax prediction (Inter-layer Syntax Prediction) are controlled independently.

In this case, if the encoding method for the base layer is AVC and the encoding method for the enhancement layer is HEVC, the inter-layer syntax prediction employs the prediction process of the syntax in HEVC with the use of the syntax (syntax) in AVC. Actually, however, it has been difficult to perform the prediction process of the syntax in HEVC using the syntax (syntax) in AVC, which is different from HEVC. In view of this, the inter-layer syntax prediction using the syntax of the base layer in AVC encoding method may be prohibited.

<Control on the Encoding Side>

For example, if the encoding method for the base layer is AVC on the encoding side and the layer 0 (layer=0) is referred to, the inter-layer syntax prediction control information that controls the execution of the inter-layer syntax prediction may be set to the value at which the inter-layer syntax prediction is not executed, and then may be transmitted.

The structure of the scalable encoding device 100 in this case is similar to that in the example described with reference to FIG. 9. The structure of each unit of the scalable encoding device 100 is similar to that in the example described with reference to FIG. 44.

In this case, the encoding process executed by the scalable encoding device 100 is executed in a manner similar to the process in the example of the flowchart illustrated in FIG.

13. Then, the common information generation process executed in the encoding process is executed in a manner similar to the process in the flowchart illustrated in FIG. 45. The base layer encoding process executed in the encoding process is executed in a manner similar to the process in the flowchart illustrated in FIG. 46. Additionally, the enhancement layer encoding process executed in the encoding process is executed in a manner similar to the process in the flowchart illustrated in FIG. 48. The motion prediction/compensation process executed in the enhancement layer encoding process is executed in a manner similar to the process in the flowchart illustrated in FIG. 49. The intra prediction process executed in the encoding process is executed in a manner similar to the process in the flowchart illustrated in FIG. 50.

Figure 79:
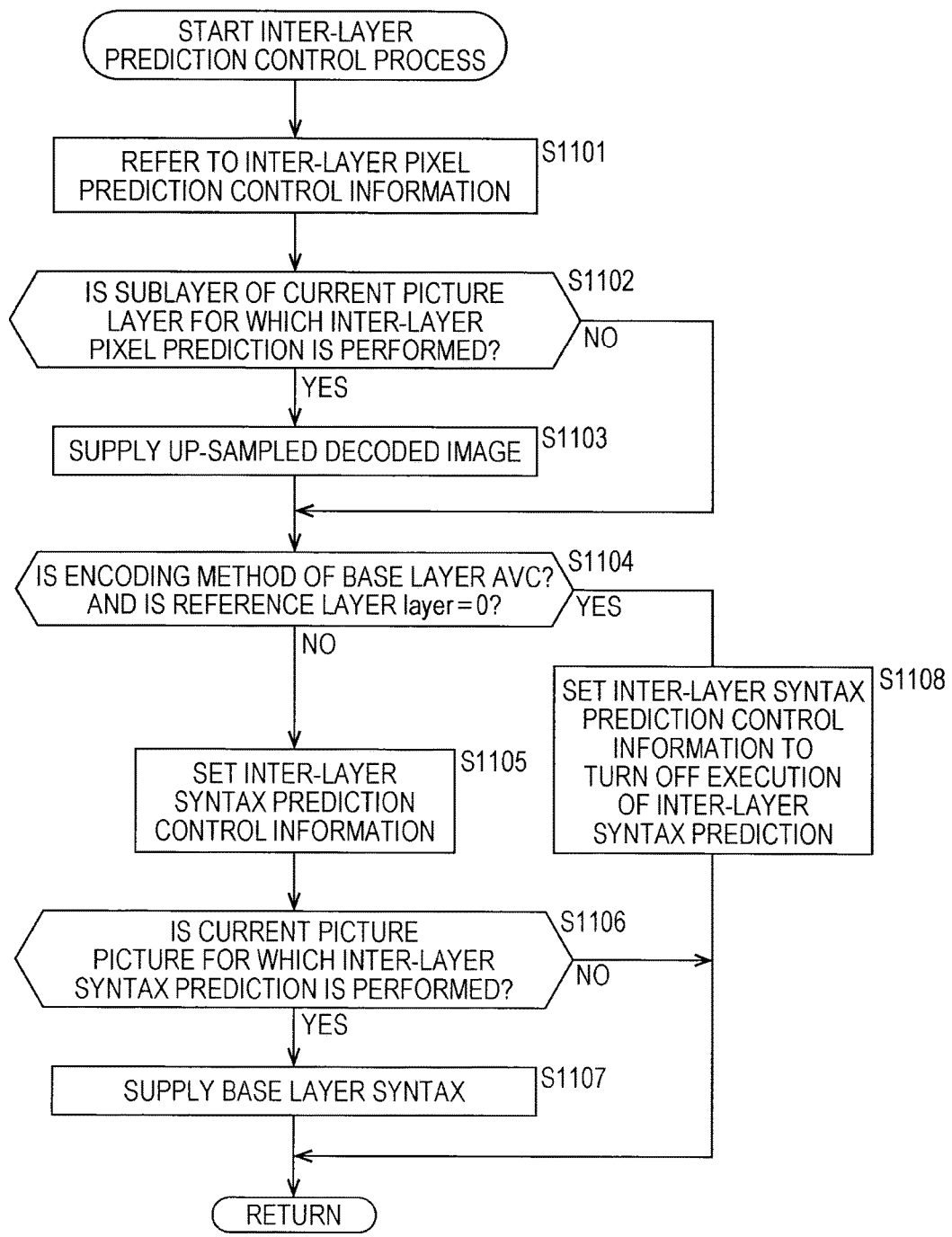
FIG. 79 is a flowchart for describing an example of the flow of the inter-layer prediction control process.

An example of the flow of the inter-layer prediction control process to be executed in step S106 in the encoding process is described with reference to the flowchart of FIG. 79.

Figure 47:
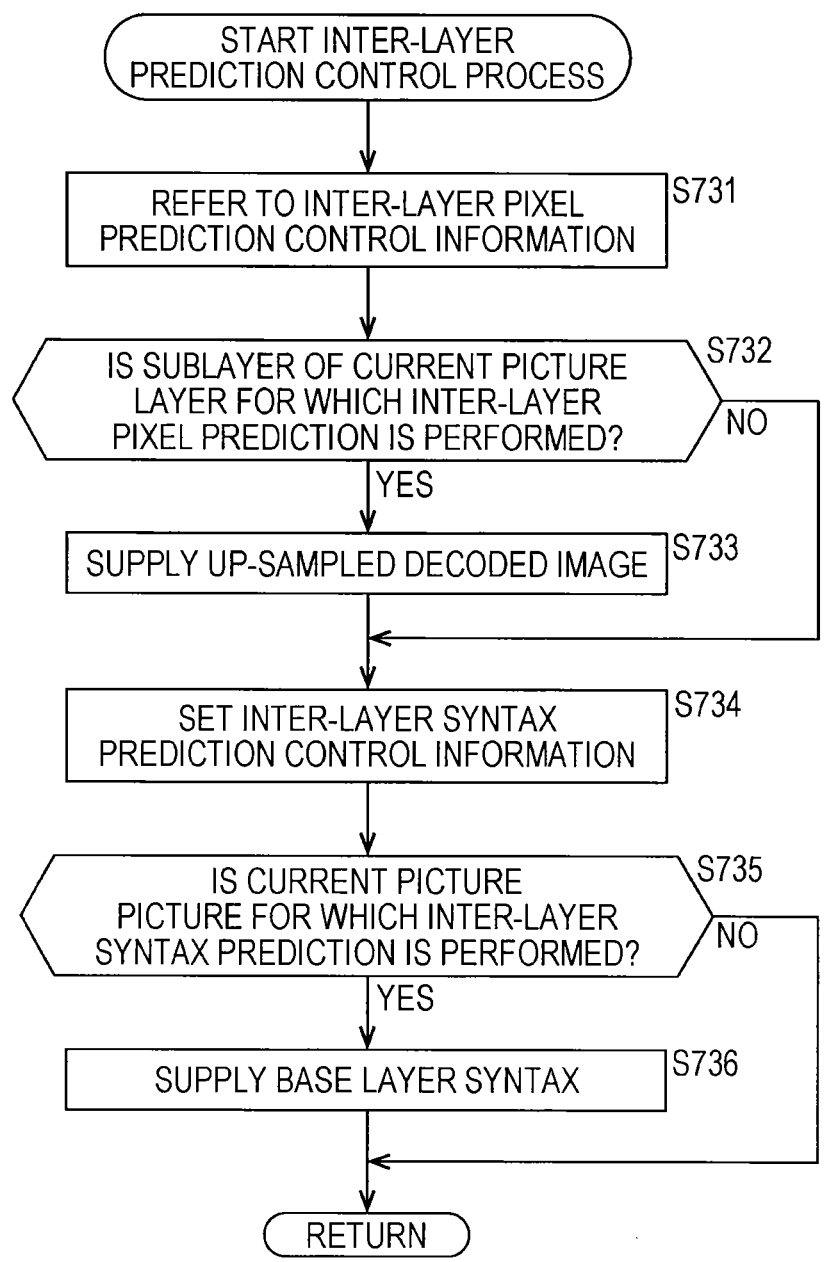
FIG. 47 is a flowchart for describing an example of the flow of the inter-layer prediction control process.

Each process in step S1101 to step S1103 is executed in a manner similar to each process in step S731 to step S733 in FIG. 47, and the control on the inter-layer pixel prediction is performed based on the inter-layer pixel prediction control information.

In step S1104, the inter-layer syntax prediction control information setting unit 725 determines whether the base layer encoding method is AVC and whether the reference layer is the layer 0. More specifically, the inter-layer syntax prediction control information setting unit 725 determines whether the value of avc_base_layer_flag, which is the flag information representing whether the base layer encoding method is AVC or not is "1" (avc_base_layer_flag=1) or not and whether the value of the layer, which is the parameter representing the reference layer, is "0" (layer=0) or not.

If it has been determined that avc_base_layer_flag is 0 or the layer is not 0 in step S1104, the process advances to step S1105.

In this case, each process in step S1105 to step S1107 is executed in a manner similar to each process in step S734 to step S736 in FIG. 47, and the inter-layer syntax prediction control information is set based on any piece of information and the control on the inter-layer syntax prediction is conducted. Upon the end of the process of step S1107 or determination that the current picture is the picture for which the inter-layer syntax prediction is not performed in step S1106, the inter-layer prediction control process ends and the process returns to FIG. 13.

If it has been determined that avc_base_layer_flag is 1 or the layer is 0 in step S1104, the process advances to step S1108.

In step S1108, the inter-layer syntax prediction control information setting unit 725 sets the inter-layer syntax prediction control information so that the execution of the inter-layer syntax prediction is turned off. In this case, the inter-layer syntax prediction is not performed (omitted). Upon the end of the process in step S1108, the inter-layer prediction control process ends and the process returns to FIG. 13.

The inter-layer pixel prediction control information setting unit 711 transmits the inter-layer pixel prediction control information as the control information that controls the execution (on/off) of the inter-layer pixel prediction in, for example, the video parameter set (VPS (Video Parameter Set)), the extension video parameter set (Vps_extension( )), or the nal unit (nal_unit).

Then, the inter-layer syntax prediction control information as the control information that controls the execution (on/off) of the inter-layer syntax prediction is transmitted to the decoding side in, for example, the picture parameter set (PPS (Picture Parameter Set)), the slice header (Slice-Header), or the nal unit (nal_unit). Note that the inter-layer syntax prediction control information may be transmitted to the decoding side in, for example, the video parameter set (VPS (Video Parameter Set)) or the extension video parameter set (Vps_extension( )).

Thus, the execution of the process related to the inter-layer syntax prediction control when the base layer encoding method is AVC can be omitted in the scalable encoding device 100, whereby the unnecessary increase in load in the encoding process can be suppressed. Further, by transmitting the thusly set inter-layer syntax prediction control information to the decoding side, it is possible to omit the execution of the process related to the inter-layer syntax prediction control when the base layer encoding method is AVC on the decoding side. In other words, the scalable encoding device 100 can suppress the unnecessary increase in load in the decoding process.

<Control on Decoding Side>

For example, if the base layer encoding method is AVC and the layer 0 (layer=0) is referred to on the decoding side, the value of the inter-layer syntax prediction control information may be regarded as "0" forcibly regardless of the actual value.

The structure of the scalable decoding device 200 in this case is similar to that in the example described with reference to FIG. 19. The structure of each unit of the scalable decoding device 200 is similar to that in the example described with reference to FIG. 51.

In this case, the decoding process executed by the scalable decoding device 200 is executed in a manner similar to the process in the example of the flowchart illustrated in FIG. 23. Then, the common information acquisition process executed in the decoding process is executed in a manner similar to the process in the flowchart illustrated in FIG. 52. The base layer decoding process executed in the decoding process is executed in a manner similar to the process in the flowchart illustrated in FIG. 53. Additionally, the enhancement layer decoding process executed in the decoding process is executed in a manner similar to the process in the flowchart illustrated in FIG. 27. The prediction process executed in the enhancement layer decoding process is executed in a manner similar to the process in the flowchart illustrated in FIG. 55.

Figure 80:
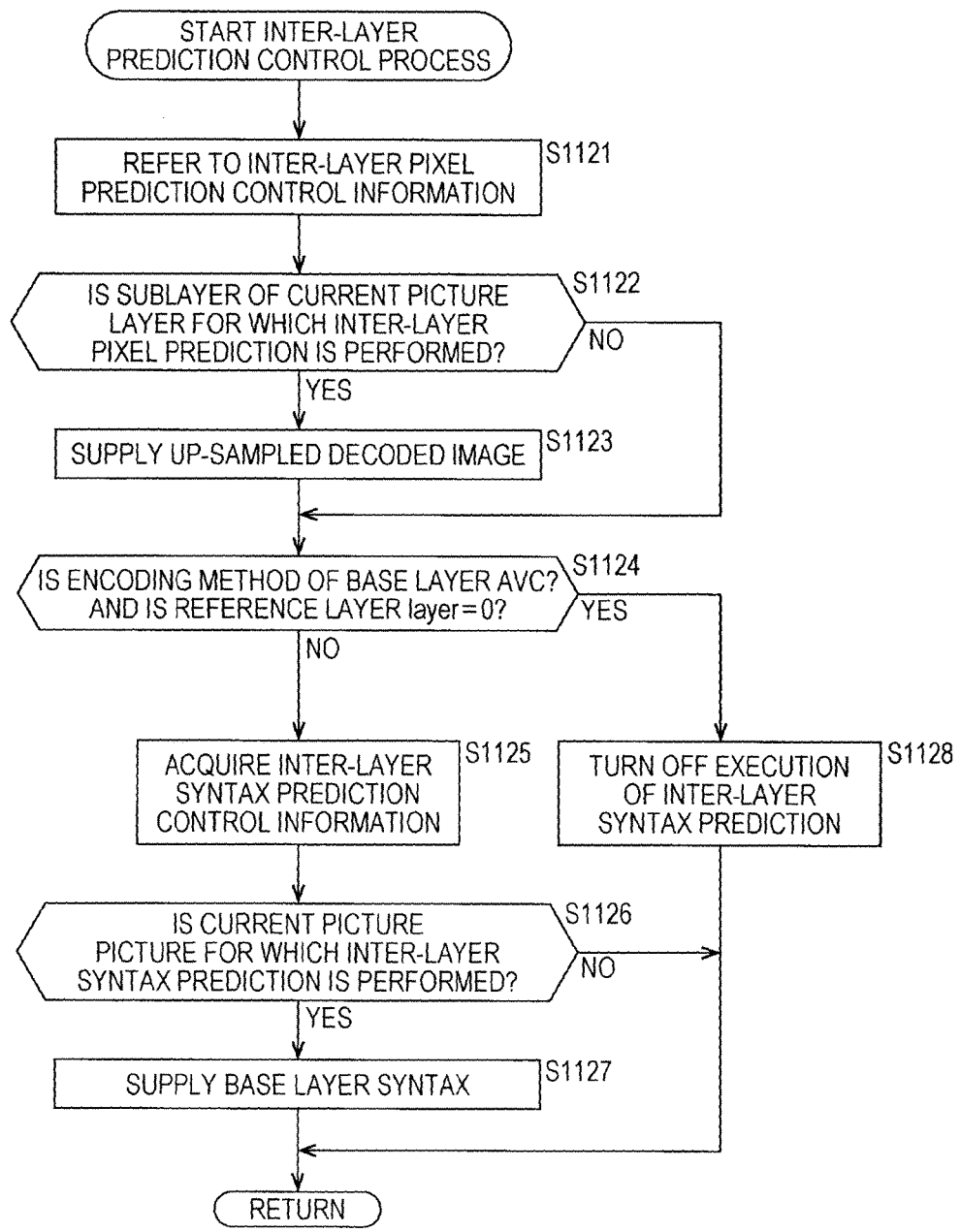
FIG. 80 is a flowchart for describing an example of the flow of the inter-layer prediction control process.

An example of the flow of the inter-layer prediction control process to be executed in step S306 in the decoding process is described with reference to the flowchart of FIG. 80.

Figure 54:
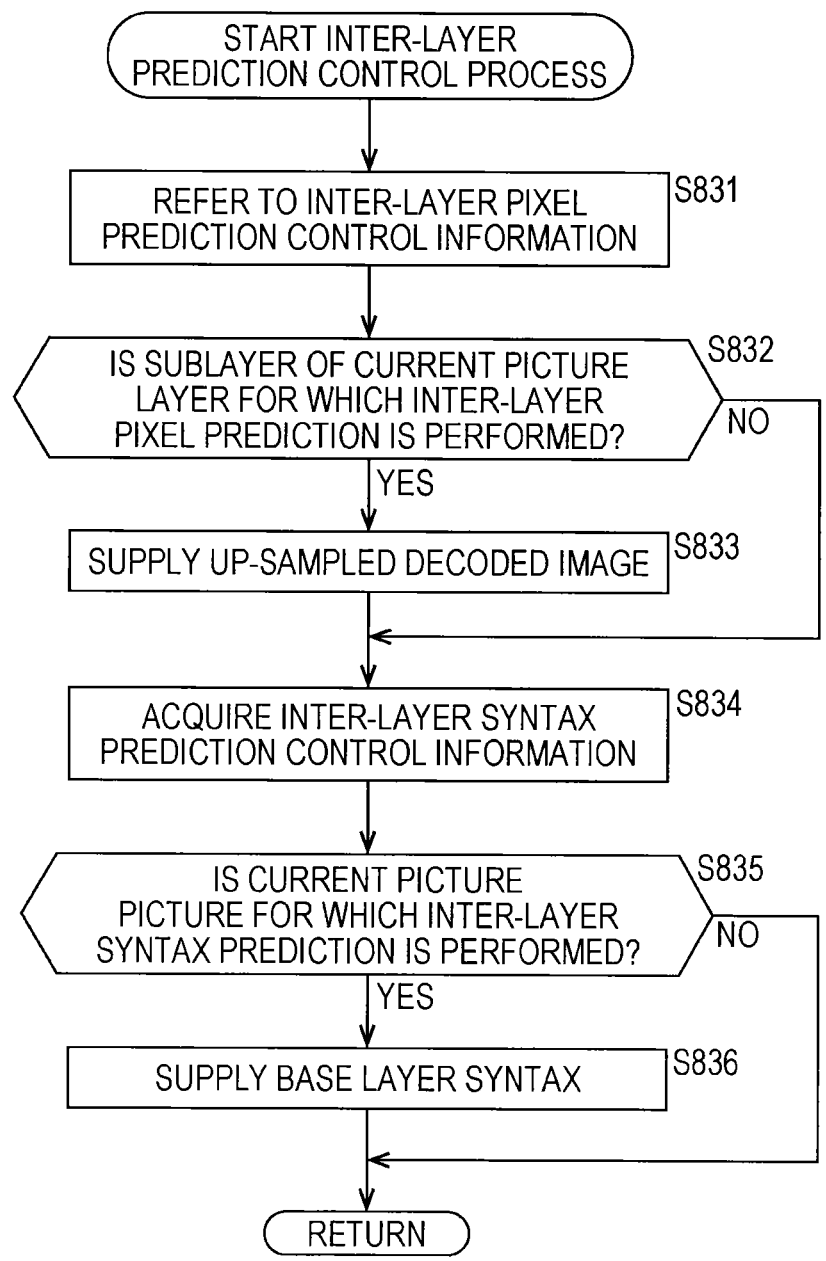
FIG. 54 is a flowchart for describing an example of the flow of the inter-layer prediction control process.

Each process in step S1121 to step S1123 is executed in a manner similar to each process in step S831 to step S833 of FIG. 54, and the control for the inter-layer pixel prediction is conducted based on the inter-layer pixel prediction control information.

In step S1124, the inter-layer syntax prediction control unit 826 determines whether the base layer encoding method is AVC and whether the reference layer is the layer 0 or not. More specifically, the inter-layer syntax prediction control unit 826 determines whether the value of avc_base_layer_flag, which is the flag information representing whether the base layer encoding method is AVC or not is "1" (avc_base_layer_flag=1) or not and whether the value of the layer, which is the parameter representing the reference layer, is "0" (layer=0) or not in the extension video parameter set (Vps_extension ( )) transmitted from the encoding side.

In step S1124, if it has been determined that avc_base_layer_flag is 0 or the layer is not 0, the process advances to step S1125.

In this case, each process in step S1125 to step S1127 is executed in a manner similar to each process in step S834 to step S836 of FIG. 54, and the control for the inter-layer syntax prediction is conducted based on the inter-layer syntax prediction control information. Upon the end of the process of step S1127 or determination that the current picture is the picture for which the inter-layer syntax prediction is not performed in step S1126, the inter-layer prediction control process ends and the process returns to FIG. 23.

If it has been determined that avc_base_layer_flag is 1 and the layer is 0 in step S1124, the process advances to step S1128.

In step S1128, the inter-layer syntax prediction control unit 826 turns off the inter-layer syntax prediction. In other words, in this case, the inter-layer syntax prediction is not performed (omitted). Upon the end of the process of step S1128, the inter-layer prediction control process ends and the process returns to FIG. 23.

Thus, the execution of the process related to the inter-layer syntax prediction control when the base layer encoding method is AVC can be omitted in the scalable decoding device 200, whereby the unnecessary increase in load in the decoding process can be suppressed.

<14. Others>

Figure 81:
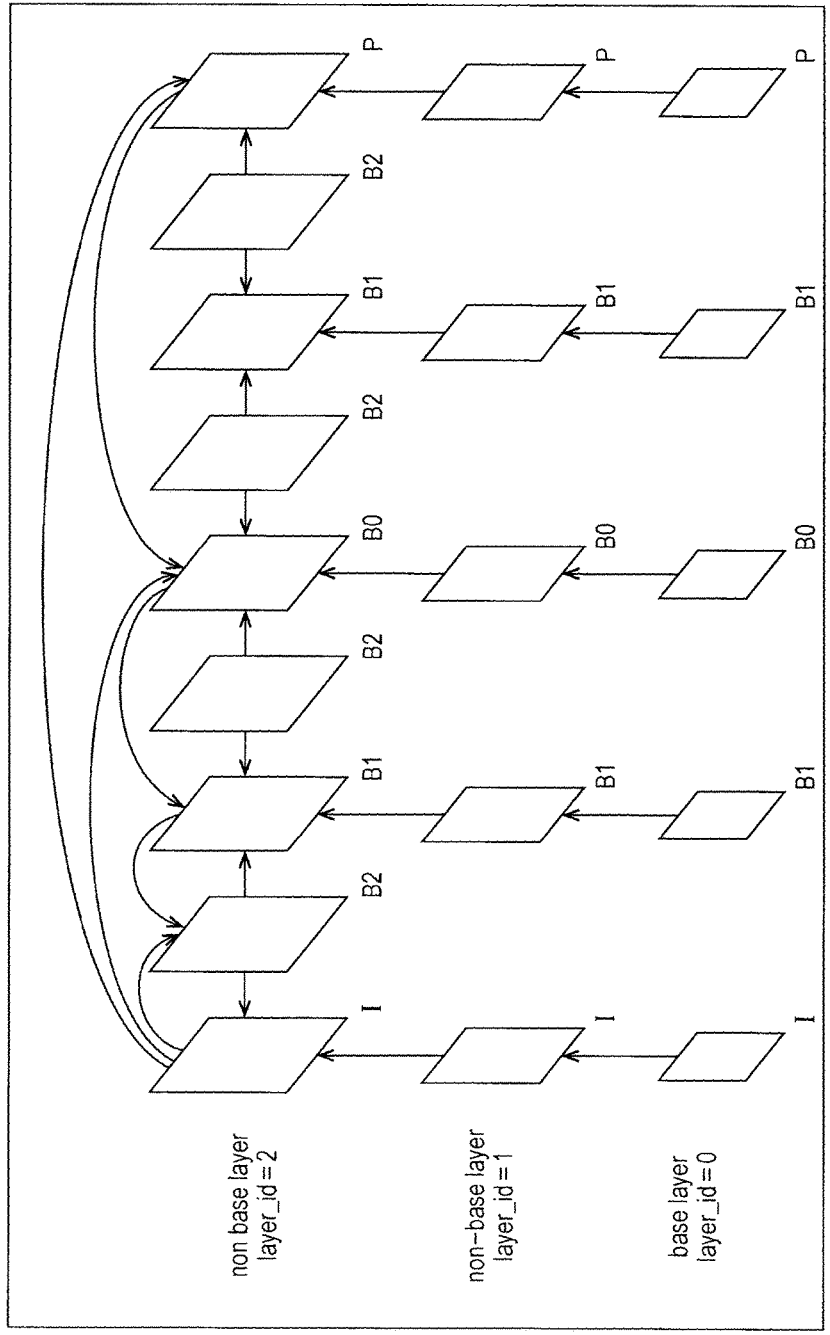
FIG. 81 is a diagram illustrating an example of a layer image encoding method.

The above description has been made on the example in which the image data are divided into a plurality of layers through the scalable encoding. Note that the number of layers may be determined arbitrarily. As illustrated in the example of FIG. 81, a part of the picture may be divided into layers. Moreover, in the above example, the enhancement layer is processed with reference to the base layer in encoding and decoding; however, the present disclosure is not limited thereto and the enhancement layer may be processed with reference to other processed enhancement layers.

Figure 82:
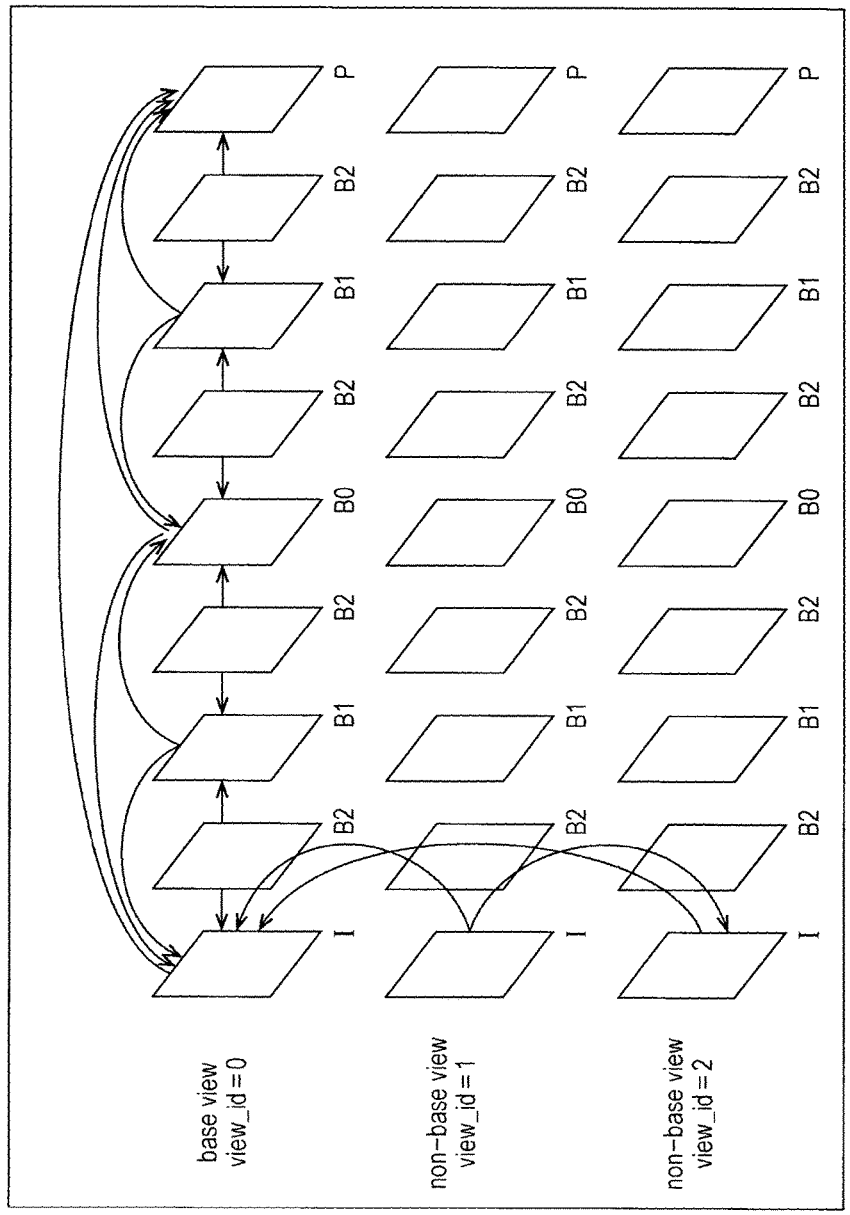
FIG. 82 is a diagram illustrating an example of a multi-viewpoint image encoding method.

The layer described above includes views in the multi-viewpoint image encoding and decoding. In other words, the present technique can be applied to the multi-viewpoint image encoding and decoding. FIG. 82 illustrates an example of the multi-viewpoint image encoding.

As illustrated in FIG. 82, the multi-viewpoint image includes images with a plurality of viewpoints (views), and an image with a predetermined one viewpoint among the viewpoints is specified as the image of a base view. The images other than the base view image are treated as the non-base view images.

In encoding or decoding the multi-viewpoint image as illustrated in FIG. 82, the image of each view is encoded or decoded; in this case, the above method may be applied in the encoding or decoding of each view. In other words, the information related to the encoding and decoding may be shared among the plural views in the multi-viewpoint encoding and decoding.

For example, the base view is subjected to the encoding and decoding without referring to the information related to the encoding and decoding of the other views, while the non-base view is subjected to the encoding and decoding by referring to the information related to the encoding and decoding of the base view. Then, only the information related to the encoding and decoding on the base view is transmitted.

Thus, the deterioration in encoding efficiency can be suppressed even in the multi-viewpoint encoding and decoding in a manner similar to the above layer encoding and decoding.

In this manner, the present technique can be applied to any image encoding device and image decoding device based on the scalable encoding and decoding methods.

The present technique can be applied to the image encoding device and image decoding device used when the image information (bit stream) compressed by the motion compensation and orthogonal transform such as discrete cosine transform like MPEG or H.26x is received through the satellite broadcasting, cable television, the Internet, or the network media such as cellular phones. Moreover, the present technique can be applied to the image encoding device and image decoding device used in the process performed in the storage media such as optical or magnetic disks or flash memory. In addition, the present technique can be applied to an orthogonal transform device or an inverse orthogonal transform device included in the image encoding device and image decoding device, etc.

<15. Twelfth Embodiment>

<Computer>

The aforementioned series of processes can be executed using either hardware or software. In the case of using the software to execute the processes, programs constituting the software are installed in a computer. Here, the computer includes a computer incorporated in the dedicated hardware or a general personal computer capable of executing various functions by having various programs installed therein.

Figure 83:
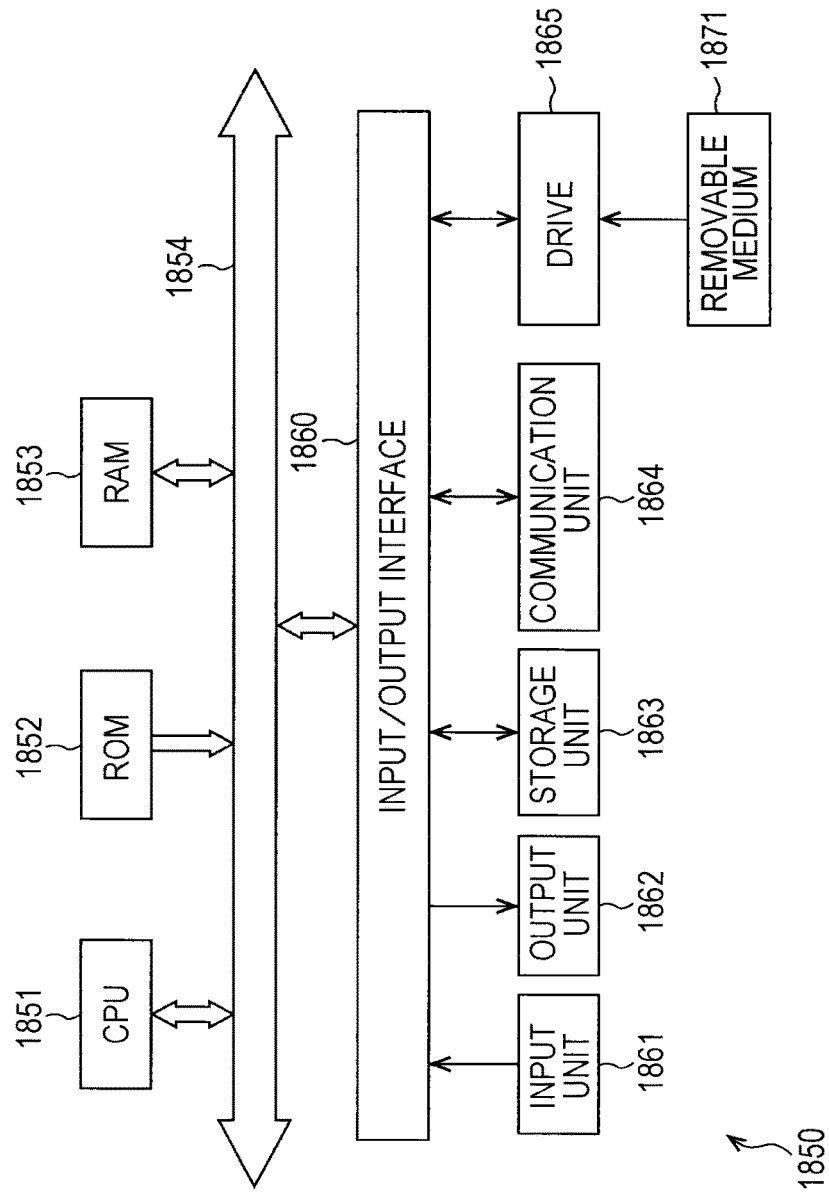
FIG. 83 is a block diagram illustrating an example of a main structure of a computer.

FIG. 83 is a block diagram illustrating an example of a structure of the hardware of the computer executing the above processes through programs.

In a computer 1850 illustrated in FIG. 83, a CPU (Central Processing unit) 1851, a ROM (Read Only Memory) 1852, and a RAM (Random Access Memory) 1853 are connected to each other through a bus 1854.

An input/output interface 1860 is also connected to the bus 1854. The input/output interface 1860 also has an input unit 1861, an output unit 1862, a storage unit 1863, a communication unit 1864, and a drive 1865 connected thereto.

The input unit 1861 corresponds to, for example, a keyboard, a mouse, a microphone, a touch panel, an input terminal, or the like. The output unit 1862 corresponds to, for example, a display, a speaker, an output terminal, or the like. The storage unit 1863 corresponds to, for example, a hard disk, a RAM disk, a nonvolatile memory, or the like. The communication unit 1864 corresponds to, for example, a network interface. The drive 1865 drives a removable medium 1871 such as a magnetic disk, an optical disk, a magneto-optic disk, or a semiconductor memory.

In the computer with the above structure, the CPU 1851 loads the programs stored in the storage unit 1863 to the RAM 1853 through the input/output interface 1860 and the bus 1854 and executes the programs, thereby performing the above processes. The RAM 1853 also stores the data necessary for the CPU 1851 to execute various processes as appropriate.

The programs executed by the computer (CPU 1851) can be recorded in the removable medium 1871 as a package medium, and applied.

In this case, the programs can be installed in the storage unit 1863 through the input/output interface 1860 by having the removable medium 1871 attached to the drive 1865.

The programs can be provided through the wired or wireless transmission media such as the local area network, the Internet, or digital satellite broadcasting. In this case, the programs can be received by the communication unit 1864 and installed in the storage unit 1863. Moreover, the programs can be installed in advance in the ROM 1852 or the storage unit 1863.

The programs to be executed by the computer may be the programs that enable the process in time series order as described in this specification or that enable the processes in parallel or at necessary timing such as when the calling is made.

In this specification, the steps describing the program recorded in the recording medium include not just the process performed in the time series order as described herein but also the process that is not necessary performed in the time series but executed in parallel or individually.

In this specification, the system refers to a group of a plurality of components (devices, modules (parts), etc.) and whether all the components are present in one case does not matter. Therefore, a plurality of devices housed in separate cases and connected through a network, and one device containing a plurality of modules in one case are both systems.

Further, in the above example, the structure described as one device (or one process unit) may be divided into a plurality of devices (or process units). On the contrary, the structures described as the separate devices (or process units) may be formed as one device (or process unit). Further, the structure of each device (or process unit) may be additionally provided with a structure other than the above. As long as the structure or operation as the whole system is substantially the same, a part of the structure of a certain device (or process unit) may be included in a structure of another device (or process unit).

The preferred embodiments of the present disclosure have been described with reference to the drawings; however, the technical scope of the present disclosure is not limited thereto. It is apparent that a person skilled in the art of the present disclosure would conceive the modifications or improvements within the range of the technical thought as described in the scope of claims, and these are also included in the technical scope of the present disclosure.

For example, the present technique can have a structure of cloud computing: one function is shared with a plurality of devices via a network and the work is processed together.

Each step described with reference to the above flowchart can be either executed in one device or shared among a plurality of devices.

If a plurality of processes is included in one step, the processes included in one step can be either executed in one device or shared among a plurality of devices.

The image encoding device and image decoding device according to the above embodiments can be applied to various electronic appliances including a transmitter or a receiver used in the distribution on the satellite broadcasting, wired broadcasting such as cable TV, or the Internet, or the distribution to the terminal through the cellular communication, a recording device that records the images in a medium such as an optical disk, a magnetic disk, or a flash memory, and a reproducing device that reproduces the image from these storage media. Description is hereinafter made of four application examples.

<16. Application Examples>
<First Application Example: Television Receiver>

Figure 84:
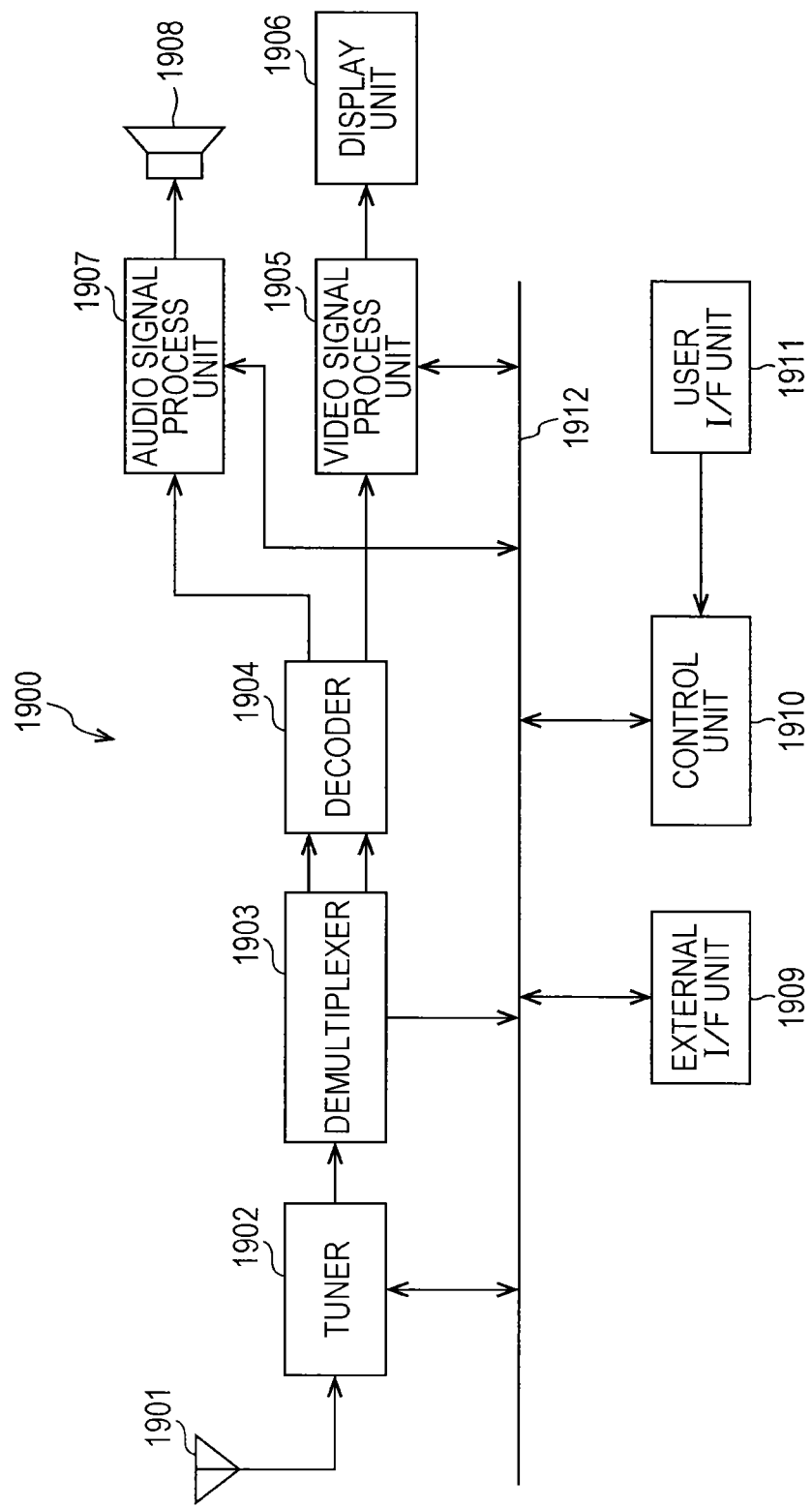
FIG. 84 is a block diagram illustrating an example of a schematic structure of a television device.

FIG. 84 illustrates an example of a schematic structure of a television device to which the above embodiment has been applied. A television device 1900 includes an antenna 1901, a tuner 1902, a demultiplexer 1903, a decoder 1904, a video signal process unit 1905, a display unit 1906, an audio signal process unit 1907, a speaker 1908, an external interface (I/F) unit 1909, a control unit 1910, a user interface unit 1911, and a bus 1912.

The tuner 1902 extracts a signal of a desired channel from broadcasting signals received through the antenna 1901, and demodulates the extracted signal. The tuner 1902 outputs an encoded bit stream obtained by the demodulation to the demultiplexer 1903. In other words, the tuner 1902 has a role of a transmission unit in the television device 1900 for receiving the encoded stream in which the image is encoded.

The demultiplexer 1903 separates the video stream and the audio stream of the program to be viewed from the encoded bit stream, and outputs the separated streams to the decoder 1904. The demultiplexer 1903 extracts an auxiliary piece of data such as EPG (Electronic Program Guide) from the encoded bit stream, and supplies the extracted data to the control unit 1910. Note that the demultiplexer 1903 may descramble the encoded bit stream if the encoded bit stream has been scrambled.

The decoder 1904 decodes the video stream and the audio stream input from the demultiplexer 1903. The decoder 1904 outputs the video data generated by the decoding process to the video signal process unit 1905. The decoder 1904 moreover outputs the audio data generated by the decoding process to the audio signal process unit 1907.

The video signal process unit 1905 reproduces the video data input from the decoder 1904, and displays the video on the display unit 1906. The video signal process unit 1905 may display the application screen supplied through the network on the display unit 1906. The video signal process unit 1905 may perform an additional process such as noise removal on the video data in accordance with the setting. Moreover, the video signal process unit 1905 may generate the image of GUI (Graphical User Interface) such as a menu, a button, or a cursor and overlap the generated image on the output image.

The display unit 1906 is driven by a drive signal supplied from the video signal process unit 1905, and displays the video or image on the video screen of a display device (such as a liquid crystal display, a plasma display, or an OELD (Organic ElectroLuminescence Display) (organic EL display)).

The audio signal process unit 1907 performs the reproduction process such as D/A conversion or amplification on the audio data input from the decoder 1904, and outputs the audio from the speaker 1908. Moreover, the audio signal process unit 1907 may perform the additional process such as noise removal on the audio data.

The external interface unit 1909 is the interface for connecting between the television device 1900 and an external appliance or a network. For example, the video stream or audio stream received through the external interface unit 1909 may be decoded by the decoder 1904. In other words, the external interface unit 1909 also has a role of a transmission unit in the television device 1900 for receiving the encoded stream in which the image is encoded.

The control unit 1910 includes a processor such as a CPU, and a memory such as a RAM and a ROM. The memory stores programs to be executed by the CPU, program data, EPG data, and data acquired through the network, etc. The programs stored in the memory are read in and executed by the CPU when the television device 1900 is activated, for example. By executing the programs, the CPU controls the operation of the television device 1900 in response to an operation signal input from the user interface unit 1911, for example.

The user interface unit 1911 is connected to the control unit 1910. The user interface unit 1911 includes, for example, a button and a switch for a user to operate the television device 1900, and a reception unit for receiving a remote control signal. The user interface unit 1911 generates the operation signal by detecting the operation of the user through these components, and outputs the generated operation signal to the control unit 1910.

The bus 1912 connects among the tuner 1902, the demultiplexer 1903, the decoder 1904, the video signal process unit 1905, the audio signal process unit 1907, the external interface unit 1909, and the control unit 1910.

In the television device 1900 with the above structure, the decoder 1904 has a function of the scalable decoding device 200 or the image decoding device 1000 (FIG. 71) according to the above embodiment. Thus, in the decoding of the image in the television device 1900, the deterioration in encoding efficiency can be suppressed and the deterioration in image quality due to the encoding and decoding can be suppressed.

<Second Application Example: Cellular Phone>

Figure 85:
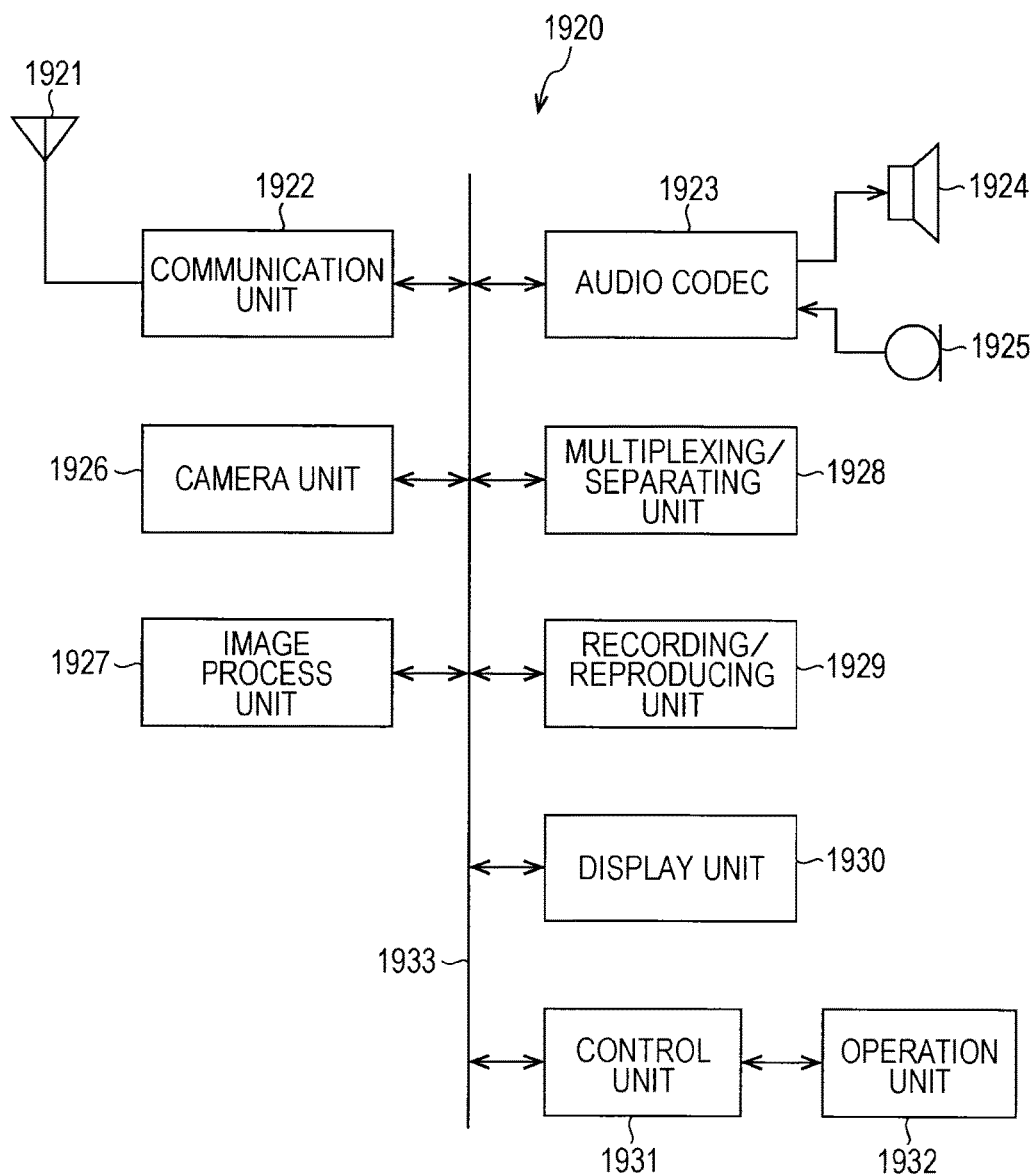
FIG. 85 is a block diagram illustrating an example of a schematic structure of a cellular phone.

FIG. 85 illustrates an example of a schematic structure of a cellular phone to which the above embodiment has been applied. The cellular phone 1920 includes an antenna 1921, a communication unit 1922, an audio codec 1923, a speaker 1924, a microphone 1925, a camera unit 1926, an image process unit 1927, a multiplexing/separating unit 1928, a recording/reproducing unit 1929, a display unit 1930, a control unit 1931, an operation unit 1932, and a bus 1933.

The antenna 1921 is connected to the communication unit 1922. The speaker 1924 and the microphone 1925 are connected to the audio codec 1923. The operation unit 1932 is connected to the control unit 1931. The bus 1933 connects among the communication unit 1922, the audio codec 1923, the camera unit 1926, the image process unit 1927, the multiplexing/separating unit 1928, the recording/reproducing unit 1929, the display unit 1930, and the control unit 1931.

The cellular phone 1920 performs the operations including the exchange of audio signals, email, and image data, the photographing of images, and the recording of the data in various modes including the voice calling mode, the data communication mode, the photographing mode, and a video calling mode.

In the voice calling mode, the analog audio signal generated by the microphone 1925 is supplied to the audio codec 1923. The audio codec 1923 converts the analog audio signal into the audio data, and compresses the converted audio data through the A/D conversion. Then, the audio codec 1923 outputs the compressed audio data to the communication unit 1922. The communication unit 1922 encodes and modulates the audio data and generates a transmission signal. The communication unit 1922 transmits the generated transmission signal to a base station (not shown) through the antenna 1921. The communication unit 1922 amplifies the wireless signal received through the antenna 1921 and converts the frequency thereof, and acquires the reception signal. The communication unit 1922 then generates the audio data by demodulating and decoding the reception signal, and outputs the generated audio data to the audio codec 1923. The audio codec 1923 extends the audio data and performs the D/A conversion thereon, and generates the analog audio signal. The audio codec 1923 supplies the generated audio signal to the speaker 1924 to output the audio.

In the data communication mode, for example, the control unit 1931 generates the text data constituting the email in response to the user operation through the operation unit 1932. The control unit 1931 displays the text on the display unit 1930. The control unit 1931 generates the email data in response to the transmission instruction from the user through the operation unit 1932, and outputs the generated email data to the communication unit 1922. The communication unit 1922 encodes and modulates the email data, and generates the transmission signal. The communication unit 1922 transmits the generated transmission signal to the base station (not shown) through the antenna 1921. The communication unit 1922 amplifies the wireless signal received through the antenna 1921 and converts the frequency thereof, and acquires the reception signal. The communication unit 1922 then decompresses the email data by demodulating and decoding the reception signal, and outputs the generated email data to the control unit 1931. The control unit 1931 causes the display unit 1930 to display the content of the email, and at the same time, supplies the email data to the recording/reproducing unit 1929 and has the data written in the storage medium.

The recording/reproducing unit 1929 has an arbitrary readable and writable storage medium. For example, the storage medium may be a built-in type storage medium such as a RAM or a flash memory, or a detachable storage medium such as a hard disk, a magnetic disk, a magneto-optic disk, and an optical disk, a USB (Universal Serial Bus) memory, or a memory card.

In the photographing mode, for example, the camera unit 1926 photographs a subject, generates the image data, and outputs the generated image data to the image process unit 1927. The image process unit 1927 encodes the image data input from the camera unit 1926, supplies the encoded stream to the recording/reproducing unit 1929, and has the data written in the storage medium. Moreover, in the image display mode, the recording/reproducing unit 1929 reads out the encoded stream recorded in the storage medium and outputs the stream to the image process unit 1927. The image process unit 1927 decodes the encoded stream input from the recording/reproducing unit 1929 and supplies the image data to the display unit 1930, on which the image is displayed.

In the video calling mode, for example, the multiplexing/separating unit 1928 multiplexes the video stream encoded by the image process unit 1927 and the audio stream input from the audio codec 1923, and outputs the multiplexed stream to the communication unit 1922. The communication unit 1922 encodes and modulates the stream and generates the transmission signal. Then, the communication unit 1922 transmits the generated transmission signal to a base station (not shown) through the antenna 1921. Moreover, the communication unit 1922 amplifies the wireless signal received through the antenna 1921 and converts the frequency thereof, and acquires the reception signal. These transmission signal and reception signal may include the encoded bit stream. Then, the communication unit 1922 decompresses the stream by demodulating and decoding the reception signal, and outputs the decompressed stream to the multiplexing/separating unit 1928. The multiplexing/separating unit 1928 separates the video stream and the audio stream from the input stream, and outputs the video stream to the image process unit 1927 and the audio stream to the audio codec 1923. The image process unit 1927 decodes the video stream and generates the video data. The video data are supplied to the display unit 1930 where a series of images are displayed. The audio codec 1923 extends the audio stream and performs the D/A conversion thereon, and generates the analog audio signal. The audio codec 1923 supplies the generated audio signal to the speaker 1924 to output the audio.

In the cellular phone 1920 with the above structure, the image process unit 1927 has a function of the scalable encoding device 100 and the scalable decoding device 200, or a function of the image encoding device 900 (FIG. 62) and the image decoding device 1000 (FIG. 71) according to the above embodiment. Thus, in the encoding and decoding of the image in the cellular phone 1920, the deterioration in encoding efficiency can be suppressed and the deterioration in image quality due to the encoding and decoding can be suppressed.

<Third Application Example: Recording/Reproducing Device>

Figure 86:
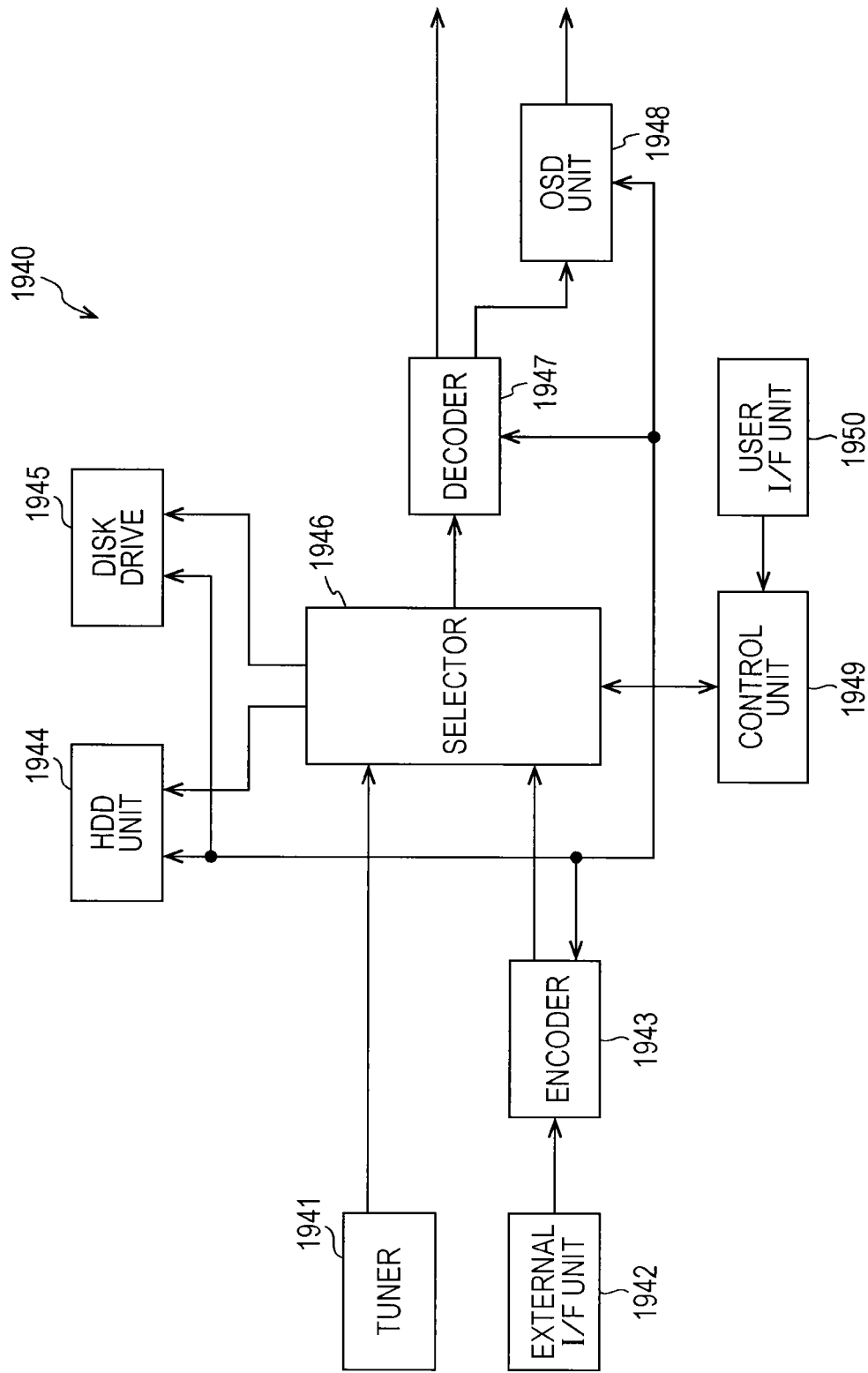
FIG. 86 is a block diagram illustrating an example of a schematic structure of a recording/reproducing device.

FIG. 86 illustrates an example of a schematic structure of a recording/reproducing device to which the above embodiment has been applied. The recording/reproducing device 1940 encodes the audio data and the video data of the received broadcast program, and records the data in the recording medium. The recording/reproducing device 1940 may encode the audio data and the video data acquired from another device, and record the data in the recording medium. The recording/reproducing device 1940 reproduces the data recorded in the recording medium on the monitor and speaker in response to the user instruction. In this case, the recording/reproducing device 1940 decodes the audio data and the video data.

The recording/reproducing device 1940 includes a tuner 1941, an external interface (I/F) unit 1942, an encoder 1943, an HDD (Hard Disk Drive) 1944, a disk drive 1945, a selector 1946, a decoder 1947, an OSD (On-Screen Display) 1948, a control unit 1949, and a user interface (I/F) 1950.

The tuner 1941 extracts a signal of a desired channel from broadcasting signals received through an antenna (not shown), and demodulates the extracted signal. The tuner 1941 outputs an encoded bit stream obtained by the demodulation to the selector 1946. In other words, the tuner 1941 has a role of a transmission unit in the recording/reproducing device 1940.

The external interface unit 1942 is the interface that connects between the recording/reproducing device 1940 and an external appliance or a network. The external interface unit 1942 may be, for example, the IEEE (Institute of Electrical and Electronics Engineers) 1394 interface, the network interface, the USB interface, or the flash memory interface. For example, the video data or audio data received through the external interface unit 1942 are input to the encoder 1943. In other words, the external interface unit 1942 also has a role of a transmission unit in the recording/reproducing device 1940.

If the video data or audio data input from the external interface unit 1942 have not been encoded, the encoder 1943 encodes the video data and the audio data. Then, the encoder 1943 outputs the encoded bit stream to the selector 1946.

The HDD 1944 records the encoded bit stream containing compressed content data such as video and audio, various programs, and other data in the internal hard disk. The HDD 1944 reads out these pieces of data from the hard disk when the video or audio is reproduced.

The disk drive 1945 records and reads out the data in and from the attached recording medium. The recording medium attached to the disk drive 1945 may be, for example, a DVD (Digital Versatile Disc) (such as DVD-Video, DVD-RAM (DVD-Random Access Memory), DVD-R (DVD-Recordable), DVD-RW (DVD-Rewritable), DVD+R (DVD+Recordable), or DVD+RW (DVD+Rewritable)) or a Blu-ray (registered trademark) disc.

When the video and audio are recorded, the selector 1946 selects the encoded bit stream input from the tuner 1941 or the encoder 1943, and outputs the selected encoded bit stream to the HDD 1944 or the disk drive 1945. When the video and audio are reproduced, the selector 1946 outputs the encoded bit stream input from the HDD 1944 or the disk drive 1945 to the decoder 1947.

The decoder 1947 decodes the encoded bit stream to generate the video data and audio data. Then, the decoder 1947 outputs the generated video data to the OSD 1948. The decoder 1947 outputs the generated audio data to the external speaker.

The OSD 1948 reproduces the video data input from the decoder 1947, and displays the video. The OSD 1948 may overlap the GUI image such as a menu, a button, or a cursor on the displayed video.

The control unit 1949 includes a processor such as a CPU, and a memory such as a RAM and a ROM. The memory stores programs to be executed by the CPU, and program data, etc. The programs stored in the memory are read in and executed by the CPU when the recording/reproducing device 1940 is activated, for example. By executing the programs, the CPU controls the operation of the recording/reproducing device 1940 in response to an operation signal input from the user interface unit 1950, for example.

The user interface unit 1950 is connected to the control unit 1949. The user interface unit 1950 includes, for example, a button and a switch for a user to operate the recording/reproducing device 1940, and a reception unit for receiving a remote control signal. The user interface unit 1950 generates the operation signal by detecting the operation of the user through these components, and outputs the generated operation signal to the control unit 1949.

In the recording/reproducing device 1940 with the above structure, the encoder 1943 has a function of the scalable encoding device 100 or image encoding device 900 (FIG. 62) according to the above embodiment. The decoder 1947 has a function of the scalable decoding device 200 or image decoding device 1000 (FIG. 71) according to the above embodiment. Thus, in the encoding and decoding of the image in the recording/reproducing device 1940, the deterioration in encoding efficiency can be suppressed and the deterioration in image quality due to the encoding and decoding can be suppressed.

<Fourth Application Example: Photographing Device>

Figure 87:
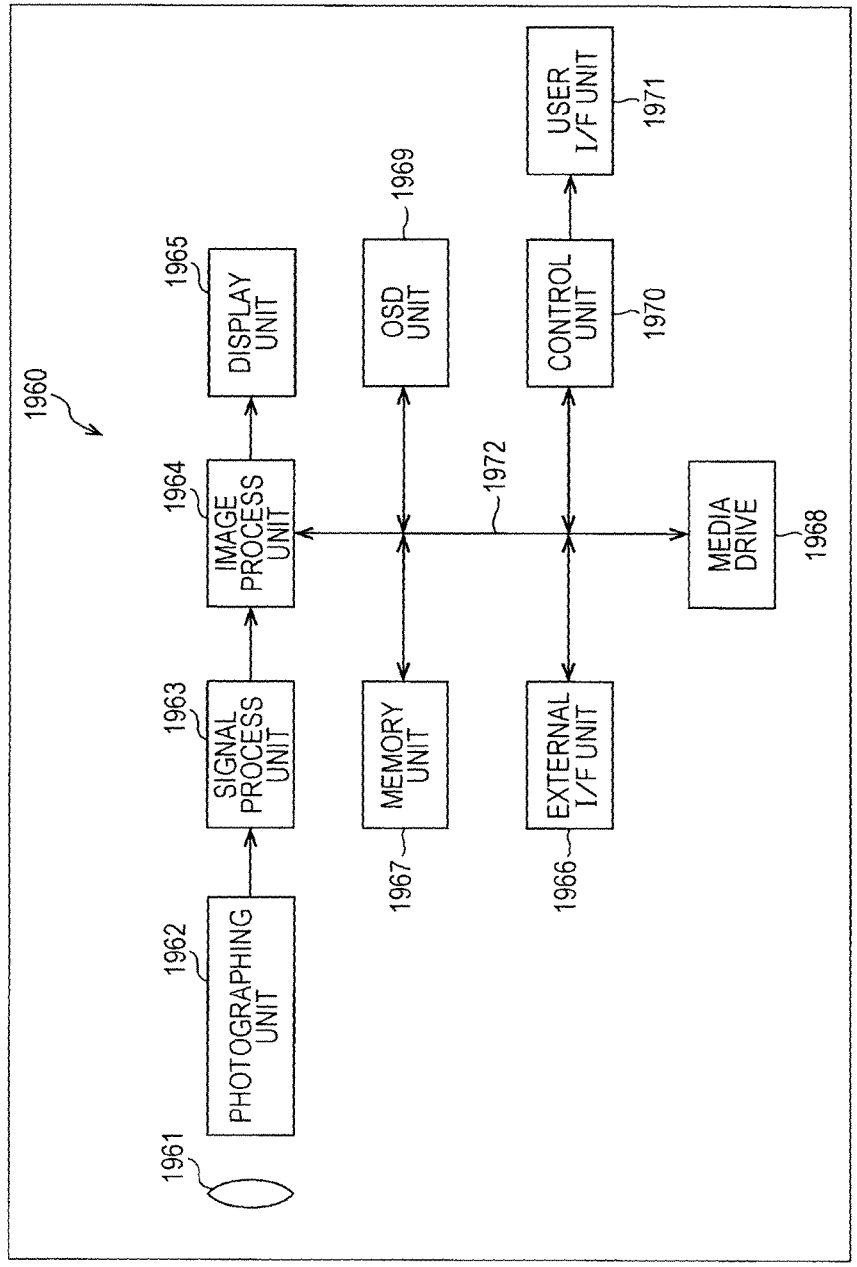
FIG. 87 is a block diagram illustrating an example of a schematic structure of a photographing device.

FIG. 87 illustrates an example of a schematic structure of a photographing device to which the above embodiment has been applied. A photographing device 1960 generates an image by photographing a subject, encodes the image data, and records the data in a recording medium.

The photographing device 1960 includes an optical block 1961, a photographing unit 1962, a signal process unit 1963, an image process unit 1964, a display unit 1965, an external interface (I/F) unit 1966, a memory unit 1967, a media drive 1968, an OSD 1969, a control unit 1970, a user interface (I/F) unit 1971, and a bus 1972.

The optical block 1961 is connected to the photographing unit 1962. The photographing unit 1962 is connected to the signal process unit 1963. The display unit 1965 is connected to the image process unit 1964. The user interface unit 1971 is connected to the control unit 1970. The bus 1972 connects among the image process unit 1964, the external interface unit 1966, the memory unit 1967, the media drive 1968, the OSD 1969, and the control unit 1970.

The optical block 1961 has a focusing lens, a diaphragm mechanism, and the like. The optical block 1961 focuses an optical image of a subject on a photographing surface of the photographing unit 1962. The photographing unit 1962 includes an image sensor such as a CCD (Charge Coupled Device) or a CMOS (Complementary Metal Oxide Semiconductor), and converts the optical image focused on the photographing surface into an image signal as an electric signal through photoelectric conversion. Then, the photographing unit 1962 outputs the image signal to the signal process unit 1963.

The signal process unit 1963 performs various camera signal processes such as knee correction, gamma correction, and color correction on the image signal input from the photographing unit 1962. The signal process unit 1963 outputs the image data after the camera signal process, to the image process unit 1964.

The image process unit 1964 encodes the image data input from the signal process unit 1963 and generates the encoded data. Then, the image process unit 1964 outputs the generated encoded data to the external interface unit 1966 or the media drive 1968. The image process unit 1964 decodes the encoded data input from the external interface unit 1966 or the media drive 1968, and generates the image data. Then, the image process unit 1964 outputs the generated image data to the display unit 1965. Moreover, the image process unit 1964 may output the image data input from the signal process unit 1963 to the display unit 1965 where the image is displayed. The image process unit 1964 may additionally overlap the display data acquired from the OSD 1969 on the image output to the display unit 1965.

The OSD 1969 generates the GUI image such as a menu, a button, or a cursor and outputs the generated image to the image process unit 1964.

The external interface unit 1966 is configured as, for example, a USB input/output terminal. The external interface unit 1966 connects, for example, between the photographing device 1960 and a printer when the image is printed. Moreover, the external interface unit 1966 can have a drive connected thereto when necessary. To the drive, for example, a removable medium such as a magnetic disk or an optical disk is attached, and the program read out from the removable medium can be installed in the photographing device 1960. Alternatively, the external interface unit 1966 may be configured as the network interface connected to the network such as LAN or the Internet. In other words, the external interface unit 1966 has a role of a transmission unit in the photographing device 1960.

The recording medium attached to the media drive 1968 may be, for example, any readable and writable removable medium such as a magnetic disk, a magneto-optic disk, an optical disk, or a semiconductor memory. The media drive 1968 may have the recording medium fixedly attached thereto and a non-transportable storage unit such as a built-in hard disk drive or an SSD (Solid State Drive) may be configured.

The control unit 1970 includes a processor such as a CPU, and a memory such as a RAM and a ROM. The memory stores programs to be executed by the CPU, and program data, etc. The programs stored in the memory are read in and executed by the CPU when the photographing device 1960 is activated, for example. By executing the programs, the CPU controls the operation of the photographing device 1960 in response to an operation signal input from the user interface unit 1971, for example.

The user interface unit 1971 is connected to the control unit 1970. The user interface unit 1971 includes, for example, a button and a switch for a user to operate the photographing device 1960. The user interface unit 1971 generates the operation signal by detecting the operation of the user through these components, and outputs the generated operation signal to the control unit 1970.

In the photographing device 1960 with the above structure, the image process unit 1964 has a function of the scalable encoding device 100 and the scalable decoding device 200, or a function of the image encoding device 900 (FIG. 62) and the image decoding device 1000 (FIG. 71) according to the above embodiment. Thus, in the encoding and decoding of the image in the photographing device 1960, the deterioration in encoding efficiency can be suppressed and the deterioration in image quality due to the encoding and decoding can be suppressed.

<17. Application Example of Scalable Encoding>
<First System>

Next, a specific example of using the scalably encoded data that have been subjected to scalable encoding (layer (image)-encoding) will be described. The scalable encoding is used for selecting the data to be transmitted as illustrated in FIG. 88, for example.

Figure 88:
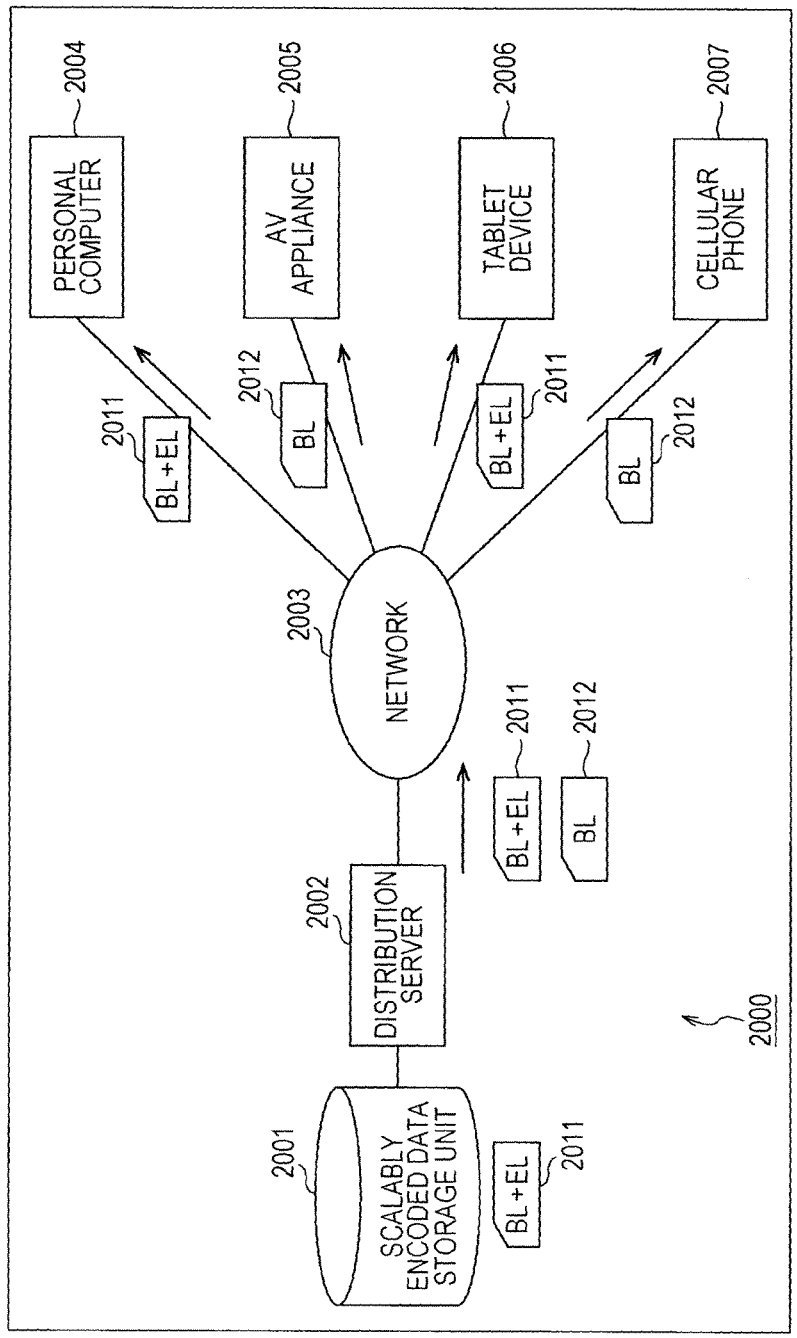
FIG. 88 is a block diagram illustrating an example of scalable encoding usage.

In a data transmission system 2000 illustrated in FIG. 88, a distribution server 2002 reads out the scalably encoded data stored in a scalably encoded data storage unit 2001, and distributes the data to a terminal device such as a personal computer 2004, an AV appliance 2005, a tablet device 2006, or a cellular phone 2007 through a network 2003.

On this occasion, the distribution server 2002 selects and transmits the encoded that with the appropriate quality in accordance with the capability or communication environment of the terminal device. Even though the distribution server 2002 transmits data with excessively high quality, the terminal device does not necessarily receive that high-quality image, in which case the delay or overflow may occur. Moreover, in that case, the communication band may be occupied or the load of the terminal device may be increased more than necessary. On the contrary, when the distribution server 2002 transmits the image with excessively low quality, the terminal device may not be able to obtain the image with the sufficient quality. Therefore, the distribution server 2002 reads out and transmits the scalably encoded data stored in the scalably encoded data storage unit 2001 as the encoded data with the quality suitable for the capability or communication environment of the terminal device as appropriate.

For example, the scalably encoded data storage unit 2001 stores scalably encoded data (BL+EL) 2011 that have been subjected to the scalable encoding. The scalably encoded data (BL+EL) 2011 are the encoded data including both the base layer and the enhancement layer, and by decoding the data, both the image of the base layer and the image of the enhancement layer can be obtained.

The distribution server 2002 selects the appropriate layer in accordance with the capability or the communication environment of the terminal device to which the data are transmitted, and reads out the data of that layer. For example, the distribution server 2002 reads out the high-quality scalably encoded data (BL+EL) 2011 from the scalably encoded data storage unit 2001 and transmits the data to the personal computer 2004 and the tablet device 2006 with high processing capability. In contrast to this, the distribution server 2002 extracts the data of the base layer from the scalably encoded data (BL+EL) 2011 and transmits the data as scalably encoded data (BL+EL) 2012, which have the same content as the scalably encoded data (BL+EL) 2011 but have lower quality than the scalably encoded data (BL+EL) 2011, to the AV appliance 2005 and the cellular phone 2007 with low processing capability.

By the use of the scalably encoded data as above, the data quantity can be adjusted easily; therefore, the delay or the overflow can be suppressed and the unnecessary increase in load of the terminal device or the communication medium can be suppressed. Moreover, since the scalably encoded data (BL+EL) 2011 has the redundancy between the layers reduced, the data quantity can be made smaller than that in the case where the encoded data of each layer are treated as the individual data. Thus, the storage region of the scalably encoded data storage unit 2001 can be used more efficiently.

Note that the terminal device may be various devices including the personal computer 2004 to the cellular phone 2007, and the capability of the hardware of the terminal device differs depending on the device. Moreover, since the terminal devices execute a wide variety of applications, the software has various levels of capability. Moreover, the network 2003 as the communication medium may be wired and/or wireless network such as the Internet or LAN (Local Area Network) or any other communication line; thus, the data transmission capability varies. Moreover, the data transmission capability may be affected by another communication.

In view of this, before the start of the data transmission, the distribution server 2002 may communicate with the terminal device to which the data are transmitted to obtain the information related to the capability of the terminal device such as the hardware performance of the terminal device or the performance of the application (software) to be executed by the terminal device, and the information related to the communication environment such as the usable bandwidth of the network 2003. Then, based on the obtained information, the distribution server 2002 may select the appropriate layer.

Note that the layer may be extracted in the terminal device. For example, the personal computer 2004 may decode the transmitted scalably encoded data (BL+EL) 2011 to display either the image of the base layer or the image of the enhancement layer. Alternatively, for example, the personal computer 2004 may extract the scalably encoded data (BL) 2012 of the base layer from the transmitted scalably encoded data (BL+EL) 2011, store the data, transfer the data to another device, or decode the data and display the image of the base layer.

Needless to say, the numbers of scalably encoded data storage units 2001, distribution servers 2002, networks 2003, and terminal devices may be determined arbitrarily. Although the above description has been made of the example in which the distribution server 2002 transmits the data to the terminal device, the usage example is not limited thereto. The data transmission system 2000 can be applied to any device that, when the scalably encoded data are transmitted to the terminal device, transmits the data while selecting the appropriate layer according to the capability or communication environment of the terminal device.

The data transmission system 2000 as illustrated in FIG. 88 can provide the effect similar to the above effect described with reference to FIG. 1 to FIG. 80 by applying the present technique to the layer encoding and decoding as described with reference to FIG. 1 to FIG. 80.

<Second System>

Figure 89:
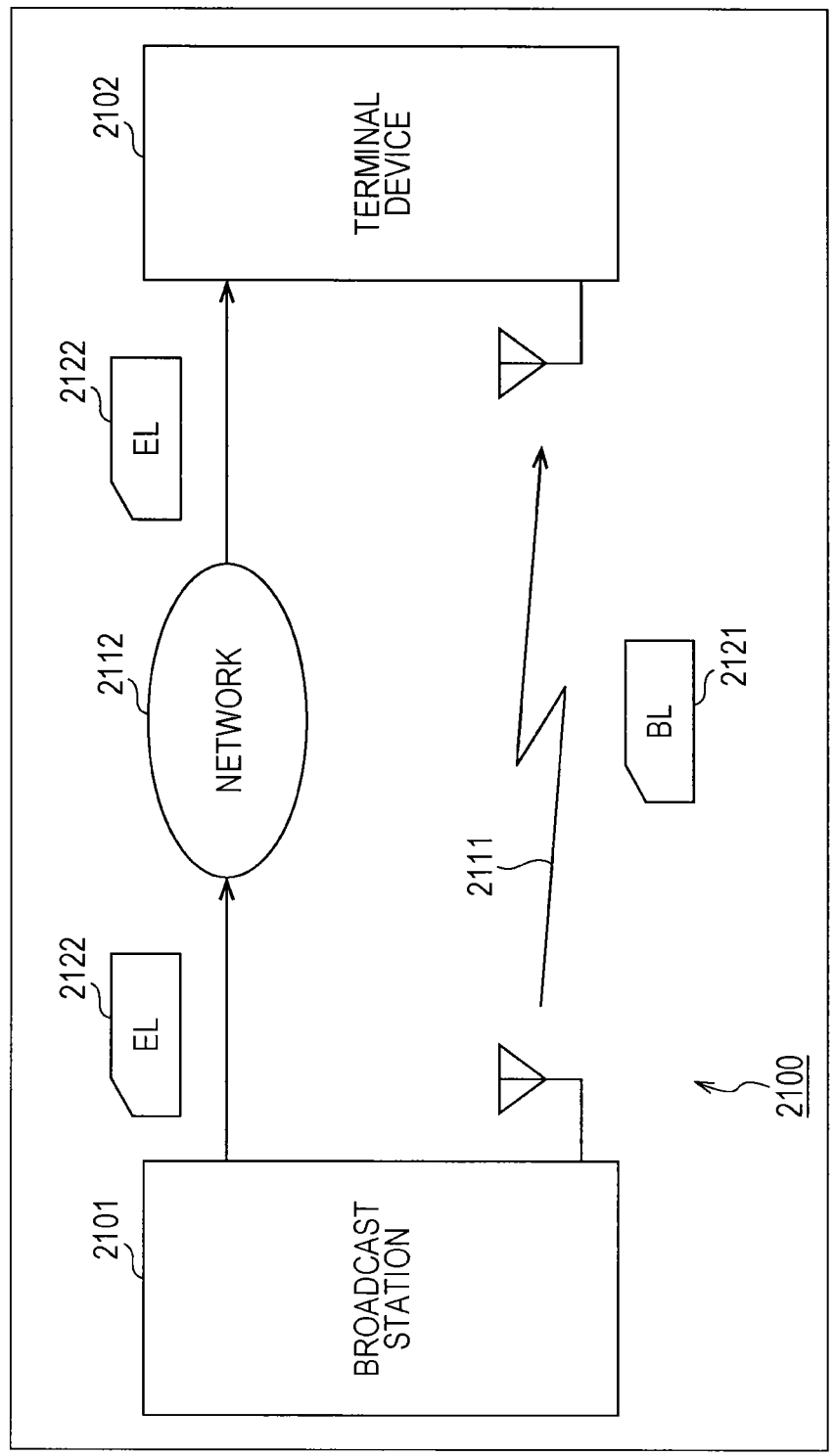
FIG. 89 is a block diagram illustrating another example of scalable encoding usage.

The scalable encoding is used for the transmission via a plurality of communication media as illustrated in an example of FIG. 89.

In a data transmission system 2100 illustrated in FIG. 89, a broadcast station 2101 transmits base layer scalably encoded data (BL) 2121 through terrestrial broadcasting 2111. The broadcast station 2101 transmits enhancement layer scalably encoded data (EL) 2122 through any network 2112 including a wired communication network, a wireless communication network, or a wired/wireless communication network (for example, transmission in packet).

The terminal device 2102 has a function of receiving the terrestrial broadcasting 2111 from the broadcast station 2101, and receives the base layer scalably encoded data (BL) 2121 transmitted through the terrestrial broadcasting 2111. The terminal device 2102 further has a function of communicating through the network 2112, and receives the enhancement layer scalably encoded data (EL) 2122 transmitted through the network 2112.

In response to the user instruction or the like, for example, the terminal device 2102 decodes the base layer scalably encoded data (BL) 2121 acquired through the terrestrial broadcasting 2111 to obtain the image of the base layer, store the image, or transfer the image to another device.

Moreover, in response to the user instruction, the terminal device 2102 obtains the scalably encoded data (BL+EL) by synthesizing the base layer scalably encoded data (BL) 2121 acquired through the terrestrial broadcasting 2111 and the enhancement layer scalably encoded data (EL) 2122 acquired through the network 2112, decodes the data to obtain the enhancement layer image, stores the image, or transfer the image to another device.

Thus, the scalably encoded data can be transmitted through a different communication medium for each layer, for example. Therefore, the load can be diffused and the delay or overflow can be suppressed.

The communication medium used in the transmission can be selected for each layer in accordance with the circumstances. For example, the base layer scalably encoded data (BL) 2121 whose data quantity is relatively large may be transmitted through the communication medium with a wide bandwidth, while the enhancement layer scalably encoded data (EL) 2122 whose data quantity is relatively small may be transmitted through the communication medium with a narrow bandwidth.

Alternatively, whether the communication medium that transmits the enhancement layer scalably encoded data (EL) 2122 is the network 2112 or the terrestrial broadcasting 2111 may be changed according to the usable bandwidth of the network 2112. Needless to say, this similarly applies to the data of any layer.

By the control as above, the increase in load in the data transmission can be suppressed.

The number of layers may be determined arbitrarily and the number of communication media used in the transmission may also be determined arbitrarily. Furthermore, the number of terminal devices 2102 to which the data are distributed may be determined arbitrarily. The above description has been made of the example of the broadcasting from the broadcast station 2101; however, the usage example is not limited thereto. The data transmission system 2100 can be applied to any system that transmits the scalably encoded data in a manner that the data are divided into a plurality of pieces in the unit of layer and transmitted through a plurality of lines.

The data transmission system 2100 as illustrated in FIG. 89 can provide the effect similar to the above effect described with reference to FIG. 1 to FIG. 80 by applying the present technique in a manner similar to the application to the layer encoding and decoding as described with reference to FIG. 1 to FIG. 80.

<Third System>

Figure 90:
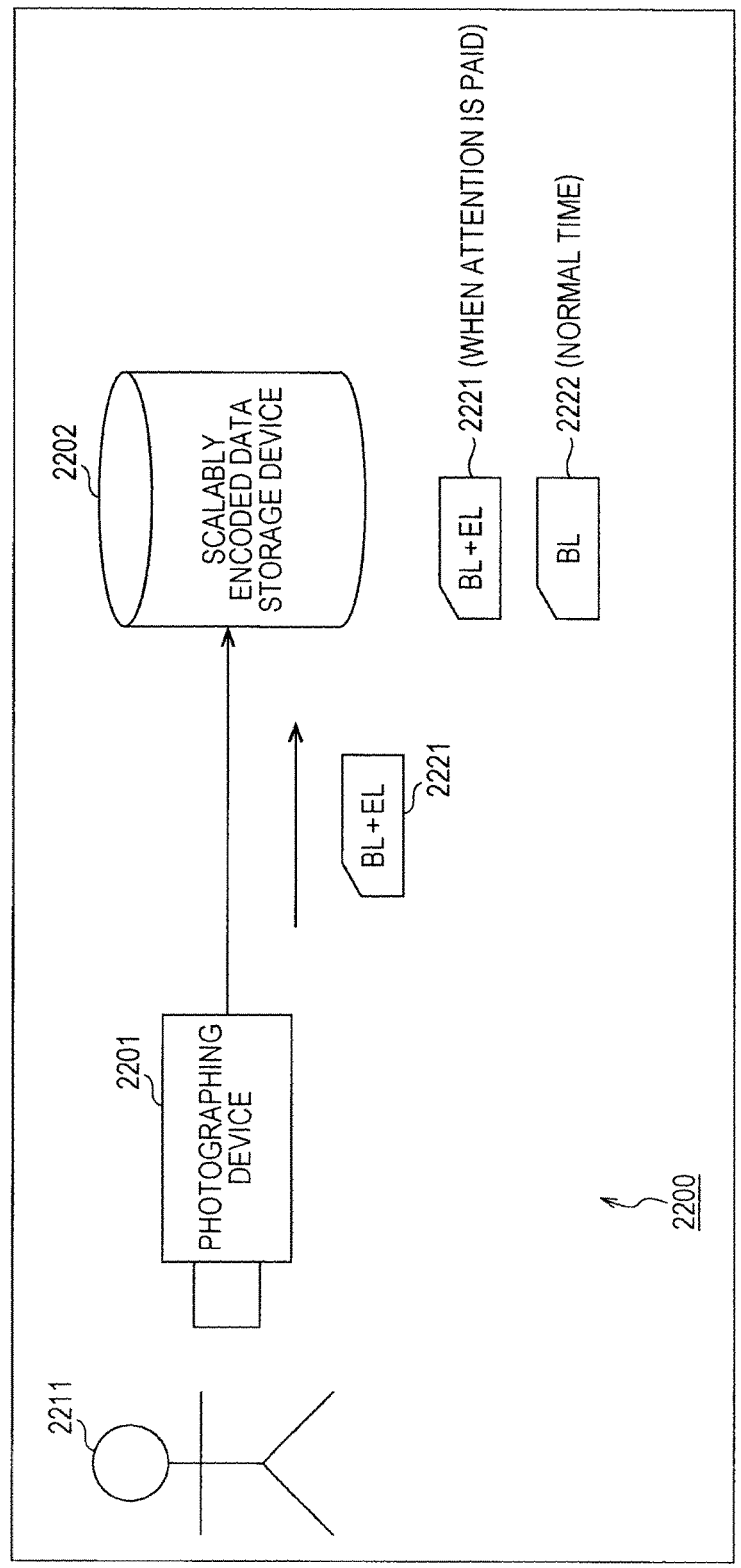
FIG. 90 is a block diagram illustrating another example of scalable encoding usage.

The scalable encoding is used for storing the encoded data as illustrated in an example of FIG. 90.

In a photographing system 2200 illustrated in FIG. 90, a photographing device 2201 performs the scalable encoding on the image data obtained by photographing a subject 2211, and supplies the data as scalably encoded data (BL+EL) 2221 to a scalably encoded data storage device 2202.

The scalably encoded data storage device 2202 stores the scalably encoded data (BL+EL) 2221 supplied from the photographing device 2201 with the quality based on the circumstances. For example, in the normal case, the scalably encoded data storage device 2202 extracts the data of the base layer from the scalably encoded data (BL+EL) 2221, and stores the data as the scalably encoded data (BL) 2222 with low quality and small data quantity. In contrast to this, in the case where attention is paid, the scalably encoded data storage device 2202 stores the scalably encoded data (BL+ EL) 2221 with high quality and large data quantity.

This enables the scalably encoded data storage device 2202 to save the image with high quality only when necessary; therefore, the increase in data quantity can be suppressed while the deterioration in image value due to the image degradation is suppressed. As a result, the use efficiency of the storage region can be improved.

For example, the photographing device 2201 is a monitor camera. If a target to be monitored (for example, intruder) is not present in the photographed image (in normal case), it is highly likely that the content of the photographed image is not important; therefore, priority is put to the reduction of data quantity and the image data (scalably encoded data) are stored with low quality. In contrast to this, if the target to be monitored is present as the subject 2211 in the photographed image (when attention is paid), it is highly likely that the content of the photographed image is important; therefore, priority is put to the image quality and the image data (scalably encoded data) are stored with high quality.

Whether the attention is paid or not may be determined by having the scalably encoded data storage device 2202 analyze the image, for example. Alternatively, the photographing device 2201 may determine and the determination result may be transmitted to the scalably encoded data storage device 2202.

The determination criterion on whether the attention is paid or not is arbitrarily set and the content of the image as the criterion is arbitrarily set. Needless to say, the condition other than the content of the image can be used as the determination criterion. For example, whether attention is paid or not may be changed based on the magnitude or waveform of the recorded audio, for every predetermined period of time, or in response to the instruction from the outside such as the user instruction.

The above description has been made of an example of changing the two states of when the attention is paid and not paid; however, the number of states may be determined arbitrarily. For example, three or more states may be set: attention is not paid, a little attention is paid, attention is paid, and careful attention is paid. The upper-limit number of states to be changed depends on the number of layers of the scalably encoded data.

The number of layers of the scalable encoding may be decided by the photographing device 2201 in accordance with the state. In the normal case, the photographing device 2201 may generate the base layer scalably encoded data (BL) 2222 with low quality and small data quantity, and supply the data to the scalably encoded data storage device 2202. On the other hand, when attention is paid, the photographing device 2201 may generate the base layer scalably encoded data (BL+EL) 2221 with high quality and large data quantity, and supply the data to the scalably encoded data storage device 2202.

The above description has been made of the example of the monitor camera; however, the application of the photographing system 2200 is arbitrarily set and is not limited to the monitor camera.

The photographing system 2200 as illustrated in FIG. 90 can provide the effect similar to the above effect described with reference to FIG. 1 to FIG. 80 by applying the present technique in a manner similar to the application to the layer encoding and decoding as described with reference to FIG. 1 to FIG. 80.

The present technique can also be applied to the HTTP streaming such as MPEG or DASH in which the appropriate piece of data is selected in the unit of segment from among the prepared encoded data whose resolution and the like are different. In other words, the information related to the encoding or decoding can be shared among the pieces of encoded data.

<18. Thirteenth Embodiment>
<Another Example of Embodiment>

The above description has been made of the example of the device or the system to which the present technique has been applied; however, the present technique is not limited thereto. The present technique can be applied to any kind of a structure mounted on the device as above and a structure included in the system, for example, to a processor as a system LSI (Large Scale Integration), a module including a plurality of processors, a unit including a plurality of modules, and a set having another function added to the unit (that is, the structure of a part of the device).

<Video Set>

Figure 91:
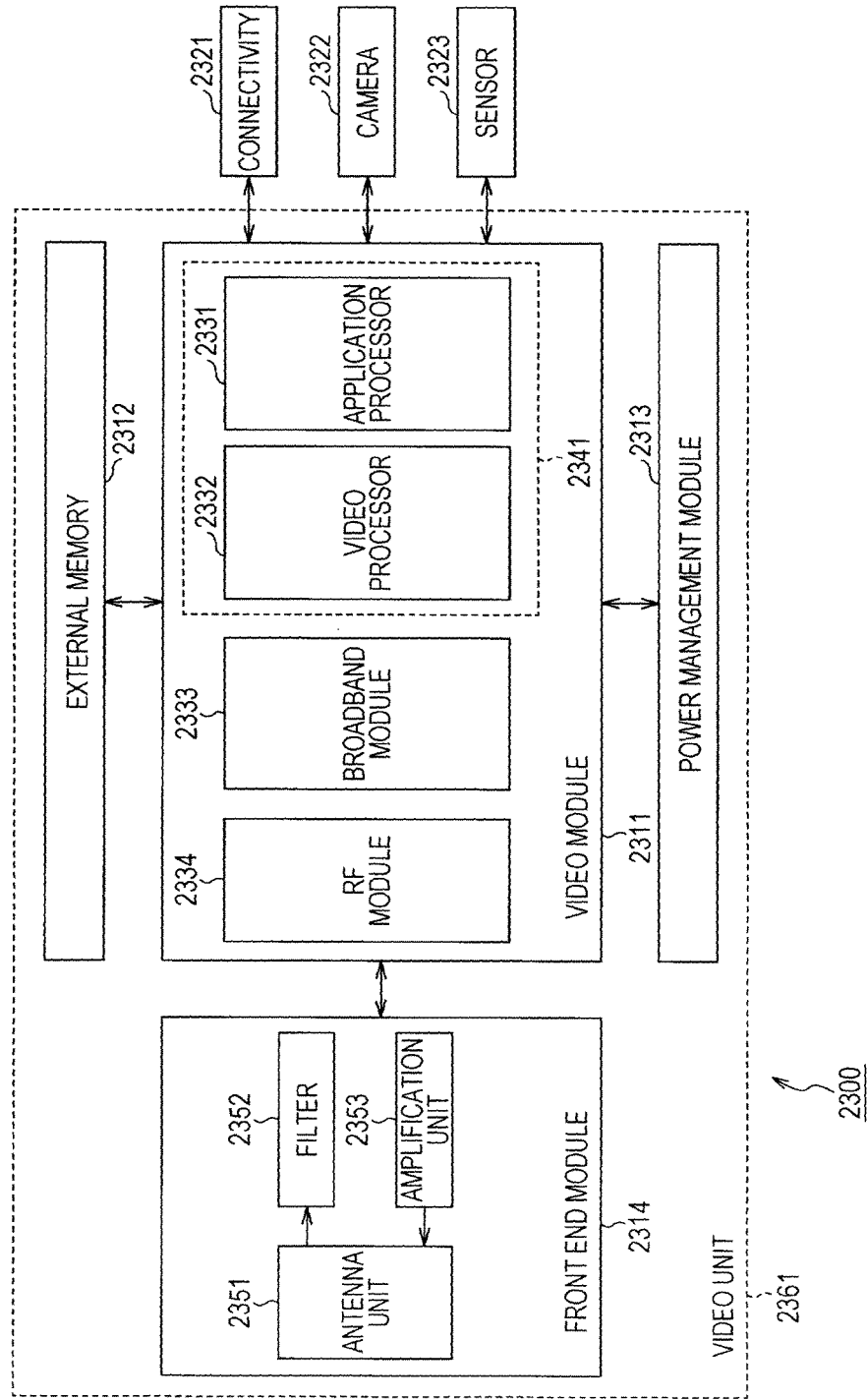
FIG. 91 is a block diagram illustrating an example of a schematic structure of a video set.

An example of carrying out the present technique as a set is described with reference to FIG. 91. FIG. 91 illustrates an example of a schematic structure of a video set to which the present technique has been applied.

In recent years, electronic appliances have come to have various functions, and when just a part of the structure is sold or provided in the development and manufacture, it is often seen that not just one structure is provided but a plurality of structures with correlated functions is combined and sold as one multi-functional set.

A video set 2300 illustrated in FIG. 91 has a structure with various functions, which is formed by having a device with a function related to image encoding or decoding (either one of them or both) added to a device with another function related to the above function.

As illustrated in FIG. 91, the video set 2300 includes a module group including a video module 2311, an external memory 2312, a power management module 2313, a front end module 2314, and the like, and devices with correlated functions including a connectivity 2321, a camera 2322, and a sensor 2323, etc.

The module refers to a component with several partial but united functions that are relevant to each other. The specific physical structure is arbitrarily given; for example, a plurality of electronic circuit elements each having its own function, such as a processor, a resistor, and a capacitor, and other devices are disposed on a wiring board and integrated. Further, another module or processor may be combined with the above module to form a new module.

In the case of the example of FIG. 91, the video module 2311 is the combination of the structures with functions related to image processing, and includes an application processor 2331, a video processor 2332, a broadband modem 2333, and an RF module 2334.

The processor is formed by integrating structures with predetermined functions on a semiconductor chip through SoC (System on Chip), and is also referred to as, for example, a system LSI (Large Scale Integration). The structure with the predetermined function may be a logic circuit (hardware structure), a CPU, a ROM, a RAM or the like, a program executed using the same (software structure), or the combination of the both. For example, the processor may have a logic circuit, and a CPU, a ROM, a RAM, or the like and have a part of the function achieved by the logic circuit (hardware structure) and the other functions may be achieved by a program (software structure) executed in the CPU.

The application processor 2331 in FIG. 91 is the processor that executes the application for the image processing. The application executed in the application processor 2331 not just performs the calculation process but also controls the structures in and out of the video module 2311 such as the video processor 2332 for achieving the predetermined function.

The video processor 2332 is the processor with the function for the image encoding or decoding (one of them or both).

The broadband modem 2333 converts the data (digital signal) transmitted through the wired or wireless (or both) broadband communication performed via a broadband line such as the Internet or public telephone network into analog signals through digital modulation, or converts the analog signal received through the broadband communication into data (digital signals) by demodulating the analog signal. The broadband modem 2333 processes any piece of information including the image data, the stream in which the image data are encoded, the application program, and the setting data to be processed by the video processor 2332, for example.

The RF module 2334 is the module that performs the frequency conversion, modulation/demodulation, amplification, filtering, and the like on the RF (Radio Frequency) signal that are exchanged via the antenna. For example, the RF module 2334 generates the RF signal by converting the frequency of the base band signal generated by the broadband modem 2333. In another example, the RF module 2334 generates the base band signal by converting the frequency of the RF signal received via the front end module 2314.

As indicated by a dotted line 2341 in FIG. 91, the application processor 2331 and the video processor 2332 may be integrated into one processor.

The external memory 2312 is the module provided outside the video module 2311 and having a storage device used by the video module 2311. The storage device of the external memory 2312 may be achieved by any physical structure; however, since the storage device is often used for storage of high-capacity data such as the image data in the unit of frame, the storage device is desirably achieved by a semiconductor memory that has high capacity but costs less like a DRAM (Dynamic Random Access Memory).

The power management module 2313 manages and controls the power supply to the video module 2311 (each structure in the video module 2311).

The front end module 2314 is the module that provides the RF module 2334 with the front end function (circuit on the transmission/reception end of the antenna side. As illustrated in FIG. 91, the front end module 2314 has, for example, an antenna unit 2351, a filter 2352, and an amplification unit 2353.

The antenna unit 2351 has an antenna that transmits and receives wireless signals and a peripheral structure thereof. The antenna unit 2351 transmits the signal supplied from the amplification unit 2353 and supplies the received wireless signal to the filter 2352 as an electric signal (RF signal). The filter 2352 filters the RF signal received through the antenna unit 2351 and supplies the processed RF signal to the RF module 2334. The amplification unit 2353 amplifies the RF signal supplied from the RF module 2334 and supplies the signal to the antenna unit 2351.

The connectivity 2321 is the module having the function related to the external connection. The physical structure of the connectivity 2321 may be determined arbitrarily. For example, the connectivity 2321 has a structure with a communication function other than the communication specification for the broadband modem 2333, and an external input/output terminal, etc.

For example, the connectivity 2321 may have a module with a communication function based on the wireless communication specification such as Bluetooth (registered trademark), IEEE 802.11 (for example, Wi-Fi (Wireless Fidelity, registered trademark)), NFC (Near Field Communication), or IrDA (Infrared Data Association), an antenna that transmits or receives the signal based on that specification, and the like. Alternatively, the connectivity 2321 may have a module with a communication function based on the wired communication specification such as USB (Universal Serial Bus) or HDMI (registered trademark, High-Definition Multimedia Interface), a terminal based on that specification, and the like. Further alternatively, the connectivity 2321 may have another data (signal) transmission function such as an analog input/output terminal, or the like.

Note that the connectivity 2321 may incorporate a device to which the data (signal) are transmitted. For example, the connectivity 2321 may have a drive (not just the drive of the removable medium but also a hard disk, an SSD (Solid State Drive), and a NAS (Network Attached Storage)) that reads out or writes data from and in a recording medium such as a magnetic disk, an optical disk, a magneto-optical disk, or a semiconductor memory. The connectivity 2321 may have a device that outputs the image or audio (monitor, speaker, or the like).

The camera 2322 is the module that photographs a subject and obtains image data of the subject. The image data obtained by the photographing with the camera 2322 are supplied to, for example, the video processor 2332 and encoded therein.

The sensor 2323 is the module with any sensor function, such as an audio sensor, an ultrasonic wave sensor, a light sensor, an illuminance sensor, an infrared-ray sensor, an image sensor, a rotation sensor, an angle sensor, an angular velocity sensor, a speed sensor, an acceleration sensor, an inclination sensor, a magnetic identification sensor, a shock sensor, or a temperature sensor. The data detected by the sensor 2323 are supplied to the application processor 2331 and used by the application, etc.

The structure described as the module may be achieved as a processor or on the contrary, the structure described as the processor may be achieved as a module.

In the video set 2300 with the above structure, the present technique can be applied to the video processor 2332 as described below. Therefore, the video set 2300 can be used as the set to which the present technique has been applied.

<Structure Example of Video Processor>

Figure 92:
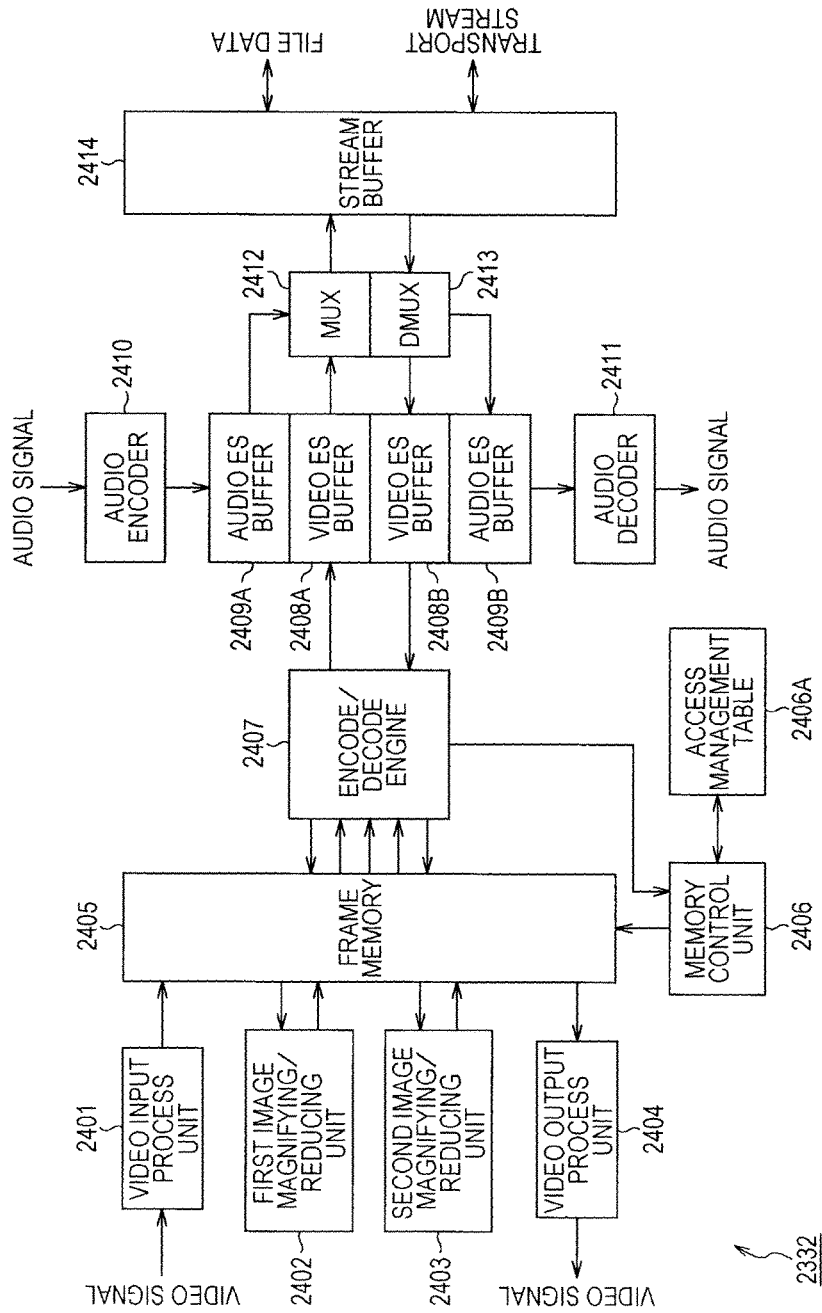
FIG. 92 is a block diagram illustrating an example of a schematic structure of a video processor.

FIG. 92 illustrates an example of a schematic structure of the video processor 2332 (FIG. 91) to which the present technique has been applied.

In the case of the example of FIG. 92, the video processor 2332 has a function of encoding a video signal and an audio signal in a predetermined method upon the reception of the signals, and a function of decoding the encoded video data and audio data and reproducing and outputting the video signal and the audio signal.

As illustrated in FIG. 92, the video processor 2332 includes a video input process unit 2401, a first image magnifying/reducing unit 2402, a second image magnifying/reducing unit 2403, a video output process unit 2404, a frame memory 2405, and a memory control unit 2406. The video processor 2332 includes an encode/decode engine 2407, video ES (Elementary Stream) buffers 2408A and 2408B, and audio ES buffers 2409A and 2409B. The video processor 2332 further includes an audio encoder 2410, an audio decoder 2411, a multiplexer (MUX (Multiplexer)) 2412, a demultiplexer (DMUX (Demultiplexer)) 2413, and a stream buffer 2414.

The video input process unit 2401 acquires the video signal input from, for example, the connectivity 2321 (FIG. 91) and converts the signal into digital image data. The first image magnifying/reducing unit 2402 performs the format conversion on the image data or magnifies/reduces the image. The second image magnifying/reducing unit 2403 performs the image magnifying/reducing process on the image data according to the format at the destination to which the data are output through the video output process unit 2404, or performs the format conversion on the image data or magnifies/reduces the image in a manner similar to the first image magnifying/reducing unit 2402. The video output process unit 2404 performs the format conversion on the image data or converts the image data into analog signals, for example, and outputs the data as the reproduced video signal to the connectivity 2321 (FIG. 91), for example.

The frame memory 2405 is the memory for the image data shared by the video input process unit 2401, the first image magnifying/reducing unit 2402, the second image magnifying/reducing unit 2403, the video output process unit 2404, and an encode/decode engine 2407. The frame memory 2405 is achieved as, for example, a semiconductor memory such as a DRAM.

The memory control unit 2406 controls the access of writing and reading in and from the frame memory 2405 according to the access schedule for the frame memory 2405 that has been written in an access management table 2406A upon the reception of a synchronization signal from the encode/decode engine 2407. The access management table 2406A is updated by the memory control unit 2406 in response to the process executed by the encode/decode engine 2407, the first image magnifying/reducing unit 2402, the second image magnifying/reducing unit 2403, or the like.

The encode/decode engine 2407 encodes the image data and decodes the video stream, which is the data obtained by encoding the image data. For example, the encode/decode engine 2407 encodes the image data read out from the frame memory 2405, and sequentially writes the data in the video ES buffer 2408A as the video streams. Moreover, the encode/decode engine 2407 sequentially reads out the video streams from the video ES buffer 2408B and sequentially writes the streams in the frame memory 2405 as the image data. The encode/decode engine 2407 uses the frame memory 2405 as a work region in the encoding and decoding. The encode/decode engine 2407 outputs a synchronization signal to the memory control unit 2406 at the timing at which the process for each macroblock is started, for example.

The video ES buffer 2408A buffers the video stream generated by the encode/decode engine 2407, and supplies the stream to the multiplexer (MUX) 2412. The video ES buffer 2408B buffers the video stream supplied from the demultiplexer (DMUX) 2413 and supplies the stream to the encode/decode engine 2407.

The audio ES buffer 2409A buffers the audio stream generated by the audio encoder 2410, and supplies the stream to the multiplexer (MUX) 2412. The audio ES buffer 2409B buffers the audio stream supplied from the demultiplexer (DMUX) 2413 and supplies the stream to the audio decoder 2411.

The audio encoder 2410 converts the audio signal input from the connectivity 2321 (FIG. 91), for example, into the digital signals, thereby encoding the signal in a predetermined method such as the MPEG audio method or AC3 (AudioCode number 3). The audio encoder 2410 sequentially writes the audio stream as the data obtained by encoding the audio signals into the audio ES buffer 2409A. The audio decoder 2411 decodes the audio stream supplied from the audio ES buffer 2409B, and converts the stream into analog signals, and then supplies the signals as the reproduced audio signals to, for example, the connectivity 2321 (FIG. 91).

The multiplexer (MUX) 2412 multiplexes the video stream and the audio stream. A method for this multiplexing (i.e., format of the bit stream generated by the multiplexing) may be determined arbitrarily. In the multiplexing, the multiplexer (MUX) 2412 may add predetermined header information or the like to the bit stream. In other words, the multiplexer (MUX) 2412 can convert the format of the stream by the multiplexing. For example, the multiplexer (MUX) 2412 multiplexes the video stream and the audio stream to convert the streams into the transport stream, which is the bit stream in the format for transfer. In another example, the multiplexer (MUX) 2412 multiplexes the video stream and the audio stream to convert the streams into the data (file data) in the file format for recording.

The demultiplexer (DMUX) 2413 demultiplexes the bit stream in which the video stream and the audio stream are multiplexed, by a method corresponding to the multiplexing by the multiplexer (MUX) 2412. In other words, the demultiplexer (DMUX) 2413 extracts the video stream and the audio stream from the bit streams read out of the stream buffer 2414 (separates the video stream and the video stream from each other). That is to say, the demultiplexer (DMUX) 2413 can convert the format of the stream by demultiplexing (inverted conversion of the conversion by the multiplexer (MUX) 2412). For example, the demultiplexer (DMUX) 2413 acquires the transport stream supplied from the connectivity 2321 or the broadband modem 2333 (both illustrated in FIG. 91) through the stream buffer 2414, and demultiplexes the stream, whereby the transport stream can be converted into the video stream and the audio stream. In another example, the demultiplexer (DMUX) 2413 acquires the file data read out from each recording medium by the connectivity 2321 (FIG. 91) through the stream buffer 2414, and demultiplexes the stream, whereby the data can be converted into the video stream and the audio stream.

The stream buffer 2414 buffers the bit stream. For example, the stream buffer 2414 buffers the transport stream supplied from the multiplexer (MUX) 2412, and supplies the stream to the connectivity 2321 or the broadband modem 2333 (both illustrated in FIG. 91) at a predetermined timing or upon a request from the outside.

In another example, the stream buffer 2414 buffers the file data supplied from the multiplexer (MUX) 2412 and supplies the data to the connectivity 2321 (FIG. 91) or the like at a predetermined timing or upon a request from the outside, and records the data in various kinds of recording media.

Further, the stream buffer 2414 buffers the transport stream acquired through the connectivity 2321 or the broadband modem 2333 (both illustrated in FIG. 91), and supplies the stream to the demultiplexer (DMUX) 2413 at a predetermined timing or upon a request from the outside.

The stream buffer 2414 buffers the file data read out from the recording medium at the connectivity 2321 (FIG. 91), and supplies the data to the demultiplexer (DMUX) 2413 at a predetermined timing or upon a request from the outside.

Next, an example of the operation of the video processor 2332 with the above structure is described. For example, the video signal input to the video processor 2332 from the connectivity 2321 (FIG. 91) or the like is converted into the digital image data in a predetermined method such as 4:2:2 Y/Cb/Cr method in the video input process unit 2401, and the image data are sequentially written in the frame memory 2405. The digital image data are read out by the first image magnifying/reducing unit 2402 or the second image magnifying/reducing unit 2403, are subjected to the format conversion into 4:2:0 Y/Cb/Cr method and magnified or reduced, and then written in the frame memory 2405 again. The image data are encoded by the encode/decode engine 2407 and written in the video ES buffer 2408A as the video stream.

Moreover, the audio signal input from the connectivity 2321 (FIG. 91) to the video processor 2332 is encoded by the audio encoder 2410, and written in the audio ES buffer 2409A as the audio stream.

The video stream of the video ES buffer 2408A and the audio stream of the audio ES buffer 2409A are read out by the multiplexer (MUX) 2412 and multiplexed therein to be converted into the transport stream or the file data, for example. The transport stream generated by the multiplexer (MUX) 2412 is buffered by the stream buffer 2414, and output to the external network through the connectivity 2321 or the broadband modem 2333 (both illustrated in FIG. 91). The file data generated by the multiplexer (MUX) 2412 are buffered by the stream buffer 2414 and then output to the connectivity 2321 (FIG. 91) or the like, and then recorded in various recoding media.

The transport stream input to the video processor 2332 from the external network through the connectivity 2321 or the broadband modem 2333 (both illustrated in FIG. 91) is buffered by the stream buffer 2414 and then demultiplexed by the demultiplexer (DMUX) 2413. The file data read out from the recording medium and input to the video processor 2332 at the connectivity 2321 (FIG. 91) are buffered by the stream buffer 2414 and then demultiplexed by the demultiplexer (DMUX) 2413. In other words, the file data or the transport stream input to the video processor 2332 is separated into the video stream and the audio stream by the demultiplexer (DMUX) 2413.

The audio stream is supplied to the audio decoder 2411 through the audio ES buffer 2409B and decoded, so that the audio signal is reproduced. The video stream is written in the video ES buffer 2408B and sequentially read out by the encode/decode engine 2407 and decoded, and written in the frame memory 2405. The decoded image data are magnified or reduced by the second image magnifying/reducing unit 2403 and written in the frame memory 2405. The decoded image data are read out by the video output process unit 2404 and subjected to the format conversion into a predetermined format such as 4:2:2 Y/Cb/Cr method, and are further converted into an analog signal, so that the video signal is reproduced and output.

When the present technique is applied to the video processor 2332 with this structure, the present technique according to any of the above embodiments may be applied to the encode/decode engine 2407. For example, the encode/decode engine 2407 may have a function of the scalable encoding device 100 and the scalable decoding device 200 or the image encoding device 900 (FIG. 62) and the image decoding device 1000 (FIG. 71) according to the above embodiment. Thus, the video processor 2332 can provide the effect similar to that of the above effect described with reference to FIG. 1 to FIG. 80.

In the encode/decode engine 2407, the present technique (i.e., the function of the image encoding device and the image decoding device according to any of the above embodiments) may be achieved by hardware such as a logic circuit or software such as a built-in program, or both the hardware and the software.

<Another Structure Example of Video Processor>

Figure 93:
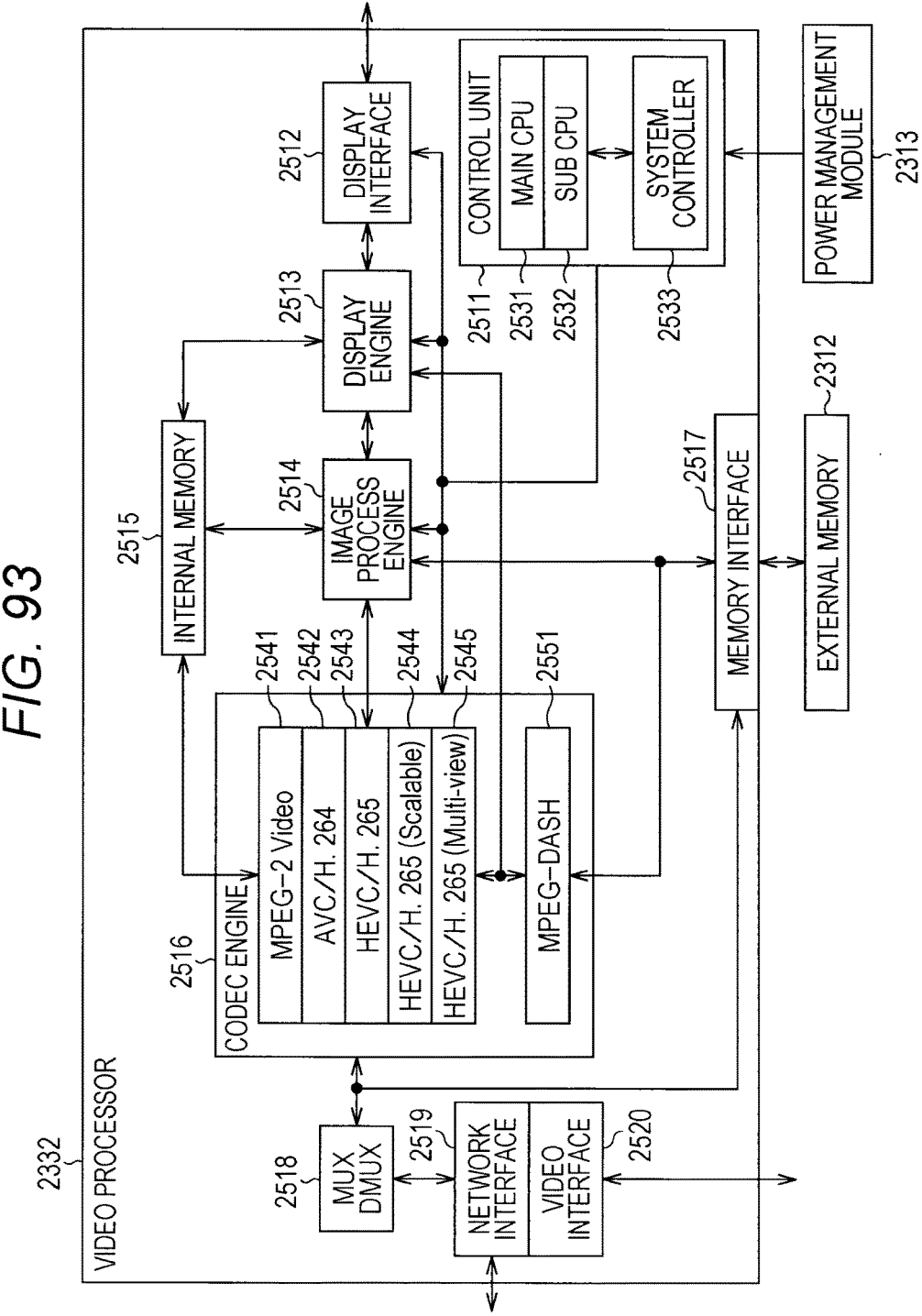
FIG. 93 is a block diagram illustrating another example of a schematic structure of a video processor.

FIG. 93 illustrates another example of a schematic structure of the video processor 2332 (FIG. 91) to which the present technique has been applied. In the case of the example of FIG. 93, the video processor 2332 has a function of encoding and decoding video data in a predetermined method.

More specifically, as illustrated in FIG. 93, the video processor 2332 includes a control unit 2511, a display interface 2512, a display engine 2513, an image processing engine 2514, and an internal memory 2515. The video processor 2332 includes a codec engine 2516, a memory interface 2517, a multiplexer/demultiplexer (MUX/DMUX) 2518, a network interface 2519, and a video interface 2520.

The control unit 2511 controls the operation of the process units in the video processor 2332, such as the display interface 2512, the display engine 2513, the image processing engine 2514, and the codec engine 2516.

As illustrated in FIG. 93, the control unit 2511 includes, for example, a main CPU 2531, a subCPU 2532, and a system controller 2533. The main CPU 2531 executes the programs and the like for controlling the operation of the process units in the video processor 2332. The main CPU 2531 generates control signals in accordance with the programs and the like and supplies the signals to the process units (i.e., controls the operation of the process units). The subCPU 2532 serves to assist the main CPU 2531. For example, the subCPU 2532 executes the child process or subroutine of the programs executed by the main CPU 2531. The system controller 2533 controls the operation of the main CPU 2531 and the subCPU 2532; for example, the system controller 2533 specifies the programs to be executed by the main CPU 2531 and the subCPU 2532.

The display interface 2512 outputs the image data to, for example, the connectivity 2321 (FIG. 91) under the control of the control unit 2511. For example, the display interface 2512 converts the digital image data to the analog signals and outputs the data as the reproduced video signal or in the form of digital data to the monitor device or the like of the connectivity 2321 (FIG. 91).

Under the control of the control unit 2511, the display engine 2513 performs various conversion processes such as format conversion, size conversion, and color range conversion on the image data to suit the specification of the hardware such as the monitor device where the image is displayed.

The image processing engine 2514 performs a predetermined image process such as filtering for image improvement on the image data under the control of the control unit 2511.

The internal memory 2515 is the memory provided in the video processor 2332 and is shared among the display engine 2513, the image processing engine 2514, and the codec engine 2516. The internal memory 2515 is used to exchange data among the display engine 2513, the image processing engine 2514, and the codec engine 2516. For example, the internal memory 2515 stores the data supplied from the display engine 2513, the image processing engine 2514, and the codec engine 2516, and supplies the data to the display engine 2513, the image processing engine 2514, or the codec engine 2516 as necessary (or upon a request). The internal memory 2515 may be formed by any kind of storage device; generally, since the memory is used to store the small quantity of data such as the image data or parameters in the unit of block, the internal memory 2515 is desirably formed by a semiconductor memory that has relatively small capacity (smaller capacity than the external memory 2312) but has high response speed, such as an SRAM (Static Random Access Memory).

The codec engine 2516 performs the processes for encoding or decoding the image data. The method of encoding or decoding by the codec engine 2516 is determined arbitrarily and the number of methods may be one or more than one. For example, the codec engine 2516 may have a codec function of a plurality of encoding/decoding methods, and may encode the image data or decode the encoded data by the selected method.

In the example illustrated in FIG. 93, the codec engine 2516 has, for example, MPEG-2 Video 2541, AVC/H.2642542, HEVC/H.2652543, HEVC/H.265 (Scalable) 2544, HEVC/H.265 (Multi-view) 2545, and MPEG-DASH 2551 as the function blocks of the process related to the codec.

MPEG-2 Video 2541 corresponds to the function block that encodes or decodes the image data in the MPEG-2 method. AVC/H.264 2542 corresponds to the function block that encodes or decodes the image data in the AVC method. HEVC/H.2652543corresponds to the function block that encodes or decodes the image data in the HEVC method. HEVC/H.265 (Scalable) 2544 corresponds to the function block that scalably encodes or scalably decodes the image data in the HEVC method. HEVC/H.265 (Multi-view) 2545 corresponds to the function block that encodes or decodes the image data with multiple viewpoints in the HEVC method.

MPEG-DASH 2551 corresponds to the function block that transmits or receives the image data in the MPEG-DASH (MPEG-Dynamic Adaptive Streaming over HTTP) method. MPEG-DASH is the technique of streaming the video using HTTP (HyperText Transfer Protocol), and one feature thereof is to select and transmit the appropriate piece of prepared encoded data with different resolutions, etc. in the unit of segment. MPEG-DASH 2551 generates the stream based on the specification or controls the transmission of the stream, and uses the aforementioned MPEG-2 Video 2541 to HEVC/H.265(Multi-view) 2545 in the encoding and decoding of the image data.

The memory interface 2517 is the interface for the external memory 2312. The data supplied from the image processing engine 2514 or the codec engine 2516 are supplied to the external memory 2312 through the memory interface 2517. The data read out from the external memory 2312 are supplied to the video processor 2332 (image processing engine 2514 or codec engine 2516) through the memory interface 2517.

The multiplexer/demultiplexer (MUX/DMUX) 2518 multiplexes or demultiplexes various pieces of data related to the image, such as the bit stream of the encoded data, the image data, and the video signals. The method of the multiplexing/demultiplexing is determined arbitrarily. For example, in the multiplexing, in addition to collecting the plural pieces of data, the multiplexer/demultiplexer (MUX/DMUX) 2518 can add predetermined header information, etc. to the collected data. On the contrary, in the demultiplexing, in addition to dividing the data into plural pieces, the multiplexer/demultiplexer (MUX/DMUX) 2518 can add predetermined header information to the divided piece of data. In other words, the multiplexer/demultiplexer (MUX/DMUX) 2518 can convert the format of the data by the multiplexing/demultiplexing. For example, the multiplexer/demultiplexer (MUX/DMUX) 2518 can convert the bit stream into the transport stream, which is the bit stream of the transfer format, or the data in the file format for recording (file data) by multiplexing the bit stream. Needless to say, the inverse conversion is also possible by the demultiplexing.

The network interface 2519 is the interface for the broadband modem 2333 and the connectivity 2321 (both illustrated in FIG. 91), etc. The video interface 2520 is the interface for the connectivity 2321 and the camera 2322 (both illustrated in FIG. 91), etc.

Next, an example of the operation of the video processor 2332 as above is described. For example, upon the reception of the transport stream from the external network through the connectivity 2321 or the broadband modem 2333 (both illustrated in FIG. 91), the transport stream is supplied to the multiplexer/demultiplexer (MUX/DMUX) 2518 through the network interface 2519, demultiplexed therein, and decoded by the codec engine 2516. The image data obtained by the decoding of the codec engine 2516 are subjected to a predetermined image process by the image processing engine 2514, and to a predetermined conversion by the display engine 2513 and the data are supplied to the connectivity 2321 (FIG. 91) or the like through the display interface 2512; thus, the image is displayed on the monitor. In another example, the image data obtained by the decoding of the codec engine 2516 are encoded again by the codec engine 2516 and multiplexed by the multiplexer/demultiplexer (MUX/DMUX) 2518 and converted into the file data; then, the data are output to the connectivity 2321 (FIG. 91) or the like through the video interface 2520 and recorded in various recording media.

In another example, the file data of the encoded data in which the image data are encoded, which have been readout from the recording medium (not shown) by the connectivity 2321 (FIG. 91) or the like are supplied to the multiplexer/demultiplexer (MUX/DMUX) 2518 through the video interface 2520 and demultiplexed therein, and decoded by the codec engine 2516. The image data obtained by the decoding of the codec engine 2516 are subjected to a predetermined image process by the image processing engine 2514, and to a predetermined conversion by the display engine 2513; then, the data are supplied to the connectivity 2321 (FIG. 91) or the like through the display interface 2512 and the image is displayed on the monitor. In another example, the image data obtained by the decoding of the codec engine 2516 are encoded again by the codec engine 2516 and multiplexed by the multiplexer/demultiplexer (MUX/DMUX) 2518 and converted into the transport stream; then, the data are transmitted to the connectivity 2321 or the broadband modem 2333 (both illustrated in FIG. 91) or the like through the network interface 2519 and transmitted to another device which is not shown.

The image data or another piece of data is exchanged among the process units in the video processor 2332 through, for example, the internal memory 2515 or the external memory 2312. The power management module 2313 controls the power supply to the control unit 2511.

In the case of applying the present technique to the video processor 2332 with the structure as above, the present technique according to any of the above embodiments may be applied to the codec engine 2516. In other words, for example, the codec engine 2516 may have the function block that achieves the scalable encoding device 100 and the scalable decoding device 200 or the image encoding device 900 (FIG. 62) and the image decoding device 1000 (FIG. 71) according to any of the above embodiments. Thus, the video processor 2332 can provide the effect similar to the above effect described with reference to FIG. 1 to FIG. 80.

In the codec engine 2516, the present technique (i.e., the function of the image encoding device and the image decoding device according to any of the above embodiments) may be achieved by hardware such as a logic circuit or software such as a built-in program, or both the hardware and the software.

The two examples have been described as the structure of the video processor 2332; however, the structure of the video processor 2332 may be determined arbitrarily and may be other than the above two examples. The video processor 2332 may be configured as one semiconductor chip or as a plurality of semiconductor chips. For example, a three-dimensional multilayer LSI in which a plurality of semiconductor layers are stacked may be used. Alternatively, a plurality of LSIs may be used.

<Example of Application to Device>

The video set 2300 can be incorporated into various devices that process the image data. For example, the video set 2300 can be incorporated in the television device 1900 (FIG. 84), the cellular phone 1920 (FIG. 85), the recording/reproducing device 1940 (FIG. 86), the photographing device 1960 (FIG. 87), or the like. By having the video set 2300 incorporated, the device can have the effect similar to the effect described with reference to FIG. 1 to FIG. 80.

The video set 2300 can also be incorporated in the terminal device such as the personal computer 2004, the AV appliance 2005, the tablet device 2006, or the cellular phone 2007 in the data transmission system 2000 illustrated in FIG. 88, the broadcast station 2101 and the terminal device 2102 in the data transmission system 2100 illustrated in FIG. 89, and the photographing device 2201 and the scalably encoded data storage device 2202 in the photographing system 2200 illustrated in FIG. 90. By having the video set 2300 incorporated, the device can have the effect similar to the effect described with reference to FIG. 1 to FIG. 80.

Even if the structure is a part of the structures of the video set 2300, the structure can be regarded as the structure to which the present technique has been applied as long as the structure includes the video processor 2332. For example, just the video processor 2332 can be embodied as the video processor to which the present technique has been applied. Further, the processor or the video module 2311, which is illustrated by a dotted line 2341, can be embodied as the processor or the module to which the present technique has been applied. Moreover, the video module 2311, the external memory 2312, the power management module 2313, and the front end module 2314 can be combined to be embodied as a video unit 2361 to which the present technique has been applied. In any structure, the effect similar to the effect described with reference to FIG. 1 to FIG. 80 can be obtained.

As long as the structure includes the video processor 2332, the structure can be incorporated in various devices that process image data in a manner similar to the video set 2300. For example, the video processor 2332, the processor indicated by the dotted line 2341, the video module 2311, or the video unit 2361 can be incorporated in the television device 1900 (FIG. 84), the cellular phone 1920 (FIG. 85), the recording/reproducing device 1940 (FIG. 86), the photographing device 1960 (FIG. 87), the terminal device such as the personal computer 2004, the AV appliance 2005, the tablet device 2006, or the cellular phone 2007 in the data transmission system 2000 illustrated in FIG. 88, the broadcast station 2101 and the terminal device 2102 in the data transmission system 2100 illustrated in FIG. 89, and the photographing device 2201 and the scalably encoded data storage device 2202 in the photographing system 2200 illustrated in FIG. 90. By incorporating any of the above structures to which the present technique has been applied, the device can have the effect similar to the effect described with reference to FIG. 1 to FIG. 80, in a manner similar to the case of the video set 2300.

<19. Fourteenth Embodiment>

<Application Example of MPEG-DASH>

The present technique can be applied to the system in which the appropriate piece of encoded data is selected in the unit of segment from the plural pieces of data with different resolutions, etc., such as a content reproducing system of the HTTP streaming like MPEG DASH as described below or a wireless communication system of Wi-Fi specification.

<Summary of Content Reproducing System>

First, the content reproducing system to which the present technique can be applied is schematically described with reference to FIG. 94 to FIG. 96.

The basic structure common to such embodiments is described below with reference to FIG. 94 and FIG. 95.

Figure 94:
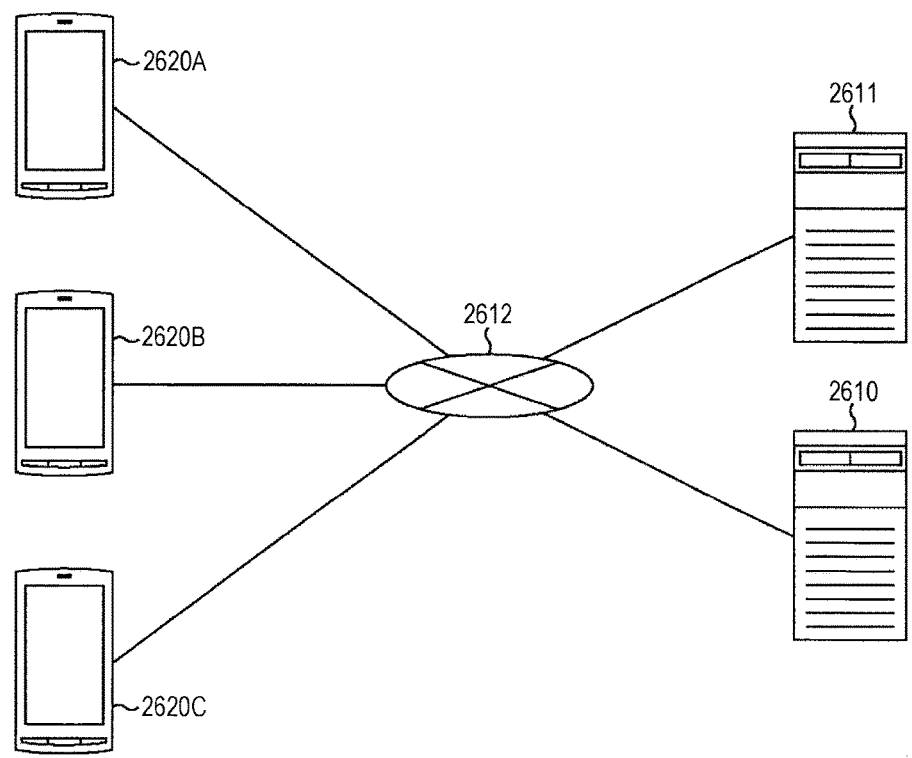
FIG. 94 is an explanatory diagram illustrating a structure of a content reproducing system.

FIG. 94 is an explanatory view illustrating a structure of the content reproducing system. As illustrated in FIG. 94, the content reproducing system includes content servers 2610 and 2611, a network 2612, and a content reproducing device 2620 (client device).

The content servers 2610 and 2611 and the content reproducing device 2620 are connected to each other through the network 2612. The network 2612 is a wired or wireless transmission path for the information transmitted from the device connected to the network 2612.

For example, the network 2612 may include the Internet, public line network such as the telephone line network or the satellite communication network, various LANs (Local Area Network) including Ethernet (registered trademark), and WAN (Wide Area Network). The network 2612 may include a dedicated line network such as IP-VPN (Internet Protocol-Virtual Private Network).

The content server 2610 encodes the content data and generates and stores the data file including the encoded data and the meta-information of the encoded data. Note that in the case where the content server 2610 generates the data file of the MP4 format, the encoded data correspond to "mdat" and the meta-information corresponds to "moov".

The content data may be the music data such as music, presentation, and radio programs, the video data such as movies, television programs, video programs, photographs, texts, pictures, and diagrams, games, software, and the like.

Here, the content server 2610 generates a plurality of data files on the same content but with different bit rates. The content server 2611 has the information of the parameters, which is to be added to the URL of the content server 2610 in the content reproducing device 2620, included in the information of the URL in response to the request of reproducing the content from the content reproducing device 2620, and transmits the information to the content reproducing device 2620. Specific description is hereinafter made with reference to FIG. 95.

Figure 95:
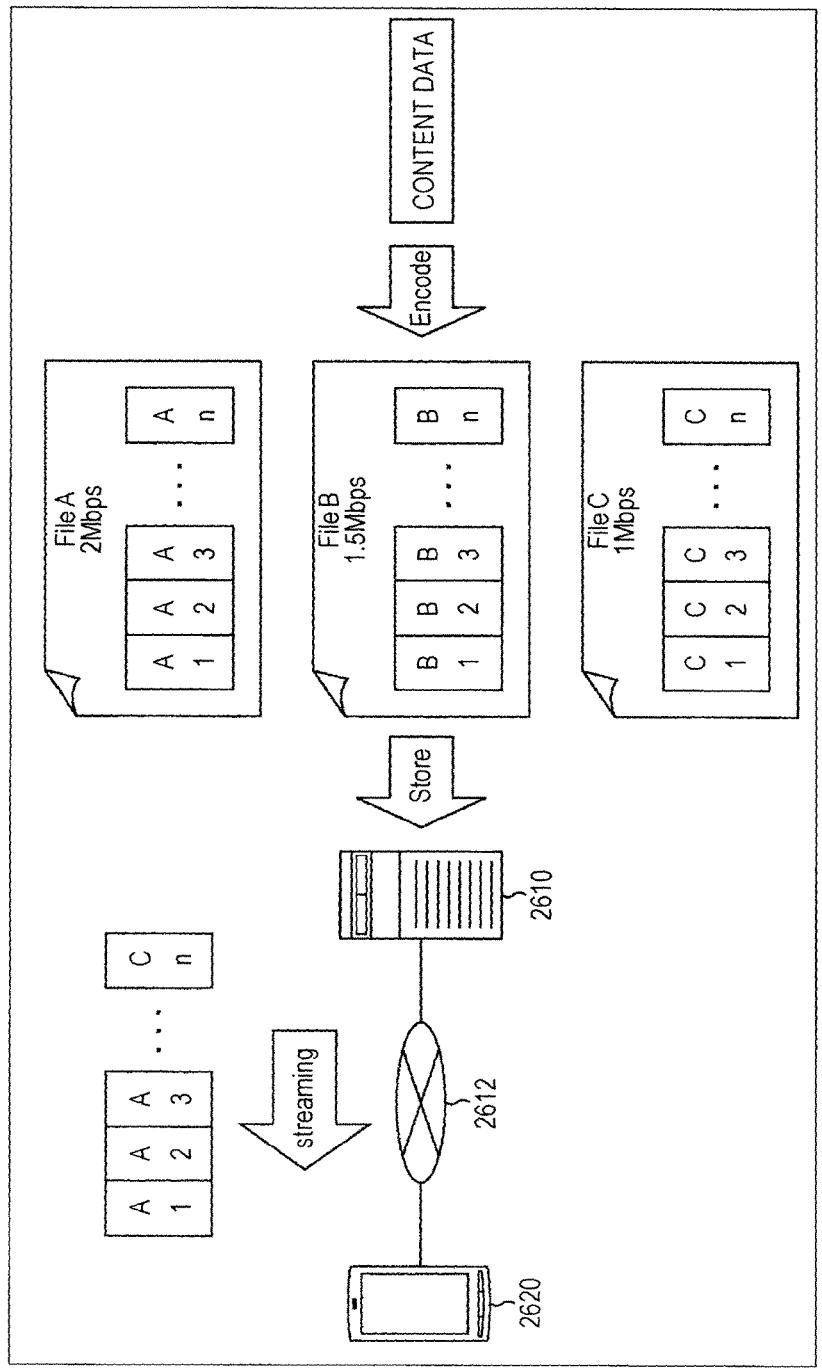
FIG. 95 is an explanatory diagram illustrating the flow of data in the content reproducing system.

FIG. 95 is an explanatory view illustrating the flow of data in the content reproducing system in FIG. 94. The content server 2610 encodes the same content data in different bit rate to generate a file A with 2 Mbps, a file B with 1.5 Mbps, and a file C with 1 Mbps as illustrated in FIG. 95. Relatively, the file A has a high bit rate, the file B has a standard bit rate, and the file C has a low bit rate.

As illustrated in FIG. 95, the encoded data of each file are sectioned into a plurality of segments. For example, the encoded data of the file A are sectioned into "A1", "A2", "A3", . . . "An" segments; the encoded data of the file B are sectioned into "B1", "B2", "B3", . . . "Bn" segments; and the encoded data of the file C are sectioned into "C1", "C2", "C3", . . . "Cn" segments.

Each segment may be configured by a structure sample of one or two or more pieces of video encoded data and audio encoded data that are started by a sync sample of MP4 (for example, IDR-picture in the case of AVC/H.264 video encoding) and that can be reproduced alone. For example, when the video data with 30 frames in one second are encoded in GOP (Group of Picture) with a fixed length of 15 frames, each segment may be the video and audio encoded data for 2 seconds corresponding to 4 GOP or the video and audio encoded data for 10 seconds corresponding to 20 GOP.

The reproduction ranges by the segments with the same order of arrangement (range of time position from the head of the content) in each file are the same. For example, the reproduction ranges of the segment "A2", the segment "B2", and the segment "C2" are the same, and if each segment is the encoded data for 2 seconds, the reproduction ranges of the segment "A2", the segment "B2", and the segment "C2" are 2 to 4 seconds of the content.

Upon the generation of the files A to C composed of the plural segments, the content server 2610 stores the files A to C. As illustrated in FIG. 95, the content server 2610 transmits the segments constituting different files sequentially to the content reproducing device 2620, and the content reproducing device 2620 streams the received segments.

Here, the content server 2610 according to the embodiment transmits the playlist files (hereinafter MPD: Media Presentation Description) including the bit rate information and the access information of the encoded data to the content reproducing device 2620, and the content reproducing device 2620 selects the bit rate among the plural bit rates based on MPD, and requests the content server 2610 to transmit the segment corresponding to the selected bit rate.

Although FIG. 94 illustrates only one content server 2610, the present disclosure is not limited to this example.

FIG. 96 is an explanatory view illustrating a specific example of MPD. As illustrated in FIG. 96, MPD includes the access information related to the plural pieces of encoded data with different bit rates (BANDWIDTH). For example, MPD illustrated in FIG. 96 indicates that the pieces of encoded data of 256 Kbps, 1.024 Mbps, 1.384 Mbps, 1.536 Mbps, and 2.048 Mbps are present and includes the access information related to each piece of encoded data. The content reproducing device 2620 can dynamically change the bit rate of the encoded data to be streamed based on the MPD.

FIG. 94 illustrates a cellular phone as one example of the content reproducing device 2620 but the content reproducing device 2620 is not limited to this example. For example, the content reproducing device 2620 may be an information processing device such as a PC (Personal Computer), a home-use video processing device (DVD recorder or video cassette recorder), a PDA (Personal Digital Assistant), a home-use game machine, or a home appliance. The content reproducing device 2620 may be an information processing device such as a cellular phone, a PHS (Personal Handyphone System), a portable music player, a portable video processing device, or a portable game machine.

<Structure of Content Server 2610>

The summary of the content reproducing system has been described with reference to FIG. 94 to FIG. 96. Subsequently, the structure of the content server 2610 is described with reference to FIG. 97.

Figure 97:
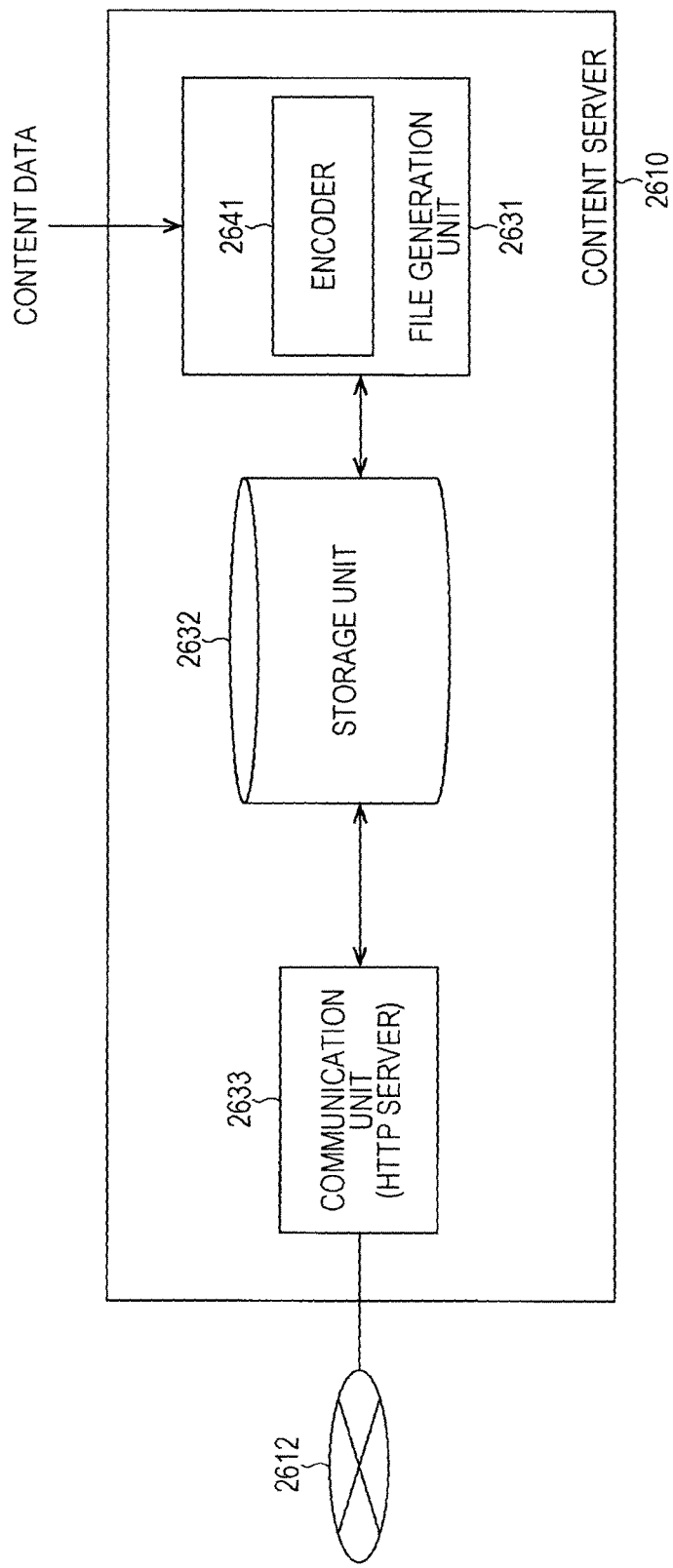
FIG. 97 is a function block diagram illustrating a structure of a content server of the content reproducing system.

FIG. 97 is a function block diagram illustrating a structure of the content server 2610. As illustrated in FIG. 97, the content server 2610 includes a file generation unit 2631, a storage unit 2632, and a communication unit 2633.

The file generation unit 2631 includes an encoder 2641 for encoding the content data, and generates a plurality of pieces of encoded data with the same content but different bit rates, and the aforementioned MPD. For example, in the case of generating the pieces of encoded data with 256 Kbps, 1.024 Mbps, 1.384 Mbps, 1.536 Mbps, and 2.048 Mbps, the file generation unit 2631 generates the MPD as illustrated in FIG. 96.

The storage unit 2632 stores the plurality of pieces of encoded data with different bit rates and the MPD generated by the file generation unit 2631. This storage unit 2632 may be the storage medium such as a nonvolatile memory, a magnetic disk, an optical disk, or an MO (Magneto Optical) disk. Examples of the nonvolatile memory include an EEPROM (Electrically Erasable Programmable Read-Only Memory) and an EPROM (Erasable Programmable ROM). Examples of the magnetic disk include a hard disk and a disc-like magnetic disk. Examples of the optical disk include a CD (Compact Disc, DVD-R (Digital Versatile Disc Recordable)), and BD (Blu-Ray Disc (registered trademark)).

The communication unit 2633 is the interface for the content reproducing device 2620 and communicates with the content reproducing device 2620 through the network 2612. More specifically, the communication unit 2633 has a function as an HTTP server that communicates with the content reproducing device 2620 in accordance with the HTTP. For example, the communication unit 2633 transmits the MPD to the content reproducing device 2620, extracts the encoded data requested from the content reproducing device 2620 based on MPD in accordance with HTTP from the storage unit 2632, and transmits the encoded data to the content reproducing device 2620 as the HTTP response.

<Structure of Content Reproducing Device 2620>

The structure of the content server 2610 according to the present embodiment has been described. Subsequently, the structure of the content reproducing device 2620 is described with reference to FIG. 98.

Figure 98:
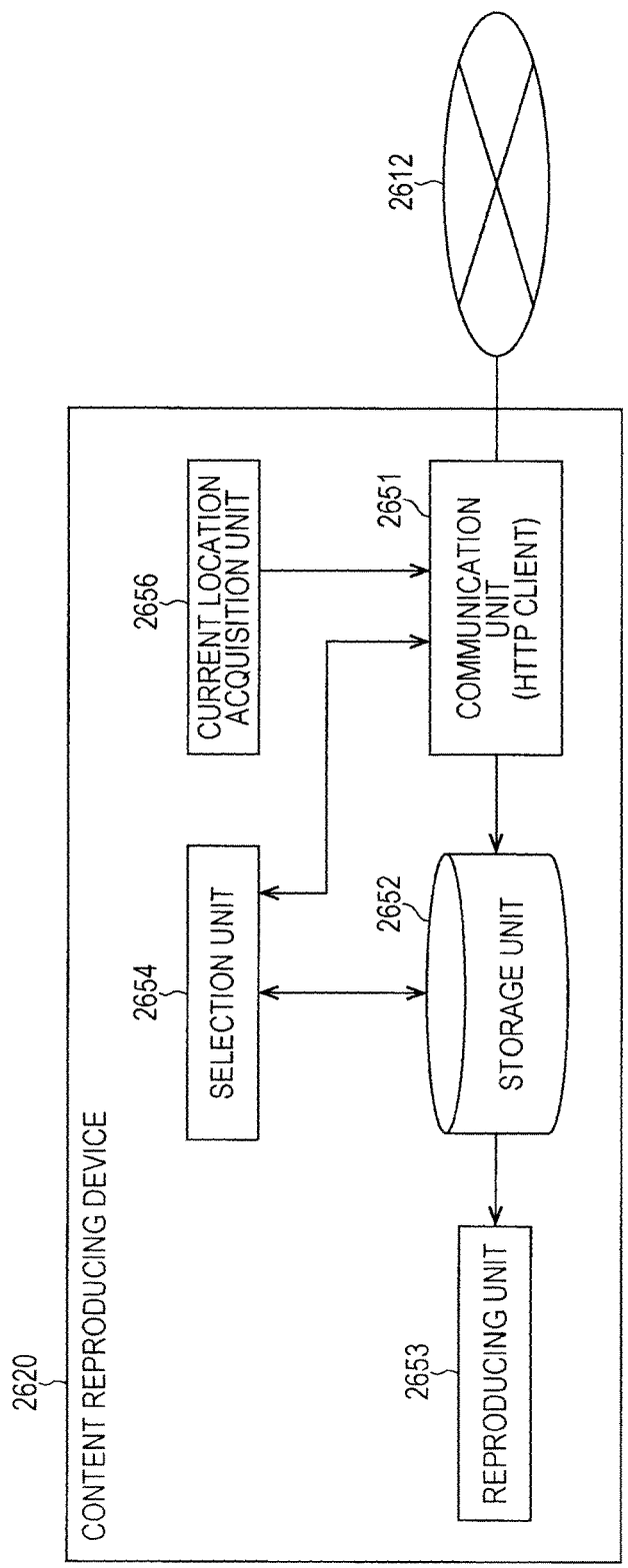
FIG. 98 is a function block diagram illustrating a structure of a content reproducing device of the content reproducing system.

FIG. 98 is a function block diagram illustrating the structure of the content reproducing device 2620. As illustrated in FIG. 98, the content reproducing device 2620 includes a communication unit 2651, a storage unit 2652, a reproducing unit 2653, a selection unit 2654, and a current location acquisition unit 2656.

The communication unit 2651 is the interface for the content server 2610, and requests data from the content server 2610 and acquires the data from the content server 2610. More specifically, the communication unit 2651 has a function as the HTTP client that communicates with the content reproducing device 2620 in accordance with the HTTP. For example, the communication unit 2651 can selectively acquire the segment of the encoded data or the MPD from the content server 2610 by using the HTTP Range.

The storage unit 2652 stores various pieces of information related to the content reproduction. For example, the segments acquired by the communication unit 2651 from the content server 2610 are sequentially buffered. The segments of the encoded data buffered by the storage unit 2652 are sequentially supplied to the reproducing unit 2653 on FIFO (First In First Out).

Based on an instruction of adding parameters to the URL of the content described in MPD requested from the content server 2611 as described below, the storage unit 2652 adds the parameter to the URL in the communication unit 2651 and stores the definition for accessing the URL.

The reproducing unit 2653 sequentially reproduces the segments supplied from the storage unit 2652. Specifically, the reproducing unit 2653 performs the decoding of the segment, the DA conversion, and rendering, etc.

The selection unit 2654 sequentially selects in the same content, the segment of the encoded data corresponding the bit rate included in the MPD. For example, when the selection unit 2654 selects sequentially the segments "A1", "B2", and "A3" depending on the band of the network 2612, the communication unit 2651 sequentially acquires the segments "A1", "B2", and "A3" from the content server 2610 as illustrated in FIG. 95.

The current location acquisition unit 2656 is to acquire the current location of the content reproducing device 2620, and may be configured by, for example, a module that acquires the current location such as a GPS (Global Positioning System) receiver. The current location acquisition unit 2656 may acquire the current location of the content reproducing device 2620 by using the wireless network.

<Structure of Content Server 2611>

Figure 99:
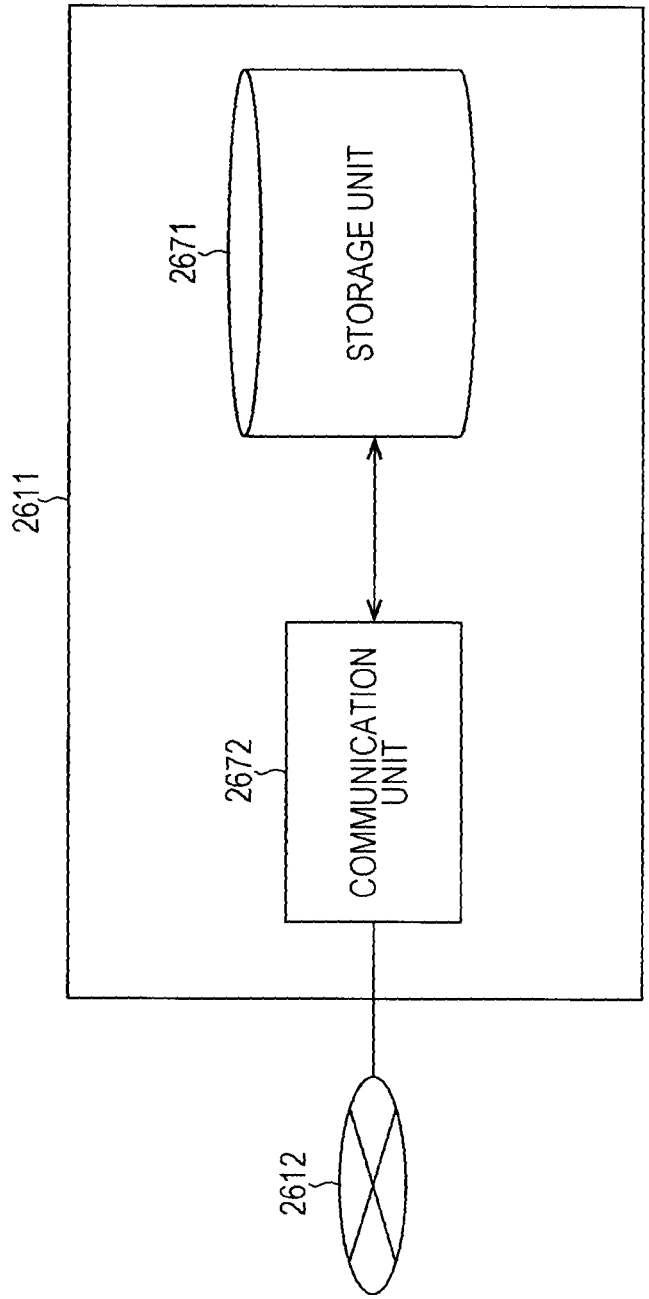
FIG. 99 is a function block diagram illustrating a structure of a content server of the content reproducing system.

FIG. 99 is an explanatory view illustrating a structure example of the content server 2611. As illustrated in FIG. 99, the content server 2611 includes a storage unit 2671 and a communication unit 2672.

The storage unit 2671 stores the information of the URL of the MPD. The information of the URL of the MPD is transmitted from the content server 2611 to the content reproducing device 2620 upon a request from the content reproducing device 2620 that requests for the reproduction of the content. When the information of the URL of the MPD is provided to the content reproducing device 2620, the storage unit 2671 stores the definition information when the parameters are added to the URL described in the MPD in the content reproducing device 2620.

The communication unit 2672 is the interface for the content reproducing device 2620, and communicates with the content reproducing device 2620 through the network 2612. In other words, the communication unit 2672 receives the request of the information of the URL of the MPD from the content reproducing device 2620 that requests for the reproduction of the content, and transmits the information of the URL of the MPD to the content reproducing device 2620. The URL of the MPD transmitted from the communication unit 2672 includes the information for adding the parameters in the content reproducing device 2620.

The parameters to be added to the URL of the MPD in the content reproducing device 2620 can be variously set by the definition information to be shared by the content server 2611 and the content reproducing device 2620. For example, the information such as the current location of the content reproducing device 2620, the user ID of the user that uses the content reproducing device 2620, the memory size of the content reproducing device 2620, and the capacity of storage of the content reproducing device 2620 can be added to the URL of the MPD in the content reproducing device 2620.

In the content reproducing system with the above structure, the effect similar to the effect described with reference to FIG. 1 to FIG. 80 can be obtained by applying the present technique as described with reference to FIG. 1 to FIG. 80.

In other words, the encoder 2641 of the content server 2610 has the function of the image encoding device according to the above embodiment. The reproducing unit 2653 of the content reproducing device 2620 has the function of the image decoding device according to the above embodiment. Thus, the increase in storage capacity necessary in the encoding and decoding can be suppressed.

Moreover, in the content reproducing system, the increase in storage capacity necessary in the encoding and decoding can be suppressed by exchanging the data encoded according to the present technique.

<16. Application Example of Wi-Fi Wireless Communication System>

<Application Example of Wi-Fi Wireless Communication System>

Description is made of an example of the basic operation of the wireless communication device in the wireless communication system to which the present technique can be applied.

<Example of Basic Operation of Wireless Communication Device>

First, wireless packet transmission and reception are conducted until the P2P (Peer to Peer) connection is established to operate a particular application.

Next, prior to the connection in the second layer, wireless packet transmission and reception after specifying the particular application and before establishing the P2P connection to operate the particular application are conducted. Then, after the connection in the second layer, the wireless packet transmission and reception in the case of activating the particular application are conducted.

<Communication Example at Start of Particular Application>

Figure 100:
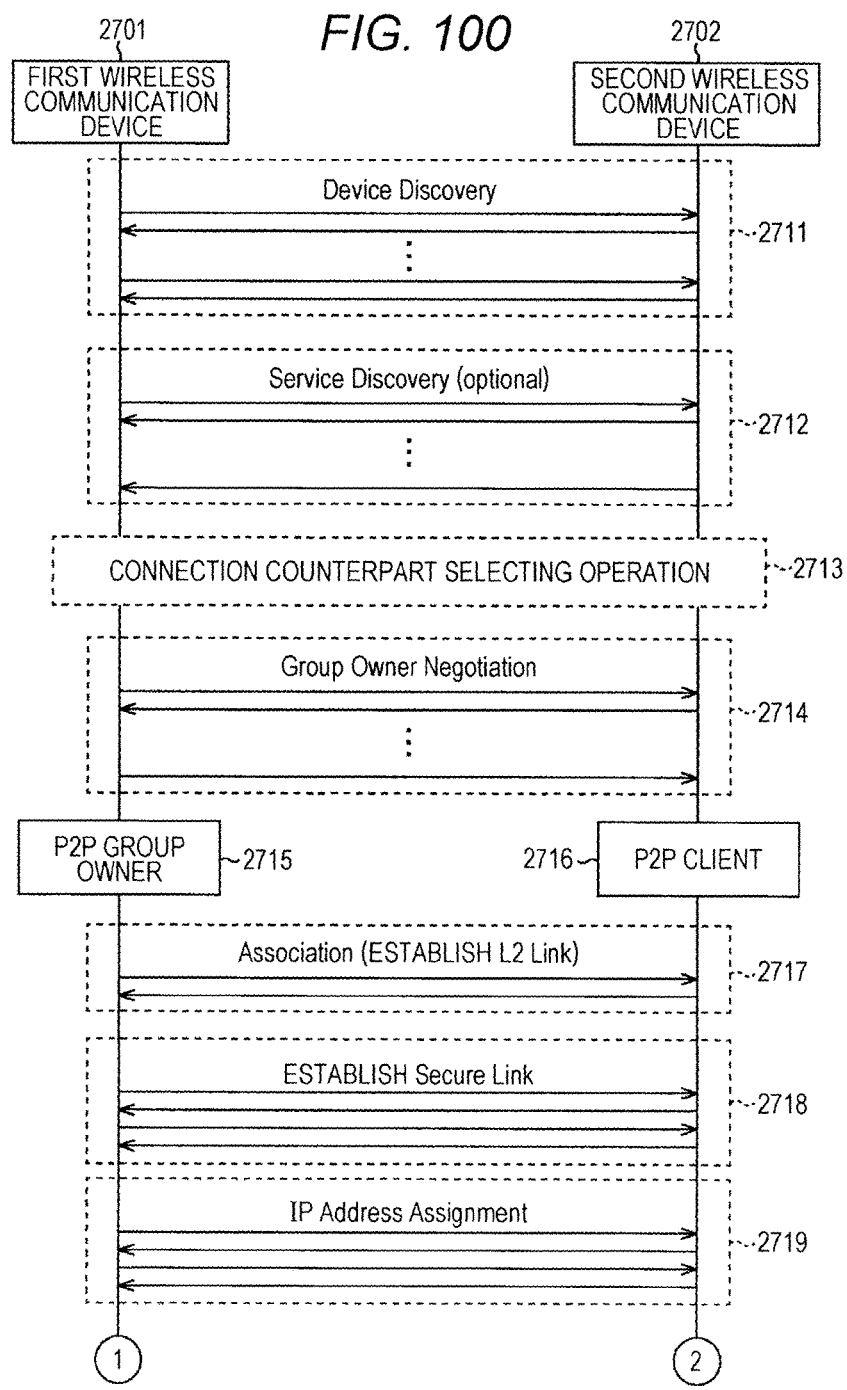
FIG. 100 is a sequence chart illustrating a communication process example of each device in a wireless communication system.
Figure 101:
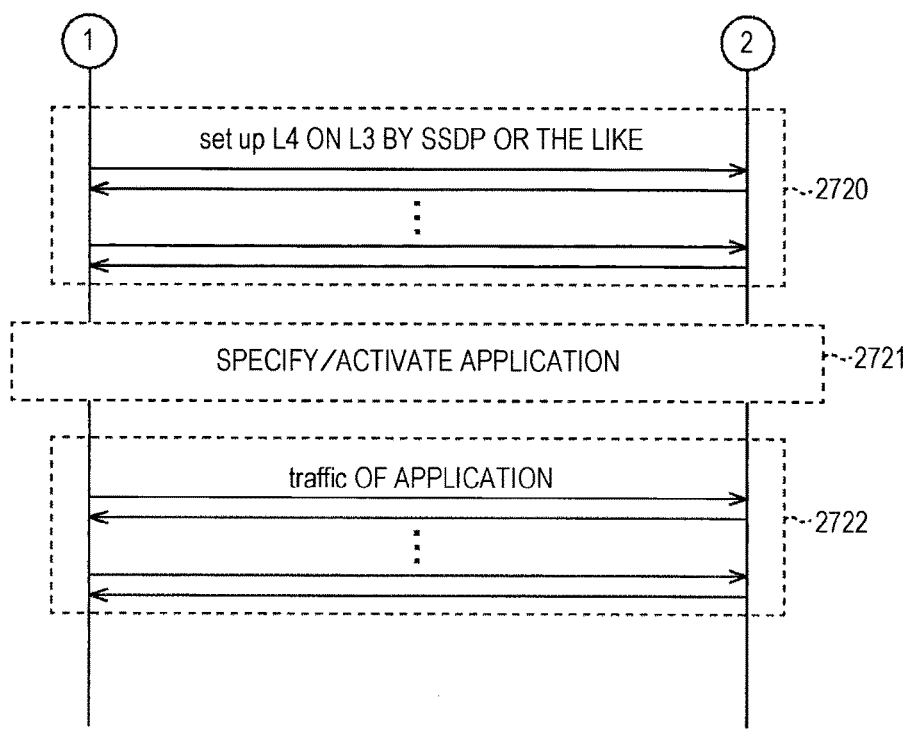
FIG. 101 is a sequence chart illustrating a communication process example of each device in a wireless communication system.

FIG. 100 and FIG. 101 illustrate an example of transmission and reception of a wireless packet after establishing the P2P (Peer to Peer) connection and before operating the particular operation, which are the sequence charts representing the example of processing the communication by each device that serves as the fundamentals of wireless communication. Specifically, an example of the procedure of establishing the direct connection that leads to the connection based on Wi-Fi direct (Direct) specification (also referred to as Wi-Fi P2P) standardized in Wi-Fi Alliance is illustrated.

Here, in the Wi-Fi direct, a plurality of wireless communication devices detects each other's presence (Device Discovery, Service Discovery). Then, upon the selection of the devices to be connected, the device authentication is carried out between the devices through WPS (Wi-Fi Protected Setup), thereby establishing the direct connection. In the Wi-Fi direct, which one of the plural wireless communication devices serves as the group owner (Group Owner) is decided and the others are decided to serve as clients (Clients), whereby the communication group is formed.

In this example of the communication process, however, some packet exchanges are omitted. For example, the initial connection requires the packet exchange for WPS, and moreover the Authentication Request/Response also requires the packet exchange. In FIG. 100 and FIG. 101, however, the illustration of these packet exchanges is omitted and just the connection for the second and subsequent times is illustrated.

The example of the communication process between a first wireless communication device 2701 and a second wireless communication device 2702 in FIG. 100 and FIG. 101 also applies to the communication process between other wireless communication devices.

First, Device Discovery is carried out between the first wireless communication device 2701 and the second wireless communication device 2702 (2711). For example, the first wireless communication device 2701 transmits Probe request (response request signal) and receives Probe response (response signal) for this Probe request from the second wireless communication device 2702. Thus, the first wireless communication device 2701 and the second wireless communication device 2702 can find each other's presence. Further, with Device Discovery, the device name or kind (TV, PC, smartphone, etc.) of the counterpart can be acquired.

Next, Service Discovery is carried out between the first wireless communication device 2701 and the second wireless communication device 2702 (2712). First, the first wireless communication device 2701 transmits Service Discovery Query for inquiring the service that can be dealt with the second wireless communication device 2702 discovered by Device Discovery. Then, by receiving Service Discovery Response from the second wireless communication device 2702, the first wireless communication device 2701 acquires the service that can be dealt with the second wireless communication device 2702. In other words, owing to Service Discovery, the service that can be dealt with the counterpart can be received. The service that can be dealt with the counterpart is, for example, the service, the protocol (DLNA (Digital Living Network Alliance), and DMR (Digital Media Renderer), etc.).

Subsequently, the user conducts the operation for selecting the connection counterpart (connection counterpart selecting operation) (2713). This connection counterpart selecting operation may occur in any one of the first wireless communication device 2701 and the second wireless communication device 2702. For example, the connection counterpart selection screen is displayed on the display unit of the first wireless communication device 2701, and the second wireless communication device 2702 is selected by the user operation as the connection counterpart on this connection counterpart selection screen.

Upon the connection counterpart selecting operation by the user (2713), Group Owner Negotiation is carried out between the first wireless communication device 2701 and the second wireless communication device 2702 (2714). FIG. 100 and FIG. 101 illustrate the example in which the first wireless communication device 2701 serves as the group owner (Group Owner) 2715 and the second wireless communication device 2702 serves as the client (Client) 2716 according to the result of Group Owner Negotiation.

Subsequently, the processes (2717 to 2720) are conducted between the first wireless communication device 2701 and the second wireless communication device 2702, thereby establishing the direct connection. In other words, Association (L2 (second layer) link establishment) (2717) and Secure link establishment (2718) are carried out sequentially. Moreover, IP Address Assignment (2719) and L4 setup (2720) on L3 by SSDP (Simple Service Discovery Protocol) or the like are carried out sequentially. Note that L2 (layer2) refers to the second layer (data link layer), L3 (layer3) refers to the third layer (network layer), and L4 (layer4) refers to the fourth layer (transport layer).

Subsequently, the user specifies or activates a particular application (application specification/activation operation) (2721). This application specification/activation operation may occur in any one of the first wireless communication device 2701 and the second wireless communication device 2702. For example, the application specification/activation operation screen is displayed on the display unit of the first wireless communication device 2701 and the particular application is selected by the user on this application specification/activation operation screen.

Upon the application specification/activation operation by the user (2721), the particular application corresponding to the application specification/activation operation is executed between the first wireless communication device 2701 and the second wireless communication device 2702 (2722).

Here, a case is assumed in which connection is made between AP (Access Point) and STA (Station) in the range of the specification before the Wi-Fi Direct specification (specification standardized in IEEE802.11). In this case, it has been impossible to know in advance the device to be connected before the connection in the second layer (before association in IEEE802.11).

In contrast to this, as illustrated in FIG. 100 and FIG. 101, the Wi-Fi Direct makes it possible to acquire the information of the connection counterpart when the candidate for the connection counterpart is searched in Device Discovery or Service Discovery (option). The information of the connection counterpart is, for example, the basic type of the device or the particular application that can be dealt with. Then, based on the acquired information of the connection counterpart, the user can select the connection counterpart.

This mechanism can be expanded to realize a wireless communication system in which the particular application is specified before the connection in the second layer, the connection counterpart is selected and then the particular application is activated automatically. An example of the sequence that leads to the connection in this case is illustrated in FIG. 103. Moreover, an example of a structure of the frame format (frame format) exchanged in this communication process is illustrated in FIG. 102.

<Structure Example of Frame Format>

Figure 102:
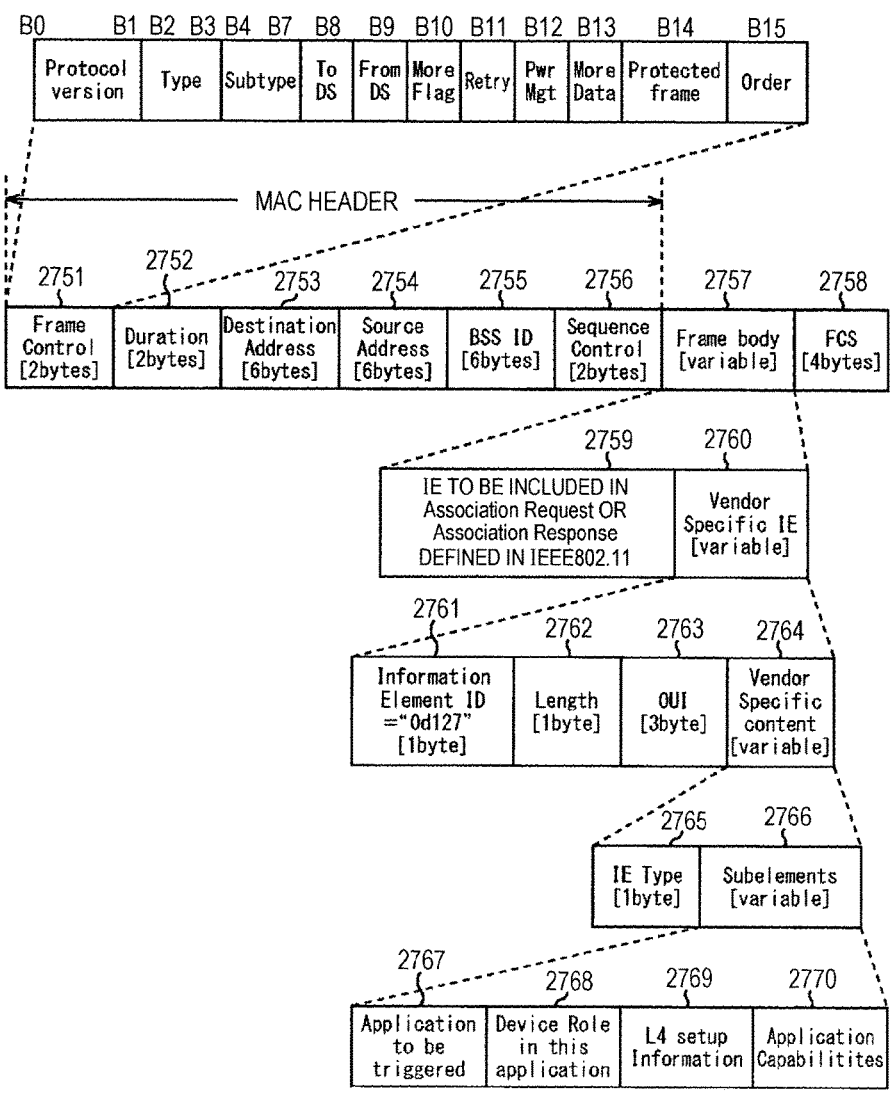
FIG. 102 is a diagram schematically illustrating a structure example of a frame format (frame format) exchanged in the communication process by each device in the wireless communication system.
Figure 103:
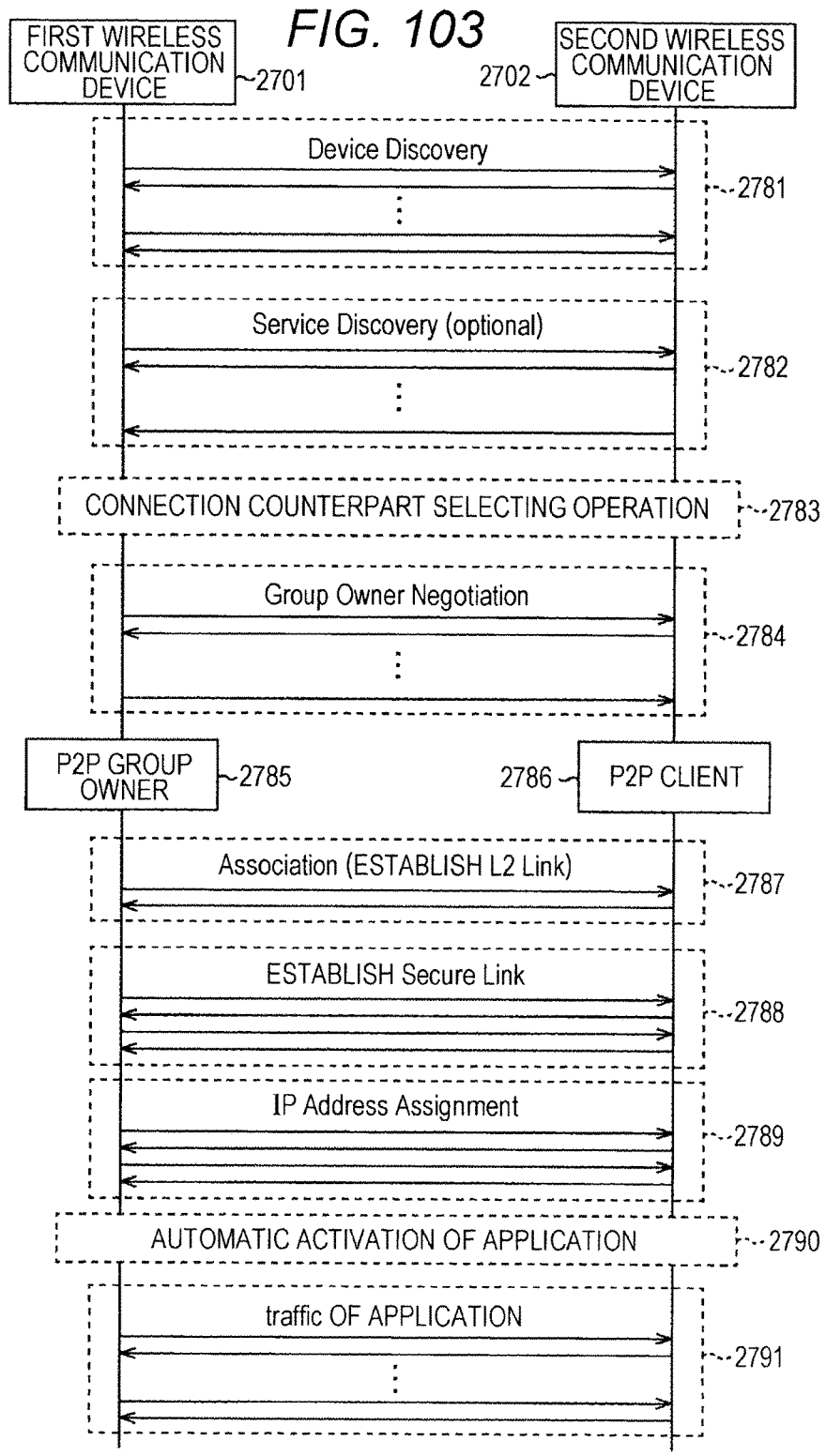
FIG. 103 is a sequence chart illustrating a communication process example of each device in a wireless communication system.

FIG. 102 is a schematic diagram illustrating a structure example of the frame format (frame format) exchanged in the communication process of each device that serves as the fundamentals of the present technique. In other words, FIG. 102 illustrates the structure example of MAC frame for establishing the connection in the second layer. Specifically, this is one example of the frame format of Association Request/Response (2787) for achieving the sequence illustrated in FIG. 103.

As illustrated in FIG. 102, the MAC frame includes Frame Control (2751) to FCS (2758), and among those, Frame Control (2751) to Sequence Control (2756) are the MAC headers. When Association Request is transmitted, B3B2="0b00" and B7B6B5B4="0b0000" is set in Frame Control (2751). Moreover, when Association Response is encapsulated, B3B2="0b00" and B7B6B5B4="0b0001" is set in Frame Control (2751). Note that "0b00" represents "00" in binary, "0b0000" represents "0000" in binary and "0b0001" represents "0001" in binary.

Here, basically, the MAC frame (Frame body (2757)) illustrated in FIG. 100 is the Association Request/Response frame format according to the section 7.2. 3.4 and 7.2. 3.5 in the specification of IEEE802.11-2007. However, the format is different in that, in addition to the Information Element (hereinafter abbreviated as IE) (2759) defined in the specification of IEEE802.11, the extension IE is included.

Moreover, for expressing the Vendor Specific IE (2760), 127 is set in decimal in IE Type (Information Element ID (2761)). In this case, based on 7.3. 2.26 in the specification IEEE802.11-2007, the Length field (2762) and the OUI field (2763) are present, which are followed by the vendor specific content (2764).

As the content of the vendor specific content (2764), the field (IE type (2765)) representing the type of the vendor specific IE is provided first. Then, the structure capable of storing a plurality of subelements (2766) is considered.

As the content of the subelement (2766), the name (2767) of the particular application to be used or the role (2768) of the device during the operation of the particular application may be included. Moreover, the information of the particular application or the port number used for the control of the application (information for the L4 set up) (2769), or the information related to the Capability in the particular application (Capability information) (2770) may be included. Here, the Capability information refers to, for example, the information for specifying, when the particular application to be specified is DLNA, whether it is possible to deal with the audio transmission/reproduction or video transmission/reproduction.

Thus, the wireless communication system with the above structure can provide the effect similar to the above effect described with reference to FIG. 1 to FIG. 80 by applying the present technique as described with reference to FIG. 1 to FIG. 80. In other words, the increase in storage capacity necessary for encoding and decoding can be suppressed. Further, in the wireless communication system as described above, the increase in storage capacity necessary for encoding and decoding can be suppressed by exchanging the data encoded according to the present technique.

In this specification, description has been made of the example in which various pieces of information are multiplexed on the encoded stream and transmitted from the encoding side to the decoding side. The method of transmitting the information, however, is not limited to this example. For example, these pieces of information may be transmitted or recorded as the separate data that are correlated to the encoded bit stream without being multiplexed on the encoded bit stream. Here, "correlation" refers to the link of the image included in the bit stream (may be a part of the image such as slice or block) and the information corresponding to the image at the decoding. In other words, the information may be transmitted on a transmission path separate from the image (or bit stream). Alternatively, the information may be recorded in a recording medium separate from the image (or bit stream) (or in another recording area of the same recording medium). The information and the image (or bit stream) may be correlated to each other in any unit, such as in a plurality of frames, one frame, or a part of a frame.

The preferred embodiments of the present disclosure have been described with reference to the attached drawings; however, the present disclosure is not limited to the examples above. It is apparent that a person skilled in the art to which the present disclosure pertains can conceive various modifications or improvements in the scope of technical thoughts described in the scope of claims, and those are included in the range of the technique according to the present disclosure.

The present technique can have any of the structures as below.

(1) An image processing device including:

a reception unit that receives encoded data in which an image with a plurality of main layers is encoded, and inter-layer prediction control information controlling whether to perform inter-layer prediction, which is prediction between the plurality of main layers, with the use of a sublayer; and a decoding unit that decodes each main layer of the encoded data received by the reception unit by performing the inter-layer prediction on only the sublayer specified by the inter-layer prediction control information received by the reception unit.

(2) The image processing device according to any of (1) and (3) to (9), wherein if a current picture of a current main layer belongs to the sublayer specified as the sublayer for which the inter-layer prediction is performed by the inter-layer prediction control information, the decoding unit decodes the encoded data of the current picture using the inter-layer prediction.

(3) The image processing device according to any of (1), (2) and (4) to (9), wherein the inter-layer prediction control information specifies a highest sublayer for which the inter-layer prediction is allowed, and the decoding unit decodes using the inter-layer prediction, the encoded data of the picture belonging to the sublayers from a lowest sublayer to the highest sublayer specified by the inter-layer prediction control information.

(4) The image processing device according to any of (1) to (3) and (5) to (9), wherein the inter-layer prediction control information is set for each main layer.

(5) The image processing device according to any of (1) to (4) and (6) to (9), wherein the inter-layer prediction control information is set as a parameter common to all the main layers.

(6) The image processing device according to any of (1) to (5) and (7) to (9), wherein the reception unit receives inter-layer pixel prediction control information that controls whether to perform inter-layer pixel prediction, which is pixel prediction between the plurality of main layers, and inter-layer syntax prediction control information that controls whether to perform inter-layer syntax prediction, which is syntax prediction between the plurality of main layers, the inter-layer pixel prediction control information and the inter-layer syntax prediction control information being set independently as the inter-layer prediction control information, and the decoding unit performs the inter-layer pixel prediction based on the inter-layer pixel prediction control information received by the reception unit, and performs the inter-layer syntax prediction based on the inter-layer syntax prediction control information received by the reception unit.

(7) The image processing device according to any of (1) to (6), (8) and (9), wherein the inter-layer pixel prediction control information controls using the sublayer, whether to perform the inter-layer pixel prediction, the decoding unit performs the inter-layer pixel prediction on only the sublayer specified by the inter-layer pixel prediction control information, the inter-layer syntax prediction control information controls whether to perform the inter-layer syntax prediction for each picture or slice, and the decoding unit performs the inter-layer syntax prediction on only the picture or slice specified by the inter-layer syntax prediction control information.

(8) The image processing device according to any of (1) to (7) and (9), wherein the inter-layer pixel prediction control information is transmitted as a nal unit (nal_unit), a video parameter set (VPS (Video Parameter Set)), or an extension video parameter set (vps_extension).

(9) The image processing device according to any of (1) to (8), wherein the inter-layer syntax prediction control information is transmitted as a nal unit (nal_unit), a picture parameter set (PPS (Picture Parameter Set)), or a slice header (SliceHeader).

(10) An image processing method including:

receiving encoded data in which an image with a plurality of main layers is encoded, and inter-layer prediction control information controlling whether to perform inter-layer prediction, which is prediction between the plurality of main layers, with the use of a sublayer; and decoding each main layer of the received encoded data by performing the inter-layer prediction on only the sublayer specified by the received inter-layer prediction control information.

(11) An image processing device including:

an encoding unit that encodes each main layer of the image data by performing inter-layer prediction, which is prediction between a plurality of main layers, on only a sublayer specified by inter-layer prediction control information that controls whether to perform the inter-layer prediction with the use of a sublayer; and a transmission unit that transmits encoded data obtained by encoding by the encoding unit, and the inter-layer prediction control information.

(12) The image processing device according to any of (11) and (13) to (19), wherein if a current picture of a current main layer belongs to the sublayer specified as the sublayer for which the inter-layer prediction is performed by the inter-layer prediction control information, the encoding unit encodes the image data of the current picture using the inter-layer prediction.

(13) The image processing device according to any of (11), (12) and (14) to (19), wherein the inter-layer prediction control information specifies a highest sublayer for which the inter-layer prediction is allowed, and the encoding unit encodes using the inter-layer prediction, the image data of the picture belonging to the sublayers from a lowest sublayer to the highest sublayer specified by the inter-layer prediction control information.

(14) The image processing device according to any of (11) to (13) and (15) to (19), wherein the inter-layer prediction control information is set for each main layer.

(15) The image processing device according to any of (11) to (14) and (16) to (19), wherein the inter-layer prediction control information is set as parameters common to all the main layers.

(16) The image processing device according to any of (11) to (15) and (17) to (19), wherein the encoding unit performs inter-layer pixel prediction as pixel prediction between the plurality of main layers based on inter-layer pixel prediction control information that controls whether to perform the inter-layer pixel prediction and that is set as the inter-layer prediction control information, the encoding unit performs inter-layer syntax prediction as syntax prediction between the plurality of main layers based on inter-layer syntax prediction control information that controls whether to perform the inter-layer syntax prediction and that is set as the inter-layer prediction control information independently from the inter-layer pixel prediction control information, and the transmission unit transmits the inter-layer pixel prediction control information and the inter-layer syntax prediction control information that are set independently from each other as the inter-layer prediction control information.

(17) The image processing device according to any of (11) to (16), (18) and (19), wherein the inter-layer pixel prediction control information controls using the sublayer, whether to perform the inter-layer pixel prediction, the encoding unit performs the inter-layer pixel prediction on only the sublayer specified by the inter-layer pixel prediction control information, the inter-layer syntax prediction control information controls whether to perform the inter-layer syntax prediction for each picture or slice, and the encoding unit performs the inter-layer syntax prediction on only the picture or slice specified by the inter-layer syntax prediction control information.

(18) The image processing device according to any of (11) to (17) and (19), wherein the transmission unit transmits the inter-layer pixel prediction control information as a nal unit (nal_unit), a video parameter set (VPS (Video Parameter Set)), or an extension video parameter set (vps_extension).

(19) The image processing device according to any of (11) to (18), wherein the transmission unit transmits the inter-layer syntax prediction control information as a nal unit (nal_unit), a picture parameter set (PPS (Picture Parameter Set)), or a slice header (SliceHeader).

(20) An image processing method including:

encoding each main layer of the image data by performing inter-layer prediction, which is prediction between a plurality of main layers, on only a sublayer specified by inter-layer prediction control information that controls whether to perform the inter-layer prediction with the use of a sublayer; and transmitting encoded data obtained by the encoding, and the inter-layer prediction control information.

(21) The image processing device according to any of (1) to (9), wherein the inter-layer prediction control information is set for each of main layers less than or equal to the maximum number of main layers.

(22) The image processing device according to any of (1) to (9), wherein the inter-layer prediction control information is set to a value less than or equal to the maximum number of sublayers.

(23) The image processing device according to any of (1) to (9), wherein the inter-layer prediction control information is set to a value less than or equal to the number of sublayers that is smaller between the number of sublayers of a reference source main layer and the number of sublayers of a reference destination main layer.

(24) The image processing device according to any of (1) to (9), wherein the inter-layer prediction control information is transmitted as common information including information related to all the main layers.

(25) The image processing device according to any of (11) to (19), wherein the inter-layer prediction control information is set for each of the main layers less than or equal to the maximum number of main layers.

(26) The image processing device according to any of (11) to (19), wherein the inter-layer prediction control information is set to a value less than or equal to the maximum number of sublayers.

(27) The image processing device according to any of (11) to (19), wherein the inter-layer prediction control information is set to a value less than or equal to the number of sublayers that is smaller between the number of sublayers of a reference source main layer and the number of sublayers of a reference destination main layer.

(28) The image processing device according to any of (11) to (19), wherein the transmission unit transmits the inter-layer prediction control information as common information including information related to all the main layers.

(31) An image processing device including:
a reception unit that receives encoded data in which image data with a plurality of layers is encoded, and information controlling, for each picture, execution of inter-layer texture prediction for generating a predicted image by using an image of another layer as a reference image; and
a decoding unit that generates the predicted image by performing a prediction process in which the inter-layer texture prediction is applied in accordance with the information received by the reception unit, and decodes the encoded data received by the reception unit by using the predicted image.

(32) The image processing device according to any of (31) and (33) to (39), wherein the information is syntax for a long-term reference frame of a frame memory storing the image of the other layer.

(33) The image processing device according to any of (31), (32), and (34) to (39), wherein the reception unit receives the information as a sequence parameter set (sep_parameter_set_rbsp).

(34) The image processing device according to any of (31) to (33) and (35) to (39), wherein the reception unit receives syntax used_by_curr_pic_lt_sps_flag[i] of a sequence parameter set as the information.

(35) The image processing device according to any of (31) to (34) and (36) to (39), wherein prediction process is performed where the decoding unit is controlled not to execute the inter-layer texture prediction for a picture with a value of the syntax used_by_curr_pic_lt_sps_flag[i] set to "0" and is controlled to execute the inter-layer texture prediction for a picture with a value of the syntax used_by_curr_pic_lt_sps_flag[i] set to "1".

(36) The image processing device according to any of (31) to (35) and (37) to (39), wherein the reception unit receives the information as a slice header (slice_segment_header).

(37) The image processing device according to any of (31) to (36), (38), and (39), wherein the reception unit receives syntax used_by_curr_pic_lt_flag[i] of a slice header as the information.

(38) The image processing device according to any of (31) to (37) and (39), wherein prediction process is performed where the decoding unit is controlled not to execute the inter-layer texture prediction for a picture with a value of the syntax used_by_curr_pic_lt_flag[i] set to "0" and is controlled to execute the inter-layer texture prediction for a picture with a value of the syntax used_by_curr_pic_lt_flag[i] set to "1".

(39) The image processing device according to any of (31) to (38), wherein
if intra prediction is performed, the decoding unit performs the intra prediction in a texture BL mode as the inter-layer texture prediction, and
if inter prediction is performed, the decoding unit performs the inter prediction in a reference index mode as the inter-layer texture prediction.

(40) An image processing method including:
receiving encoded data in which an image with a plurality of layers is encoded, and information controlling, for each picture, execution of inter-layer texture prediction for generating a predicted image by using an image of another layer as a reference image; and
generating the predicted image by performing a prediction process in which the inter-layer texture prediction is applied in accordance with the received information, and decoding the received encoded data by using the predicted image.

(41) An image processing device including:
a generation unit that generates information controlling, for each picture, execution of inter-layer texture prediction for generating a predicted image by using an image of another layer as a reference image in image data including a plurality of layers;
an encoding unit that generates the predicted image by performing a prediction process in which the inter-layer texture prediction is applied in accordance with the information generated by the generation unit and encodes the image data by using the predicted image; and
a transmission unit that transmits encoded data obtained by encoding by the encoding unit, and the information generated by the generation unit.

(42) The image processing device according to any of (41) and (43) to (49), wherein the generation unit generates syntax for a long-term reference frame of a frame memory storing the image of the other layer as the information.

(43) The image processing device according to any of (41), (42), and (44) to (49), wherein the transmission unit transmits the syntax in a sequence parameter set (sep_parameter_set_rbsp).

(44) The image processing device according to any of (41) to (43) and (45) to (49), wherein the generation unit sets a value of the syntax used_by_curr_pic_lt_sps_flag[i] of the sequence parameter set as the syntax.

(45) The image processing device according to any of (41) to (44) and (46) to (49), wherein
the generation unit sets the value of the syntax used_by_curr_pic_lt_sps_flag[i] to "0" for a picture for which the inter-layer texture prediction is not executed, and
the generation unit sets the value of the syntax used_by_curr_pic_lt_sps_flag[i] to "1" for a picture for which the inter-layer texture prediction is executed.

(46) The image processing device according to any of (41) to (45) and (47) to (49), wherein the transmission unit transmits the syntax in a slice header (slice_segment_header).

(47) The image processing device according to any of (41) to (46), (48), and (49), wherein the generation unit sets the value of the syntax used_by_curr_pic_lt_flag[i] of the slice header as the syntax.

(48) The image processing device according to any of (41) to (47) and (49), wherein
the generation unit sets the value of the syntax used_by_curr_pic_lt_flag[i] to "0" for a picture for which the inter-layer texture prediction is not executed, and
the generation unit sets the value of the syntax used_by_curr_pic_lt_flag[i] to "1" for a picture for which the inter-layer texture prediction is executed.

(49) The image processing device according to any of (41) to (48), wherein if intra prediction is performed, the encoding unit performs the intra prediction in a texture BL mode as the inter-layer texture prediction, and if inter prediction is performed, the encoding unit performs the inter prediction in a reference index mode as the inter-layer texture prediction.

(50) An image processing method including:

generating information controlling, for each picture, execution of inter-layer texture prediction for generating a predicted image by using an image of another layer as a reference image in image data including a plurality of layers;

generating the predicted image by performing a prediction process in which the inter-layer texture prediction is applied in accordance with the generated information and encoding the image data by using the predicted image; and transmitting the obtained encoded image data, and the generated information.

REFERENCE SINGS LIST

100 Scalable encoding device
101 Common information generation unit
102 Encoding control unit
103 Base layer image encoding unit
104 Interlayer prediction control unit
105 Enhancement layer image encoding unit
135 Motion prediction/compensation unit
141 Main layer maximum number setting unit
142 Sublayer maximum number setting unit
143 Inter-layer prediction execution maximum sublayer setting unit
151 Inter-layer prediction execution control unit
152 Encoding related information buffer
200 Scalable decoding device
201 Common information acquisition unit
202 Decoding control unit
203 Base layer image decoding unit
204 Inter-layer prediction control unit
205 Enhancement layer image decoding unit
232 Motion compensation unit
241 Main layer maximum number acquisition unit
242 Sublayer maximum number acquisition unit
243 Inter-layer prediction execution maximum sublayer acquisition unit
251 Inter-layer prediction execution control unit
252 Decoding related information buffer
301 Common information generation unit
342 Sublayer number setting unit
343 Inter-layer prediction execution maximum sublayer setting unit
401 Common information acquisition unit
442 Sublayer number acquisition unit
443 Inter-layer prediction execution maximum sublayer acquisition unit
501 Common information generation unit
504 Inter-layer prediction control unit
543 Common flag setting unit
544 Inter-layer prediction execution maximum sublayer setting unit
551 Inter-layer prediction execution control unit
601 Common information acquisition unit
604 Inter-layer prediction control unit
643 Common flag acquisition unit
644 Inter-layer prediction execution maximum sublayer acquisition unit
651 Inter-layer prediction execution control unit
701 Common information generation unit
704 Inter-layer prediction control unit
711 Inter-layer pixel prediction control information setting unit
721 Up-sample unit
722 Inter-layer pixel prediction control unit
723 Base layer pixel buffer
724 Base layer syntax buffer
725 Inter-layer syntax prediction control information setting unit
726 Inter-layer syntax prediction control unit
801 Common information acquisition unit
811 Inter-layer pixel prediction control information acquisition unit
821 Up-sample unit
822 Inter-layer pixel prediction control unit
823 Base layer pixel buffer
824 Base layer syntax buffer
825 Inter-layer syntax prediction control information acquisition unit
826 Inter-layer syntax prediction control unit
948 Header generation unit
1044 Header decipherment unit

The invention claimed is:

1. An image processing device comprising:
encoding circuitry configured to:
encode data by performing an inter-layer prediction on a sublayer based on inter-layer prediction control information specifying the highest sublayer used for the inter-layer prediction, wherein the inter-layer prediction is performed on sublayers from the lowest sublayer to the highest sublayer specified by the inter-layer prediction control information, the highest sublayer represented by a parameter, max_sub_layer_for_inter_layer_prediction of the inter-layer prediction control information, the sublayers starting from the lowest sublayer to the highest sublayer, and sublayers higher than the highest sublayer are not used for the inter-layer prediction, the inter-layer prediction control information being set per a non-base layer, and the inter-layer prediction control information controlling a plurality of pictures of the non-base layer; and
transmit the encoded data and inter-layer prediction control information to another device.

2. The image processing device according to claim 1, wherein the inter-layer prediction is a prediction between a plurality of main layers, when a current picture of a current main layer belongs to the sublayer specified as the sublayer for which the inter-layer prediction is performed by the inter-layer prediction control information, the encoding circuitry is further configured to encode data of the current picture using the inter-layer prediction.

3. The image processing device according to claim 2, further comprising:
a transmitter configured to transmit the encoded data in which an image with the plurality of main layers is encoded, and the inter-layer prediction control information controlling whether to perform the inter-layer prediction, which is a prediction between the plurality of main layers, with a use of the sublayer.

4. The image processing device according to claim 1, wherein the inter-layer prediction is a prediction between a plurality of main layers, the inter-layer prediction control information is set for each main layer.

5. The image processing device according to claim 1, wherein the inter-layer prediction is a prediction between a plurality of main layers, the inter-layer prediction control information is set as a parameter common to all the main layers.

6. The image processing device according to claim 1, wherein
a transmitter configured to transmit inter-layer pixel prediction control information that controls whether to perform an inter-layer pixel prediction, which is a pixel prediction between a plurality of main layers, and inter-layer syntax prediction control information that controls whether to perform an inter-layer syntax prediction, which is a syntax prediction between the plurality of main layers, the inter-layer pixel prediction control information and the inter-layer syntax prediction control information being set independently as the inter-layer prediction control information, wherein
the encoding circuitry is further configured to perform the inter-layer pixel prediction based on the inter-layer pixel prediction control information, and perform the inter-layer syntax prediction based on the inter-layer syntax prediction control information.

7. The image processing device according to claim 6, wherein
the inter-layer pixel prediction control information controls using the sublayer, whether to perform the inter-layer pixel prediction,
the encoding circuitry is further configured to perform the inter-layer pixel prediction on only the sublayer specified by the inter-layer pixel prediction control information,
the inter-layer syntax prediction control information controls whether to perform the inter-layer syntax prediction for each picture or slice, and
the encoding circuitry is further configured to perform the inter-layer syntax prediction on only the picture or slice specified by the inter-layer syntax prediction control information.

8. The image processing device according to claim 7, wherein the inter-layer pixel prediction control information is transmitted as a nal unit (nal_unit), a video parameter set (VPS (Video Parameter Set)), or an extension video parameter set (vps_extension).

9. The image processing device according to claim 7, wherein the inter-layer syntax prediction control information is transmitted as a nal unit (nal_unit), a picture parameter set (PPS (Picture Parameter Set)), or a slice header (SliceHeader).

10. An image processing method comprising:
encoding data by performing an inter-layer prediction on a sublayer based on inter-layer prediction control information specifying the highest sublayer used for the inter-layer prediction, wherein the inter-layer prediction is performed on sublayers from the lowest sublayer to the highest sublayer specified by the inter-layer prediction control information, the highest sublayer represented by a parameter, max_sub_layer_for_inter_layer_prediction of the inter-layer prediction control information, the sublayers starting from the lowest sublayer to the highest sublayer, and sublayers higher than the highest sublayer are not used for the inter-layer prediction, the inter-layer prediction control information being set per a non-base layer, and the inter-layer prediction control information controlling a plurality of pictures of the non-base layer; and
transmitting the encoded data and inter-layer prediction control information to another device.

* * * * *